(12) United States Patent
Taguchi et al.

(10) Patent No.: US 11,198,608 B2
(45) Date of Patent: *Dec. 14, 2021

(54) METAL-BASED STRUCTURE OR NANOPARTICLES CONTAINING HYDROGEN, AND METHOD FOR PRODUCING SAME

(71) Applicant: Kohei Taguchi, Yokohama (JP)

(72) Inventors: Kohei Taguchi, Yokohama (JP); Kazuteru Shinozaki, Yokohama (JP); Satoshi Takayasu, Yokohama (JP)

(73) Assignee: Kohei Taguchi, Yokohama (JP)

( * ) Notice: Subject to any disclaimer, the term of this patent is extended or adjusted under 35 U.S.C. 154(b) by 214 days.

This patent is subject to a terminal disclaimer.

(21) Appl. No.: 16/134,491

(22) Filed: Sep. 18, 2018

(65) Prior Publication Data
US 2019/0016595 A1     Jan. 17, 2019

Related U.S. Application Data

(63) Continuation of application No. 15/104,571, filed as application No. PCT/JP2014/082997 on Dec. 12, 2014, now Pat. No. 10,125,019.

(30) Foreign Application Priority Data

Dec. 18, 2013    (JP) .............................. JP2013-261676

(51) Int. Cl.
    *C01B 6/02*    (2006.01)
    *B22F 9/26*    (2006.01)
    (Continued)

(52) U.S. Cl.
    CPC .............. *C01B 6/02* (2013.01); *B22F 1/0018* (2013.01); *B22F 1/0096* (2013.01); *B22F 9/24* (2013.01);
    (Continued)

(58) Field of Classification Search
    CPC .. B01J 23/745; B01J 35/0013; B01J 35/0033; B01J 35/06; B01J 37/16; B22F 1/0018;
    (Continued)

(56) References Cited

U.S. PATENT DOCUMENTS

| 10,125,019 B2* | 11/2018 | Taguchi .................... B22F 9/24 |
| 2006/0163500 A1 | 7/2006 | Inoue et al. |
| 2009/0162709 A1* | 6/2009 | Mills ......................... C01B 6/04 429/492 |

FOREIGN PATENT DOCUMENTS

| JP | S6435746 A | 2/1989 |
| JP | 2000327319 A | 11/2000 |

(Continued)

OTHER PUBLICATIONS

Yang et al. "Silicon Monohydride Clusters SinH (n ) 4-10) and Their Anions: Structures, Thermochemistry, and Electron Affinities" J. Phys. Chem. A 2005, 109, 5717-5723 (Year: 2005).*

(Continued)

*Primary Examiner* — Steven J Bos
*Assistant Examiner* — Syed T Iqbal
(74) *Attorney, Agent, or Firm* — Osha Bergman Watanabe & Burton LLP

(57) ABSTRACT

To provide a metal-based structure or nanoparticles whose homogeneity is not deteriorated and whose sticking formation is easy, and a production method thereof with a high safety. A metal-based structure comprises a hydrogen compound, cluster, or an aggregate thereof, represented by the general formula: $M_mH$. The M is a metal-based atom. The m is an integer of 3 or more and 300 or less. H is a hydrogen atom.

26 Claims, 35 Drawing Sheets

(51) Int. Cl.

| | | |
|---|---|---|
| *B22F 1/00* | (2006.01) | |
| *C01B 6/00* | (2006.01) | |
| *B22F 9/24* | (2006.01) | |
| *B01J 37/16* | (2006.01) | |
| *B01J 23/745* | (2006.01) | |
| *B01J 35/00* | (2006.01) | |
| *B01J 35/06* | (2006.01) | |
| *C25B 1/55* | (2021.01) | |
| *B82Y 30/00* | (2011.01) | |
| *B82Y 40/00* | (2011.01) | |

(52) U.S. Cl.
    CPC .............. *B22F 9/26* (2013.01); *C01B 6/00* (2013.01); *B01J 23/745* (2013.01); *B01J 35/0013* (2013.01); *B01J 35/0033* (2013.01); *B01J 35/06* (2013.01); *B01J 37/16* (2013.01); *B22F 2009/245* (2013.01); *B82Y 30/00* (2013.01); *B82Y 40/00* (2013.01); *C01P 2002/02* (2013.01); *C01P 2006/42* (2013.01); *C25B 1/55* (2021.01)

(58) Field of Classification Search
    CPC .... B22F 1/0096; B22F 2009/245; B22F 9/24; B22F 9/26; B82Y 30/00; B82Y 40/00; C01B 6/00; C01B 6/02; C01P 2002/02; C01P 2006/42; C25B 1/003
    See application file for complete search history.

(56) References Cited

FOREIGN PATENT DOCUMENTS

| JP | 2001316783 A | 11/2001 |
|---|---|---|
| JP | 2001316784 A | 11/2001 |
| JP | 2006202671 A | 8/2006 |
| JP | 2008214704 A | 9/2008 |
| JP | 2010032438 A | 2/2010 |
| JP | 2011144416 A | 7/2011 |

OTHER PUBLICATIONS

Badding et al. "High-Pressure Chemistry of Hydrogen in Metals: In Situ Study of Iron Hydride" Science, vol. 253, p. 421-424 (Year: 1991).*
Vetter et al. "Hydrogen mimicking the properties of coinage metal atoms in Cu and Ag monohydride clusters", Phys. Chem. Chem. Phys., 2013, 15, 21007-21015 (Year: 2013).*
Petkov et al. "Density functional study of Ni6 clusters", Chemical Physics 348 (2008) 61-68 (Year: 2008).*
Ishimoto et al. "Analysis of isotope effect of hydrogen-absorbing Pdultra-fine particle by X-ray powder diffraction andfirst principle multi-component MO calculation", Chemical Physics Letters 372 (2003) 503-507 (Year: 2003).*
V. E. Antonov et al., "High-pressure hydrides of iron and its alloys", Journal of Physics: Condensed Matter, Jan. 1, 2020, vol. 14, XP055656980, Retrieved from Internet, pp. 6427-6445 (20 pages).
Office Action issued in European Application No. 14871922.2, dated Jan. 16, 2020 (4 pages).
Office Action issued in Japanese Application No. 2015-532639, dated Oct. 20, 2015 (13 pages).
Office Action issued in Japanese Application No. 2015-532639, dated Mar. 1, 2016 (7 pages).
Office Action issued in Japanese Application No. 2015-532639, dated Jun. 28, 2016 (11 pages).
Office Action issued in Japanese Application No. 2020-017529, dated Jan. 5, 2021 (4 pages).

* cited by examiner

[Fig. 1]
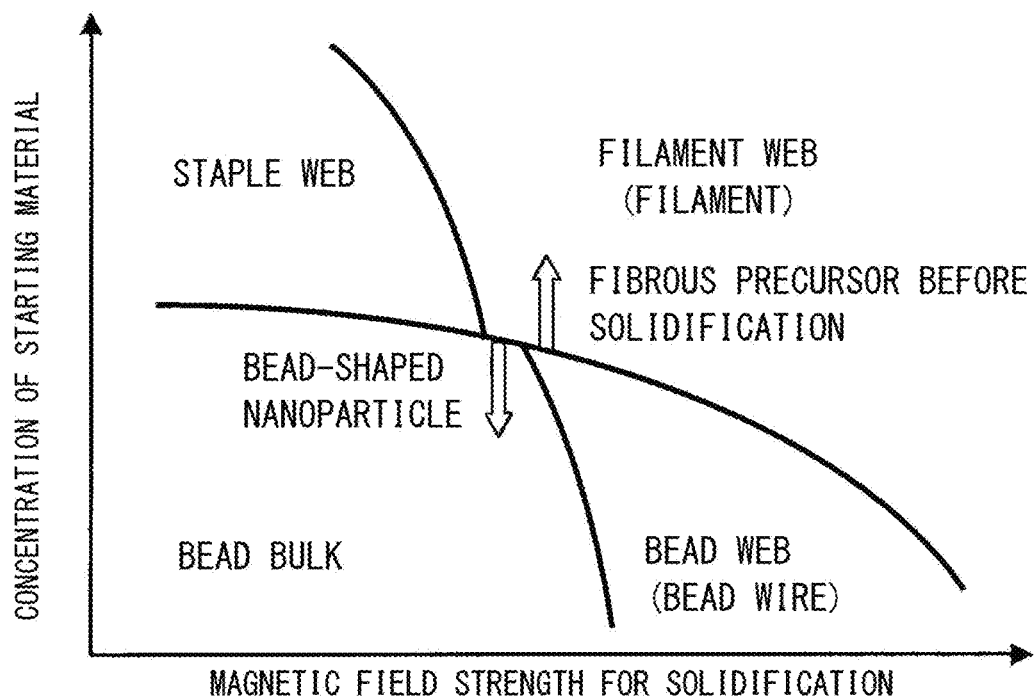
[Fig. 2]
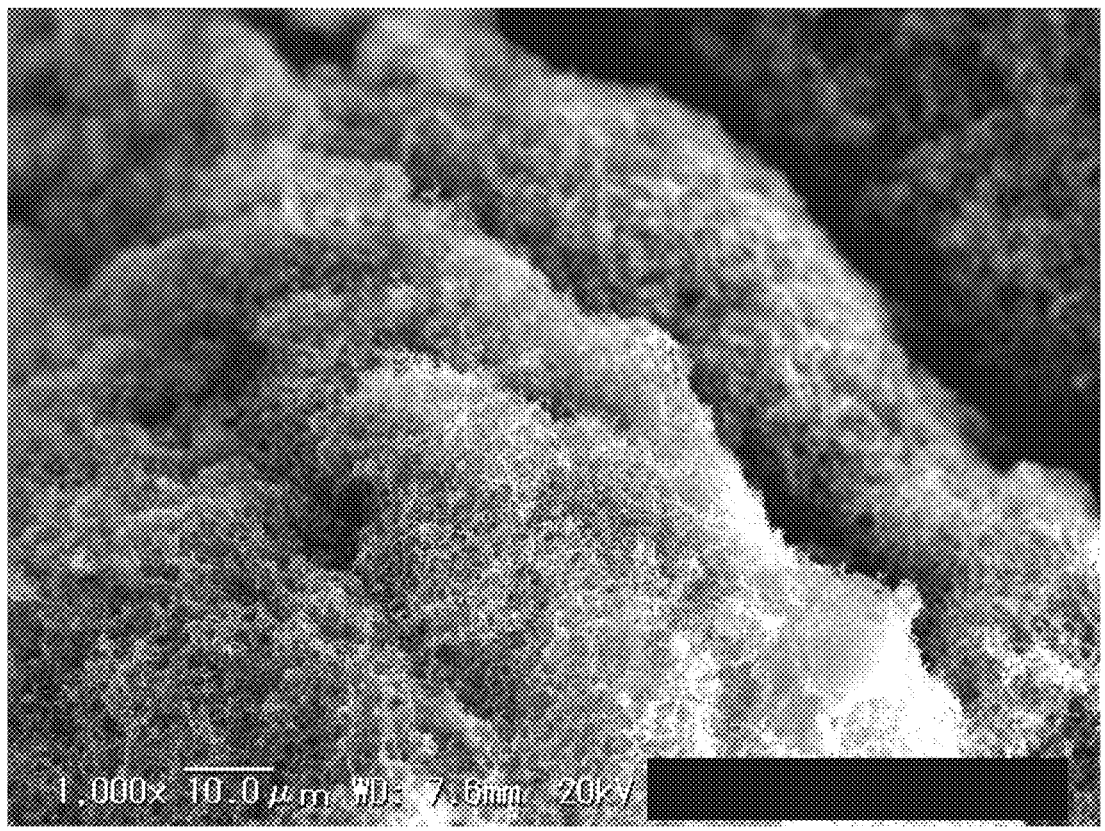

[Fig. 3]
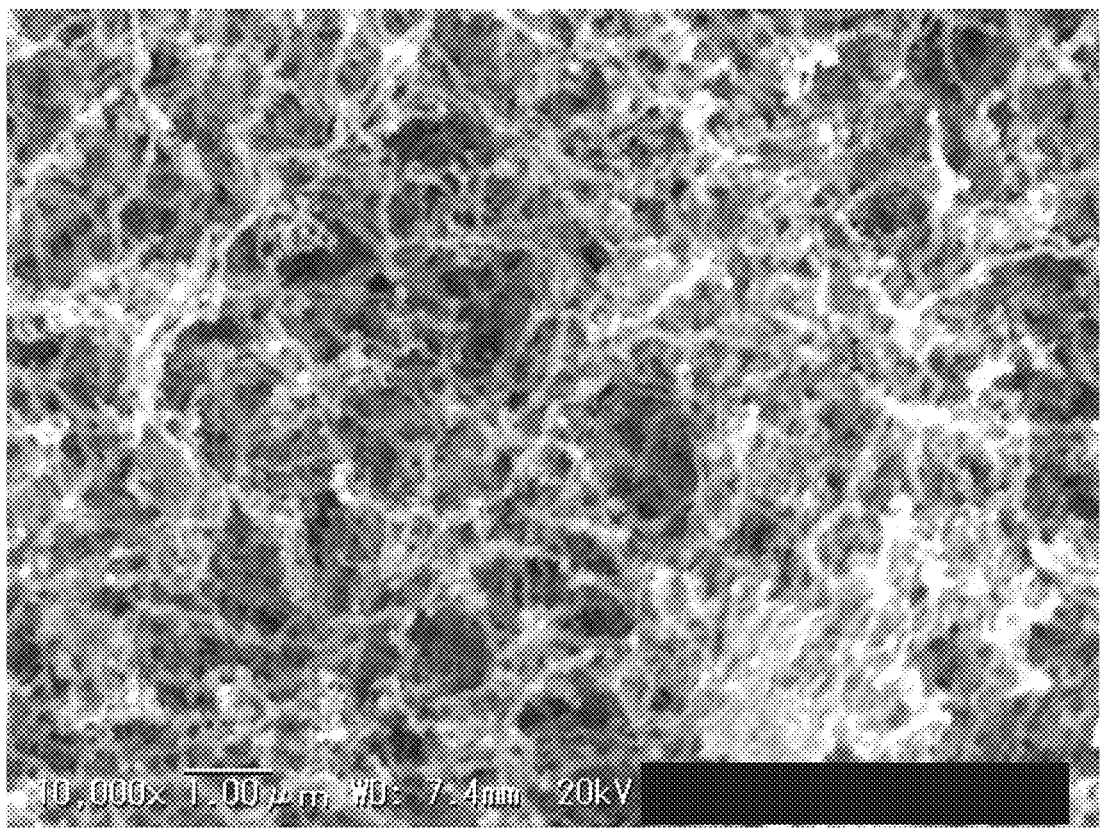
[Fig. 4]
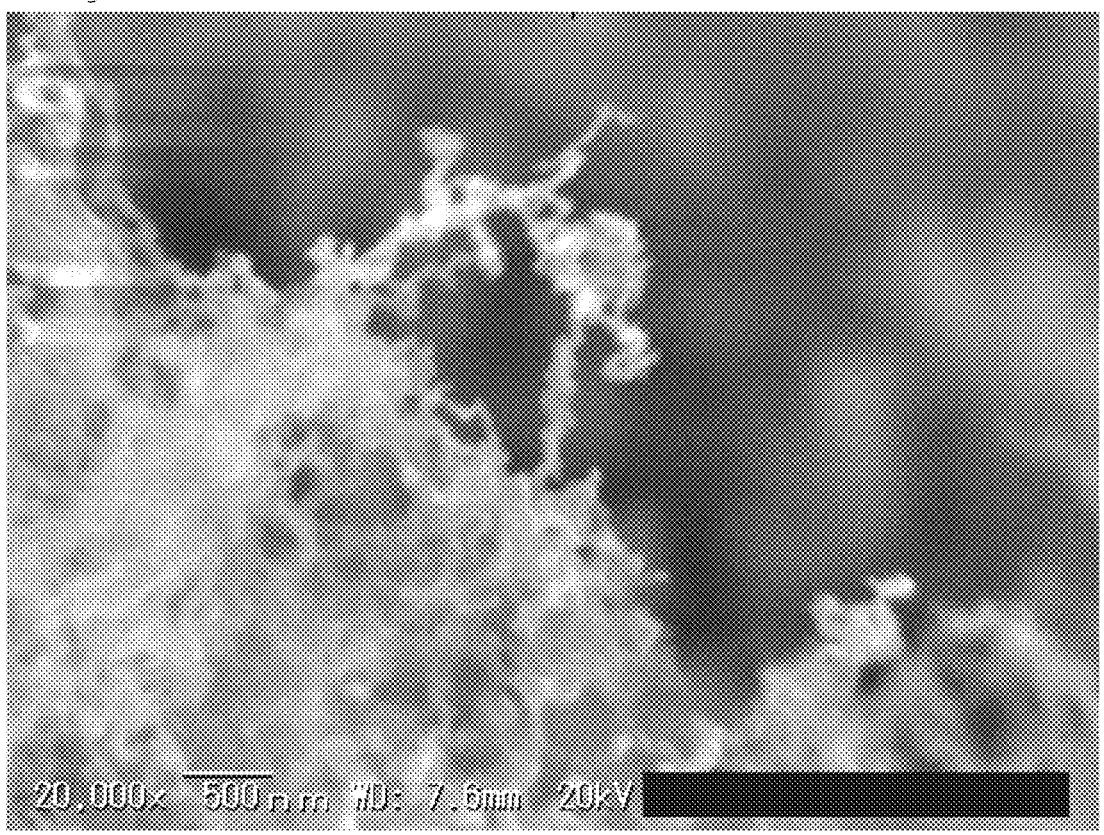

[Fig. 5]
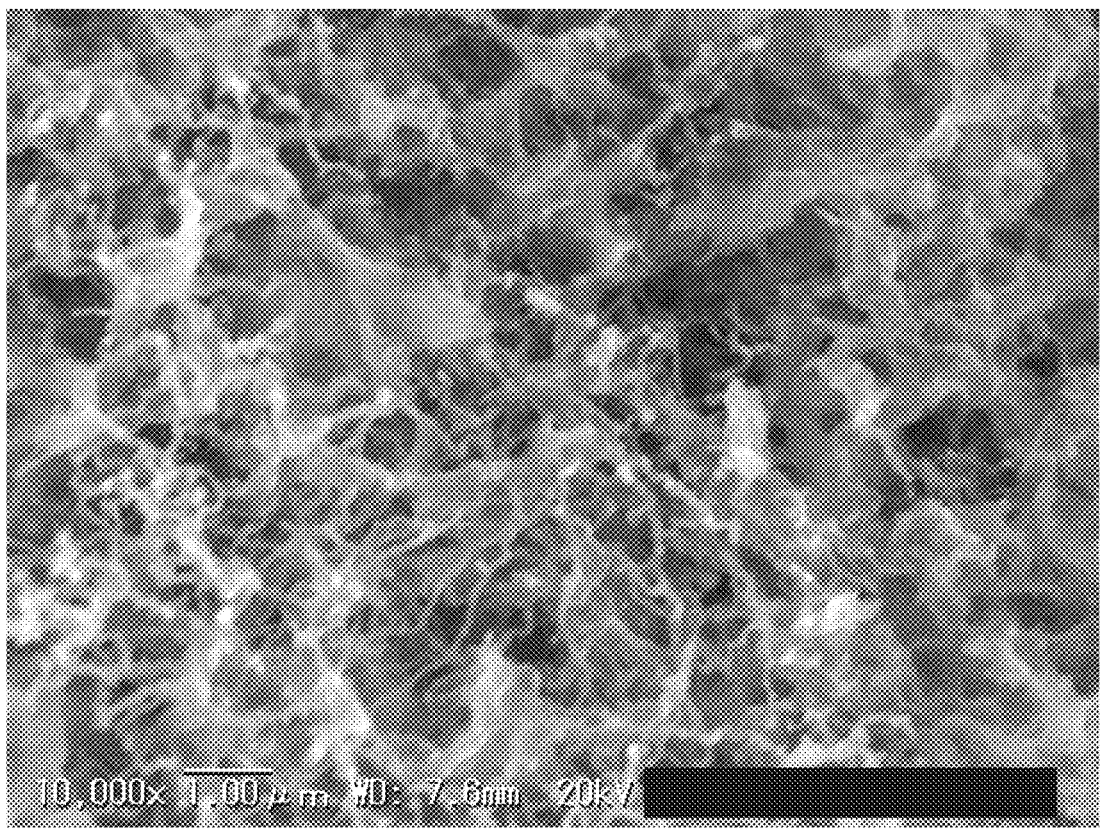
[Fig. 6]
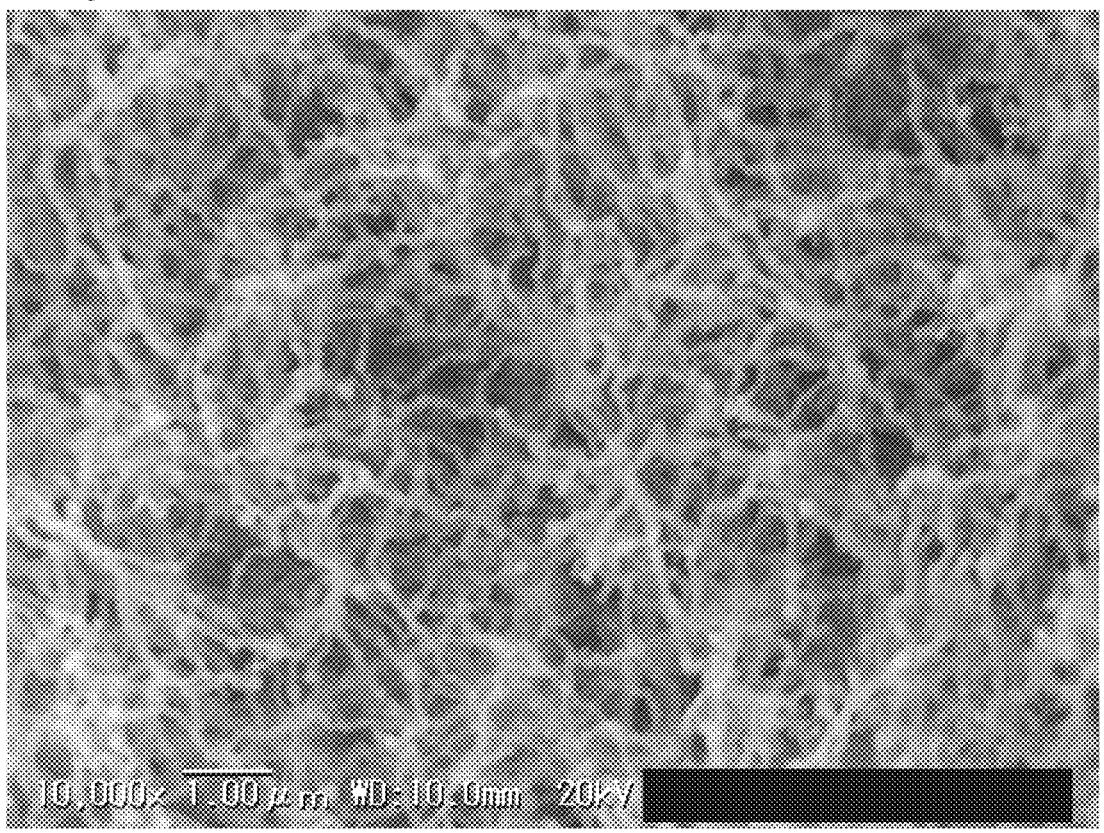

[Fig. 7]
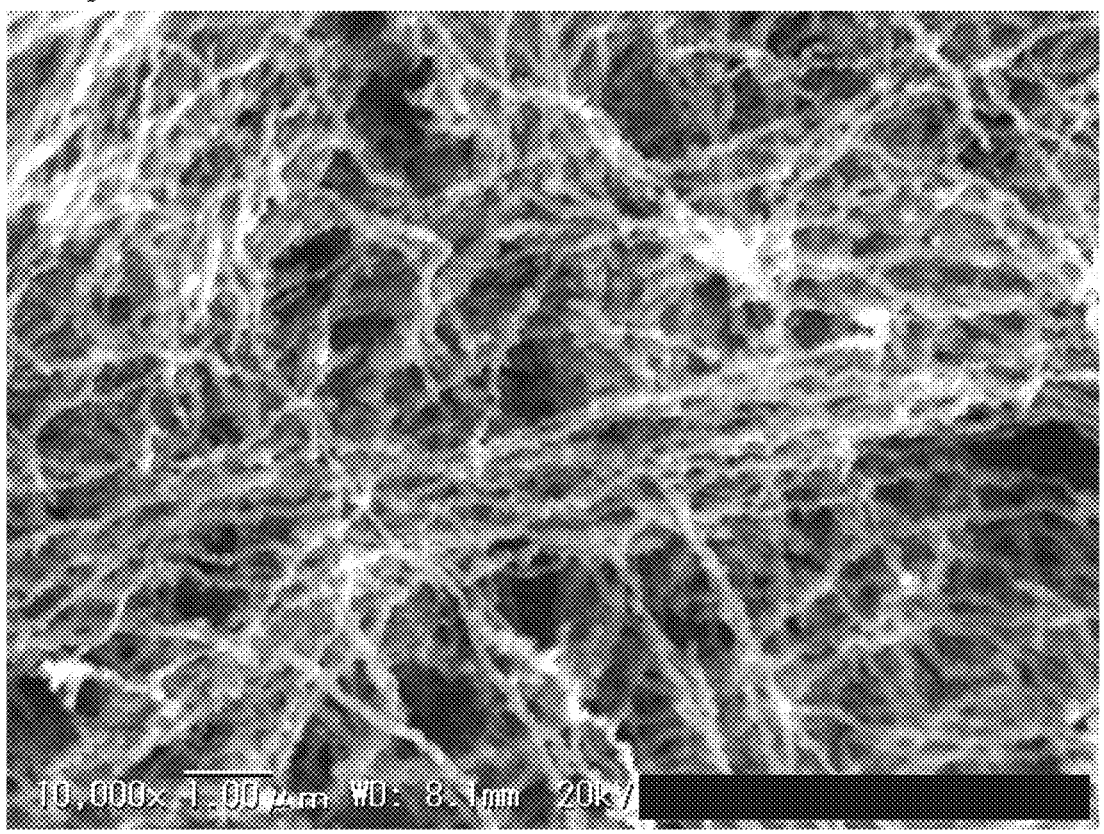
[Fig. 8]
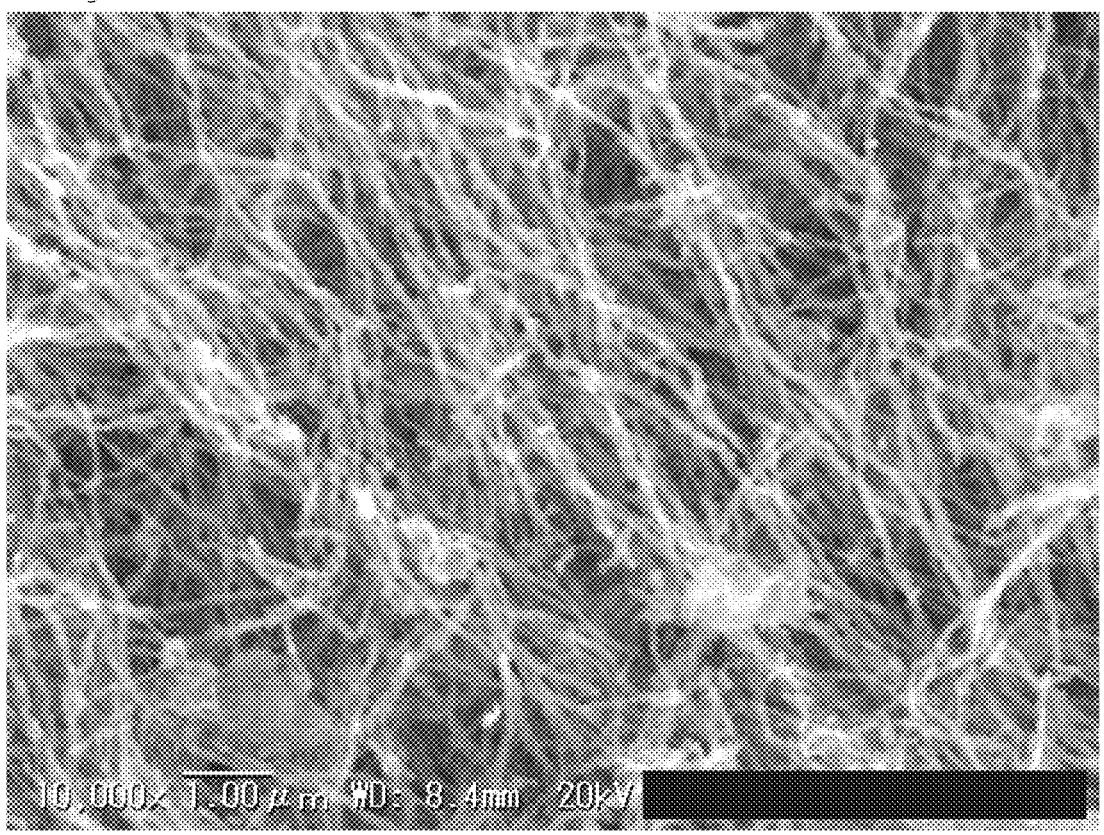

[Fig. 9]
[Fig. 10]
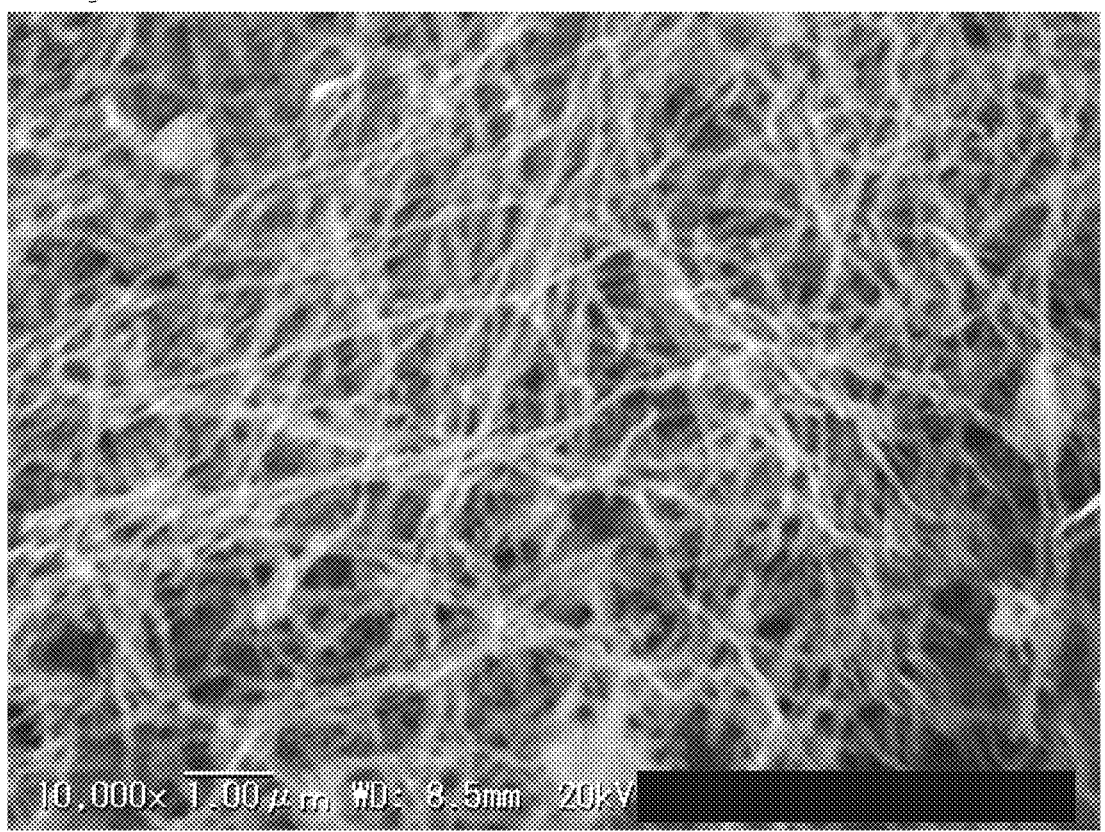

[Fig. 11]
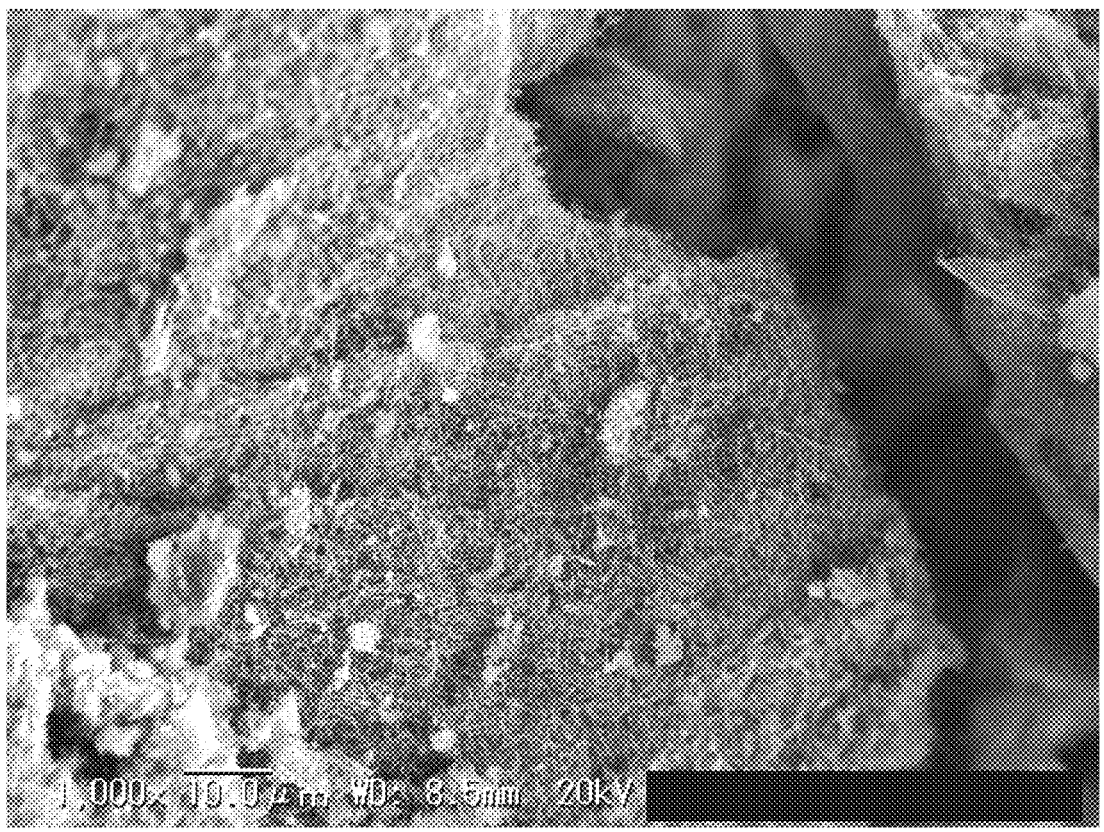
[Fig. 12]
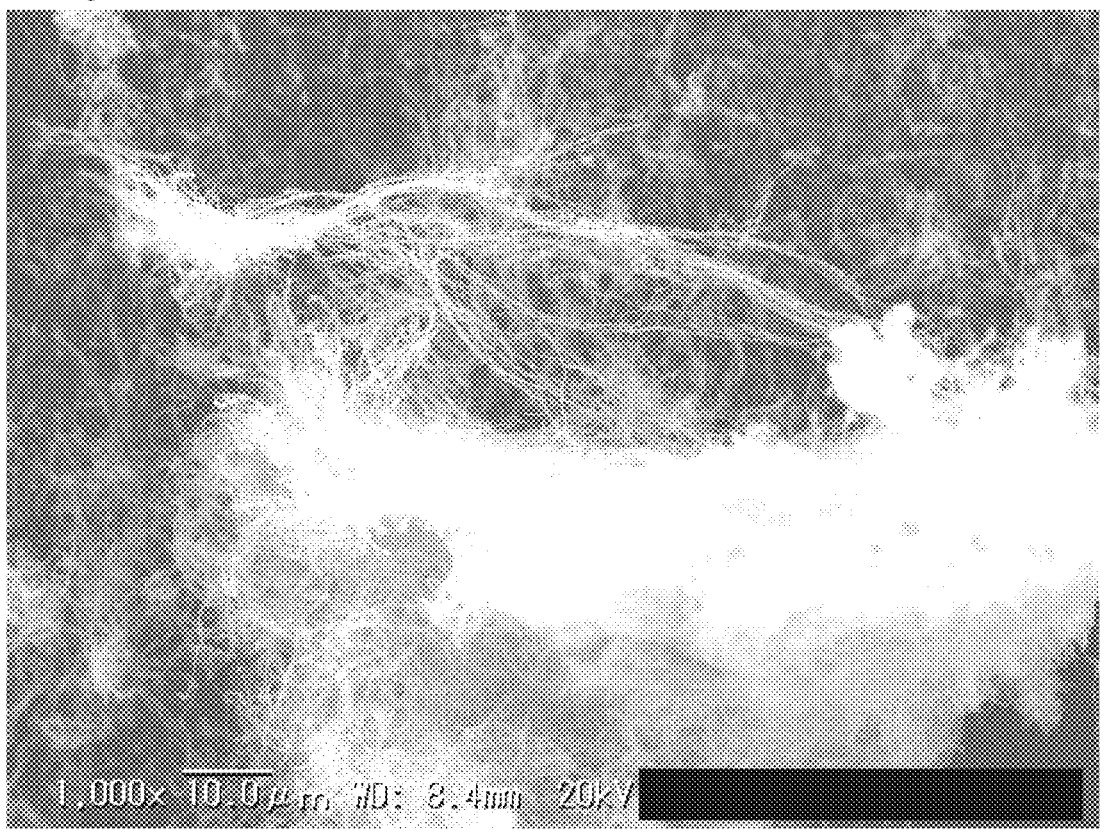

[Fig. 13]
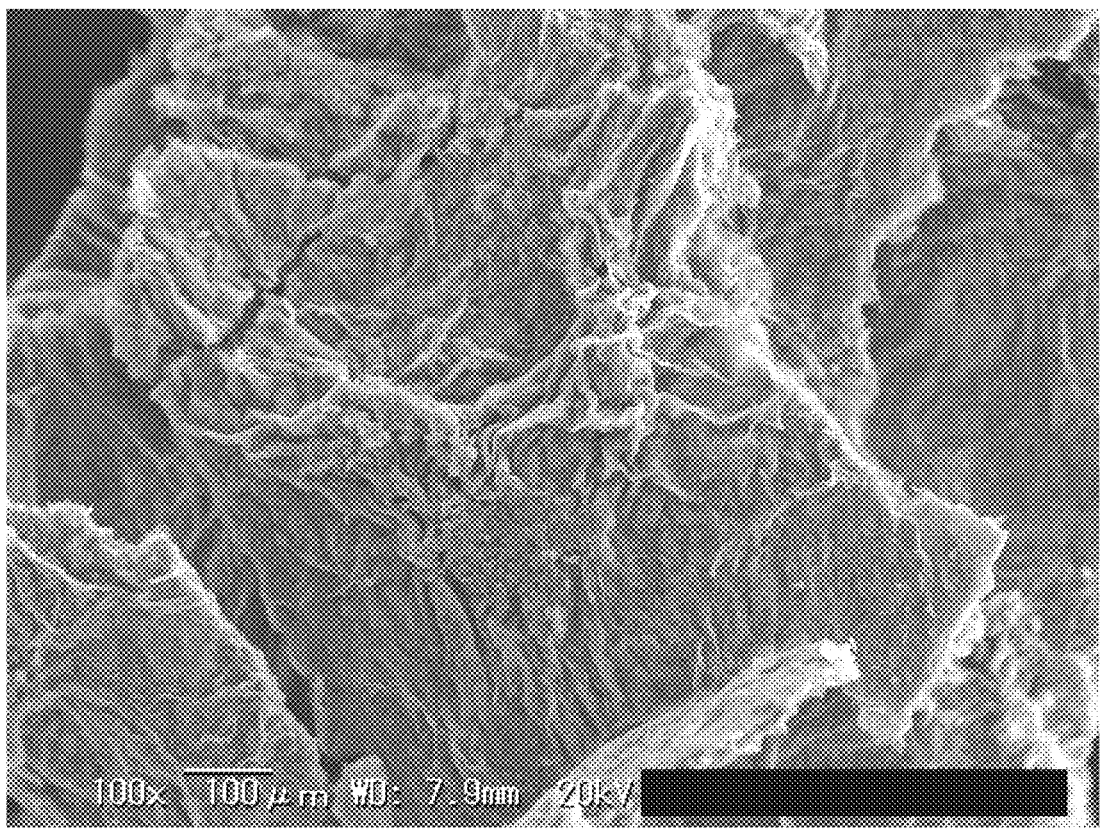
[Fig. 14]
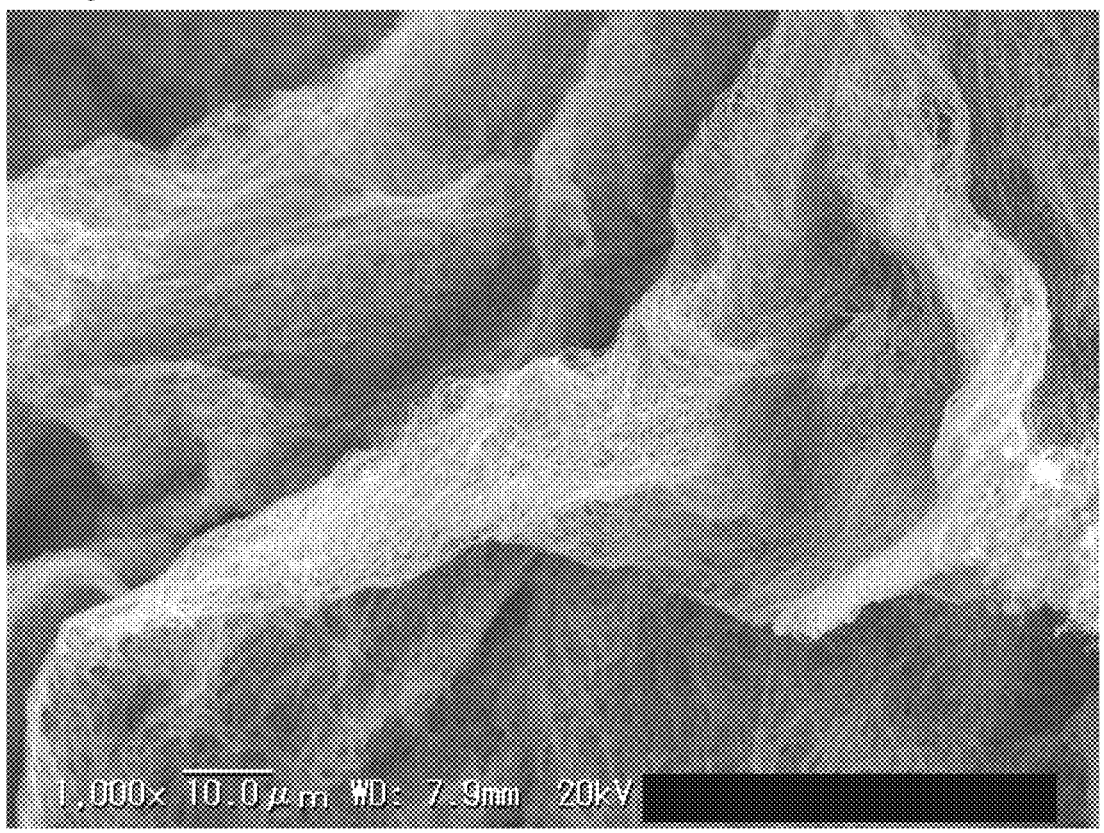

[Fig. 15]
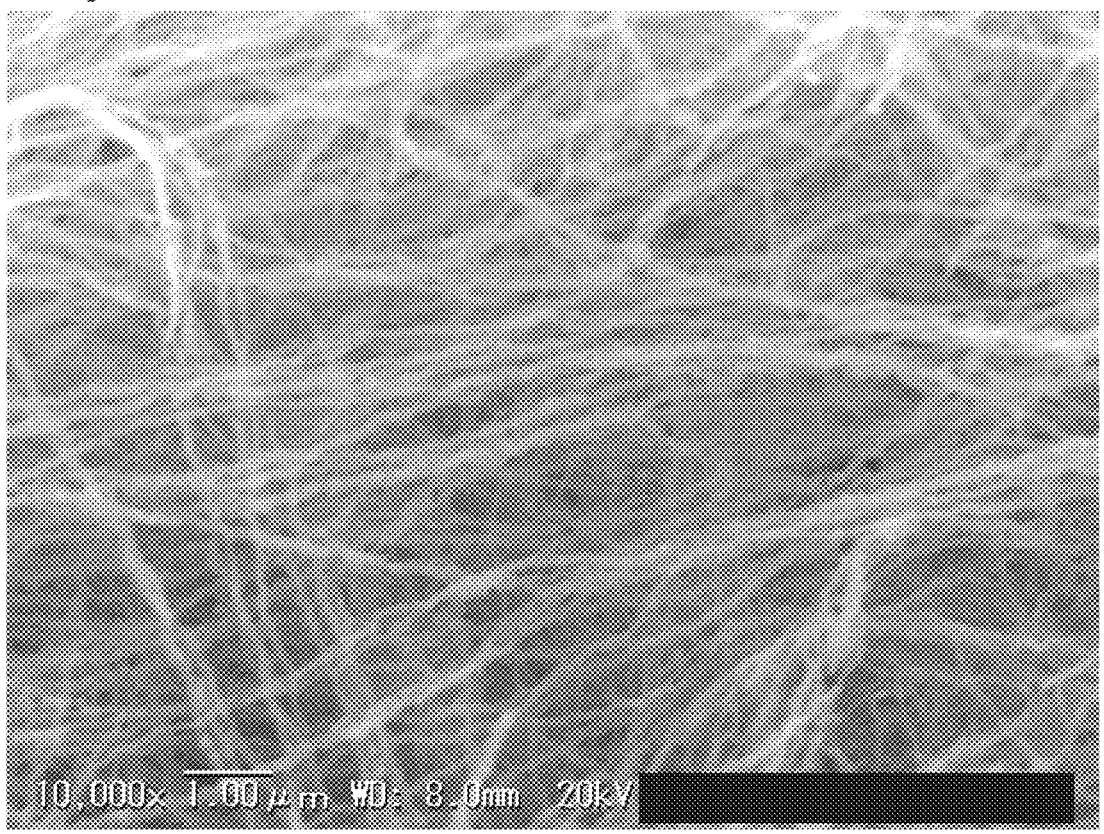
[Fig. 16]
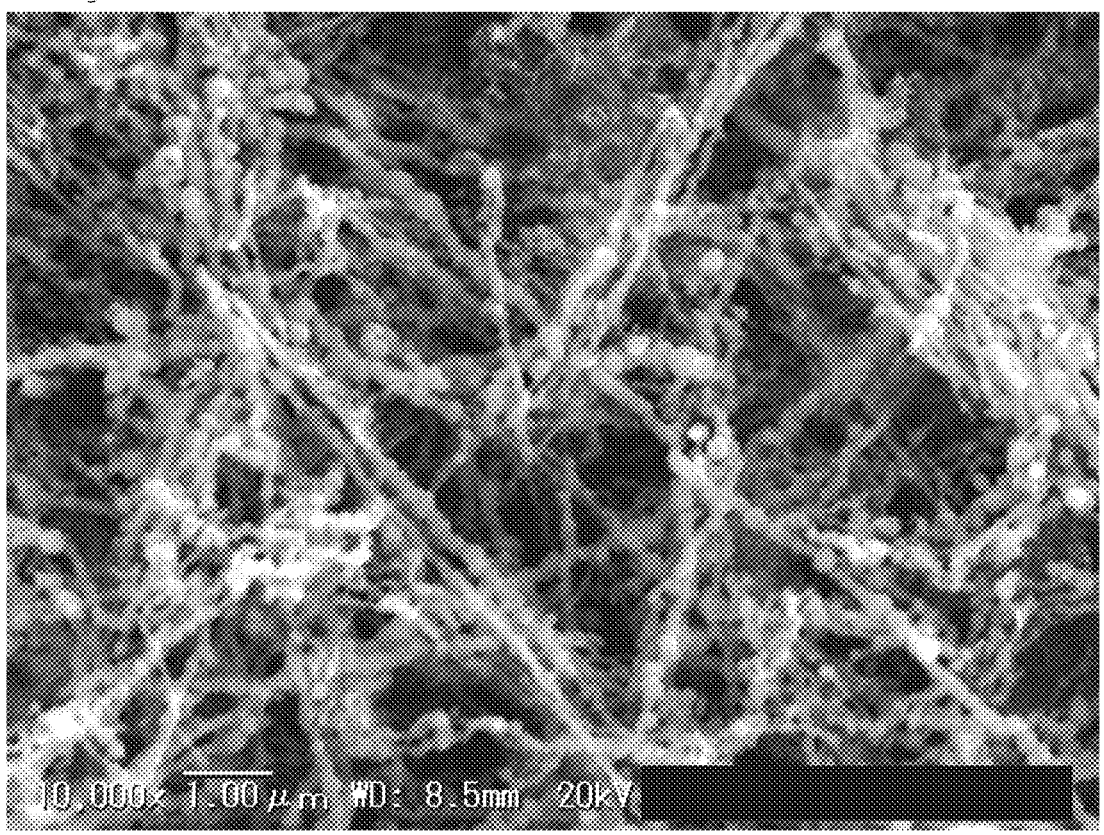

[Fig. 17]
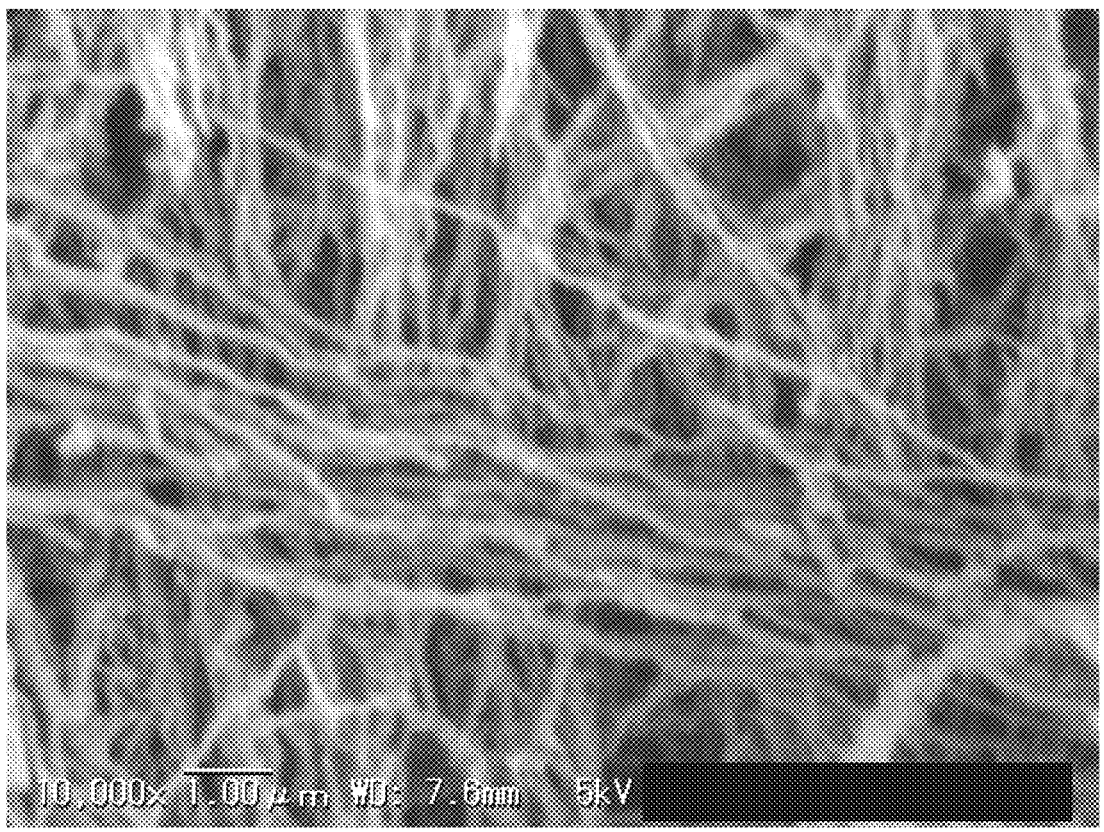
[Fig. 18]
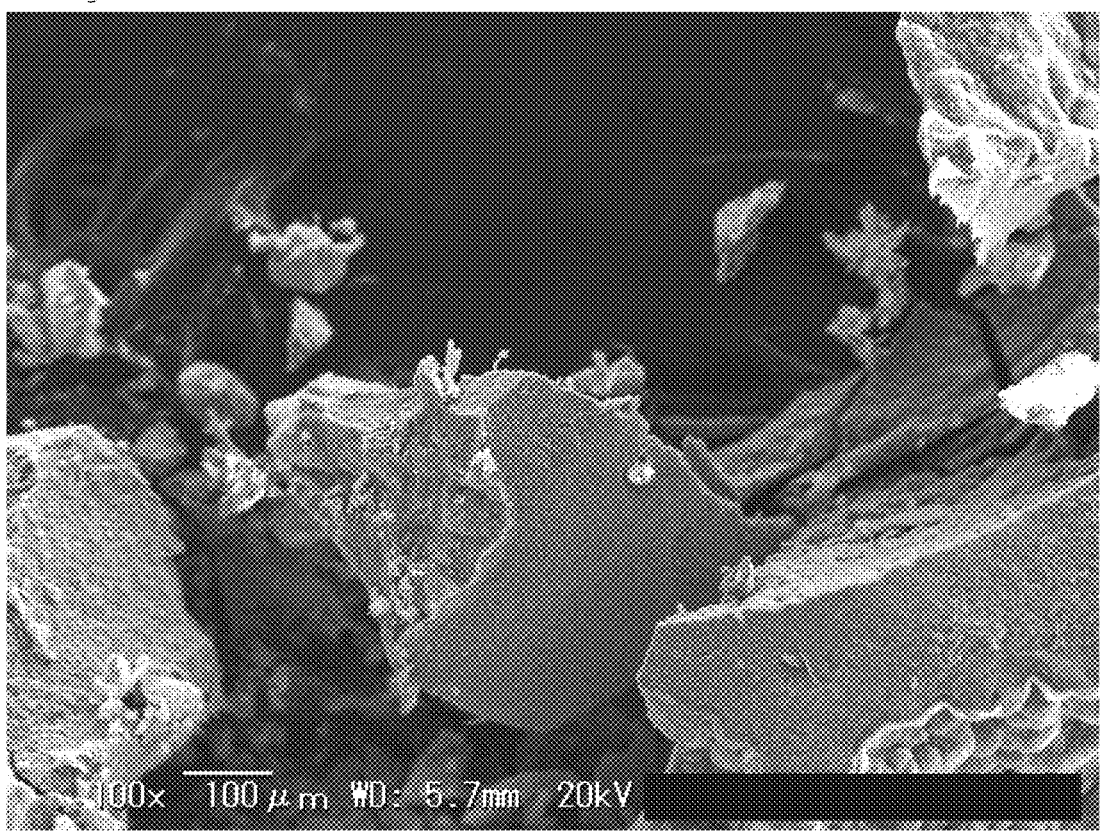

[Fig. 19]
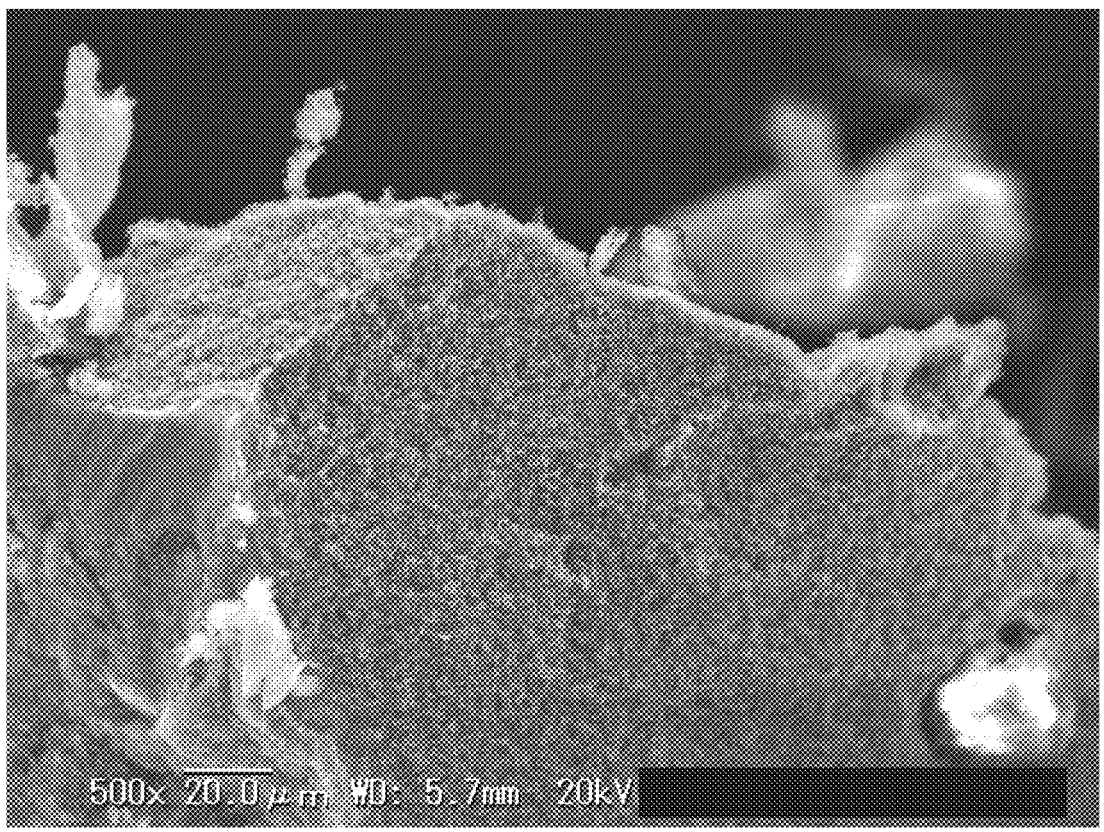
[Fig. 20]
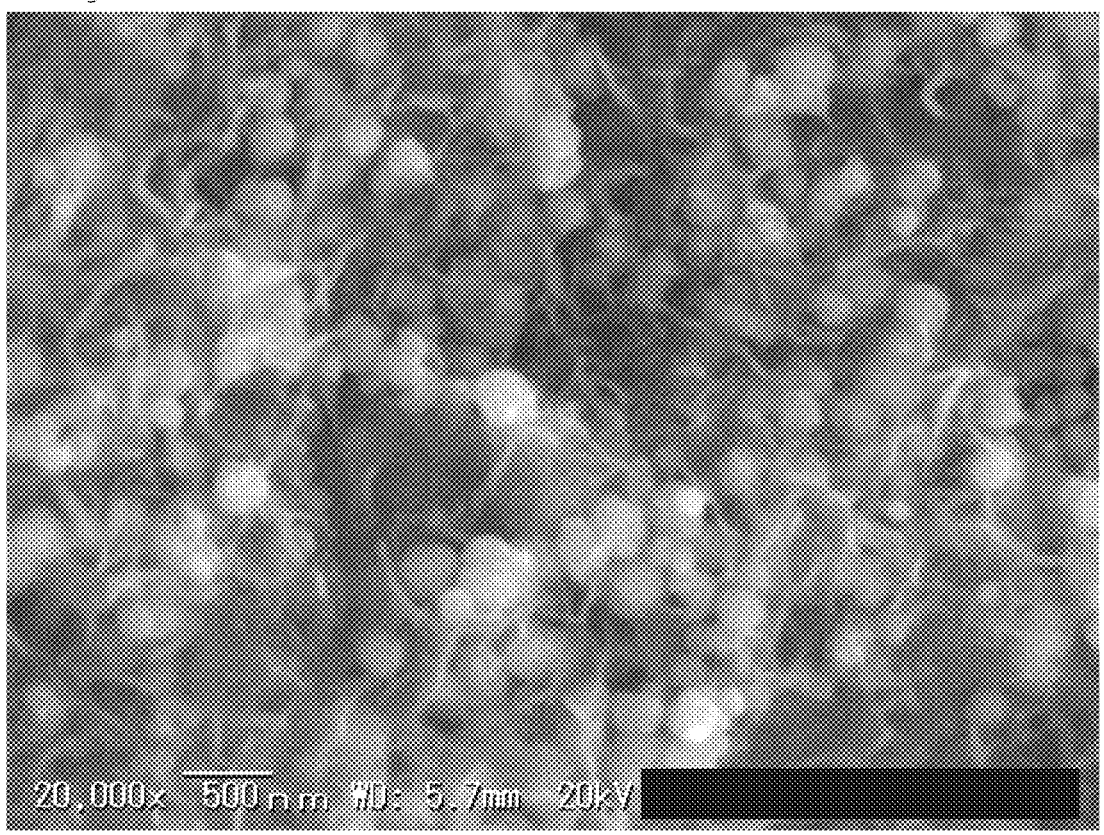

[Fig. 21]
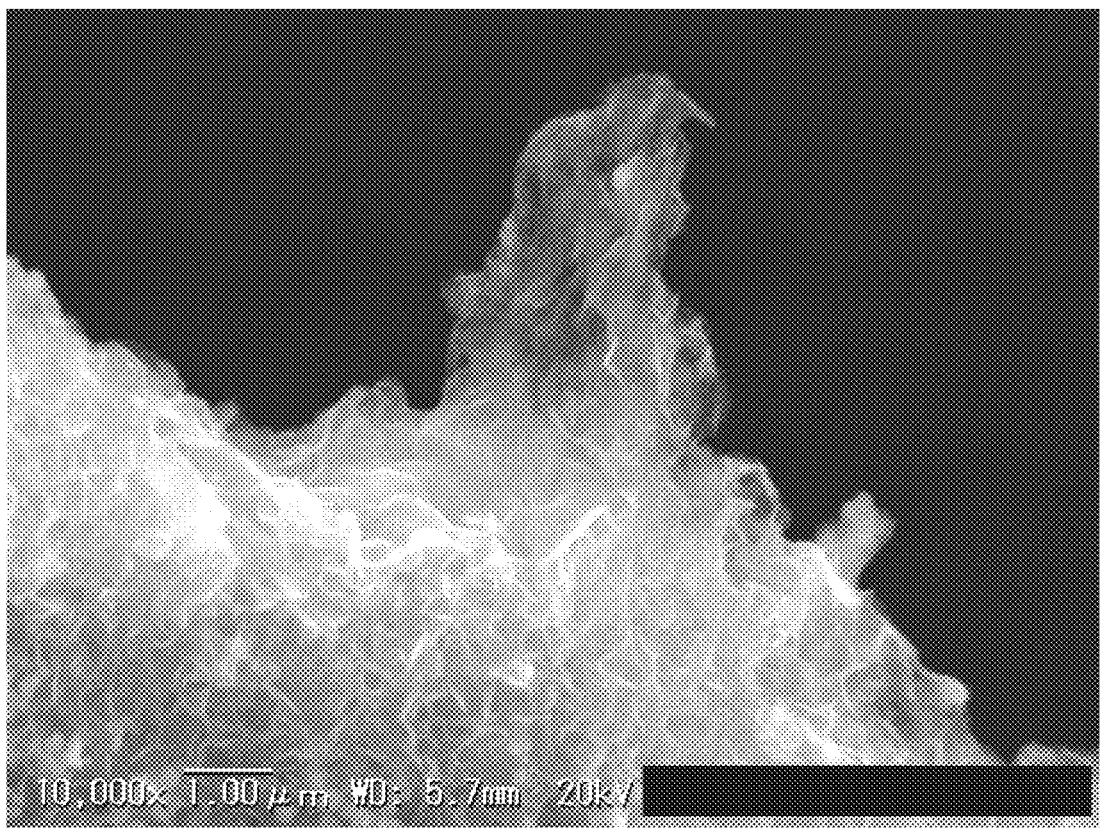
[Fig. 22]
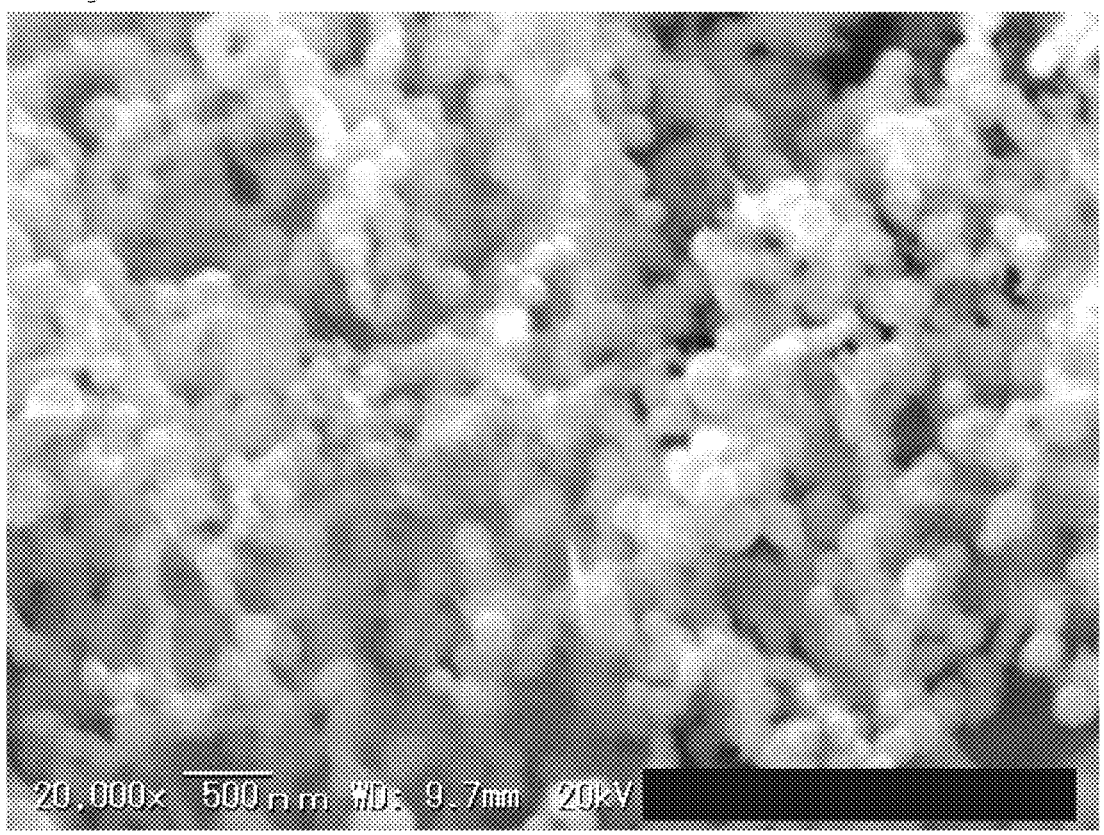

[Fig. 23]
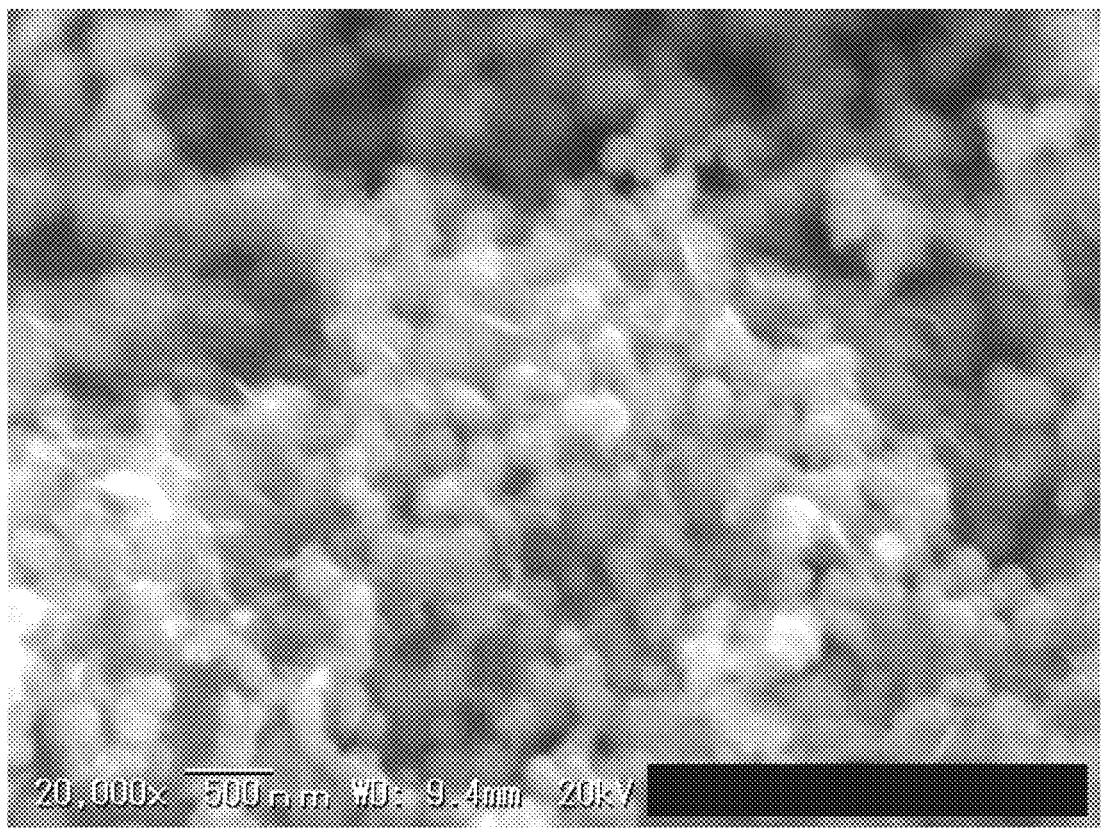
[Fig. 24]
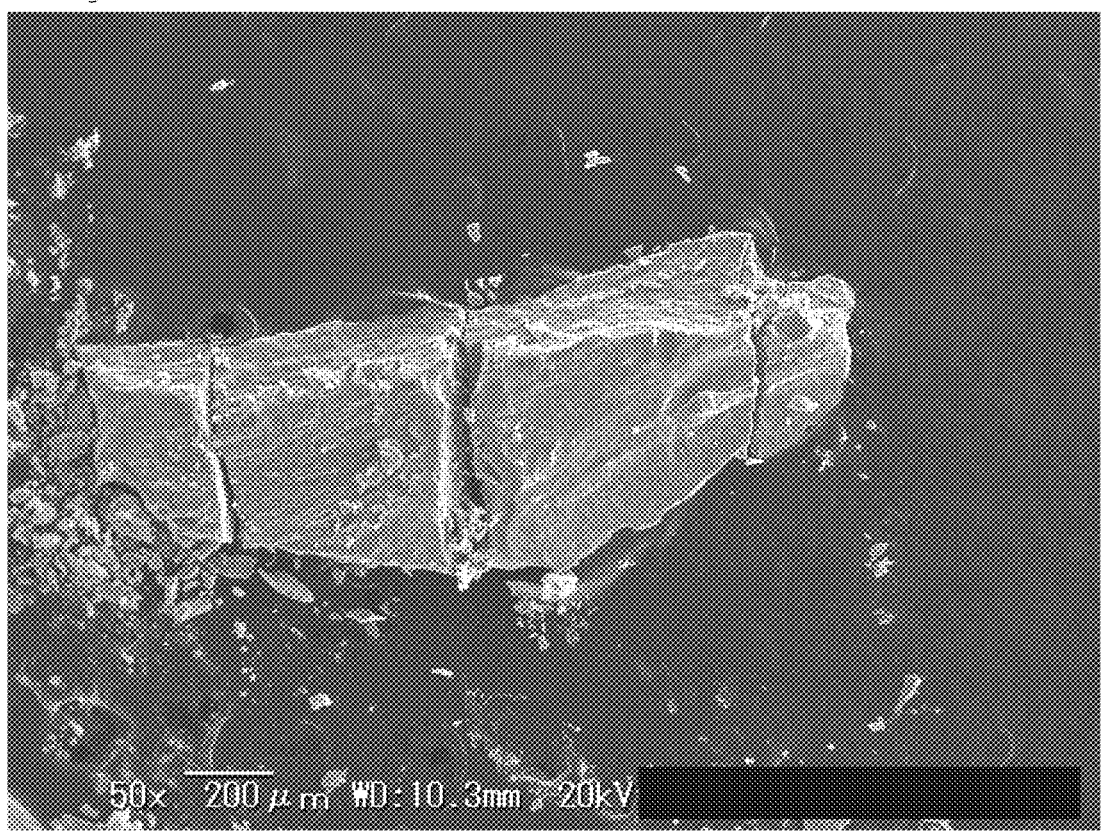

[Fig. 25]
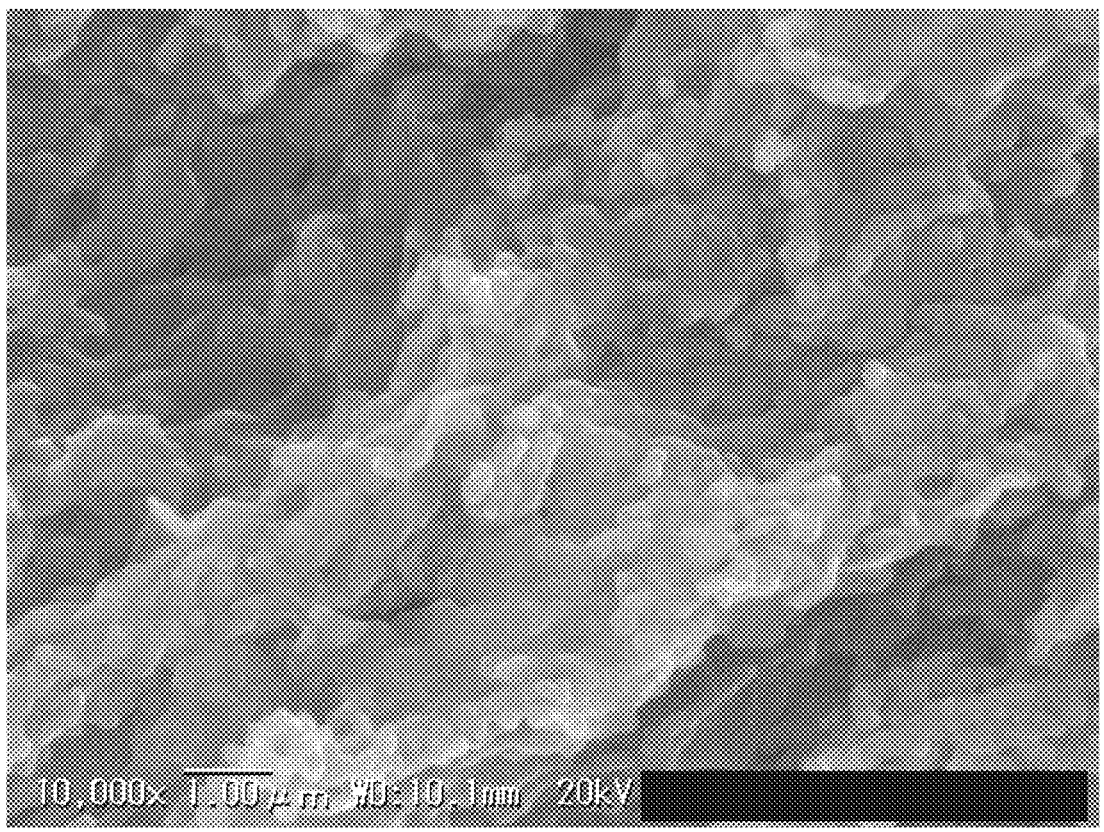
[Fig. 26]
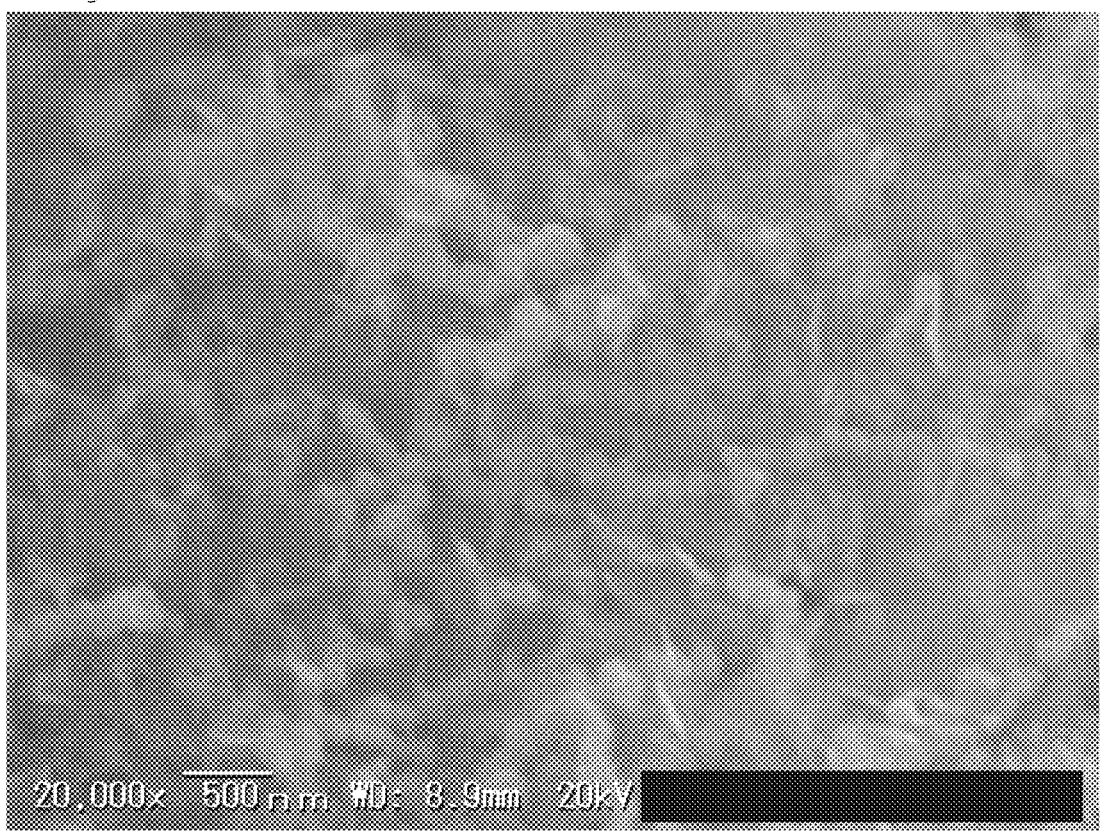

[Fig. 27]
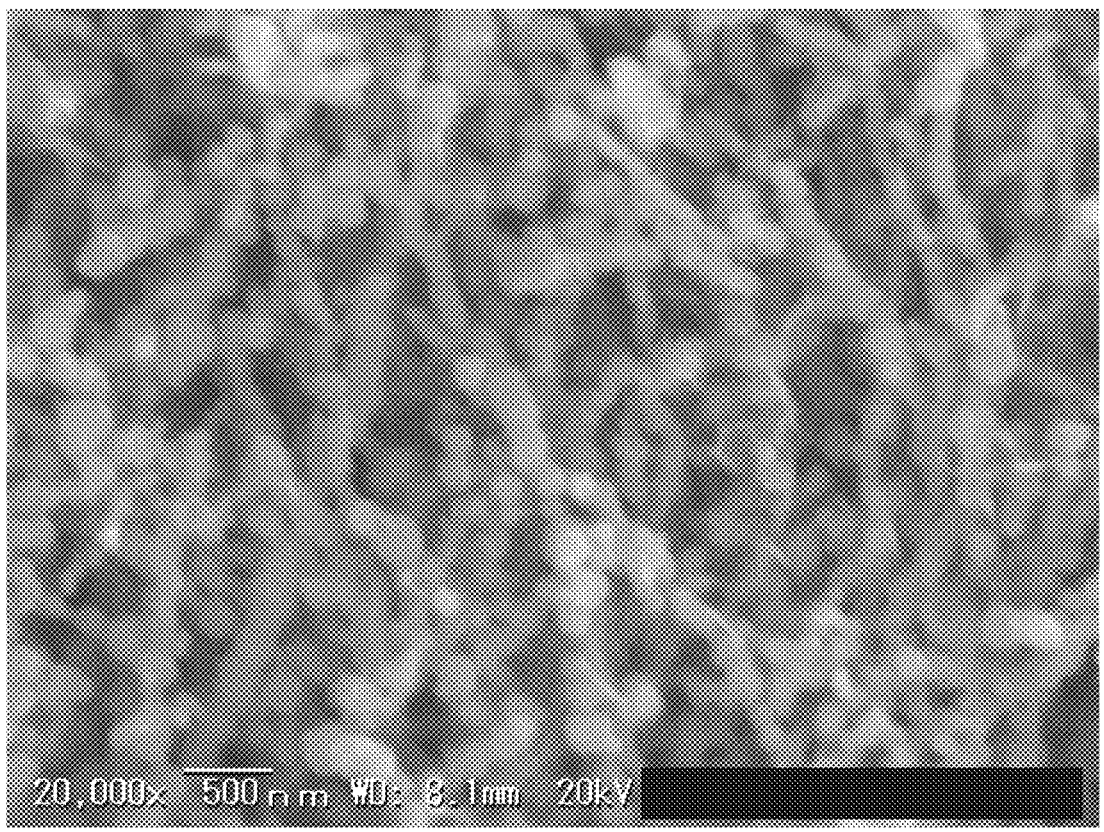
[Fig. 28]
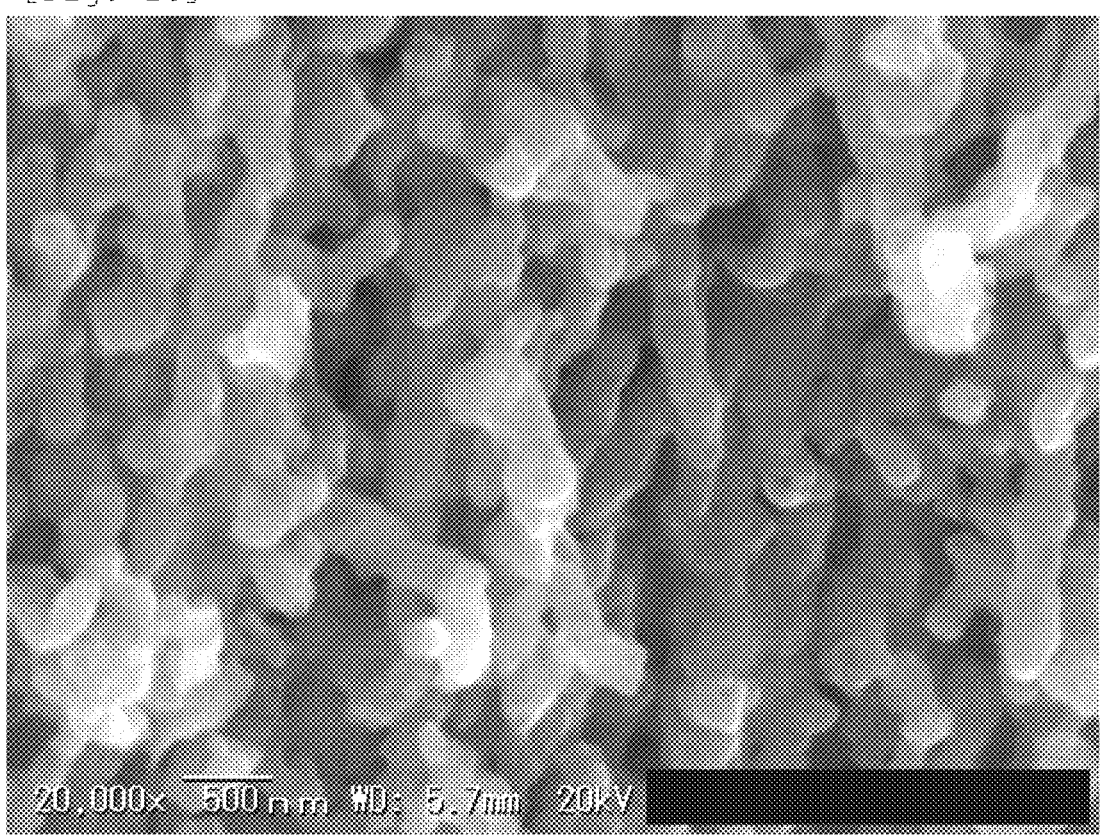

[Fig. 29]
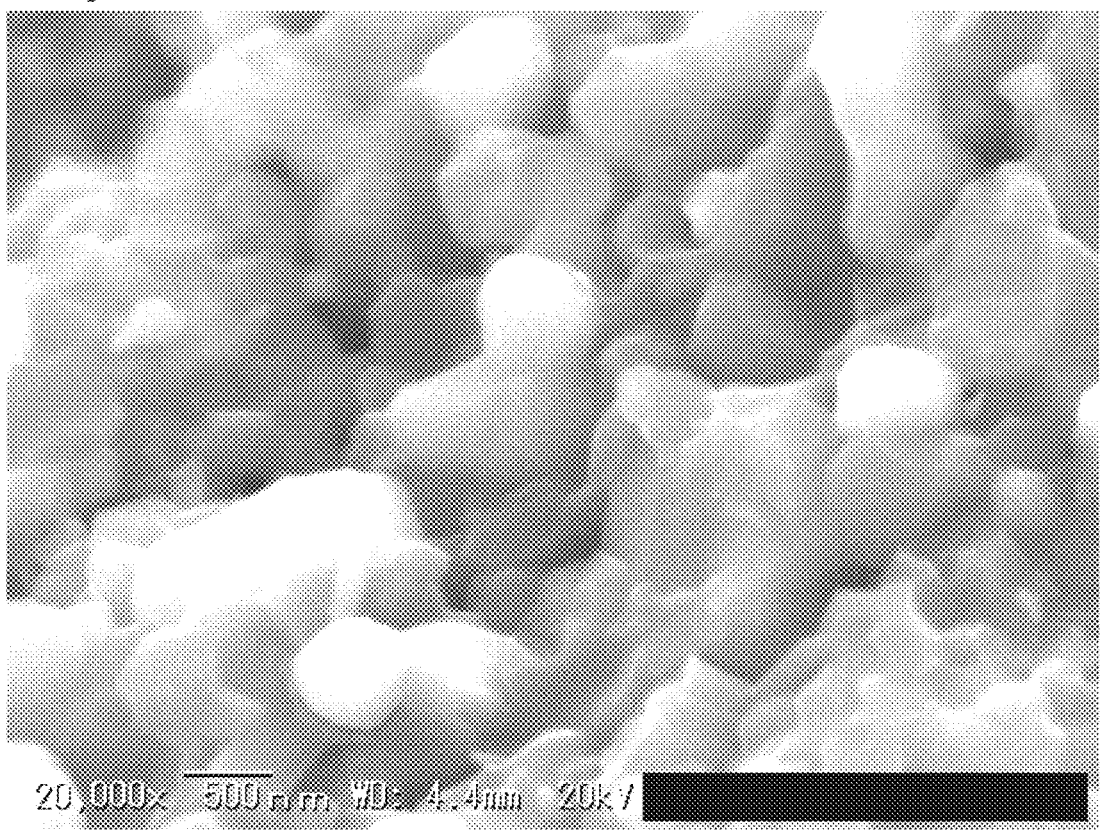
[Fig. 30]
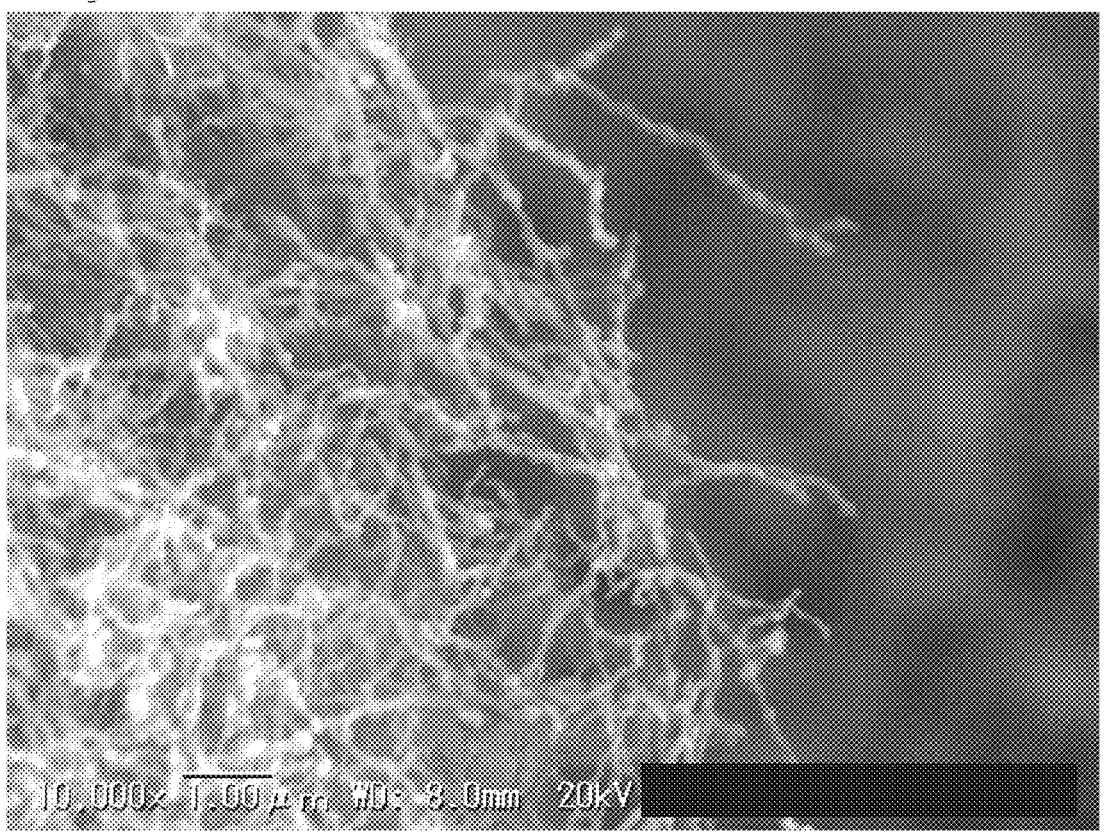

[Fig. 31]
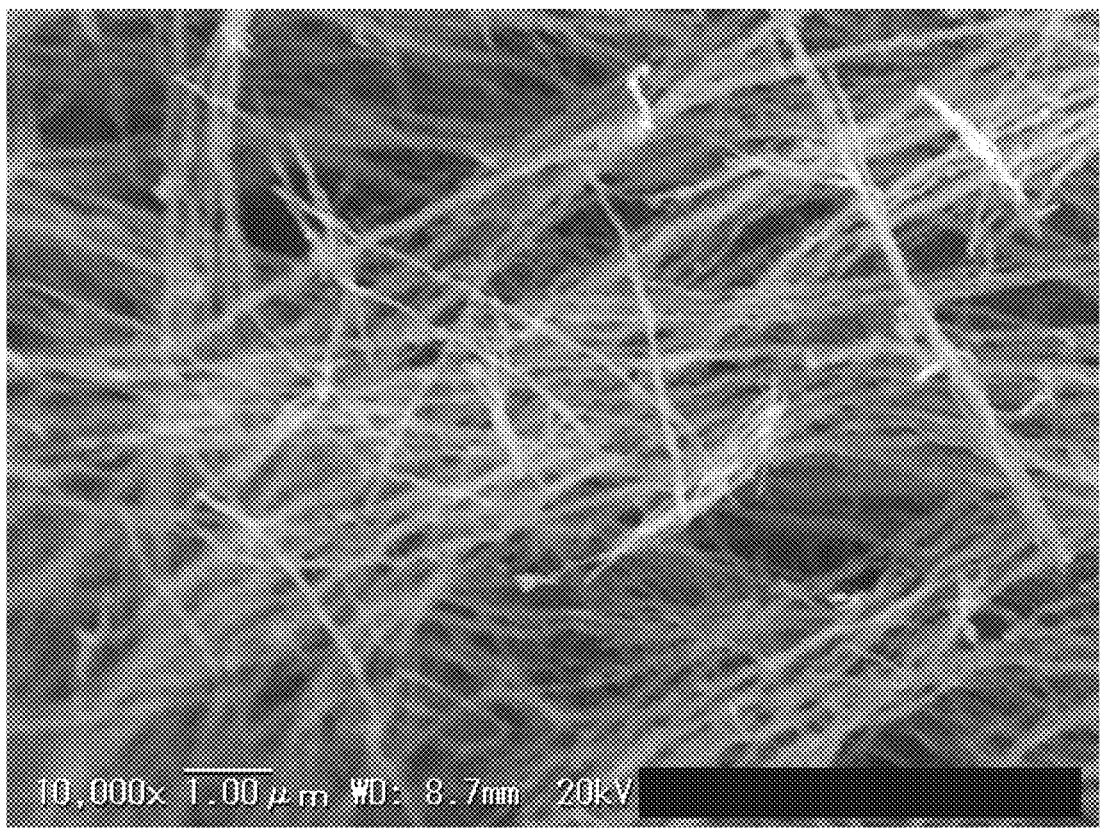
[Fig. 32]
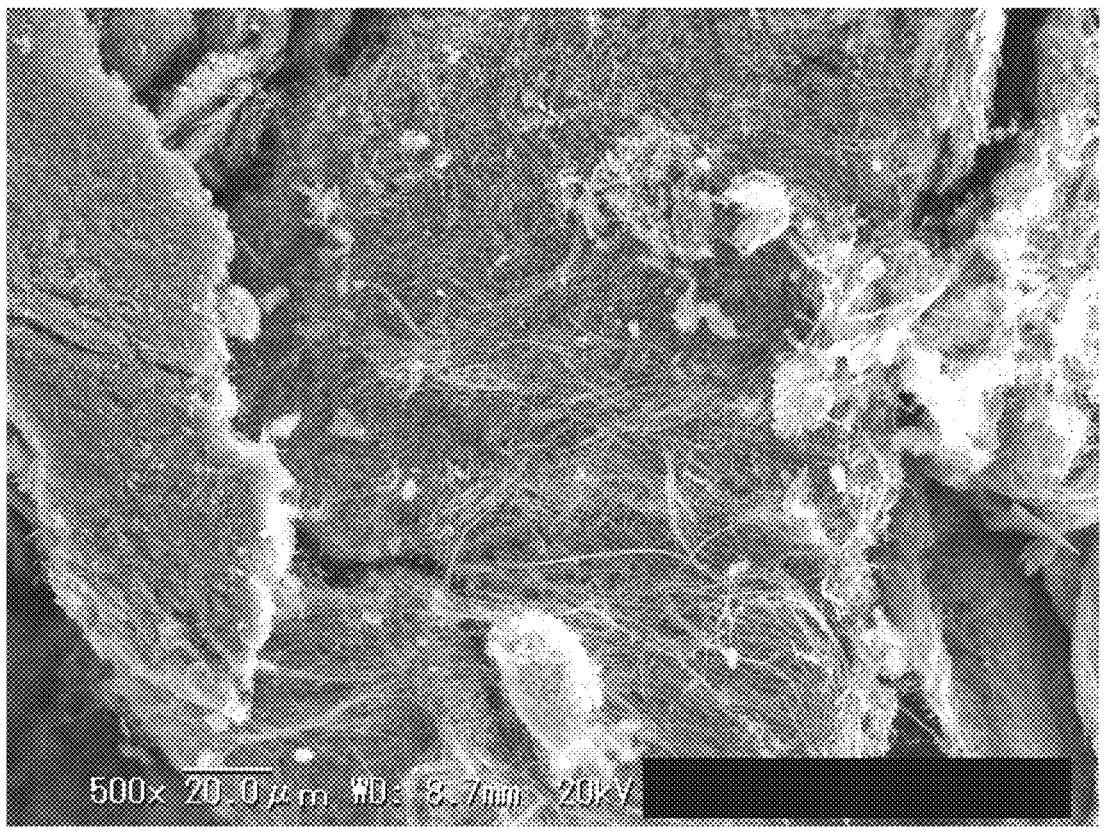

[Fig. 33]
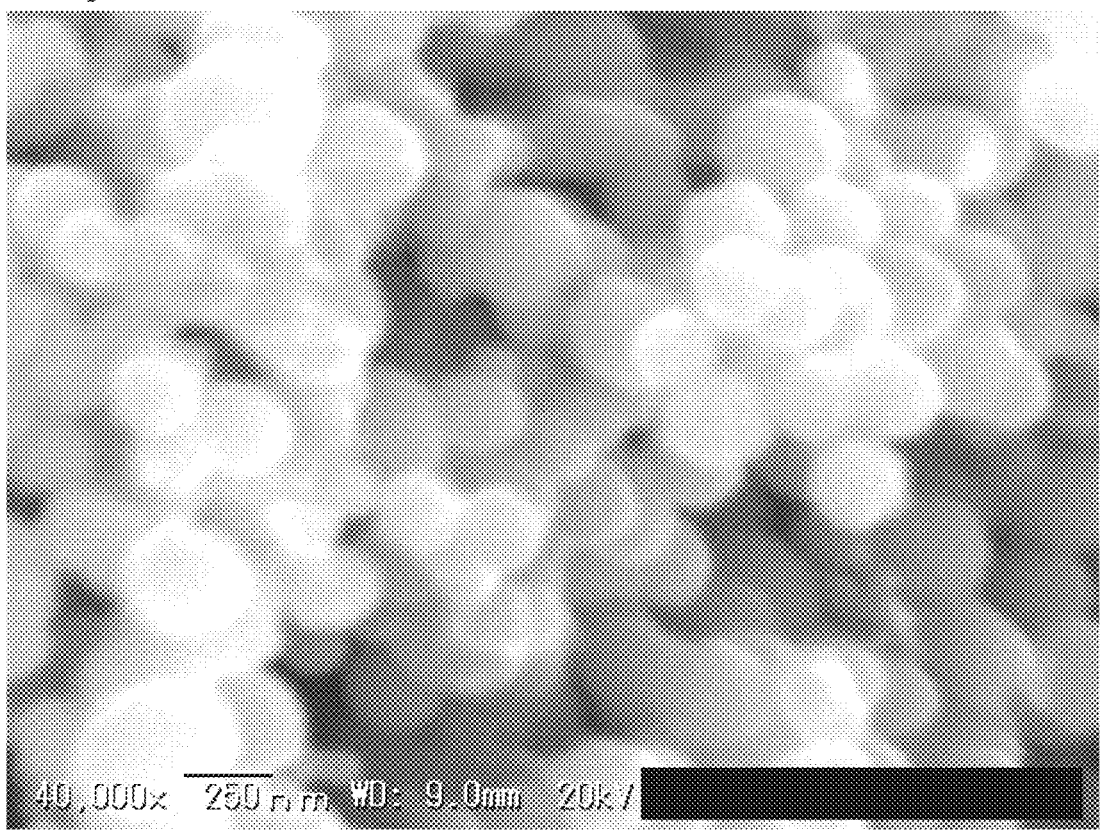
[Fig. 34]
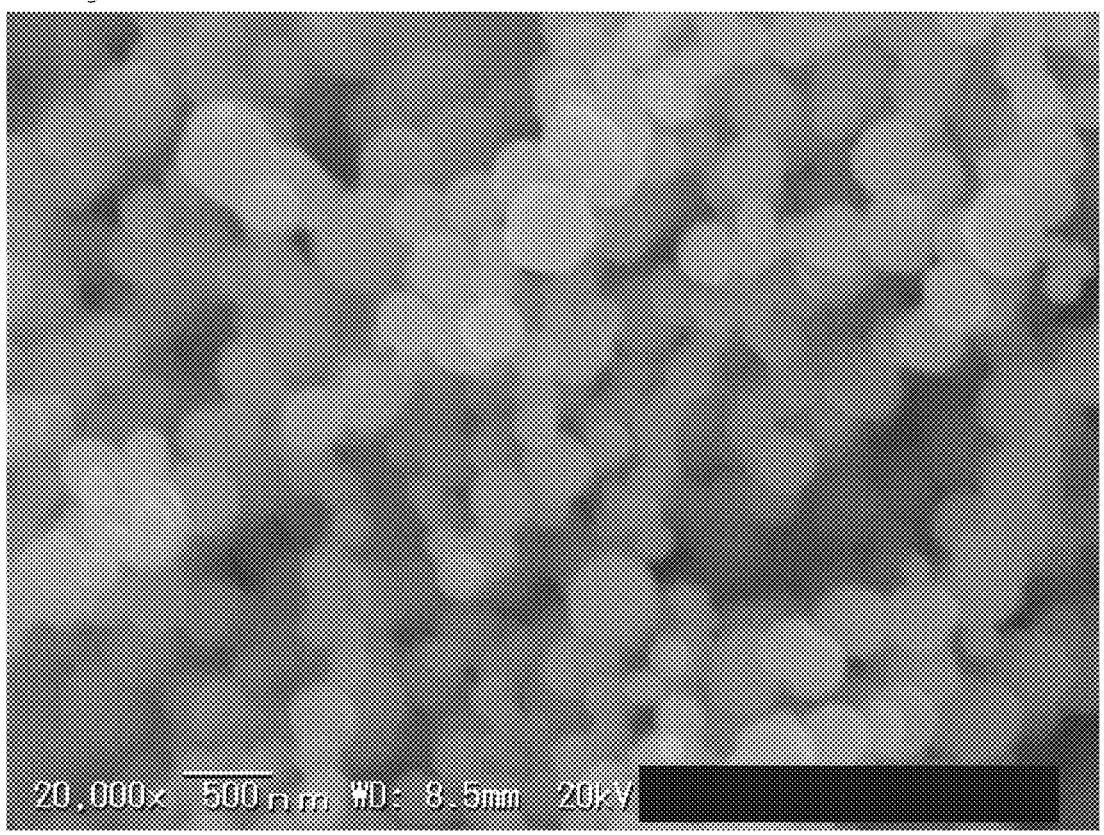

[Fig. 35]
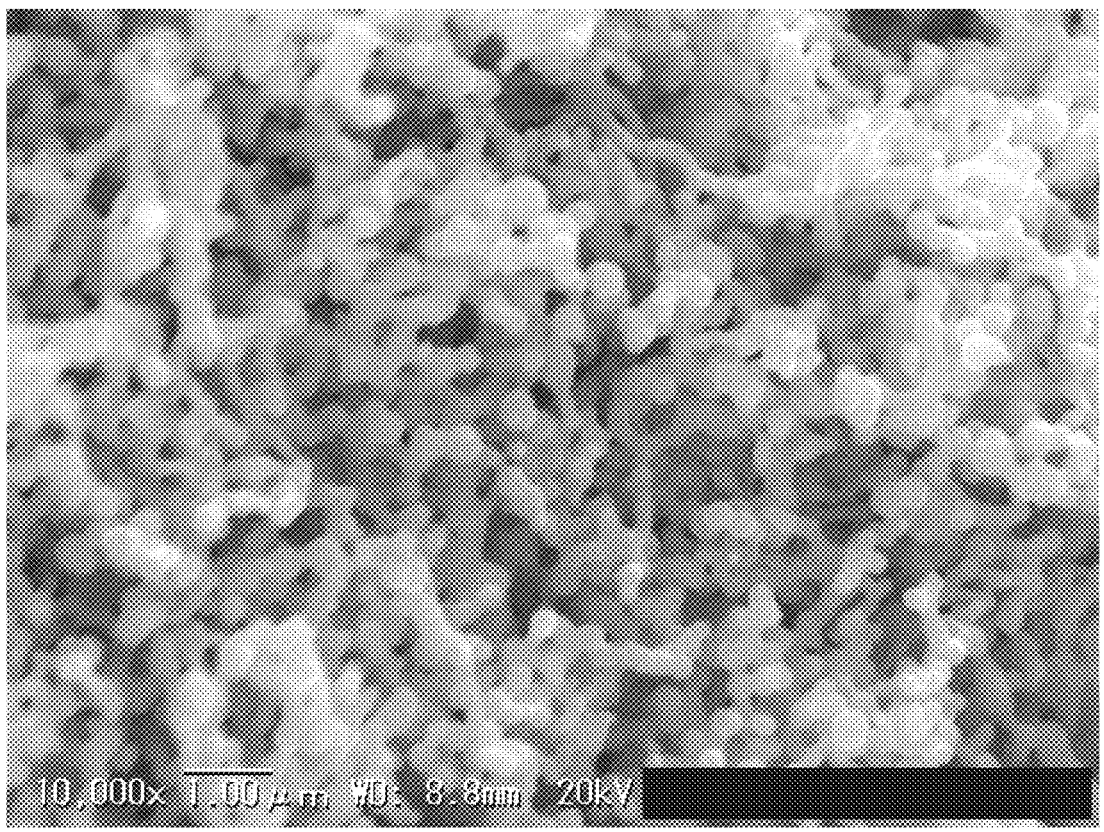
[Fig. 36]
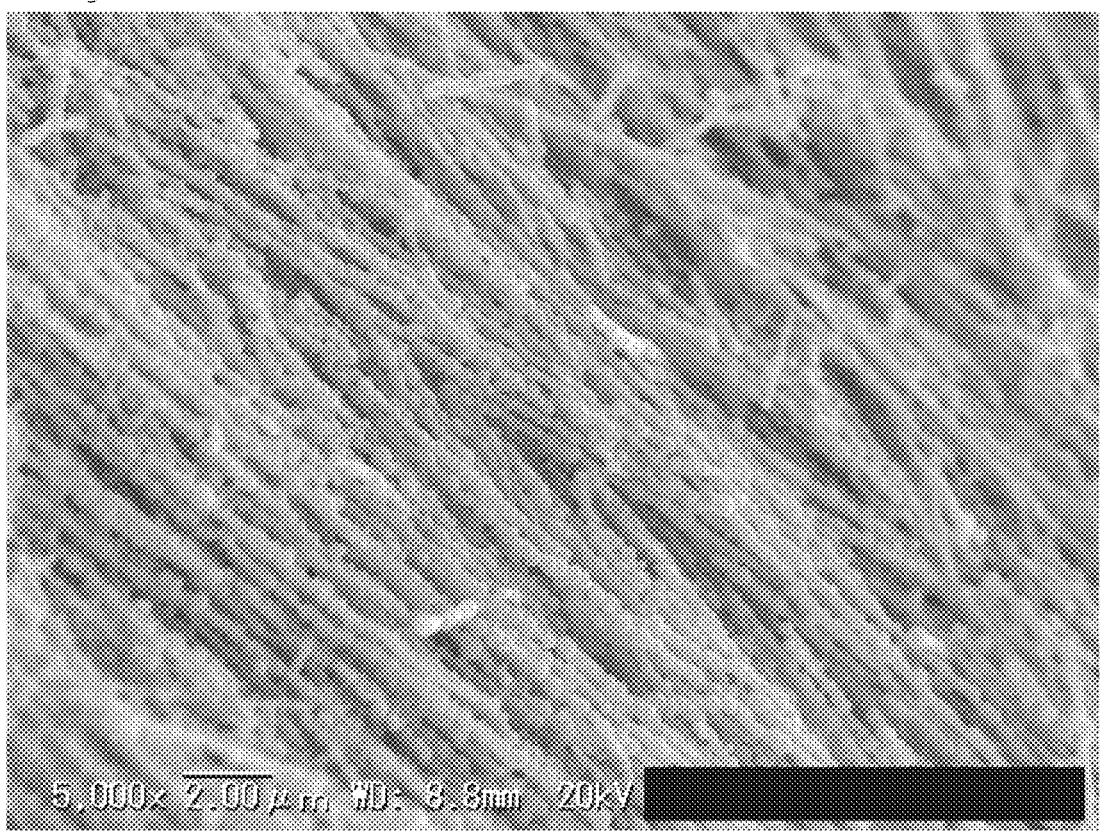

[Fig. 37]
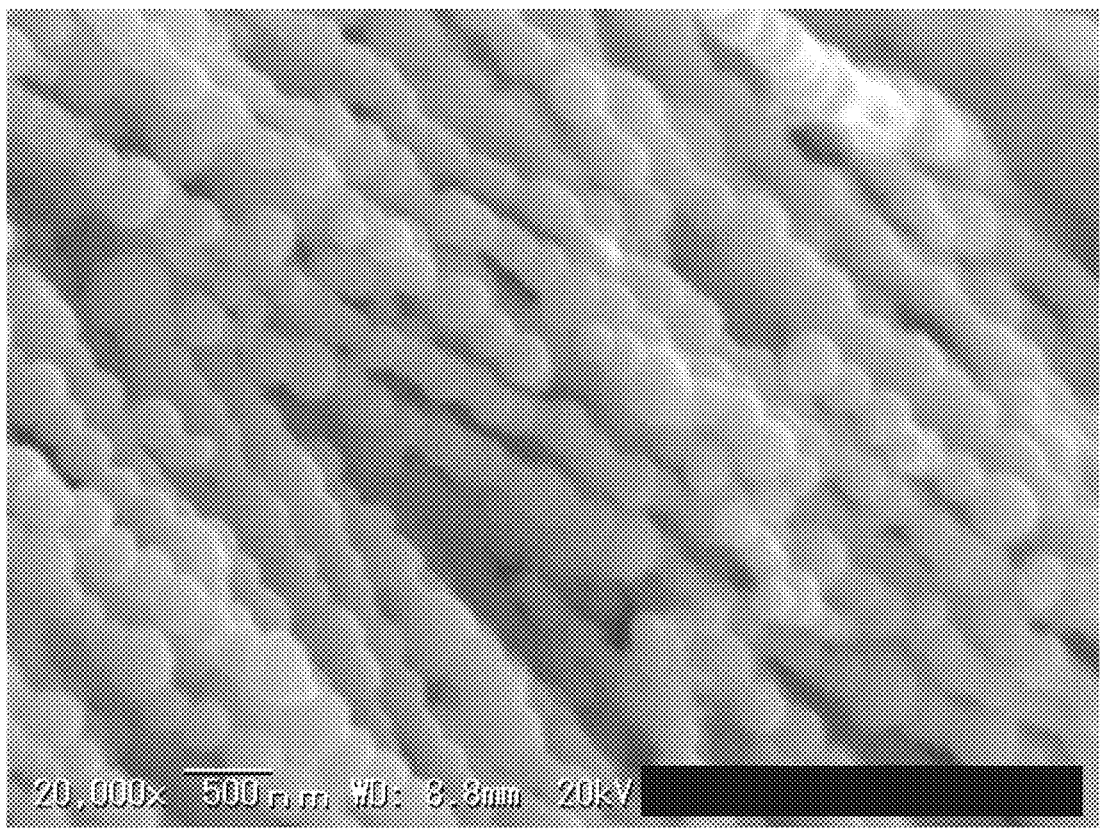
[Fig. 38]
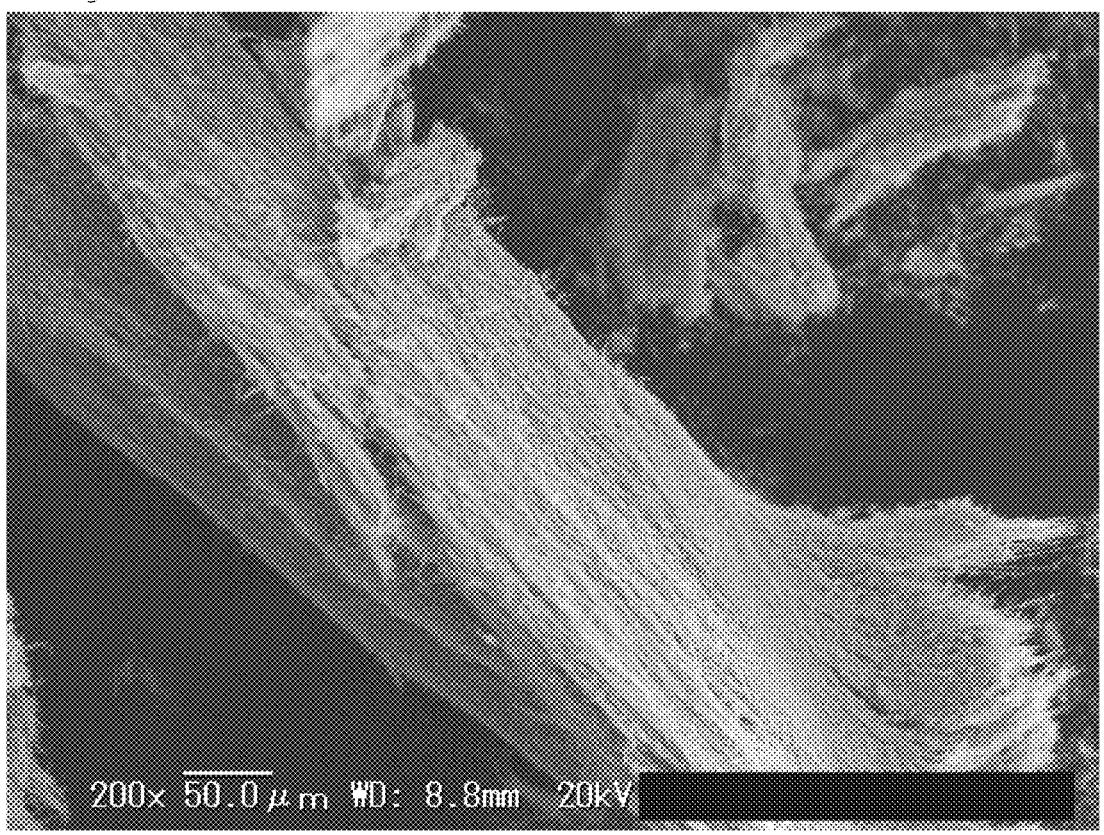

[Fig. 39]
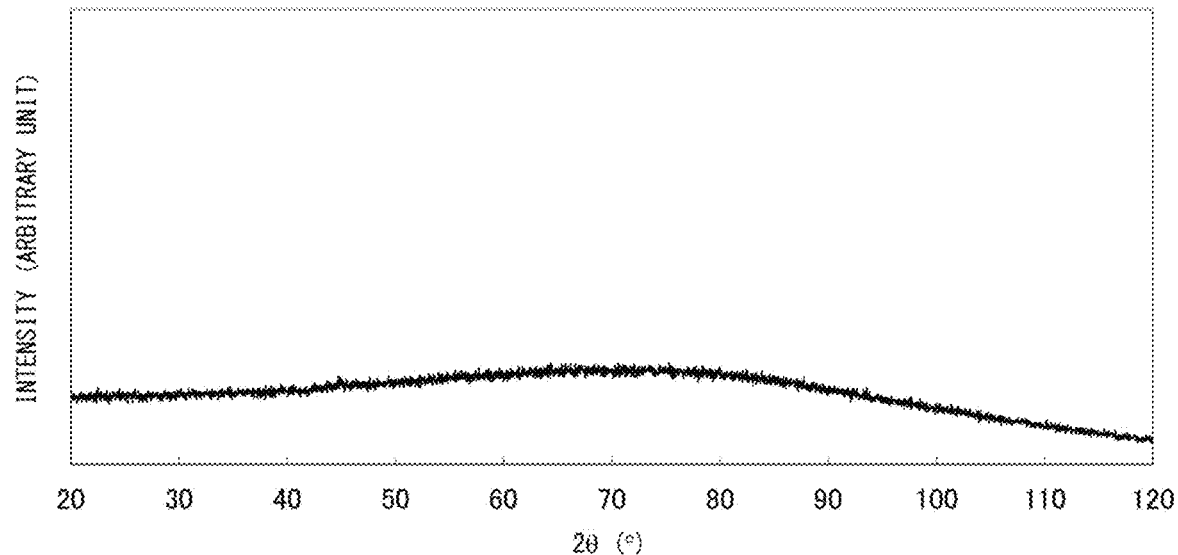
[Fig. 40]
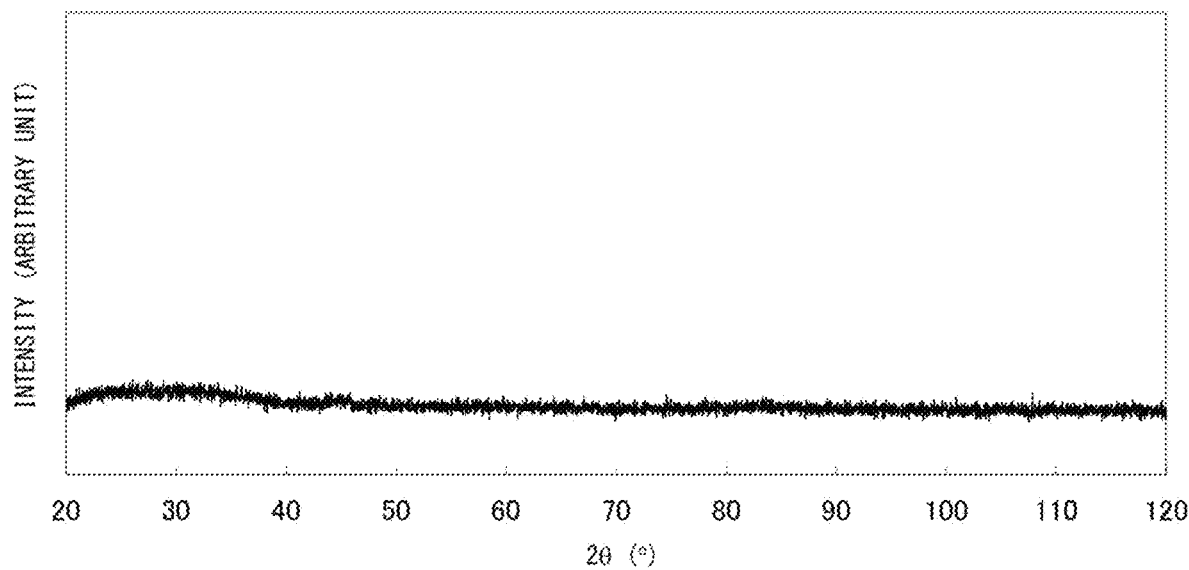

[Fig. 41]
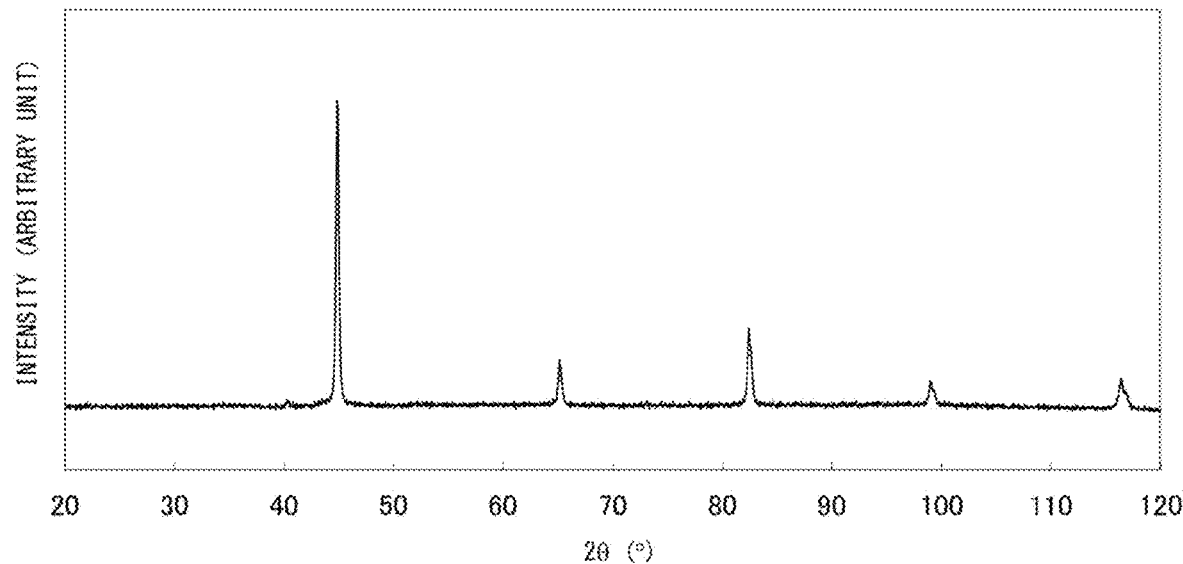
[Fig. 42]
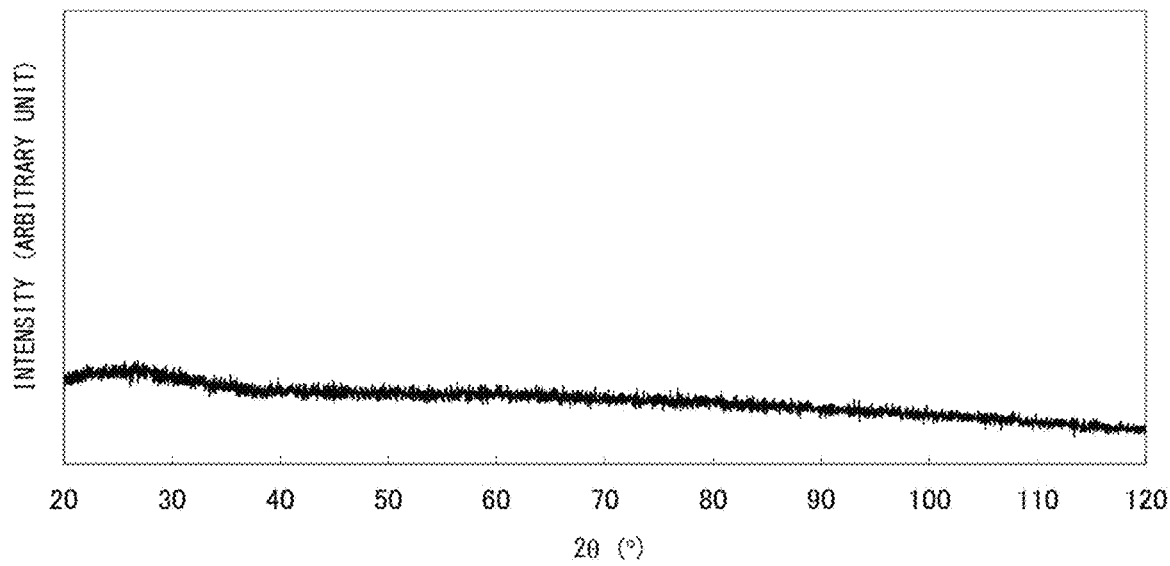

[Fig. 43]
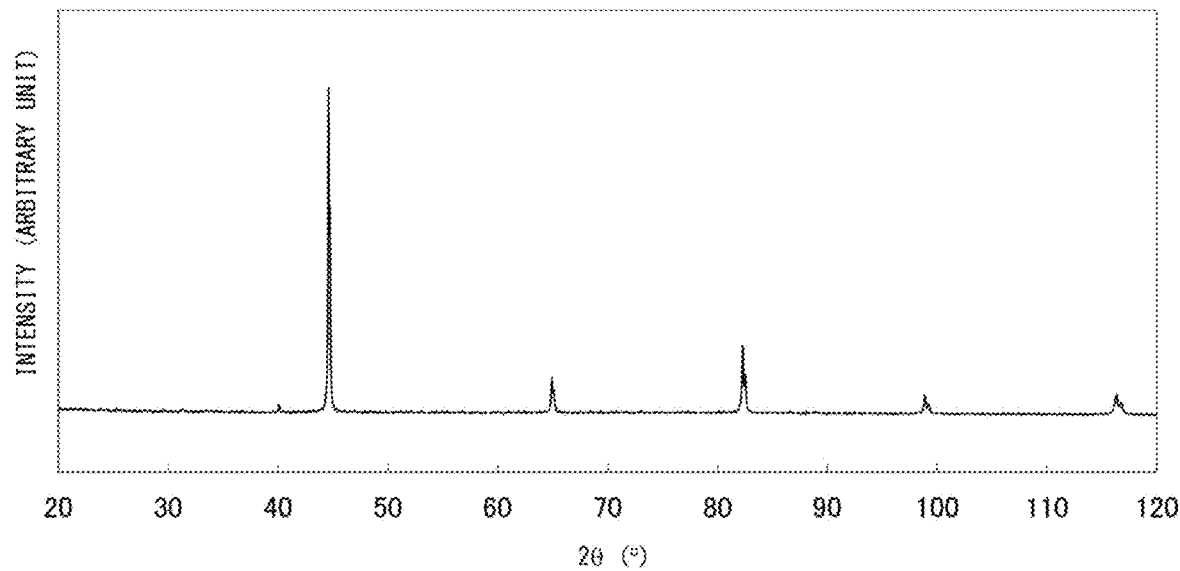
[Fig. 44]
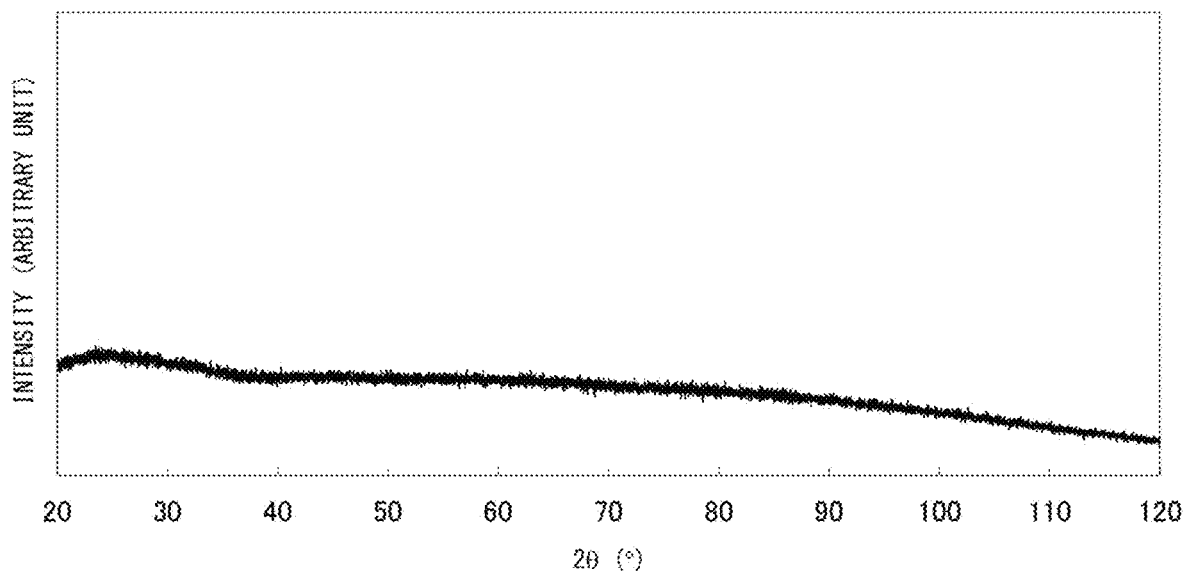

[Fig. 45]
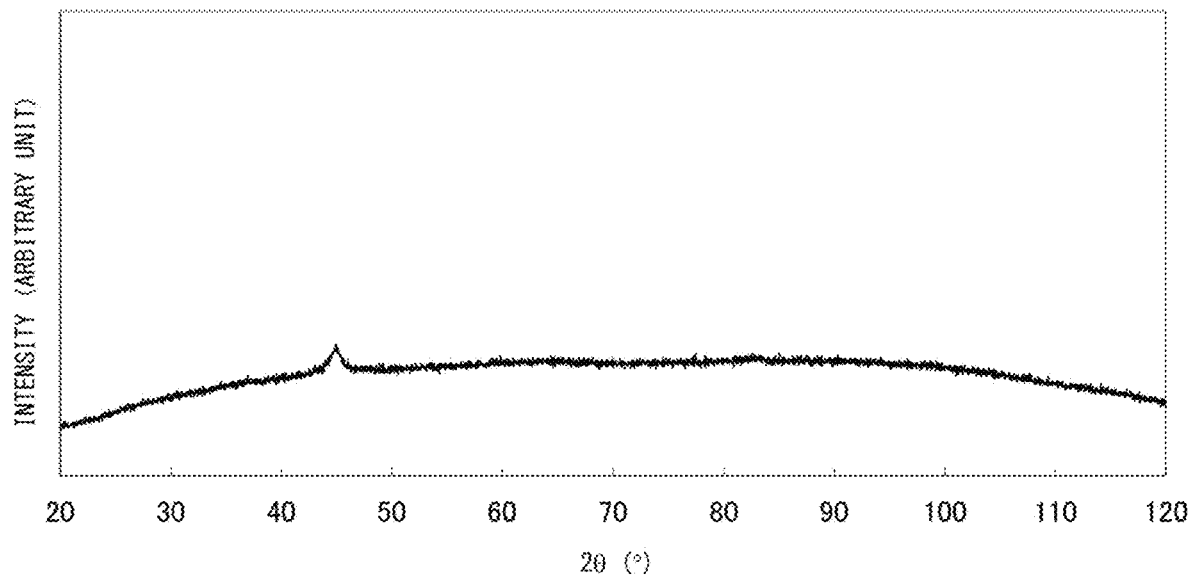
[Fig. 46]
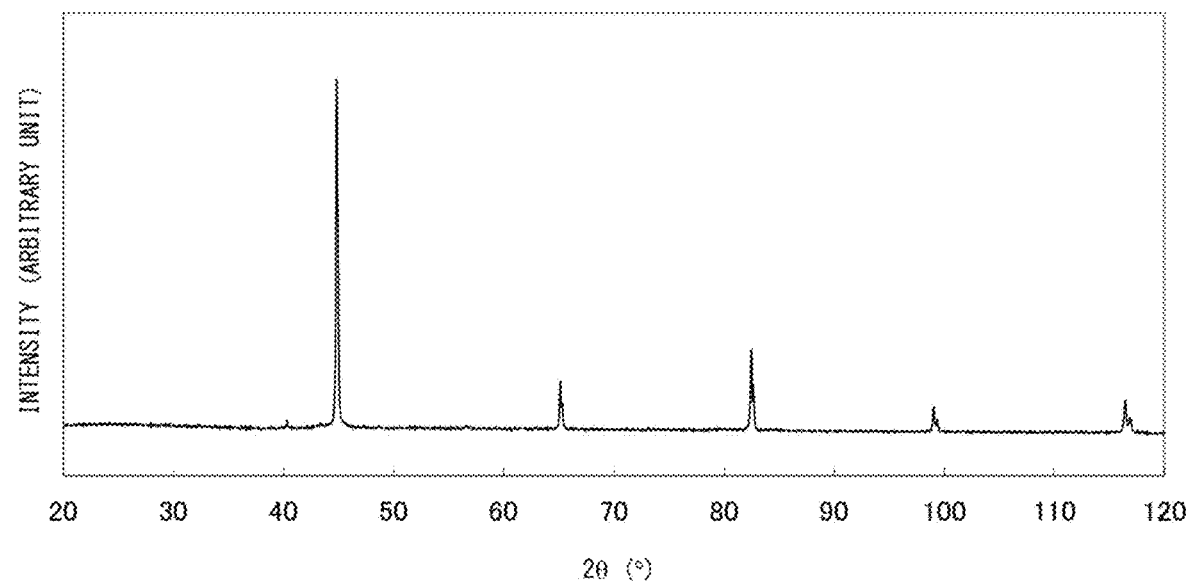

[Fig. 47]
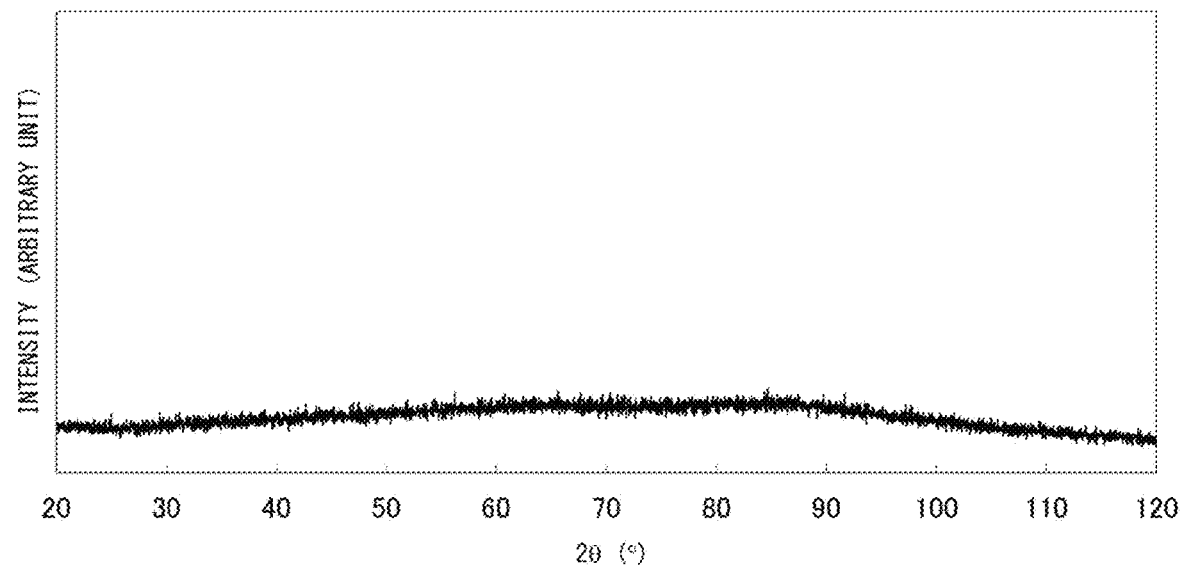
[Fig. 48]
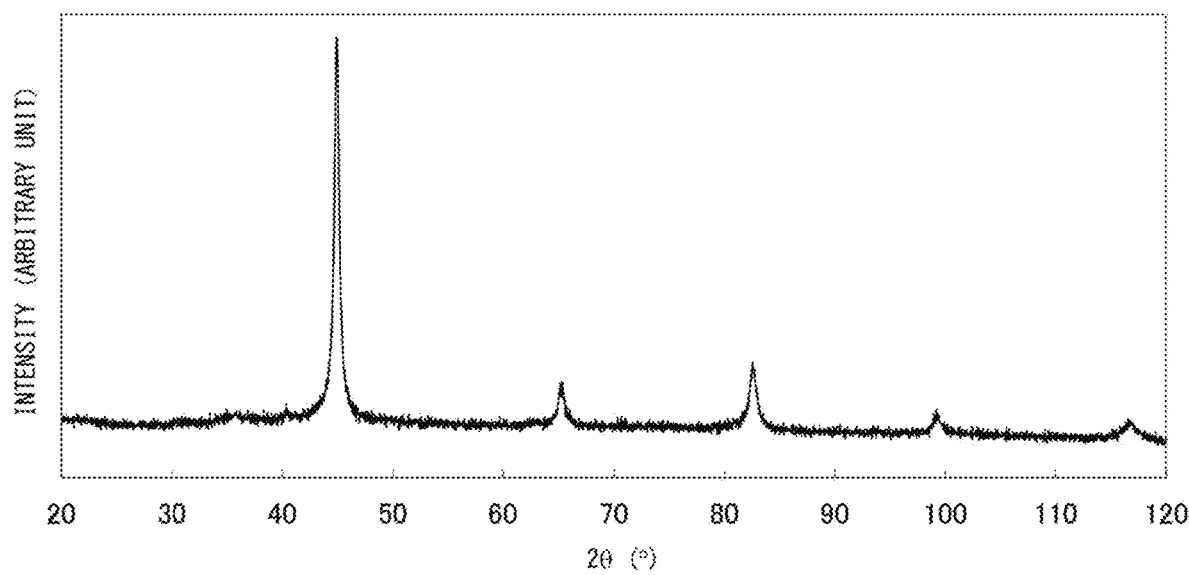

[Fig. 49]
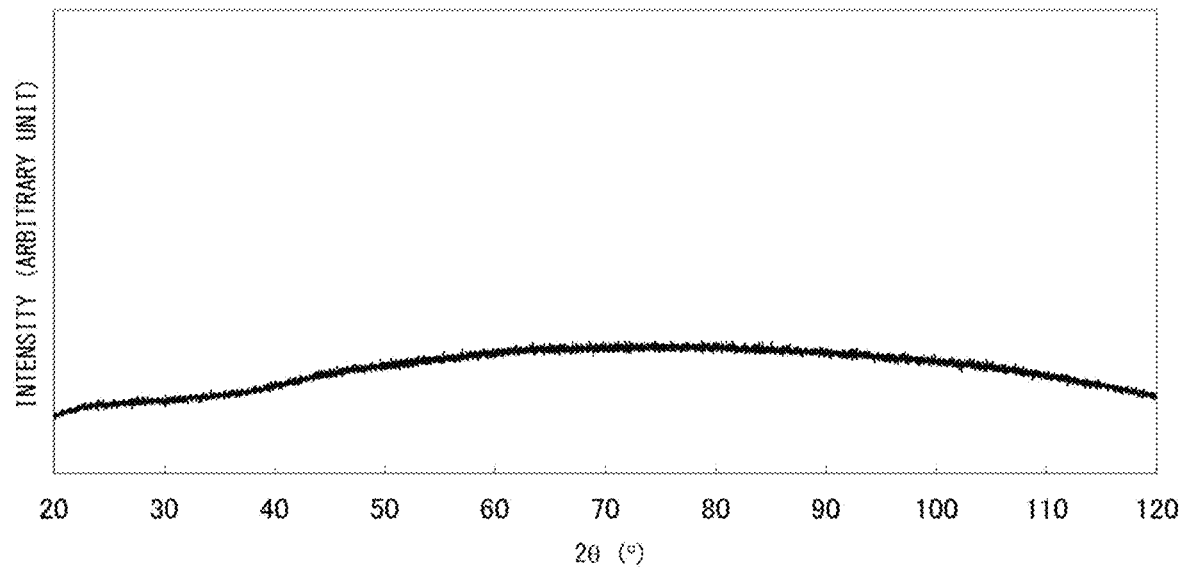
[Fig. 50]
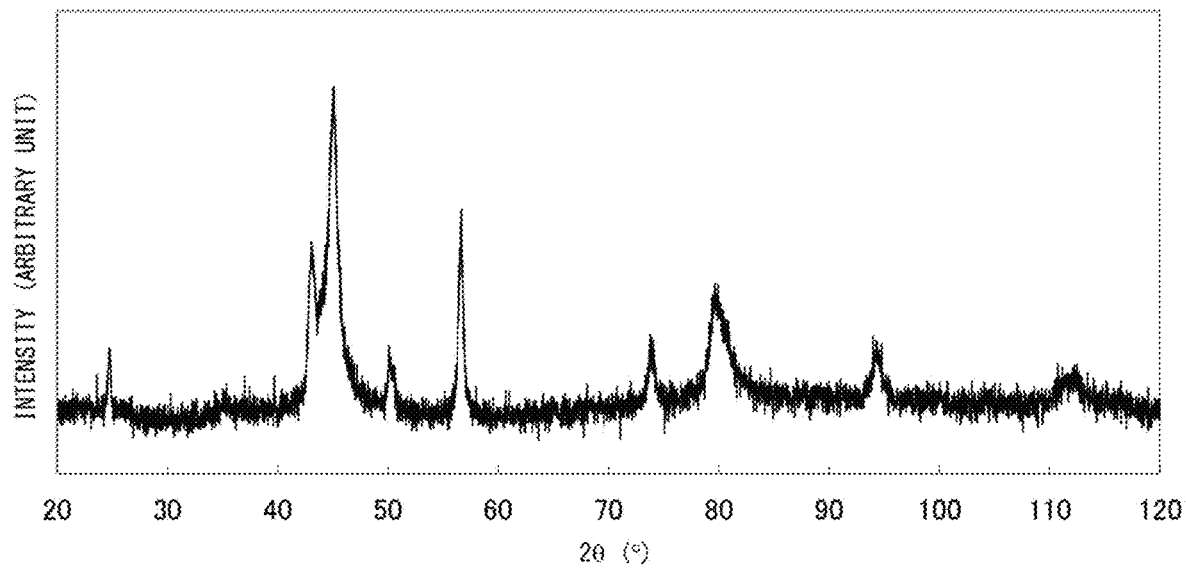

[Fig. 51]
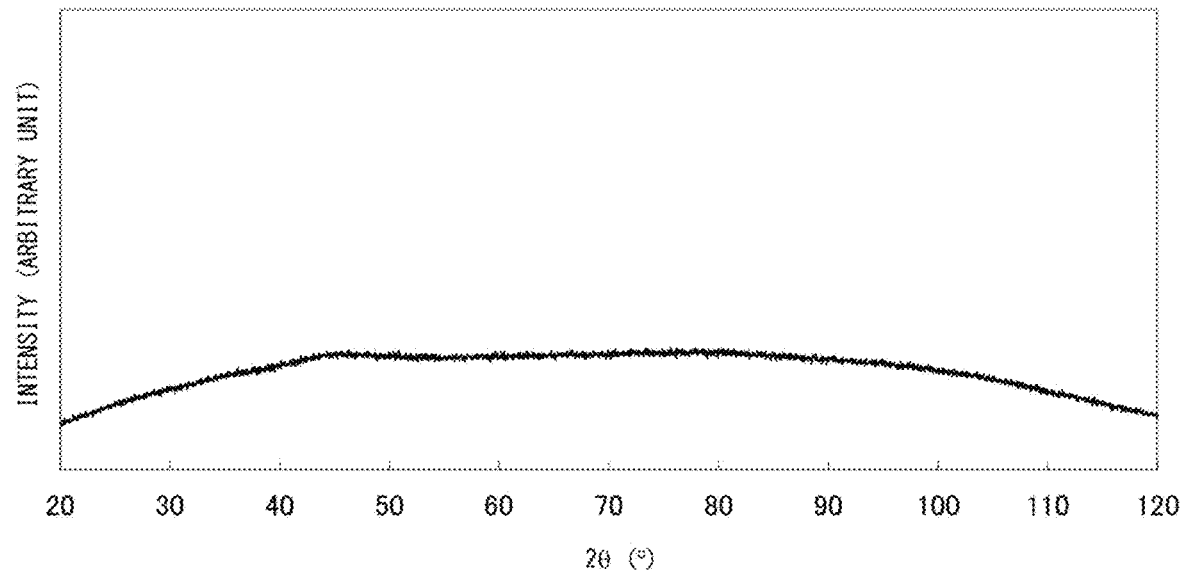
[Fig. 52]
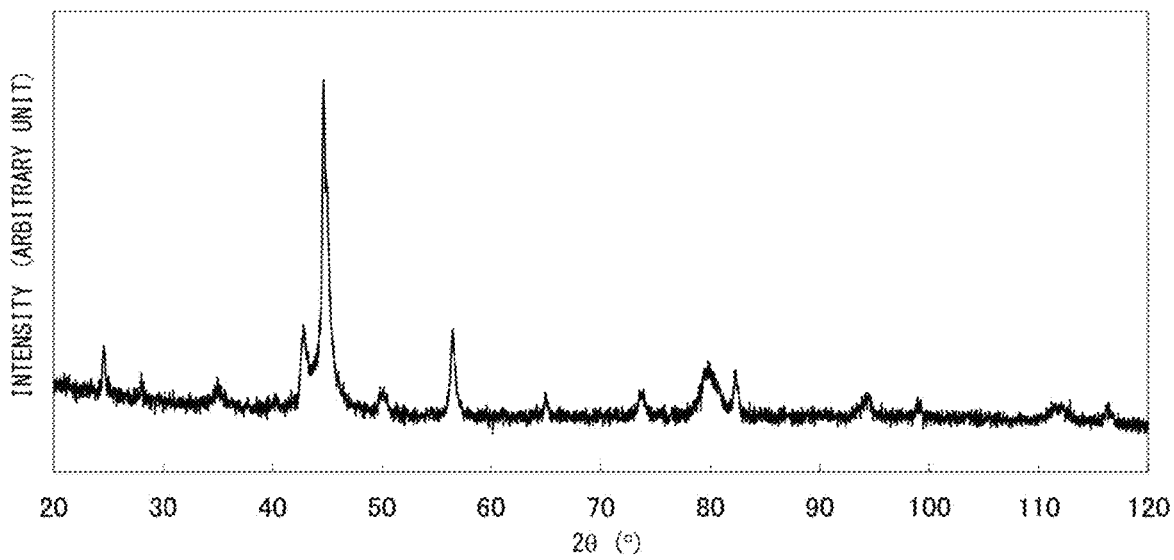

[Fig. 53]
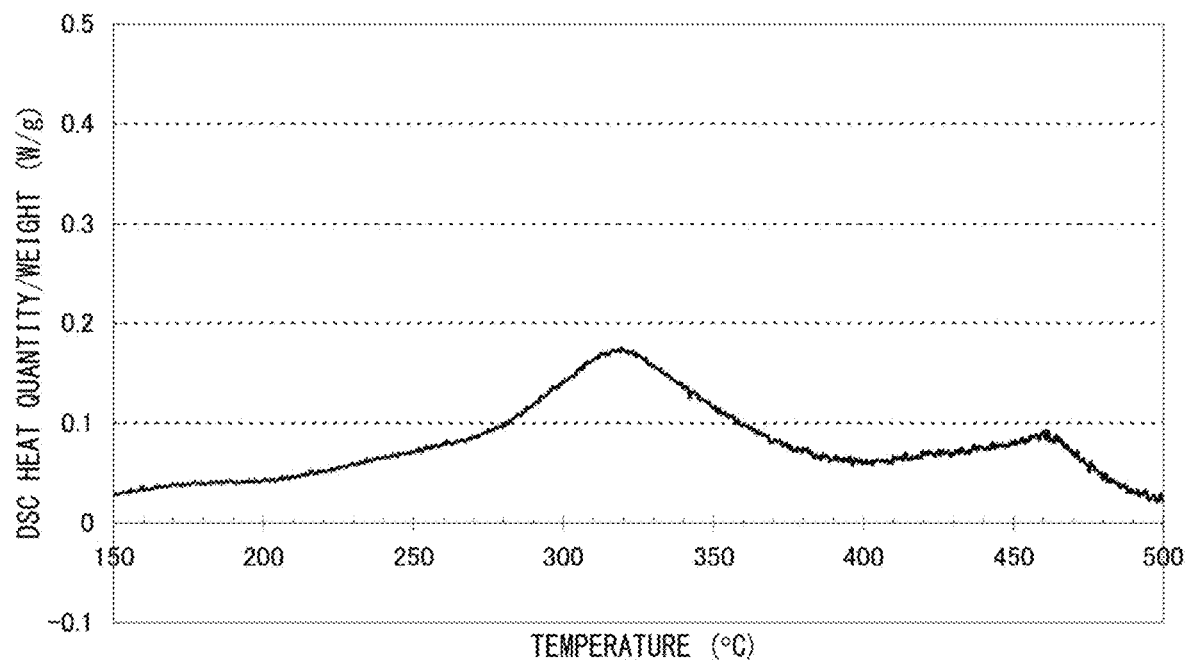
[Fig. 54]
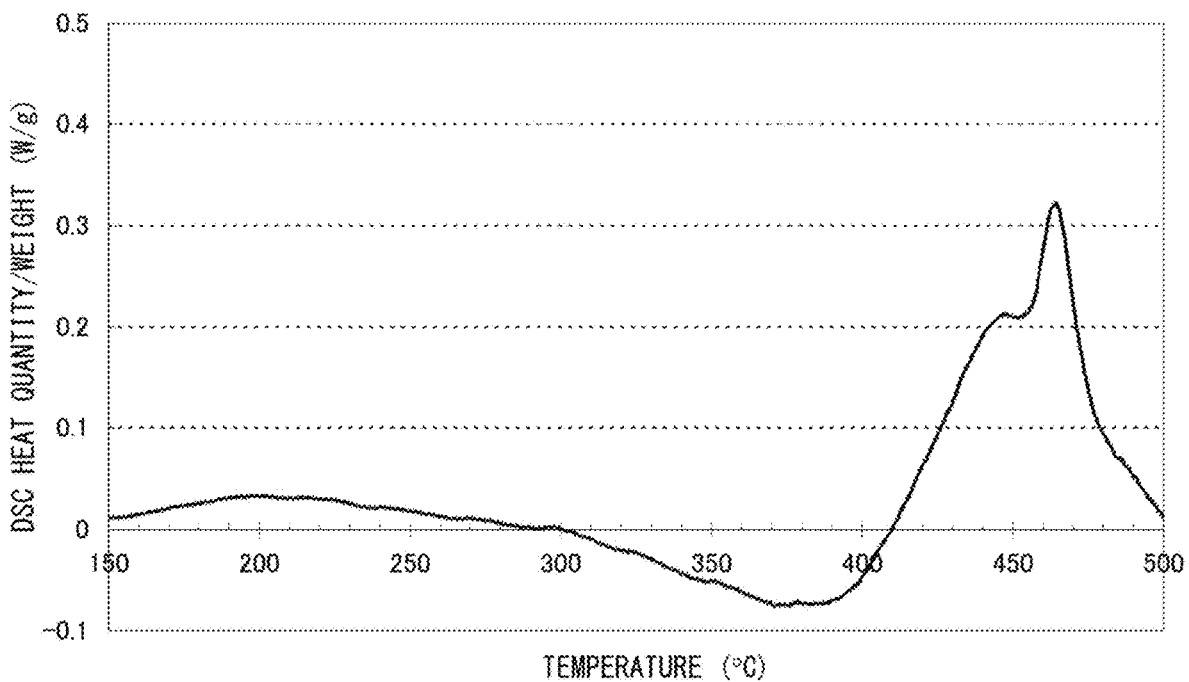

[Fig. 55]
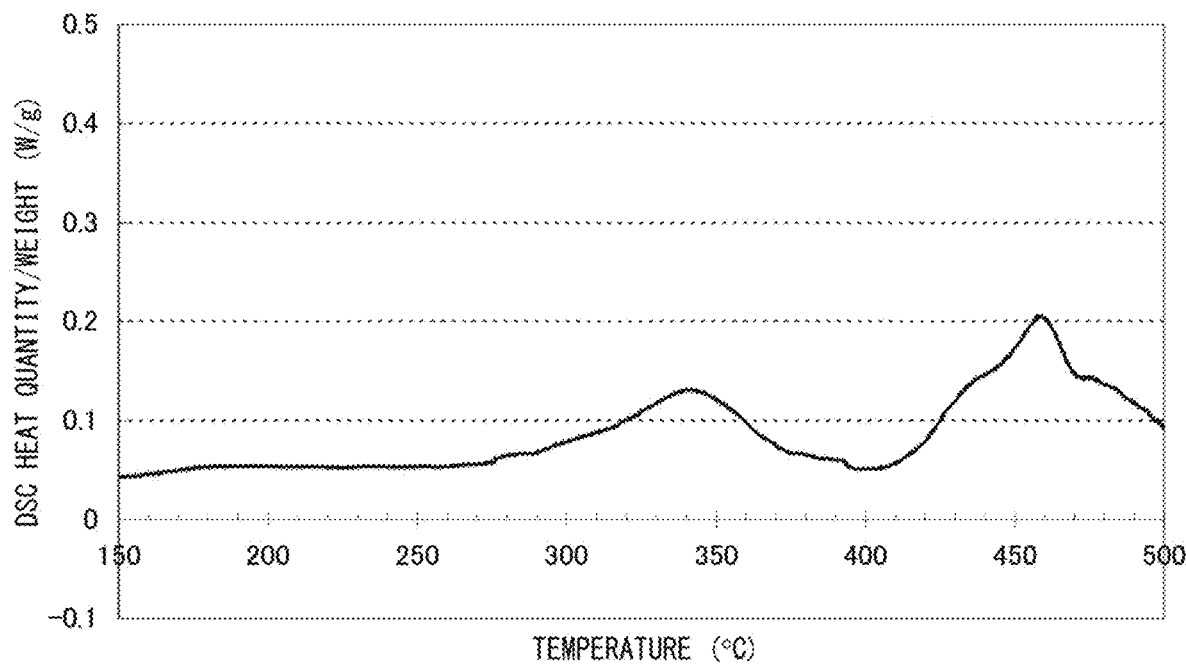
[Fig. 56]
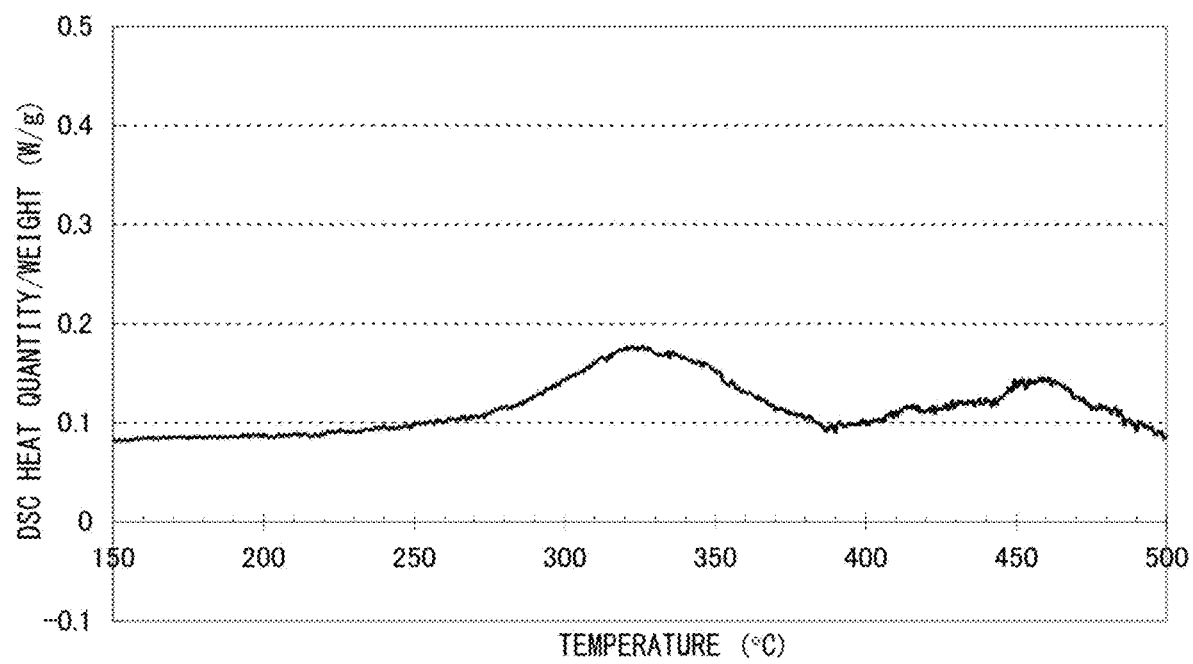

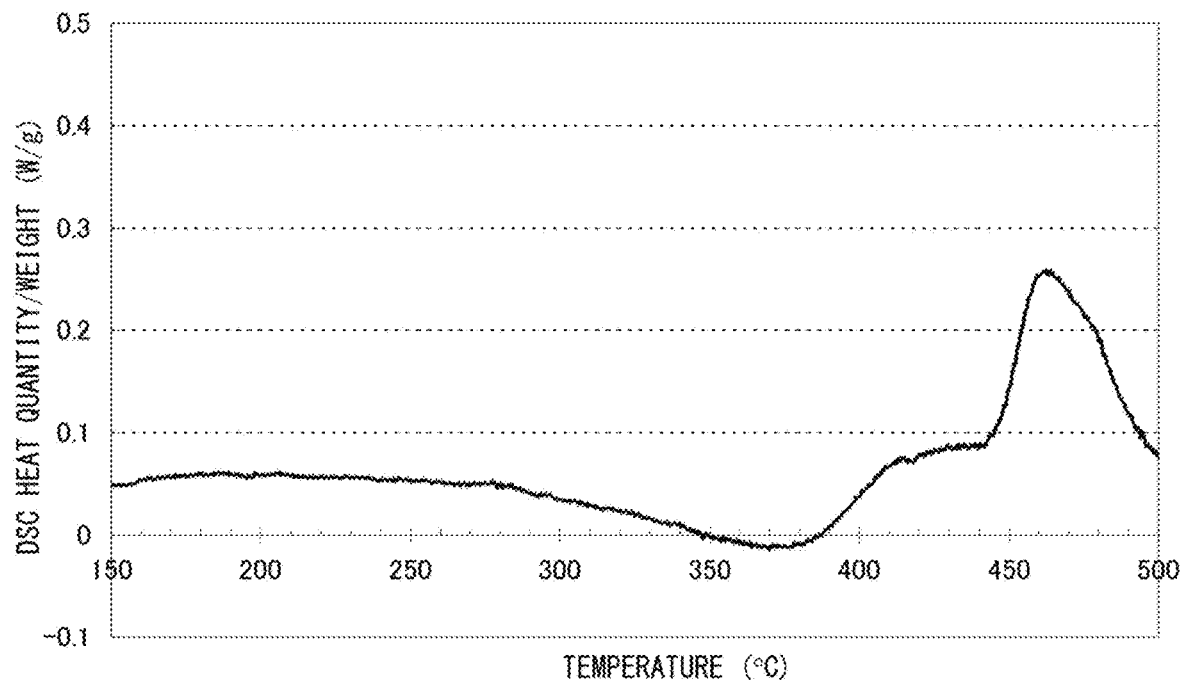
[Fig. 57]
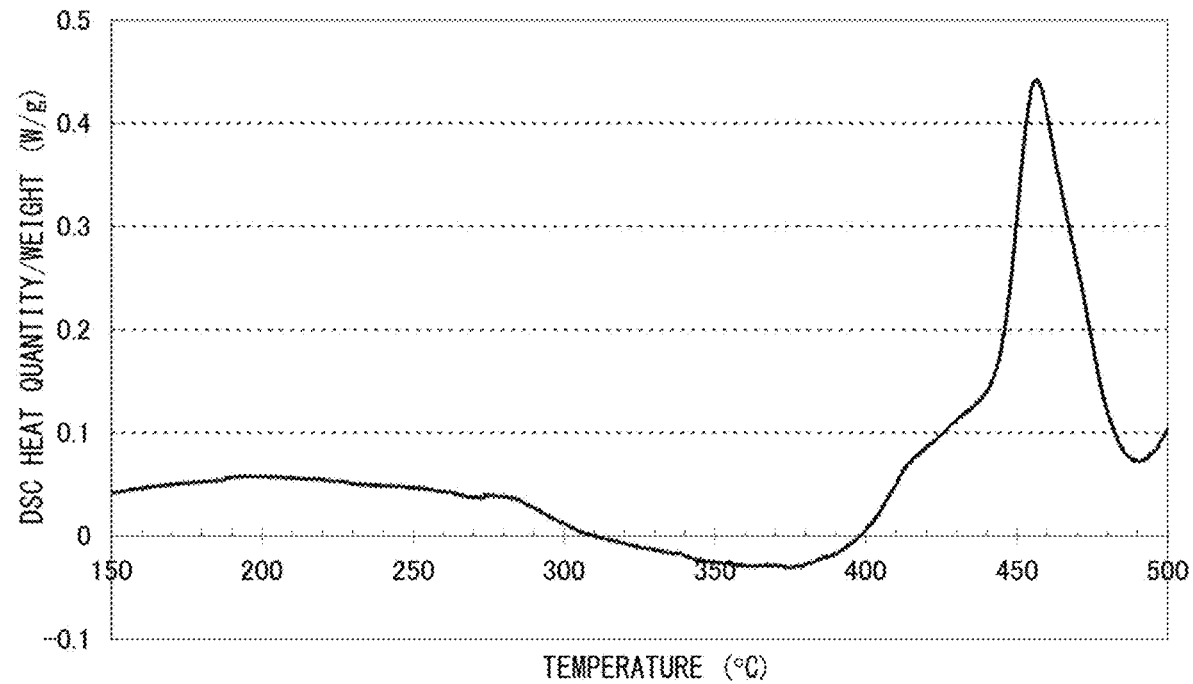
[Fig. 58]

[Fig. 59]
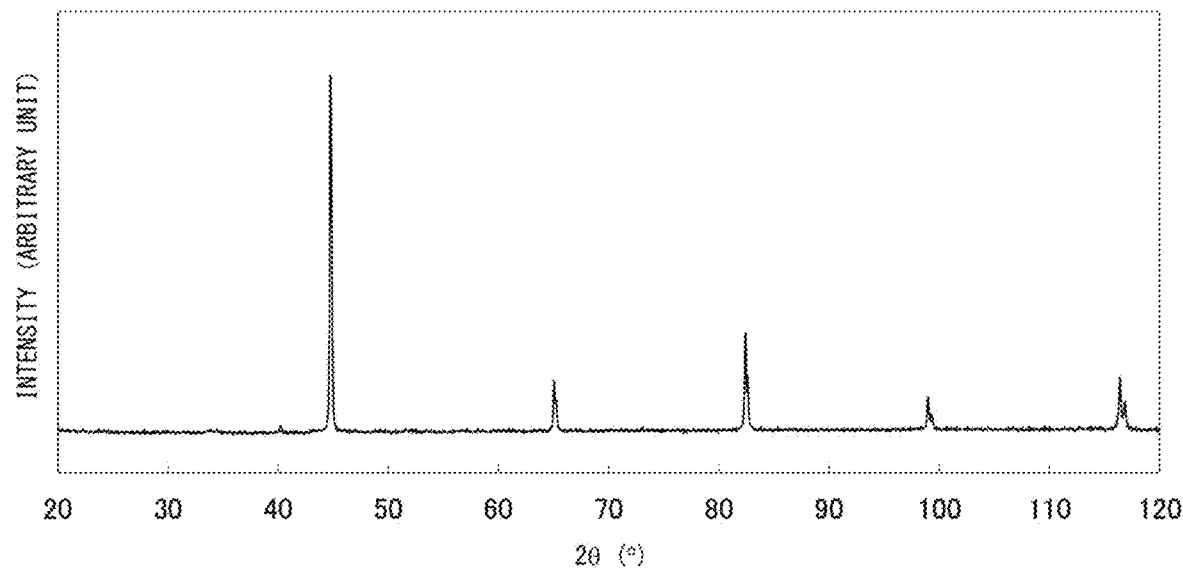
[Fig. 60]
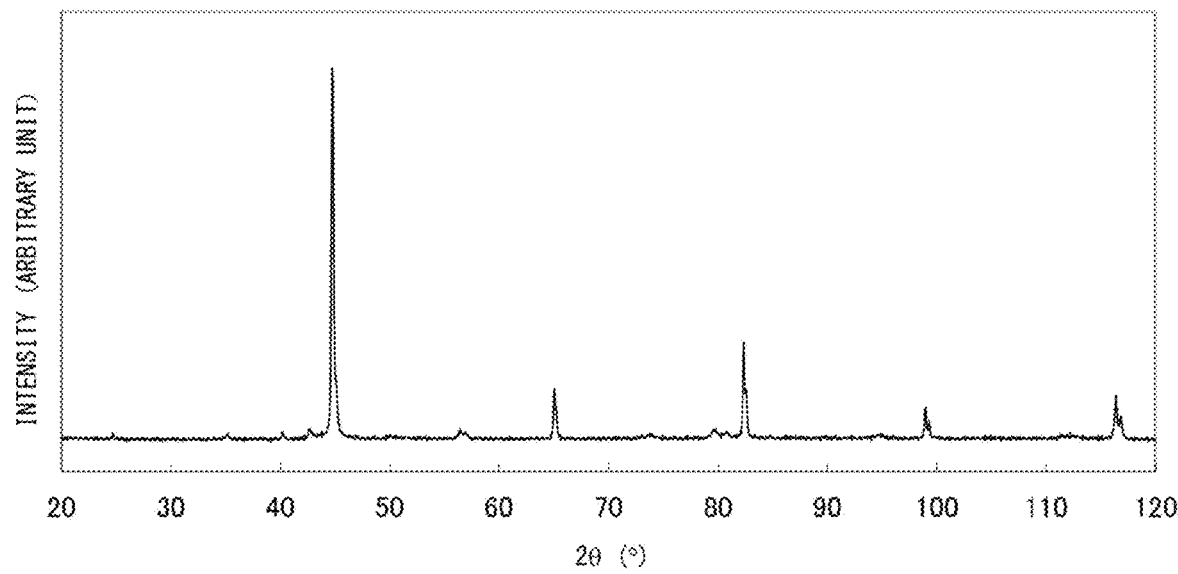

[Fig. 61]
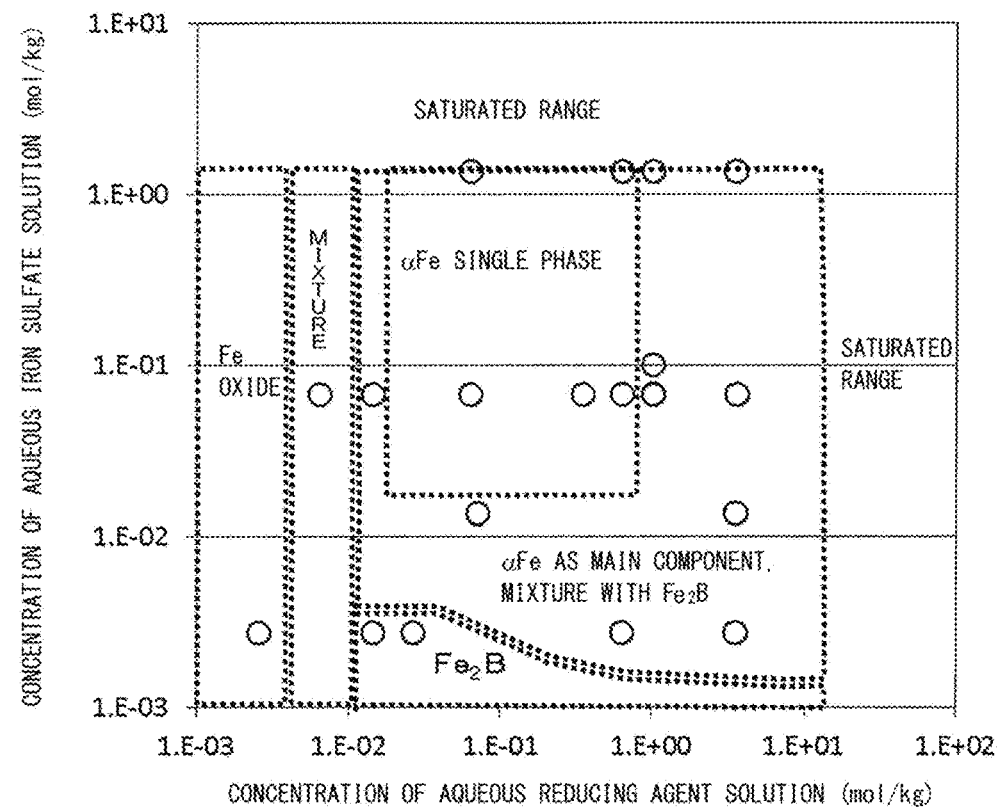
[Fig. 62]
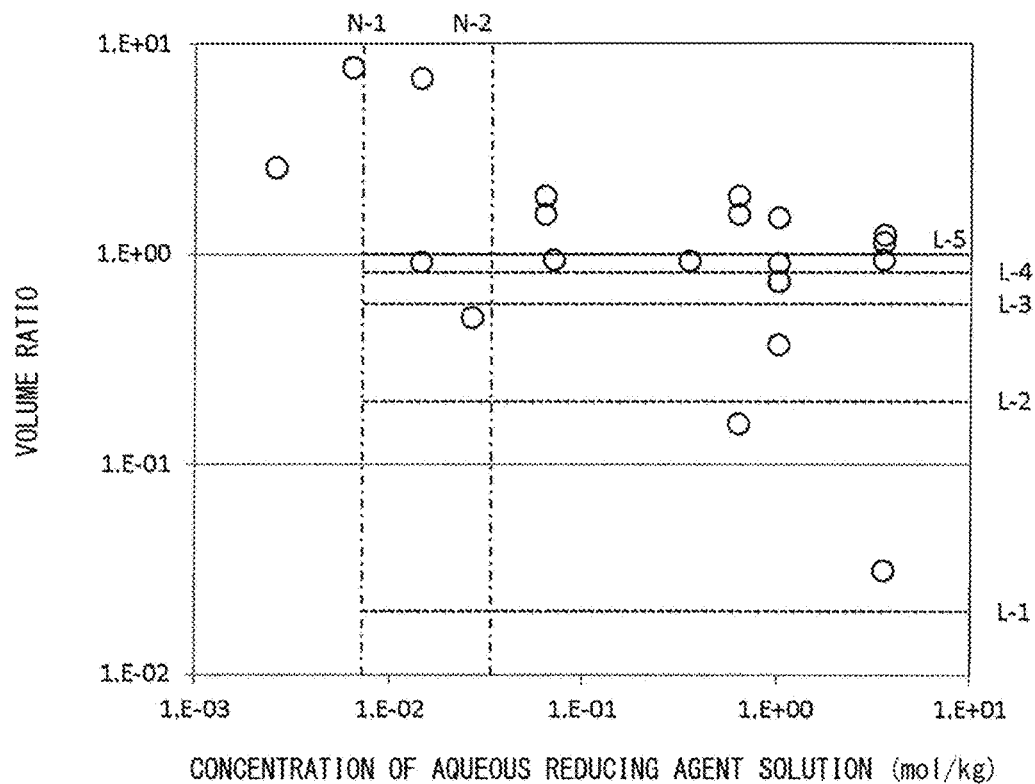

[Fig. 63]
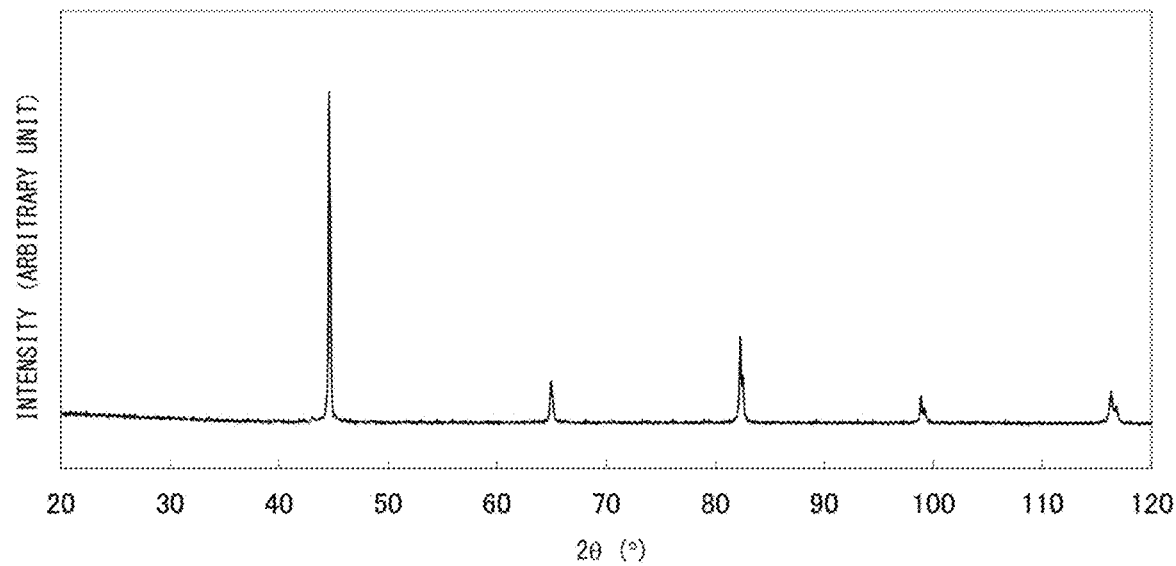
[Fig. 64]
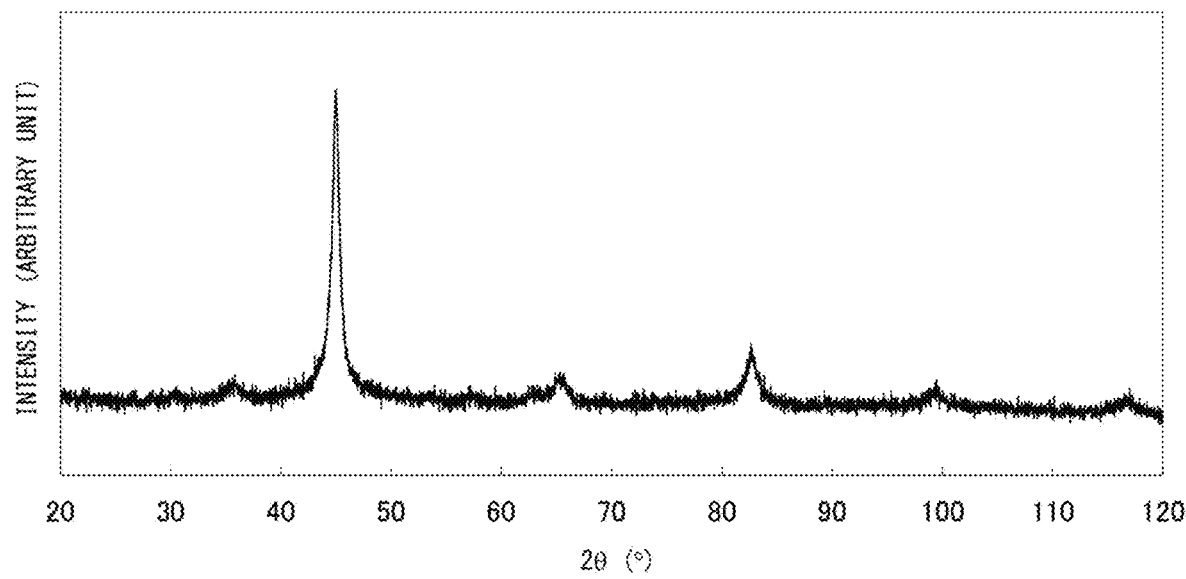

[Fig. 65]
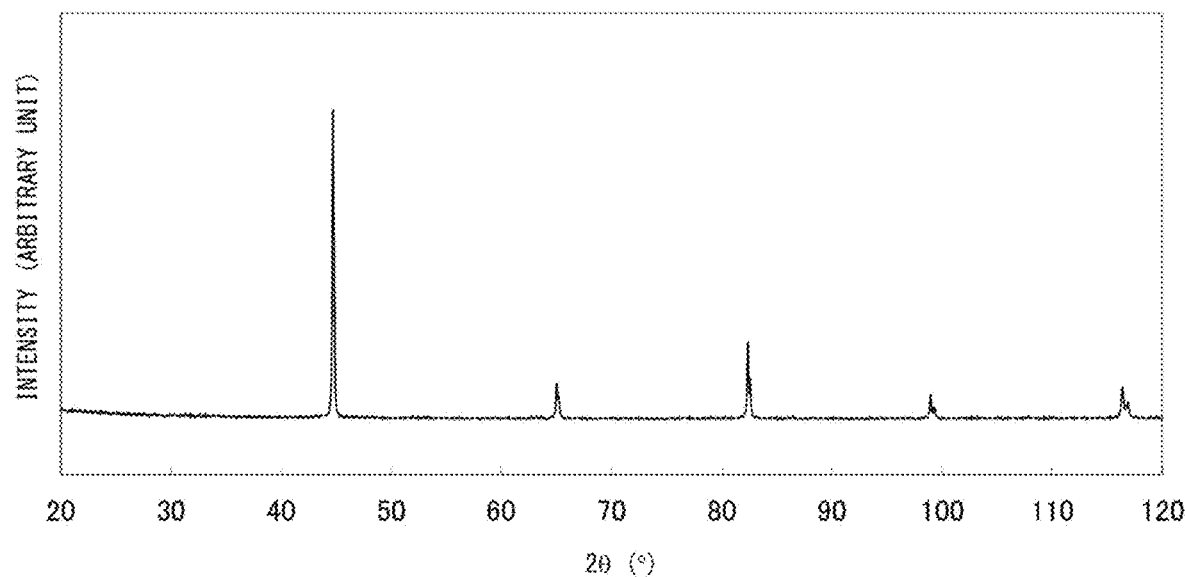
[Fig. 66]
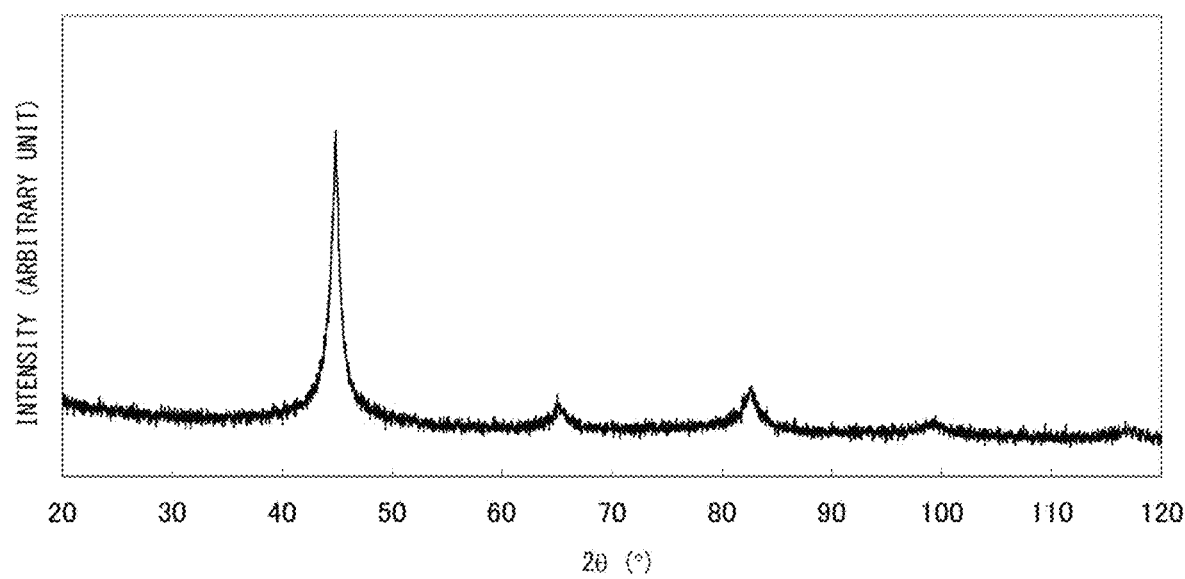

[Fig. 67]
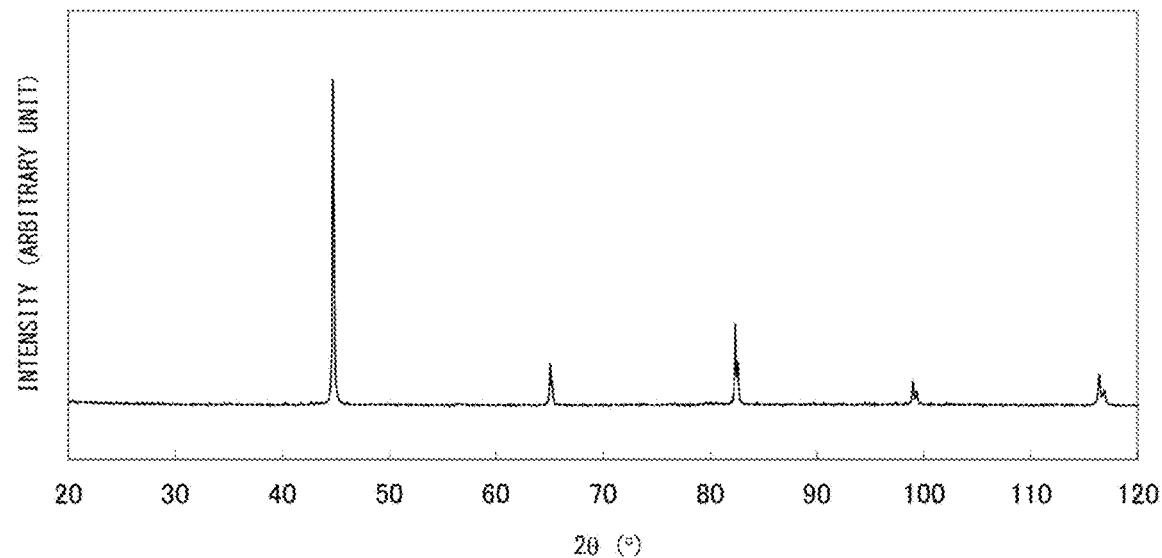
[Fig. 68]
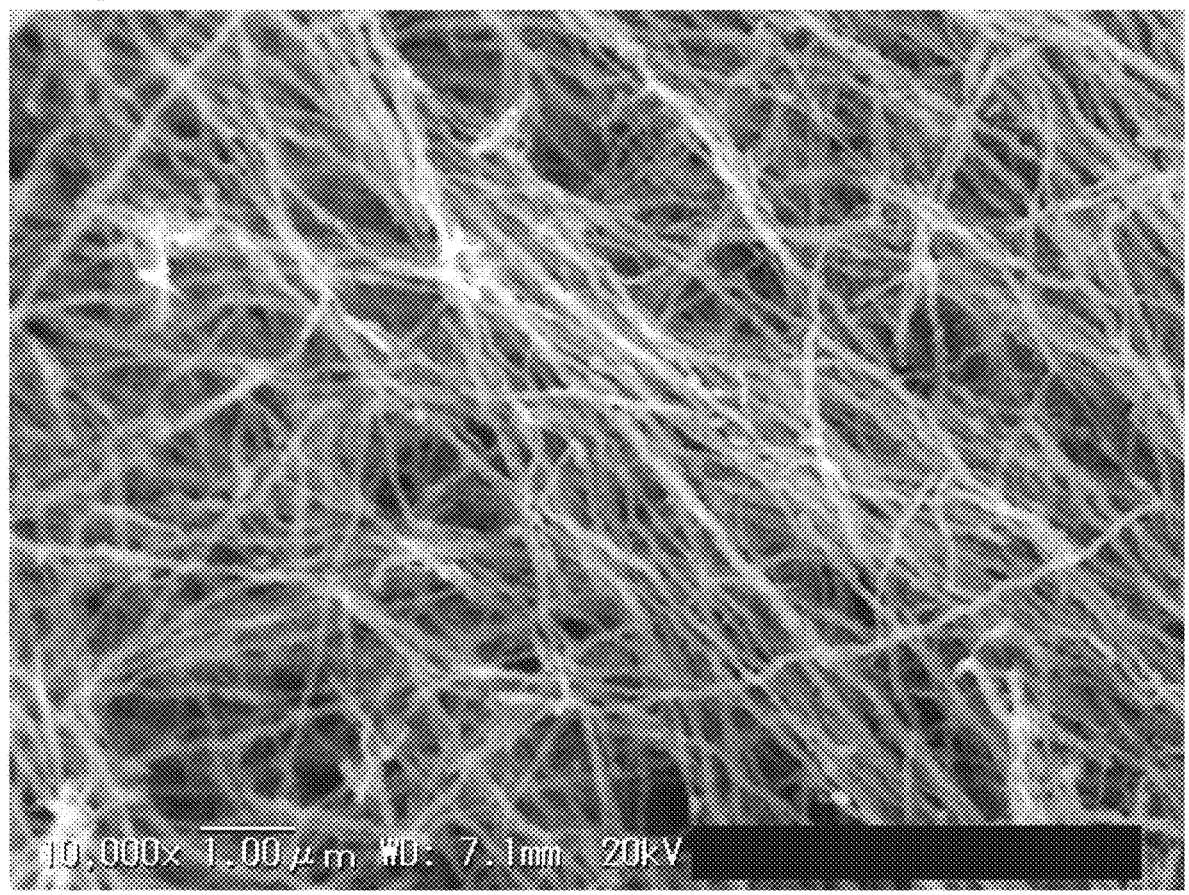

[Fig. 69]
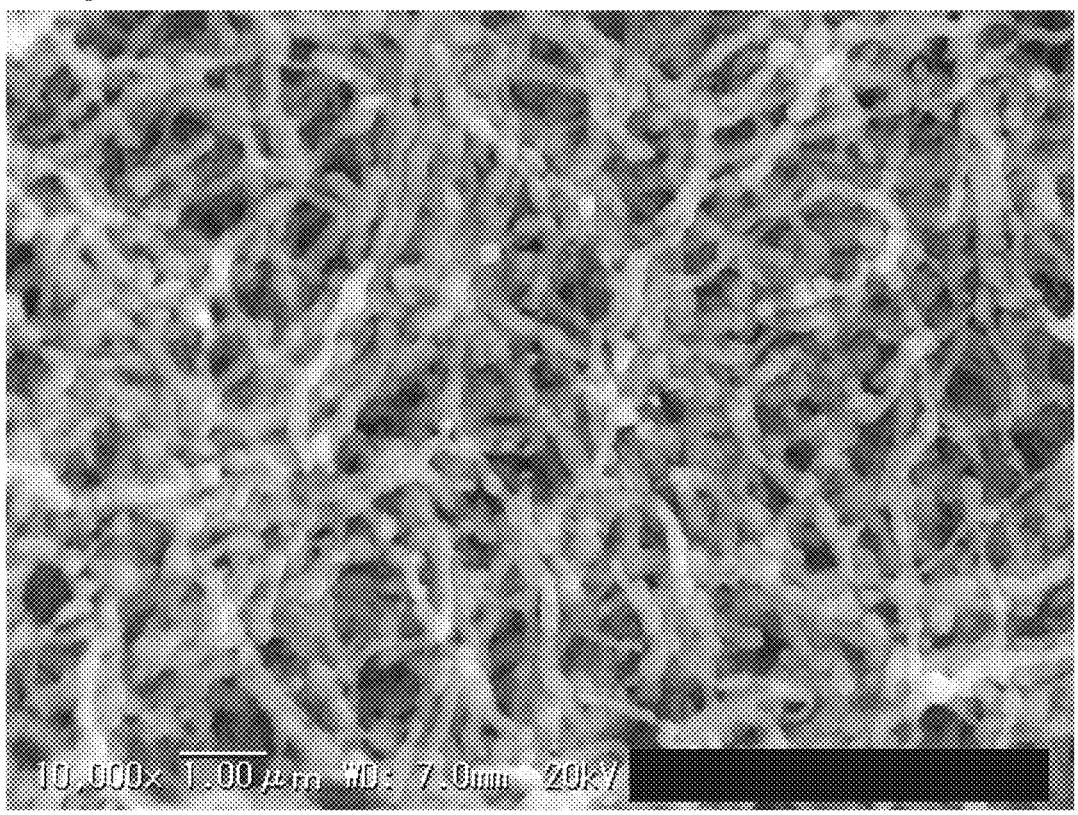

METAL-BASED STRUCTURE OR NANOPARTICLES CONTAINING HYDROGEN, AND METHOD FOR PRODUCING SAME

TECHNICAL FIELD

The present invention relates to a metal-based structure or nanoparticles containing hydrogen, and a method for producing the same.

BACKGROUND ART

A metal-based structure, which is a structure in which multiple metal-based powder bodies having a particle size of less than 1 μm, preferably 500 nm or less, more preferably 300 nm (which may sometimes be referred to as the "nanoparticle" herein) approach each other, whereby they are stuck to each other to form a pre-determined shape characteristic, is a promising material having excellent mechanical properties and chemical properties.

The metal-based structure can be usually obtained by sintering the nanoparticle in a pressurized environment, as described in Non Patent Literature 1, and the like. In general, the temperature necessary for sintering particles falls as the particle size of the powder is decreased, and thus it is preferable to use the nanoparticles as the powder for sintering in the terms of the increase of productivity when a structure is produced by the sintering.

CITATION LIST

Non Patent Literature

Non Patent Literature 1: "Powder and Powder Metallurgy" vol. 38, 7, pages 854-857 (Japanese)

SUMMARY OF INVENTION

Technical Problem

The nanoparticles, however, have a larger surface area per unit mass compared that of particles having a particle size of micron size or more (hereinafter referred to as "non-nanoparticles"), and thus they are easily reacted with oxygen in the air, and the reaction of the nanoparticles with oxygen may be explosively advanced. For those reasons, the handling thereof is difficult, and the facility charge for securing the safety of the sintering work is large.

Even if the sintering is performed while the attention is paid so that the reaction with oxygen is not explosively advanced, an amount of substances adsorbing the nanoparticles used for the sintering is remarkably larger than that in the non-nanoparticles. For that reason, when the sintering is performed using the nanoparticles, though the sintering temperature itself is low, the obtained metal-based structure has a large content of impurities derived from the adsorption substances, and there may be cavities, formed by volatilization or decomposition of the impurities, inside the metal-based structure. By the inclusion of the impurities and the existence of cavities, the homogeneity of the metal-based structure is deteriorated and the mechanical properties and chemical properties are deteriorated. Consequently, almost all of the metal-based structures produced according to the prior art are inferior to metal-based structures theoretically expected.

Furthermore, conventional metal nanoparticles have an oxidized layer, and thus a reduction operation or a pressurization operation is necessary in order to adhere particles to each other, and the formation of nanostructure is very difficult.

As explained above, when the sintering is performed using the conventional metal nanoparticles, it is not easy to secure the safety, the obtained metal-based structure has easily the deteriorated homogeneity, and the adherence formation is difficult. A method for industrially producing a metal-based structure having no problems described above, accordingly, has been desired.

In view of the circumstance described above, the present invention aims at providing a metal-based structure or nanoparticles, which do not have the deteriorated homogeneity and are easy to adhere to each other, and a method for producing the same with a high safety.

Solution to Problem

The present inventions, which are provided for solving the problems described above, are as follows:
(1) A metal-based structure comprising a hydrogen compound, a cluster, or an aggregate thereof, represented by the general formula:

$M_m H$ wherein
M is a metal-based atom;
m is an integer of 3 or more and 300 or less; and
H is a hydrogen atom.
(2) The metal-based structure according to item (1), wherein the M is a metal atom, and the m is any of 4, 6, 8, 12, 20, or 30.
(3) A metal-based structure comprising a metal-based amorphous phase which is amorphized by containing hydrogen.
(4) A metal-based structure which contains hydrogen, wherein a content A of the hydrogen, % by atom, is a value satisfying the following formulae (1) and (2), based on the whole amount of the metal-based structure.

$$Y=100\times 1/(X+1) \text{ wherein } X=4,6,8,12,20, \text{ or } 30 \quad (1)$$

$$0.85Y \leq A \leq 1.15Y \quad (2)$$

(5) The metal-based structure according to any of items (1) to (4), wherein at least a part of the hydrogen are non-diffusible hydrogen which is contained in the metal-based structure after the metal-based structure is heated at 200° C. for 2 minutes.
(6) A metal-based structure which contains hydrogen, wherein
  at least a part of the hydrogen are non-diffusible hydrogen contained in the metal-based structure after the metal-based structure is heated at 200° C. for 2 minutes, and
  a content of the non-diffusible hydrogen is 0.01% by mass or more, or 0.41% by atom or more, based on the whole amount of the metal-based structure.
(7) A metal-based structure which contains hydrogen, wherein
  a content of the hydrogen is 0.095% by mass or more, or 5.04% by atom or more, based on the whole amount of the structure.
(8) The metal-based structure according to any of items (1) to (7), wherein the metal-based structure comprises an amorphous phase at least in part.
(9) The metal-based structure according to item (8), wherein the amorphous phase contains hydrogen.

(10) A metal-based structure which comprises a metal-based amorphous phase containing hydrogen, wherein a content of the hydrogen, after the metal-based structure is heated at 200° C. for 2 minutes, is 0.01% by mass or more, or 0.41% by atom or more, based on the whole amount of the metal-based structure.

(11) The metal-based structure according to any of items (3), (6), or (10), wherein the hydrogen content is 0.037% by mass or more and 0.59% by mass or less, or 2.0% by atom or more and 25% by atom or less, based on the whole amount of the metal-based structure.

(12) The metal-based structure according to any of items (1) to (11), wherein the metal-based structure is a metal-based structure comprising a metal as a main component, and the metal is a ferromagnetic substance.

(13) The metal-based structure according to any of items (1) to (12), wherein the metal-based structure comprises a metal element as a main component.

(14) The metal-based structure according to item (13), wherein the metal element comprises a single element.

(15) The metal-based structure according to any of items (1) to (14), wherein the metal-based structure contains iron.

(16) The metal-based structure according to any of items (1) to (15), wherein at least apart of the metal-based structure comprises a particle structure.

(17) The metal-based structure according to any of items (1) to (16), wherein at least a part of the metal-based structure comprises a wire-shaped structure.

(18) The metal-based structure according to any of items (1) to (17), wherein the metal-based structure comprises a formless, amorphous phase, which fills up a cavity in the metal-based structure, or consists of the formless, amorphous phase.

(19) The metal-based structure according to item (16) or (17), wherein the particle structure or the wire-shaped structure is formed by a self-granulating reaction.

(20) The metal-based structure according to any of items (1) to (19), wherein the metal-based structure comprises a hydrogen compound, a cluster, or an aggregate thereof, which comprises a regular polyhedron structure or an almost regular polyhedron structure, and in the regular polyhedron structure, a metal atom is disposed on each vertex of the regular polyhedron structure, or on the middle of each surface or each side, centered on a hydrogen atom.

(21) A metal-based structure, which is a metal-based structure bound body of a metal-based structure according to any of items (1) to (20), wherein the metal-based structure bound body comprises a shape anisotropy.

(22) The metal-based structure or the metal-based structure bound body according to any of items (1) to (21), which is used for a 3D printer.

(23) A method for producing a metal-based structure, which is a structure obtained by reducing a reducible substance which is a substance containing a metal-based reducible component containing at least one metal element and/or semi-metal element, comprising a step of controlling at least one of the following (i) to (iii) by controlling a hydrogen content based on the whole amount of the metal-based structure, the hydrogen being contained in the metal-based structure:

(i) controlling formation of an amorphous phase which the metal-based structure comprises;

(ii) controlling a particle shape of the metal-based structure; and (iii) controlling a composition of the metal-based structure.

(24) A method for producing a metal-based structure according to any one of items (1) to (22), which is a method for producing a metal-based structure, which is a structure obtained by reducing, in liquid, a reducible substance which is a substance containing a metal-based reducible component containing at least one metal element and/or semi-metal element, comprising a step of controlling at least one of the following (i) to (iii) by controlling a hydrogen content based on the whole amount of the metal-based structure, the hydrogen being contained in the metal-based structure:

(i) controlling formation of an amorphous phase which the metal-based structure comprises;

(ii) controlling a particle shape of the metal-based structure; and (iii) controlling a composition of the metal-based structure.

(25) The method for producing a metal-based structure according to items (23) or (24), wherein the hydrogen content is controlled to 0.41% by atom or more, thereby to form the metal-based structure comprising a metal-based amorphous phase and/or, the hydrogen content is controlled to 2.0% by atom or more, thereby to form the metal-based structure comprising a metal-based amorphous phase wherein the metal-based amorphous phase comprises a metal element as a main component and/or, the hydrogen content is controlled to 3.3% by atom or more, thereby to form the metal-based structure substantially comprising a metal-based amorphous phase alone wherein the metal-based amorphous phase comprises a metal element as a main component and/or, the hydrogen content is controlled to 5.5% by atom or more, thereby to form the metal-based structure substantially comprising a metal-based amorphous phase alone wherein the metal-based amorphous phase comprises a metal element as a main component and a least a part of the metal-based amorphous phase is formless.

(26) The method for producing a metal-based structure according to any of items (23) to (25), wherein the hydrogen content is controlled to 0.41% by atom or more and 13% by atom or less, thereby to control an average length of a particle structure or an average short axis length of a wire-shaped structure of the metal-based structure to 500 nm or less.

(27) The method for producing a metal-based structure according to any of items (23) to (26), wherein the A % by atom, which is the hydrogen content, is controlled to a value satisfying the following formulae (1) and (2) based on the whole amount of the metal-based structure.

$$Y=100\times 1/(X+1) \text{ wherein } X=4,6,8,12,20, \text{ or } 30 \qquad (1)$$

$$0.85Y \leq A \leq 1.15Y \qquad (2)$$

(28) A method for producing a metal-based structure which comprises a hydrogen compound, a cluster, or an aggregate thereof, represented by the general formula:

$$M_mH$$

wherein

M is a metal-based atom;

m is an integer of 3 or more and 300 or less; and

H is a hydrogen atom, the method comprising a step of:
controlling the m to 30 or less, whereby the metal-based structure comprises a metal element as a main component and/or,
controlling the m to 31 or more, whereby the metal-based structure comprises a metal as a main component.

(29) A method for producing a metal-based structure which comprises a hydrogen compound, a cluster, or an aggregate thereof, represented by the general formula:

$$M_mH$$

wherein
M is a metal-based atom;
m is an integer of 3 or more and 300 or less; and
H is a hydrogen atom,
the method comprising a step of:
controlling the m to 31 or more, thereby to form the metal-based structure comprising a metal-based amorphous phase and/or,
controlling the m to 30 or less, thereby to form the metal-based structure comprising a metal-based amorphous phase wherein the metal-based amorphous phase comprises a metal element as a main component and/or,
controlling the m to 20 or less, thereby to form the metal-based structure substantially comprising a metal-based amorphous phase alone wherein the metal-based amorphous phase comprises a metal element as a main component and/or,
controlling the m to 12 or less, thereby to form the metal-based structure substantially comprising a metal-based amorphous phase alone wherein the metal-based amorphous phase comprises a metal element as a main component and at least a part of the metal-based amorphous phase is formless.

(30) The method for producing a metal-based structure according to item (28) or (29), wherein the m is controlled to 8 or more, thereby to control an average length of a particle structure or an average short axis length of a wire-shaped structure of the metal-based structure to 500 nm or less.

(31) The method for producing a metal-based structure according to any of items (23) to (30), wherein
at least a part of hydrogen contained in the metal-based structure are non-diffusible hydrogen contained in the metal-based structure after the metal-based structure is heated at 200° C. for 2 minutes.

(32) A method for producing a metal-based structure which contains hydrogen, comprising a step of a reduction step which comprises reducing a reducible substance containing at least one of a metal element and/or a semi-metal element in liquid containing at least one of hydrogen and a hydrogen-containing substance, wherein
at least a part of the hydrogen are non-diffusible hydrogen contained in the metal-based structure after the metal-based structure is heated at 200° C. for 2 minutes.

(33) The method for producing a metal-based structure according to item (32), wherein the reduction step comprises a step in which a solution A which contains a reducible substance containing at least one of a metal element and/or a semi-metal element and a solution B which contains at least one of hydrogen and a hydrogen-containing substance, and has a reducing action are mixed to form mixed liquid.

(34) The method for producing a metal-based structure according to item (33), wherein
the metal-based structure comprises a hydrogen compound, a cluster, or an aggregate thereof, represented by the general formula:

$$M_mH$$

wherein
M is a metal-based atom;
m is an integer of 3 or more and 300 or less;
H is a hydrogen atom, and
a concentration of the reducible substance in the solution A is controlled to a threshold value T mmol/kg or more, thereby to adjust the m to 30 or less.

(35) The method for producing a metal-based structure according to item (33), wherein
a concentration of the reducible substance in the solution A is adjusted to less than a threshold value T mmol/kg, and a concentration of the hydrogen or the hydrogen-containing substance in the solution B is adjusted to 6 mmol/kg or more, thereby to adjust a content of the hydrogen to less than 2.0% by atom based on the whole amount of the metal-based structure and/or,
a concentration of the reducible substance is adjusted to the threshold value T mmol/kg or more and a concentration of the hydrogen or the hydrogen-containing substance is adjusted to 6 mmol/kg or more, thereby to adjust a content of the hydrogen to 2.0% by atom or more, and
the threshold value T is 3.

(36) The method for producing a metal-based structure according to item (34) or (35), wherein
an alcohol is added to a solvent in the solution A and/or the solution B in an amount of 1% by mass or more based on the whole amount of the solvent to which the alcohol is added, whereby the threshold value T mmol/kg becomes lower compared to the case in which the alcohol is not added.

(37) The method for producing a metal-based structure according to item (33), wherein
a concentration of the reducible substance in the solution A is adjusted to 0.3 mmol/kg or more and a concentration of the hydrogen and the hydrogen-containing substance in the solution B is adjusted to 6 mmol/kg or more, whereby the metal-based structure is formed into a metal-based structure comprising a hydrogen compound, a cluster, or an aggregate thereof, represented by the general formula: $M_mH$ wherein M is a metal atom; m is any of 4, 6, 8, 12, 20, or 30; and H is a hydrogen atom.

(38) The method for producing a metal-based structure according to any of items (33) to (37), which further comprises a step in which a magnetic field is applied to the mixed liquid, thereby to control a shape anisotropy of the metal-based structure.

(39) A method for producing a metal-based structure comprising a step of applying a magnetic field to a metal-based structure according to any of items (1) to (22), thereby to control a shape anisotropy of the metal-based structure.

(40) A method for producing a metal-based structure comprising a step of imparting an additional substance to a cavity in a metal-based structure according to any of items (1) to (22).

(41) A method for producing a metal-based structure comprising a step of heating and/or pressurizing a metal-based structure according to any of items (1) to (22), thereby to decrease a volume of a cavity in the metal-based structure, to stick the metal-based structures to each other, to stick the part structures in the metal-based structure to each other, and/or to stick an additional substance to the metal-based structure.

(42) A method for producing a metal-based structure, comprising a step of heating a metal-based structure according to any of items (1) to (22), thereby to form a crystal phase at least in part.

Advantageous Effects of Invention

According to the present invention, a metal-based structure or nanoparticles, which do not have the deteriorated homogeneity and are easy to adhere to each other, and a method for producing the same with a high safety are provided.

BRIEF DESCRIPTION OF DRAWINGS

FIG. 1 is a view schematically showing dependency of the shape of a metal-based structure, produced by a production method according to one embodiment of the present invention, on a concentration of a starting material and a magnetic field strength for the solidification.

FIG. 2 is an image showing one example of a metal-based structure according to Example 1-1.

FIG. 3 is an image showing another example of a metal-based structure according to Example 1-1.

FIG. 4 is an image showing still another example of a metal-based structure according to Example 1-1.

FIG. 5 is an image showing a still further example of a metal-based structure according to Example 1-1.

FIG. 6 is an image showing one example of a metal-based structure according to Example 1-2.

FIG. 7 is an image showing one example of a metal-based structure according to Example 1-3.

FIG. 8 is an image showing one example of a metal-based structure according to Example 1-4.

FIG. 9 is an image showing another example of a metal-based structure according to Example 1-4.

FIG. 10 is an image showing one example of a metal-based structure according to Example 1-4-2.

FIG. 11 is an image showing another example of a metal-based structure according to Example 1-4-2.

FIG. 12 is an image showing one example of a metal-based structure according to Example 1-4-3.

FIG. 13 is an image showing another example of a metal-based structure according to Example 1-4-3.

FIG. 14 is an image showing still another example of a metal-based structure according to Example 1-4-3.

FIG. 15 is an image showing a still further example of a metal-based structure according to Example 1-4-3.

FIG. 16 is an image showing one example of a metal-based structure according to Example 1-5.

FIG. 17 is an image showing one example of a metal-based structure according to Example 1-6.

FIG. 18 is an image showing one example of a metal-based structure according to Example 1-7.

FIG. 19 is an image showing another example of a metal-based structure according to Example 1-7.

FIG. 20 is an image showing still another example of a metal-based structure according to Example 1-7.

FIG. 21 is an image showing a still further example of a metal-based structure according to Example 1-7.

FIG. 22 is an image showing one example of a metal-based structure according to Example 1-7-1.

FIG. 23 is an image showing one example of a metal-based structure according to Example 1-7-3.

FIG. 24 is an image showing one example of a metal-based structure according to Example 1-7-4.

FIG. 25 is an image showing another example of a metal-based structure according to Example 1-7-4.

FIG. 26 is an image showing one example of a metal-based structure according to Example 1-8.

FIG. 27 is an image showing one example of a metal-based structure according to Example 1-9.

FIG. 28 is an image showing one example of a metal-based structure according to Example 1-9-1.

FIG. 29 is an image showing one example of a metal-based structure according to Example 1-9-2.

FIG. 30 is an image showing one example of a metal-based structure according to Example 1-10.

FIG. 31 is an image showing one example of a metal-based structure according to Example 1-11.

FIG. 32 is an image showing another example of a metal-based structure according to Example 1-11.

FIG. 33 is an image showing one example of a metal-based structure according to Example 1-12.

FIG. 34 is an image showing one example of a metal-based structure according to Example 1-12-1.

FIG. 35 is an image showing one example of a metal-based structure according to Example 1-12-2.

FIG. 36 is an image showing one example of a metal-based structure according to Example 1-13.

FIG. 37 is an image showing another example of a metal-based structure according to Example 1-13.

FIG. 38 is an image showing still another example of a metal-based structure according to Example 1-13.

FIG. 39 is a view showing X-ray diffraction spectra of a metal-based structure according to Example 1-1 in Example of the present invention.

FIG. 40 is a view showing X-ray diffraction spectra of a metal-based structure according to Example 1-4 in Example of the present invention.

FIG. 41 is a view showing X-ray diffraction spectra of a metal-based structure according to Example 1-4-4 in Example of the present invention.

FIG. 42 is a view showing X-ray diffraction spectra of a metal-based structure according to Example 1-7 in Example of the present invention.

FIG. 43 is a view showing X-ray diffraction spectra of a metal-based structure according to Example 1-7-5 in Example of the present invention.

FIG. 44 is a view showing X-ray diffraction spectra of a metal-based structure according to Example 1-9 in Example of the present invention.

FIG. 45 is a view showing X-ray diffraction spectra of a metal-based structure according to Example 1-10 in Example of the present invention.

FIG. 46 is a view showing X-ray diffraction spectra of a metal-based structure according to Example 1-10-1 in Example of the present invention.

FIG. 47 is a view showing X-ray diffraction spectra of a metal-based structure according to Example 1-11 in Example of the present invention.

FIG. 48 is a view showing X-ray diffraction spectra of a metal-based structure according to Example 1-11-1 in Example of the present invention.

FIG. 49 is a view showing X-ray diffraction spectra of a metal-based structure according to Example 1-12 in Example of the present invention.

FIG. 50 is a view showing X-ray diffraction spectra of a metal-based structure according to Example 1-12-2 in Example of the present invention.

FIG. 51 is a view showing X-ray diffraction spectra of a metal-based structure according to Example 1-13 in Example of the present invention.

FIG. 52 is a view showing X-ray diffraction spectra of a metal-based structure according to Example 1-13-1 in Example of the present invention.

FIG. 53 is a view showing a DSC profile of a metal-based structure according to Example 1-4-1 in Example of the present invention.

FIG. 54 is a view showing a DSC profile of a metal-based structure according to Example 1-7 in Example of the present invention.

FIG. 55 is a view showing a DSC profile of a metal-based structure according to Example 1-10 in Example of the present invention.

FIG. 56 is a view showing a DSC profile of a metal-based structure according to Example 1-11 in Example of the present invention.

FIG. 57 is a view showing a DSC profile of a metal-based structure according to Example 1-12-1 in Example of the present invention.

FIG. 58 is a view showing a DSC profile of a metal-based structure according to Example 1-13 in Example of the present invention.

FIG. 59 is a view showing X-ray diffraction spectra of a metal-based structure according to Example 2-3 in Example of the present invention.

FIG. 60 is a view showing X-ray diffraction spectra of a metal-based structure according to Example 2-7 in Example of the present invention.

FIG. 61 is a view schematically showing dependency of a composition of a metal-based structure on a concentration of an aqueous iron sulfate solution and a concentration of an aqueous reducing agent solution, based on results in Example 2.

FIG. 62 is a view schematically showing dependency of a composition of a metal-based structure on a volume ratio and a concentration of an aqueous reducing agent solution, based on results in Example 2.

FIG. 63 is a view showing X-ray diffraction spectra of a metal-based structure according to Example 1-9-3 in Example of the present invention.

FIG. 64 is a view showing X-ray diffraction spectra of a metal-based structure according to Example 1-11-4 in Example of the present invention.

FIG. 65 is a view showing X-ray diffraction spectra of a metal-based structure according to Example 1-11-5 in Example of the present invention.

FIG. 66 a view showing X-ray diffraction spectra of a metal-based structure according to Example 1-14 in Example of the present invention.

FIG. 67 a view showing X-ray diffraction spectra of a metal-based structure according to Example 1-14-2 in Example of the present invention.

FIG. 68 is an SEM image of a metal-based structure according to Example 1-11-3 in Example of the present invention.

FIG. 69 is an SEM image of a metal-based structure according to Example 1-11-5 in Example of the present invention.

DESCRIPTION OF EMBODIMENTS

Embodiments of the present invention are explained.
1. Metal-Based Structure
(1-1) Structural Characteristic
(1-1-1) Metal-Based Structure or Nanoparticle In the instant specification, a "metal" refers to a substance formed of apart of typical elements and transition elements, and a single entity thereof has natures of a metal. A substance can be assumed as a metal if it has the following natures. It is in the state of a solid at a normal temperature in a normal pressure (excluding mercury), has spreadability and metallic luster, is a good conductor of electricity and heat, and forms a cation (a positive ion) in an aqueous solution. As specific examples of the "semi-metal", B, Si, Ge, As, Sb, Te, Se, Po, At, C, and P can be mentioned. The semi-metal has generally natures between a metal and a nonmetal, and Ge, Sb and Po may sometimes be classified into the metals. An "intermetallic compound" refers to a compound combined of metals, or a metal and a semi-metal. A "metal compound" refers to a compound containing a metal but excludes the combinations of a metal and a metal, or a metal and a semi-metal. Specific examples thereof may include metal oxides, metal nitrides, and the like. Alloys and intermetallic compounds containing a mixture of multiple metal elements and semi-metal elements are assumed as one form of metals. The term "metal-based" refers to a material containing, as a main component, a "metal," but it can contain a non-metal component. The "metal-based structure or nanoparticles" refer to a structure or nanoparticles containing, as a main component, a metal. The "structure" includes "nanoparticles."

(1-1-2) Hydrogen (which May Sometimes be Described as "H" in the Instant Specification)-Containing Phase and Amorphous Phase (1-1-2-1) Characteristics of Metal-Based Structure According to Present Invention The metal-based structure according to one embodiment of the present invention has at least one characteristic from the following (i) to (Iv):

(i) To contain hydrogen atoms in an amount of 0.01% by mass or more based on the whole amount of the metal-based structure;

(ii) To contain hydrogen atoms in an amount of 0.41% by atom or more based on the whole amount of the metal-based structure;

(iii) To contain an amorphous phase; and (iv) The metal-based structure contains an amorphous phase, and X-ray diffraction spectra showing existence of a metal phase are obtained in a condition in which the metal-based structure is heated to be crystallized.

(1-1-2-2) Hydrogen-Content

In the instant specification, the content of the hydrogen atoms in the metal-based structure is measured in accordance with JIS Z 2614. The measurement can be performed using an apparatus described in JIS H 1619 "Titanium and Titanium Alloy-Determination of Hydrogen Content." Specifically, it is exemplified by a method in which using an apparatus described in JIS H 1619 "Titanium and Titanium Alloy-Determination of Hydrogen Content-5 Inert Gas Fusion-Thermal Conductivity Method," hydrogen is measured as it is. One example of specific measurement apparatus may include "EMGA-621A" manufactured by HORIBA Ltd.

The outline of the measurement method can be as follows: A sample is heat-melted together with tin using a graphite crucible in an inert gas stream in an impulse furnace, and hydrogen is extracted with other gases. The extracted gases are passed through a separation column as they are to separate hydrogen from them, and the hydrogen is introduced into a thermal conductivity detector, thereby measuring a change of a thermal conductivity caused by hydrogen.

A determination method using, as the unit of the hydrogen content, % by mass (in the instant specification, which may sometimes be described as "% by weight") is simple and effective, when Fe is contained, or a ferromagnetic material such as Ni or Co is contained. It is applicable to all of other cases.

On the other hand, the unit % by atom (in the instant specification, which may sometimes be written as "at %") is effective in a case in which more theoretical and essential control is performed, which is relatively better, in view of the fact that it is possible to perform the control by not only the method described above but also another method (a method in which the number of atoms is directly counted, and the like). The unit % by mass can be exactly converted into the unit % by atom, if a metal-based structure to be measured is a single phase. However, if the metal-based structure is a diploid phase, the conversion cannot be performed unless the composition ratio thereof is obtained. When the metal-based structure is the diploid phase, the composition ratio thereof is obtained by another method (such as ICP), and then the conversion is performed.

Essentially, it is preferable to perform the control with the unit % by atom, but the unit % by mass may be adopted for simplifying the control. In the instant specification, the unit of the hydrogen content may sometimes be expressed by "H %" including the both.

When the hydrogen content is adjusted to 0.001% by mass or more to the whole metal-based structure, it is difficult to exert the influence of oxidation on the metal-based structure, and thus the adherence and the sintering property are excellent. The hydrogen content is more preferably 0.010% by mass or more, still more preferably 0.20% by mass or more, in terms of the more excellent adherence and sintering property.

When the hydrogen content is adjusted to 0.41% by atom or more to the whole metal-based structure, it is difficult to exert the influence of oxidation on the metal-based structure, and thus the adherence and the sintering property are excellent. The hydrogen content is more preferably 5.04% by atom or more, still more preferably 5.5% by atom or more, in terms of the more excellent adherence and sintering property.

Though the detailed explanation is described below, in general, it is not easy to form a metal amorphous phase from a reason in which quick cooling is necessary from a melted state, and the like. In particular, it is very difficult to form an amorphous form formed of a high purity of a metal component, or it is further very difficult to form an amorphous form formed of a high purity of a metal element.

In the present invention, the amorphous part or the hydrogen-containing amorphous part can be stably formed or maintained by containing hydrogen in the metal-based structure, and adjusting the hydrogen content to 0.41% by atom (0.01% by mass) or more, based on the whole amount of the metal-based structure, preferably 3.03% by atom (0.056% by mass) or more, more preferably 5.3% by atom (0.10% by mass) or more, still more preferably 10.1% by atom (0.20% by mass) or more. In addition, when the amorphous part stably exists and the purity of the metal elements in the metal-based structure is stably formed or maintained in the hydrogen-containing metal-based structure or the hydrogen-containing amorphous form, the crystallized metal phase after the heat-treatment or the high purity of the metal-based structure is effectively produced.

When the metal-based structure contains hydrogen, contains it in a content equal to or more than a specified value, and/or has the amorphous part, it is possible to produce the metal-based structure without containing a nucleating agent, whereby various shapes can be minutely formed, and a high purity can be preferably obtained. The hydrogen-containing amorphous substance exhibits excellent effects on the shape control of the metal-based structure, as described below. The conditions described above are also effective for forming of the formless phase.

The upper limit of the hydrogen content of the metal-based structure is not particularly limited. It is preferable that the hydrogen content of the metal-based structure is preferably 50% by atom or less, more preferably 25% by atom or less or less than 25% by atom, and there are cases the content is more preferably 23% by atom or less or less than 23% by atom, 20% by atom or less or less than 20% by atom, 16.4% by atom or less or less than 16.4% by atom, or 13% by atom or less or less than 13% by atom.

Here, the hydrogen contained in the metal-based structure is explained in detailed. The hydrogen includes diffusible hydrogen and non-diffusible hydrogen. In general, the diffusible hydrogen refers to hydrogen existing in a material, which goes out (diffuses) from the material at room temperature over time. The non-diffusible hydrogen refers to hydrogen existing in the material, which cannot go out (does not diffuse) from the material even at room temperature to about 200° C. over time. It can be considered that the diffusible hydrogen may contribute to hydrogen embrittlement.

From the above, the hydrogen which does not go out from the metal-based structure when the metal-based structure of the present invention is heated at 200° C. for 2 minutes can be said to be the non-diffusible hydrogen. The hydrogen amount in each state can also be measured using a thermal desorption analyzer (TDS). This can be similarly said in any case when the metal-based structure is in the state of an amorphous phase or a crystallized phase.

The hydrogen content when heating at 200° C. for 2 minutes is adjusted to preferably 0.01% by mass or more or 0.41% by atom or more, based on the whole amount of the structure, more preferably 0.056% by mass or more or 3.03% by atom or more, still more preferably 0.10% by mass or 5.3% by atom or more, further preferably 0.20% by mass or more or 10.1% by atom or more.

(1-1-2-3) Amorphous Phase

In the instant specification, the "amorphous substance" or "amorphous phase" refers to a phase having no long distance order in the range, and having no distinguished peak derived from the crystal structure in an X-ray diffraction spectra. When the metal-based structure contains an amorphous part or a hydrogen-containing amorphous part, plastic deformation easily occurs, thus resulting in obtaining the excellent sintering property and adherence. The metal-based structure is preferably an amorphous single phase, in terms of the excellent sintering property or adherence. When the metal-based structure is amorphous, magnetic or mechanical isotropy is provided to the metal-based structure, whereby a material which is magnetically or mechanically excellent can be obtained.

The present inventors have found that the amorphous structure containing hydrogen and containing it in an amount equal to or more than a specified value has an excellent shape-controlling property of the metal-based structure (magnetic field alignment property, adherence, formation of shape anisotropy, and formation of a formless phase). When the metal-based structure contains hydrogen and/or the metal-based structure contains the amorphous part, accordingly, it is easy to form various shapes as the whole structure, due to the effect in which the deformation property and the adherence of the metal-based structure, nanostructure or nanoparticles are improved. This tendency is remarkable in liquid, and is more remarkable in liquid containing a hydrogen-containing substance.

When the metal-based structure contains the amorphous part, it is preferable to obtain an X-ray diffraction spectra showing existence of a metal phase in the state in which the metal-based structure is crystallized by heating. In that case, the material providing the metal phase forms of the amorphous part, and thus it becomes clearer that the metal-based structure before heating contains the amorphous part. Here, the X-ray diffraction spectra of the metal-based structure, obtained by heating the metal-based structure to be crystallized, may be spectra showing that the metal-based structure is a metal single phase. Here, the metal single phase refers to a phase formed of metals alone, containing no phase other than the metal phase such as oxides. They may be exemplified by metal element single phases, alloy, semi-metal, and intermetallic compounds, formed of elements selected from metal element and/or semi-metal element, and solid solutions, mixtures in which the elements described above are mixed and composites thereof.

The reason in which the metal-based structure according to one embodiment of the present invention contains the amorphous part can be considered as follows: It can be said, accordingly, that the hydrogen in the metal-based structure influences the formation of the amorphous part, and thus when the hydrogen is contained in the metal-based structure the crystallization is inhibited during the development of a metal-based reduced substance; as a result, an amorphous region or a region being close thereto is produced in the metal-based structure.

It is possible to obtain a state which can be considered to be amorphous over the whole area, observing substantially no peak in the X-ray diffraction spectra of the metal-based structure, i.e., the metal-based structure of the amorphous single phase, by appropriately controlling production conditions. As described below, in Examples of the present invention, the metal-based structure which is the amorphous single phase and contains hydrogen is obtained, and, from the results, it can be understood that the amorphous part is the hydrogen-containing amorphous. It can be said that in such an amorphous substance, and hydrogen-containing amorphous phase, the adhesion of the metal-based structures to each other, or the adhesion of the nanopart structures forming the metal-based structures to each other is made easy, because of the high plastic deformation property and binding property.

Specifically, a metal-based structure providing an X-ray diffraction spectra shown in FIG. 42 is a structure in which the reduced substance is Fe and peaks derived from the crystal structure are not observed. When the metal-based structure is heated, a crystallized metal-based structure can be obtained in which only peaks substantially belonging to αFe with a body-centered cubic lattice structure in an X-ray diffraction spectra are obtained, as shown in FIG. 43. From the above, it can be understood that the metal-based structure mainly contains the amorphous part containing the Fe single element metal as a main component in the state before the heating.

DSC (differential scanning calorimeter) results obtained when a metal-based structure, obtained in the same manner as that of a metal-based structure having a filament wavy shape shown in FIG. 32, is heated to 500° C. (a temperature rising rate: 3° C./minute) are as shown in FIG. 56. It can be said that heat generation having a peak at around 460° C. is based on the crystallization. It can also be said that a chemical change or a state change providing heat generation having a peak at around 320° C. is caused by a structural change with a crystallographic and/or chemical change.

(1-1-3) Single Element Metal

The metal-based structure according to the present invention can be formed from a single element metal. It is known that an amorphous phase of the single element metal (pure metal) can be produced by a vacuum deposition method at a very low temperature. Bi is the first successful case according to the vacuum deposition method, and after that, Ga, Fe, Ni, Cr, Au, and the like have been produced. However, any of them are instable, and they are crystallized at room temperature or lower. For that reason, substances, which are generally called as an amorphous metal, are all alloys.

In particular, an amorphous phase of Fe single element which is stable at room temperature has not been confirmed in previous examples for Fe. There has been an example in which amorphous substance is formed in around an $Fe_2B$ composition, which has been put to practical use. Known amorphous $Fe_2B$ is produced by a rapid solidification processing, and a ribbon-shaped amorphous form can be obtained by quick cooling the melted FeB to room temperature.

According to the present invention, the amorphous phase of the single element metal can be formed. In Examples, amorphous phase of Fe containing hydrogen could be stably obtained. From the above, it can be considered that the amorphous phase can be formed by containing hydrogen. The mechanism of the amorphous formation can be considered that, as described above, the crystallization of Fe is inhibited by forming a binding reaction state, which has not been known until now, between Fe and hydrogen, which have hitherto been considered to be a combination having a very low reactivity, whereby the amorphous phase is formed.

(1-1-4) Self-Granulating Reaction and Magnetic Substance (1-1-4-1) Self-Granulating Reaction In the present invention, the self-granulating reaction refers that particle formation is advanced only by setting reaction conditions and leaving a starting material to stand, to obtain a formation of particles having a specific shape, structure (amorphous structure), composition, and hydrogen content. For example, in a case of a reducing deposition reaction by a two-liquid mixing method, described below, the granulation may be advanced by minimizing application of a mechanical external force to deposited particles by a stirring operation, and the like (control is performed without inhibiting the self-granulating reaction) (see Examples).

A driving force forming and maintaining the specific amorphous structure can be assume to be a magnetic property of the whole particle. Probably, it is considered that an influence of a size for forming a single magnetic domain structure is large. At an initial stage of deposition, an amorphous substance of a magnetically specific structure is formed, particles grow by a surface energy driving force to increase a particle size, and the particle growth is inhibited at the time at which the particle size reaches a magnetically stable particle size, for example, a particle size having the minimum magnetic energy based on the single magnetic domain structure. It is considered that amorphous particles having a uniform specific particle size can be formed by this mechanism. The mechanism in which the specific amorphous structure can be selectively formed at the initial stage of deposition may be a mechanism of natural selection. It is considered that only the particles having the specific amorphous structure grow; whereas, particles having no specific structure relatively turn to an unstable state as they grow, and they stop growing or disappear.

The size and the amorphous structure of the particle are determinant of magnetism of the particles, and thus a determinant of a state of a particle is energy based on the magnetism and the surface energy of the particle, and amorphous structure and size (for example, a particle size when it is assumed as a sphere). Summarizing the above, in a case of Example, there are two kinds of stable amorphous magnetism particle states (an amorphous structure and a size), which are separated by a metal-based ion concentration. It is assumed that the self-granulating reaction whose driving force is the change to the stable state occurs.

(1-1-4-2) Magnetic Field Alignment

When the shaped particles formed by the self-granulating reaction are aggregated and aligned in a magnetic field, a secondary structure can be very effectively formed because of the uniform property. At that time, the secondary structure can be very effectively formed by the effect of improving the adherence, when the H % is the specified value or more, and the amorphous phase is contained.

(1-1-4-3) Magnetic Substance

From the above, the metal-based structure according to the present invention may be formed of the magnetic substance. In the instant specification, the "magnetic substance" refers to a substance which is magnetized in a magnetic field. The material forming the magnetic substance may include metals, semi-metals, intermetallic compounds, metal compounds, borides, phosphides, sulfides, oxides, and the like. In particular, the metals, the intermetallic compounds and the metal compound are preferable, and substances containing a transition (metal) element are also preferable. Further, substances containing a ferromagnet element (Fe, Ni, Co, Gd, or the like) are preferable. When the nanoparticles are handled, there is a case in which a bulk body, which is a large lump, and the magnetic property are different from each other.

(1-1-5) Nucleating Agent

The metal-based structure may be a structure obtained by reduction in liquid, as described below. In the instant specification, the "liquid" may be a solution or a dispersion. The liquid is preferably the solution, in terms of the improvement of the controlling property of the form of the metal-based structure. It is preferable, accordingly that at least a part of the reducible substance is dissolved in liquid. The liquid may be liquid containing a no nucleating agent which can be more preferentially reduced than the reducible substance.

Here, in general, the nucleating agent is added in order to act as a nuclear for forming a fine particles or fine structures from the reducible substance by an action of promoting the deposition of the reducible substance, for example, formation of fine particles by more preferential reduction than that of the reducible substance, and the like.

According to conventional techniques, it is generally performed in terms of stable advance of formation of nanoparticles that a substance which can form a reduced substance (such as a metal) including the reducible substance is put in liquid, a reducing agent and a nucleating agent containing a substance from which a crystal nucleus (e.g. platinum particles) is formed are added to the liquid, a reduced substance is deposited from the reducible substance, a component based on the nucleating agent being as a nucleus, and the deposited product is grown to form nanoparticles. When such a nucleating agent is contained, however, the component based on the nucleating agent is necessarily contained in the nanoparticle; as a result, a metal-based structure formed from the nanoparticle has a decreased degree of freedom in the composition. In addition, the magnetic characteristics and the mechanical properties of the metal-based structure may be restricted by the component above. When the liquid does not contain the nucleating agent in the reduction of the reducible substance, the degree of freedom in the composition of the metal-based structure can be increased, or the ranges of the magnetic characteristics and the mechanical properties can be widened. Furthermore, the accuracy of the shape control can be increased by the effects and high purity metal-based structure.

The liquid described above does not need to use a nucleating agent having an ionization tendency smaller than that of the reducible substance. The liquid does not need to use a nucleating agent containing a metal or semi-metal element other than the reducible substance. The liquid does not need to use the nucleating agent.

From the above, the metal-based structure according to the present invention does not need to contain the nucleating agent.

(1-1-6) Metal-Based Structure Formed from Hydrogen Compound, Cluster or Aggregate Thereof Represented by General Formula: $M_mH$ (1-1-6-1) Hydrogen Compound, Cluster or Aggregate Thereof Represented by General Formula: $M_mH$ (Mix Proportion of Hydrogen Content (m Number))

From measurement results in Examples, it is confirmed that the hydrogen content in the metal-based structure of the present invention is a mix proportion according to a specific rule, "specific mix proportion." In the metal-based structure, in order to have the "specific mix proportion," aggregates which are smaller than the structure are formed in the same mix proportion, then the structure and the mix proportion are stably formed; in other word, when the aggregates or clusters of the deposited particles, or nanoparticles of aggregation thereof have the specific mix proportion, the structure is stably formed. The reason in which the specific mix proportion is attained can be understood by formation of deposited aggregates or "H clusters" with a "shell structure" and a "regular polyhedron structure." In particular, the structure containing a metal element or being a metal single element (Fe) conforms to a regular polyhedron rule. From this, the presence of aggregates or clusters having a regular polyhedron structure or a structure which has the same mix proportion (atomic ratio) as that of the regular polyhedron structure is specified.

The "H cluster" formed of a metal-based atom and hydrogen, which is a cluster in the present application, is an aggregate of a metal-based atom and hydrogen, having a mix proportion of m: 1 wherein m is an integer of m≥3. The H clusters are aggregated to form a nanoparticle and a metal-based structure, and further a nanostructure formed article such as a nanowire. When 3≥m (the upper limit is preferably m≤300), it is formed in a range of the hydrogen content of (the lower limit is preferably 0.33 at % from the upper limit of the m number, 300) to 25 at % (corresponding to 3≤m).

It is considered that because there is a limit in the kinds of the bonding state between H and the metal-based atom, there are intervals in the m number. The numbers at intervals are called "magic numbers" and it is known as a phenomenon in which the specific number of structures stably exist in an atomic nucleus structure or a metal cluster structure. For example, it is known that Na metal clusters stably exist at the number of atoms of 8, 20, 40, 58, 92, 138, 198, 264, 344, 442, 554, and larger numbers at intervals.

In the H cluster, the m number changes depending on the mix proportion of the metal-based atom to hydrogen. In particular, it has been found that a case where the metal-based atom is a metal element, or is a metal single element (Fe) conforms to a regular polyhedron rule. From that result, a "regular polyhedron structure" in which hydrogen is disposed at the center and metal-based atoms are disposed around it like a shell is formed, which conforms to the "regular polyhedron H cluster structure" in which the distance to the hydrogen is equal and the distances between the adjacent metal-based atoms are equal. Further, as in Examples, regular polyhedron H clusters containing a single element metal, or containing Fe element are stably obtained. The "regular polyhedron H cluster structure" includes a cluster structure formed of structures having the same mix proportion; in other words, also includes a distorted structure (mostly regular polyhedron structure). It is possible to selectively form or control the m number by a kind of the atom or reaction conditions.

When the metal-based element is a transition metal, the H cluster can be stably formed by the metal bond thereof. In particular, when a ferromagnetism element, Fe, Ni or Co is contained, there are cases in which shaped nanoparticles are easily formed by the self-granulating reaction.

(1-1-6-2) Specific Mix Proportion

"Integer Rule":

It is a mix proportion formed by a "shell structure" in which one hydrogen atom is disposed at the center and the specific number of atoms are disposed in two-dimensionally or three-dimensionally around it. The integer rule, which is the mix proportion, is that M:H=m:1, wherein m≥3, and m is an integer, and H %:~25.0 at % (when m=3). M is formed of a metal-based atom and, as in Examples, M includes cases to be formed of a metal single element (Fe) atom or multiple metal elements, or formed of multiple elements of a metal(s) and a semi-metal(s). m is the number of metal-based atoms to one H atom, or corresponds to the total number in multiple elements. In a case of Example 1-12-1, the metal-based elements are Fe and B, and Fe:B=2:1, and thus the m number is m=120 to Fe and B, m=40 to an $Fe_2B$ intermetallic compound composition, and m=80 to an Fe single element.

"Regular Polyhedron Rule":

It is a mix proportion formed by a "regular polyhedron structure" which is formed by a disposition in which distances from the center can make equal to each other, distances between adjacent atoms can make equal to each other, and atoms are disposed at the vertex of the regular polyhedron, the middle of the surface, and the middle of the side (the atoms are not disposed at mixed positions, for example, the vertex and the middle). The number of atoms disposed on the "regular polyhedron structure" is the number selected from 4, 6, 8, 12, 20, and 30. In the "regular polyhedron rule," M:H=m:1, and m takes a value selected from 4, 6, 8, 12, 20, and 30. H %: 3.2 to 20.0 at %. This structure is easily formed when M is a metal element, and is a single element metal.

(1-1-6-3) Mix Proportion of Hydrogen Content and Transition Metal Element

It is preferable that the metal-based structure is formed of the metal-based structure, nanoparticles or clusters having a specified value or more of H %, more preferably containing a metal element. In order to perform further stably the production, it is preferable that the metal-based element contains the following element, more preferable that it is selected from the following element group.

(1) "Metal elements excluding" alkali metals (Li, Na, K, Rb, Cs, and Fr) and alkaline earth metals (Ca, Sr, Ba, and Ra) are preferable as an element having a higher metal binding property.

(2) Further, "transition metal elements" having a higher metal binding property are desirable. The transition metal elements are elements belonging to the range of group 3 to group 12 in the periodic table. There are cases in which elements belonging to the range of group 3 to group 13 in the periodical table are preferable. In addition, there are cases in which transition metal elements belonging to the range of group 3 to group 11 in the periodical table are more preferable.

(3) Among (2) above, there are cases in which the element selected from Sc, Ti, V, Cr, Mn, Fe, Co, Ni, and Cu is particularly preferable.

(4) There are further cases in which the element selected from Fe, Co and Ni, which show ferromagnetism, is particularly preferable in the formation of particles according to the self-granulating reaction.

(5) Further, as shown in Examples, Fe is preferable in the stable production. In general, Fe tends to be easily oxidized in a solution, and it is difficult to form it according to conventional methods, and thus the production method of the present application is particularly preferable in terms of the stability of the production and the reliability of properties.

(1-2) Shape Characteristic

Here, shape characteristics in the metal-based structure according to one embodiment of the present invention are explained. The shape characteristics in the present invention are as described below, and it is specific that the structure has the following shape though it is the amorphous phase.

The metal-based structure according to one embodiment of the present invention may contain granular materials having a size of at least more than 1 nm as a part structure or the whole structure. In the instant specification, the phrase "a part structure of the metal-based structure has a size of at least more than a certain length (1 nm in the above case)" refers that the whole of the part structure of the metal-based structure cannot be put inside of a sphere whose diameter is the same as the length. Specifically, it means that the part structure always has a part which cannot be put in the circle having a diameter of the certain length in an observation with a secondary electron microscope. When the metal-based structure according to one embodiment of the present invention contains the granular materials as the whole structure, the metal-based structure is formed of the granular materials. Specific examples in such a case may include a metal-based structure containing granular materials with a bead shape described below as the whole structure.

The metal-based structure according to one embodiment of the present invention may contain a nanopart structure, which is a part structure having a part whose size is at most less than 1 μm, detectable with a secondary electron image in the observation with an electronic microscope, and at the same time may have a size of at least more than 10 μm as a whole. In the instant specification, the "part structure having a part whose size is at most less than 1 μm" means a structure in which when a virtual sphere having a diameter of 1 μm is overlapped on the metal-based structure, the characteristics of the part structure can be found inside the sphere.

The metal-based structure containing the nanopart structure according to one embodiment of the present invention specifically may have the following shapes. It can be assumed that the amorphous phase containing hydrogen according to the present invention can have the following shapes owing to the self-granulating reaction, though it is the amorphous phase.

(1-2-1) Wire (Filament and Filament Yarn)

The metal-based structure containing the nanopart structure according to one embodiment of the present invention may have a wire shape (filament or filament yarn shape). Here, a terms "filament" corresponds to a term "long fiber" in the fiber field, and the "filament yarn" means a thread obtained by spinning the long fibers.

In the instant specification, when a metal-based structure observed has a thread shape, has an aspect ratio, a ratio of the longest axial length to the shortest axial length, of 5 or more, and is formed of nanopart structures having one thread shape, then the metal-based structure is referred to as a filament. As the filament has the nanopart structure, the shortest axial length is less than 1 μm.

On the other hand, when the metal-based structure observed has an aspect ratio of 5 or more, and is formed of nanopart structures having multiple thread shapes, then the metal-based structure is referred to as a filament yarn.

FIGS. 8 and 9 show examples of observation images of metal-based structures with filament shape and filament yarn shape, respectively. The metal-based structures are observed which have a thread shape with a length of 10 μm or longer and a short axial length of less than 1 μm, and have a filament yarn shape of an aspect ratio of 5 or more. Any of the filament and the filament yarn is the metal-based structure having the part structure with the shape anisotropy, because the aspect ratio is 5 or more.

In the present invention, the anisotropy means that physical properties of a substance differ depending on the direction, and the shape anisotropy means a shape biased in any direction.

The wire structure has preferably an average short axial length of 50 to 250 nm.

(1-2-2) Filament Web

The metal-based structure according to one embodiment of the present invention may have a web shape, formed from the metal-based structures having the filament yarn shape. In the instant specification, the metal-based structure having the web shape is referred to as the "filament web." Here, the "web" is as defined in the fiber field, and means a fiber aggregate and a three-dimensional member obtained by interlacing or binding fibers at multiple points. The nanopart structure forming the metal-based structure with the filament web shape is the filament, and accordingly, the filament web is a metal-based structure having a part structure with the shape anisotropy.

FIG. 12 shows one example of observation images of the metal-based structure having such a filament web shape. It can be understood from FIG. 12 that the three-dimensional member is formed by binding or interlacing the multiple filaments. There are cavities in the filament web because the multiple filaments, forming the web, are disposed separating from each other. Such a filament web, accordingly, has a shape capable of functioning as a three-dimensional mesh. In this case, the metal-based structure according to one embodiment of the present invention contains a part structure having a mesh shape (FIGS. 13 to 15).

(1-2-3) Staple and Staple Web

It cannot be said that the metal-based structure according to one embodiment of the present invention is formed of the metal-based structure having a particularly high aspect ratio, as the filament web, but it may have a web shape having a three-dimensional mesh-shaped structure. FIG. 3 shows one example of observation images of the metal-based structures having such a shape.

As shown in FIG. 3, the metal-based structure having the web shape has a shape close to a shape obtained by interlacing multiple short fibers (staples), and thus in the instant specification, the web shape is referred to as the "staple web." The nanopart structure forming the metal-based structure having the staple web shape is a staple. The staple is the nanopart structure, and thus the shortest axial length is less than 1 μm. The staple web, accordingly, is a metal-based structure having a part structure (staple) having the anisotropy.

(1-2-4) Bead (Spherical Shape) and Bead Wire

The metal-based structure according to one embodiment of the present invention may have a bead wire shape formed of multiple bead (spherical) nanopart structures. In the instant specification, the "bead" means a nanopart structure having a shape with an aspect ratio of less than 2. In the instant specification, accordingly, the "staple" has an anisotropy which is higher than that of the "bead" and less than that of the "filament." In addition, in the instant specification, the "bead wire" refers to a metal-based structure obtained by connecting multiple nanopart structure having a bead shape while they are aligned, having an aspect ratio of 5 or more. The bead wire is, accordingly, a metal-based structure having a part structure having anisotropy.

FIG. 36 shows one example of observation images of metal-based structures having such a bead wire shape. Many metal-based structures having bead wire shape having a length of 10 μm or longer are observed.

FIG. 37 is an observation image showing one part enlarged of FIG. 36, and it can be understood from FIG. 37 that the nanopart structure is formed of multiple beads, specifically, a linear object is formed by aligning multiple beads having an aspect ratio of about 1, which can be expressed as a sphere. Specifically, one bead is connected to one bead in a long axis direction. It can be considered that beads form a line in one direction one by one, and they are stuck to each other. According to FIGS. 36 and 37, the aspect ratio of the bead wire is far more than 5.

The bead (spherical) particle structure has preferably an average length of 150 to 500 nm.

(1-2-5) Bead Web

The metal-based structure according to one embodiment of the present invention may have a three-dimensional shape obtained by binding or interlacing the multiple bead wires. In the instant specification, such a shape is referred to as a "bead web." The metal-based structure having the bead web shape is formed of nanopart structures having the bead wire shape. The bead web, accordingly, is a metal-based structure having a part structure (bead wire) having the anisotropy. FIGS. 36 to 38 are one example of observation images of the metal-based structures having such a bead web shape. FIG. 36 is the image in which a part of FIG. 38 is enlarged. In the metal-based structure having the bead web shape shown in FIG. 36, multiple metal-based structures having the bead wire shape, which form the above, are bounded while they are oriented.

On the other hand, a metal-based structure according to FIG. 16, which is another example of the observation image of the metal-based structure having such a bead web shape, has a shorter length of each bead wire forming the bead web compared to the metal-based structure shown in FIG. 36, and consequently a degree of interlacing of the bead wire is large.

As shown in FIG. 16 and FIG. 38, the metal-based structure having the bead web shape has a shape capable of functioning as a three-dimensional mesh. In that case, accordingly, the metal-based structure according to one embodiment of the present invention contains a part structure having a mesh shape.

(1-2-6) Bead Bulk

The metal-based structure according to one embodiment of the present invention may have a shape in which multiple nanopart structures having a bead shape have a particularly low degree of connection while the beads are aligned, and the multiple nanopart structures are almost isotropically bound to each other. In the instant specification, a massive shape formed of multiple nanopart structures having such a bead shape may sometimes be referred to as a "bead bulk." FIG. 20 is also one example of observation images of the metal-based structures having the bead bulk shape.

(1-2-6) Average Length of Particle Structure or Average Size (Particle Size) of Particle Structure when Particle has Spherical Shape An average length of particle structures or an average size (particle size) of the particle structures when the particles have a spherical shape can be obtained from an average value of short axis lengths d of filaments, staples, bead wire, or bead bulks. When the metal-based structure is based on the shape of staples or filaments, particles having uniform sizes between 110 and 150 nm (referred to as "100 F") are observed. It is preferable that 100 F has a particle size of 50 to 250 nm, more preferably 50 to less than 175 nm, still more preferably 100 to less than 175 nm. When the metal-based structure is based on the bead shape, particles having uniform size from 200 to 330 nm (referred to as "300B") are observed. It is preferable that 300B has a particle size of 150 to 500 nm, more preferably 175 to 400 nm or less, still more preferably 175 to 350 nm or less.

(1-3) Formless Phase

The formless phase according to the present invention is explained.

(1-3-1) Characteristic of Formless Phase

The formless phase is an amorphous phase, has (a) a high adherence and (b) a high filling ability, and forms a filled phase. The state having a high hydrogen content has particularly high effects.

FIG. 20 shows a phase formed of particles having a size of about 300 nm, which are seen white, and a formless phase. In FIG. 20, white thin beard-like parts are observed. These are billowing edges of fracture surfaces, observed when, for example, two glass plates are stuck to each other through grease and then the plates are peeled off from each other, which are observed as white beard-like substances. Protruded parts are observed white because of a characteristic of SEM. This is a characteristic fracture surface of the formless phase. These parts have a morphological character similar to starch syrup, they exist so that cavities of 300 nm particles are filled up, and a minute structure with no cavities is formed as a whole. In addition, a state in which ductility is high is observed as shown in FIG. 21. In FIG. 21, the structure formed of the formless phases alone is observed. Form this, it is understood as shown in FIGS. 20 and 21 that the formless phase is the amorphous phase, the adherence between the formless phases is high due to the particularly high H content, and the filling ability capable of filling the cavity is high, whereby a minute solidified substance with substantially no cavities is formed. Even after the crystallization by a heat-treatment, as shown in FIG. 25, aggregates of nanoparticles, which are minute solidified substance with substantially no cavities (sintered bodies), are obtained. This happens because the effect in which solidified substances with substantially no cavities are formed in the solidified substance before the heat-treatment, as shown in FIGS. 20 and 21, is large. From this, it is understood that the formless phase has a high effect of refinement of the sintered bodies.

(1-3-2) Specific Example of Formless Phase According to One Embodiment of Present Invention Here, the formless phase is explained using a case in which the metal-based structure according to one embodiment of the present invention has a bead-shaped nanopart structure as a specific example.

FIGS. 22, 20 and 23 are images showing a degree of formless phase generation, when metal-based structures taken out from liquid, having a bead bulk shape, are subjected to heat-treatment in heat-treatment condition 1 (details are described below) following drying condition 1 (details are described below).

FIG. 22 is an image when metal-based structures are observed which are subjected to a heat-treatment in the heat-treatment condition 1 in which they are held at 50° C. for 2 minutes, and then are cooled to room temperature. Each shape of the bead-shaped nanopart structures forming the bead bulk is easily confirmed, and it can also be confirmed that there are many cavities between the beads.

On the contrary, when metal-based structures are observed which are subjected to a heat-treatment in the heat condition 1 in which they are held at 200° C. for 2 minutes, and then are cooled to room temperature, as shown in FIG. 20, formless phases, which are observed transparently to semi-transparently, are generated so that they surround the whole bead-shaped nanopart structures forming the bead bulk in an observation image according to a secondary electron microscope; as a result, cavities of the metal-based structure are filled with the formless phase, and a minute solidified substance having substantially no or very small amount of cavities are formed.

When metal-based structures are observed which are subjected to a heat-treatment in the heat-treatment condition 1 in which they are held at 300° C. for 2 minutes, and then are cooled to room temperature, as shown in FIG. 23, the number of the formless phases is decreased compared to the case in which the heating temperature is 200° C., and a part of cavities in the metal-based structure are filled with the formless phase.

The metal-based structure according to one embodiment of the present invention, as shown in FIG. 23, may further have a formless phase which exists so that at least a part of a cavity defined by multiple bead-shaped nanopart structures, is filled.

The metal-based structure according to one embodiment of the present invention, as shown in FIG. 20, may have a formless phase which exists so that the multiple bead-shaped nanopart structures are dispersed therein.

The metal-based structure according to one embodiment of the present invention may contain both of the two modes of the formless phase. As shown in FIG. 20, the structure may have a structure in which bead-shaped nanopart structures are dispersed in a formless phase and, at the same time, the multiple bead-shaped nanopart structures are connected to each other, and a formless phase exists so that a cavity defined by the bead-shaped nanopart structures is filled. Furthermore, as shown in FIG. 21, the formless phase may exist so that it is a substantial single phase.

The formless phase is not observed only in the metal-based structures having the bead-shaped nanopart structures or is not first observed when the metal-based structure is heated. For example, as shown in FIG. 5, the formless phase can be observed in the metal-based structure having the staple web shape. The metal-based structure having the staple web shape according to FIG. 5 is obtained by observing the structure which is taken out from liquid, and then dried at room temperature without any specific heating treatment. There are cases, accordingly, in which the formless phase can be observed even if the heating treatment is not performed.

The composition of the formless phase is not necessarily clear. However, when the hydrogen content in the metal-based structure is high, it is observed that there are many formless phases. In such a case, it can be considered that hydrogen is contained in the formless phase. It is further considered that the hydrogen inhibits the oxidation of the metal substance contained in the metal-based structure.

As described above, the metal-based structure according to one embodiment of the present invention may contain the amorphous part. When an X-ray diffraction measurement is performed for metal-based structures (FIG. 9) formed of multiple metal-based structures having a filament yarn shape shown in FIG. 8 and having a filament web shape, results showing to be a structure having a high non-crystallinity are obtained, as shown in FIG. 40.

A threshold value of the formless phase can be summarized as follows:
(1) When the hydrogen content in the metal-based structure is adjusted to 0.41% by atom (0.01% by mass) or more, the formless phase is formed.
(2) When the hydrogen content in the metal-based structure is adjusted to 2.7% by atom (0.05% by mass) or more, preferably 5.3% by atom (0.10% by mass) or more, more preferably 10.1% by atom (0.20% by mass) or more, the formless phase is easily formed.
(3) When the content of the reducible substance is adjusted to 0.3 mmol/kg or more, provided that the saturated concentration is the upper limit, the formless phase is formed. When the content is adjusted to the lower limit of 0.3 mmol/kg to less than 150 mmol/kg, preferably less than 60 mmol/kg, more preferably less than 15 mmol/kg, the formless phase is easily formed. When the lower limit is adjusted to 1 mmol/kg, the formless phase is more stably formed.
(4) When a solvent contains an alcohol, the formless phase is easily formed.

In particular, when the metal-based structure contains a ferromagnetic substance, particularly Fe, the formless phase is easily formed when the conditions (3) and (4) above are satisfied.

(1-4) Cluster Structure and Nanoparticle, which is Aggregate of Cluster Structure
(1-4-1) Cluster Structure A measurement result of a hydrogen content of a structure formed of an amorphous single phase and containing a wire shape/formless phase, obtained in the present study, is that Fe:H=20:1.12 or 8:0.98. From the mix proportion, a cluster structure of a regular dodecahedron of $Fe_{20}H$ in which Fe atoms are disposed on 20 vertexes and an H atom is disposed at the center or a regular hexahedron (cubic) of $Fe_8H$ having the same composition can be approximately considered as the minimum unit.

The cluster structure is the minimum structural unit as a compound molecule, the composition and the structure thereof are decided, and the crystal thereof is not grown. When it is considered that the amorphous nanoparticles are formed by forming aggregates of the cluster, the consistency with the experimental result can be obtained. It can be reasonably understood, accordingly, that the amorphous nanoparticles having the uniform composition, structure and physical properties are formed by aggregation of the cluster-type compound.

It is considered that a stable shape and size are formed by a granulation reaction by self-control (self-granulating reaction), which occurs during the aggregation of the clusters due to a magnetic nature of the nanoparticle and a surface effect, whereby uniform shape and size of the amorphous nanoparticles can be obtained.

(1-4-2) Amorphous Particle by Usual Reduction Deposition (Containing No Hydrogen)

The amorphous particle is basically formless. An amorphous substance containing no hydrogen is easily oxidized, and thus it forms into particles by tearing off it with stirring and oxidizing surfaces of the teared pieces, or in a mechanism in which the substance originally cannot aggregate more than a certain size—the oxidation is advanced in the course of the aggregation, and thus they cannot stick to each other (i.e., oxidation); in other words, in the case of the usual amorphous substance containing no hydrogen, it is not that the particles are formed, but formless phase, which is a large aggregate, cannot be not formed because oxidation occurs. When stirring is performed, which is similar to mechanical pulverization, the uniform size of the pulverized particles can be obtained by making pulverization conditions constant.

In the present application, it is difficult to cause the oxidation because hydrogen is contained, and thus the formless phase (aggregate having a size of several hundred nm or more) is formed by aggregation of the formless phase component, or insertion into between particles.

(1-4-3) Aggregate of Cluster Structure and Particle Shape

In Examples, both regular dodecahedron clusters and regular hexahedron clusters are clusters having short distance order, and have a nature in which the aggregate becomes amorphous (do not form long distance order). This is led by an experimental fact in which an amorphous substance is wholly formed by containing hydrogen in a high content while controlling a metal composition with a single element.

It is specific that shaped nanoparticles are formed as in the present application. In the regular dodecahedron, the clusters thereof form nanoparticles having a size of about 100 nm (hereinafter referred to as "100 F") and the growth is self-completed. It can be considered, accordingly, that the shape and size of the aggregate are self-controlled by the magnetism thereof—the growth is stopped when a magnetically stable shape is attained, whereby uniform 100 F particles are formed. The wire structure is a structure in which the 100 F particles are aligned in a magnetic field (FIG. 31).

In the case of the regular hexahedron, the clusters thereof form nanoparticle having a size of about 300 nm (hereinafter referred to as "300B") and then the growth is self-completed. The same mechanism as in 100 F acts, but it can be considered that the magnetism thereof is weak, and thus large particles are formed. The particles are aligned in a magnetic field, as similar to above, and a bead wire is formed (FIG. 27).

(1-4-4) Formation of Formless Phase

The formless phase is formed by collapsing 300B (collapse factor), or the formless phase is formed without formation of 300B (aggregation inhibition factor); in short, it can be considered that the formless phase and 300B are formed of the same substance (regular hexahedron clusters), which are transitively changed amorphous nanoparticle shapes (shaped/formless) in transitive conditions in Examples.

In FIG. 20, a phase in which 300B and the formless phases are mixed is formed. In FIG. 21, almost all part of the phase is formless. FIG. 27 shows a bead wire obtained by applying a magnetic field to beads, whereby they are aligned and stuck to each other, and in FIG. 27, a formless phase cannot be observed and almost all part is formed of only beads (300B). The shape formed of beads only turns to an amorphous single phase (FIG. 44) after drying, and turns to an αFe single phase, from XRD results (Example 1-9-3) after a heat-treatment, and same structure change occurs and the same composition is obtained as in the case of FIG. 20 in which the formless phase is contained. Form those, it can be understood that both of 300B and the formless phase are amorphous and have the same composition (Fe single phase). It can be considered that the reason in which only beads are formed by applying the magnetic field is that the particles are selectively aggregated by the magnetic field, and the beads are bound to each other in a bead wire shape. There is a possibility in which it is difficult to gather the formless phases because the phase has a slightly weak magnetic field or is easily influenced by a resistance of a solvent; as a result, the phases are casted away during a washing step. It is also considered that the bead shape becomes stable by the effect of the magnetic field, i.e., it is difficult to collapse the shape by the effect of the magnetic field. In comparisons of FIGS. 20, 22 and 23, the amount of the formless phases is changed by a drying temperature (a heat-treatment temperature).

In FIG. 5, a formless phase is formed from staples in a condition in which ethanol is added to a solvent. It is considered that the addition of ethanol to the solvent hinders aggregation of clusters, or inhibits formation of shaped particles, thus resulting in formation of the formless phase (aggregation inhibition factor), or the cluster structure is changed by addition of ethanol to the solvent, thus resulting in increase of the hydrogen content.

2. Structure Based on Metal-Based Structure (2-1) Crystallized Metal-Based Structure A crystallized metal-based structure in which at least a part thereof is formed of crystal phases, according to one embodiment of the present invention, is obtained by crystallizing the metal-based structure by heating, or the like. Conditions for crystallization (when the crystallization is performed by heating, the conditions may concretely include a temperature, an atmosphere thereof, and the like) are appropriately decided based on the structure or composition of the metal-based structure. For example, a metal-based structure shown in FIG. 32, having a filament web shape and using Fe as a metal-based reduced substance, has a heat generation peak at 500° C. or lower, which can be considered to be based on the crystallization, as shown in FIG. 56.

When the metal-based structure according to one embodiment of the present invention is heated to a temperature higher than a crystallization temperature, a crystallized metal-based structure may sometimes be obtained which has a structure with a decreased volume of cavities defined by nanopart structures, or a structure in which cavities substantially disappear.

FIG. 24 and FIG. 25 are examples of observation images of bead bulk-shaped metal-based structures heated to 400° C., and FIG. 43 is one example of X-ray diffraction spectra of a metal-based structure obtained by heating to 600° C. The bead bulk-shaped metal-based structure is a structure having a formless phase after a heat-treatment at 200° C., as shown in FIGS. 18 to 21. FIG. 25 is an enlarged view of a part of FIG. 24, and it is seen that a minute solidified substance formed of nanoparticles having substantially no or a slightly small amount of cavities is formed by crystallization or sintering, which is advanced by heating to 400° C. From the results of FIG. 43, it is observed that a structure formed of high purity metal phase (αFe) is formed.

FIG. 35 shows one example of observation images of bead bulk-shaped metal-based structures heated to 600° C., and FIG. 50 is one example of X-ray diffraction spectra of a metal-based structure obtained by heating to 600° C. FIG. 33 and FIG. 34 are examples of observation images of bead bulk-shaped metal-based structures heated from 150° C. to 200° C., and it is observed that the bead-shaped nanopart structures are almost isotropically connected to each other, and it is a metal-based structure containing formless phases in a very small amount. As shown in FIG. 35, a state in which the crystallization or sintering is advanced by heating to 600° C., thereby decreasing cavities is observed, but a structure formed of nanoparticles has many cavities. It is also observed from the results of FIG. 50 that an intermetallic compound single phase of $Fe_2B$ is formed.

From the results as described above, when the formless phase exists and/or the metal-based structure contains hydrogen, the hydrogen content is 0.4% by atom (0.01% by mass) or more, or 2.7% by atom (0.05% by mass) or more, and/or the metal-based structure contains the amorphous part, it is easy to form the solidified substance formed of the nanoparticles, and further it is easy to form the minute solidified substance formed of the nanoparticles of the high purity metal-based structure.

FIG. 27 is one example of observation images of metal-based structures having a bead web shape, which have been heated to 250° C., and FIG. 28 shows an observation image of a metal-based structure, obtained by heating the metal-based structure shown in FIG. 27 to 600° C. It is understood that the diameter of the nanopart structure having the bead shape is increased by advance of crystallization or sintering, thereby decreasing a volume of a cavity defined by the nanopart structures.

When the metal-based structure shown in FIG. 27 is further heated to 800° C., the diameter of the nanopart structures having a bead shape is larger, as shown in FIG. 29, and a minute solidified substance formed of nanoparticles of a metal-based structure having substantially no cavities is formed. From the measurement results of XRD after a heat-treatment at 600° C. (FIG. 63), it is understood that the minute solidified substance is a nanostructure formed of αFe single phase or a nanoparticle sintered body.

A crystallized metal-based structure obtained from the metal-based structure according to one embodiment of the present invention may sometimes have X-ray diffraction spectra which can be understood that they are obtained from a structure formed of a metal single phase. For example, in a case in which a metal-based reduced substance, which is obtained by reduction of a reducible substance, is Fe, X-ray diffraction spectra having a peak of an αFe single phase is obtained from a crystallized metal-based structure, obtained by heating a metal-based structure actually formed of an amorphous substance (FIG. 65). The reason in which the single phase material as above is obtained can be considered that the metal-based structure according to one embodiment of the present invention contains hydrogen, and when the metal-based structure is heated to be crystallized, the hydrogen inhibits oxidation of the metal-based reduced substance contained in the metal-based structure.

(2-2) Composite Structure

A composite structure according to one embodiment of the present invention contains the metal-based structure as a part thereof. The content ratio of the metal-based structure in the composite structure is not particularly limited.

In the composite structure, the metal-based structure may be mainly contained. Specific examples thereof may include a structure in which another material exists in a cavity defined by nanopart structures in the metal-based structure (in the instant specification, which may be referred to as an "additional substance") or a metal-based structure which has been plated. In the former example, the additional substance may be stuck to the metal-based structure. As a specific way to stick may include heating, and pressurization. The specific composition and structure of the additional substance are not particularly limited, so long as at least one of the composition and the structure is different from those of the metal-based structure. For example, when the reduced substance in the metal-based structure is Fe, the additional substance is exemplified by substances formed of a catalyst such as platinum, a tungsten powder, or a ceramic powder.

The content ratio of the metal-based structure in the composite structure may be smaller than the content ratio of the additional substance. Specific examples of such a case may include sintering materials using the metal-based structure as a sintering aid, resin materials in which the metal-based structure is dispersed.

The composite structure may contain the crystallized metal-based structure as a part thereof. Such a composite structure may be obtained by containing the additional substance in the crystallized metal-based structure, or crystallizing metal-based structure of the composite structure containing the metal-based structure as a part thereof. In addition, it may be obtained by sticking the metal-based structures to each other. It is possible to stick part structures in the metal-based structure, in which the volume of the cavity in the metal-based structure is decreased, to each other by heating and/or pressurization.

3. Production Method of Metal-Based Structure
(Introduction)

As described above, in the present application, the adherence and the formability is stably imparted to the metal-based structure by providing the metal-based structure containing the hydrogen in a content of a specified value or more, and in particular, in particles with nanosize, the great effects can be imparted to the stability of physical properties and the safety. Further, the effects are particularly large on shape-control of a secondary structure formed of aggregates of nanoparticles. It has been found that the formability is further improved by, in addition to the inclusion of hydrogen, containing an amorphous phase, an amorphous phase containing hydrogen, or an amorphous phase formed by containing hydrogen.

Hitherto, it has been impossible or very difficult to contain hydrogen in a metal-based structure, or to contain hydrogen in concentration more than a usual concentration range, i.e., to contain hydrogen in a concentration more than a saturated concentration of hydrogen solid solution in a specific state (a temperature, a pressure), or to form an amorphous substance by containing hydrogen. The reason is that it is impossible to control a high hydrogen content, as in the present application, by a usual method. By using the usual method, as a possible method, in which a saturated concentration is increased by elevating a pressure or temperature of hydrogen gas in an atmosphere where a material is put to increase the hydrogen content, or in which a concentration of, for example, a reducing agent containing hydrogen is increased, thereby increasing the hydrogen content in a solution in a reduction reaction, it is possibly supposed that a hydrogen content in a structure is increased. According to these methods, however, it is impossible or very difficult to increase the hydrogen content. Thus, the controlling the hydrogen content and the producing substance containing hydrogen, as described in the present application, could not have been achieved, except for the present invention.

In the present application, in view of the circumstance in which it is impossible to directly control or it is possible to control the hydrogen content only a little, a control method which has hitherto not existed is tried. For example, control factors in the reducing deposition reaction of two-liquid mixture in liquid, used in the present application, include largely a "solution control" and "reaction circumstance control." The former including (1) a reducing agent, (2) a reducible substance and (3) a solvent, and (4) a "reaction circumstance control" are main four elements. The element (1) is the direct control method described above, but even if the element (1) can be controlled, it is substantially impossible to control the specific hydrogen content as in the present application. In the elements (2) to (4), the hydrogen concentration is not directly changed in the mixed solution, and the control conditions are seemingly unlikely when a usual reaction state is considered. In the present application, the control of the hydrogen content is realized in the following method, by operating the control elements which appears impossible by conventional control methods.

(4) "Reaction Circumstance Control"

It has been found that the hydrogen content is increased by excluding a physical stirring as much as possible, in other word, performing a reaction quietly, at an interface of two kinds of liquid when the two liquids are mixed; as a result, an amorphous phase can be formed all over (formation of an amorphous single phase). This finding makes it apparent that the hydrogen content in the extract can be controlled (can be increased), and the formation of the amorphous phase can be controlled (the formation of the crystal phase can be inhibited) by controlling the reaction circumstance (for example, physical dynamic environments such as stirring, a temperature, or a pressure) at or immediately after the reaction, or controlling the change of the reaction circumstance (decreasing it as much as possible). Although it is seemingly an indirect control factor, which is the reaction circumstance control of the deposition reaction, a certain kind of a binding reaction state of Fe and H, which has not hitherto been existed, is exhibited by creating the reaction circumstance, and it can be said that it is an extremely effective control method on the production of a nanosize structure.

(2) Control of Hydrogen Content by Mainly Controlling Concentration of Reducible Substance Seemingly, it seems to be a meaningless parameter control concerning the hydrogen content, but it is based on a finding of a phenomenon of forming shaped particles by a self-granulating reaction in which specific particles are formed or selected by largely changing a concentration of, particularly, a reducible substance. It has been found that a specific binding reaction state is selected and the hydrogen content is controlled by mainly changing the concentration of the reducible substance, whereby the amorphous structure is formed; as a result, nanoparticles having specific composition, shape, size and structure (self-granulating reaction particles) are formed. It can be said that the method is an extremely effective control method on the production of nanostructure, because the selective control of the very detailed binding reaction state is performed by mainly changing the concentration of the reducible substance. In the reaction control, the effect of (4) the reaction circumstance control is very large.

(3) Solvent

The minute reaction control, which is quite different from the usual reaction system, is performed as described above, and it has been found that an effect of a solvent is very large on the production of the nanoparticles or nanostructure. In the present application, for example, a certain kind of binding reaction state of H and Fe can be controlled by adding ethanol to a solvent of water. The addition of ethanol increases the hydrogen content of the extracted structure, whereby the composition can be controlled (a content of a metal element is increased), and a formless phase can be remarkably formed. In that case, similarly to (2), it can be attained by selective control of the binding reaction state. This example seems also seemingly to be control of an unrelated parameter, but the hydrogen content can be controlled by controlling the certain kind of binding reaction state of Fe and H with the solvent, and it can be said that the method is a very effective control method on the production of the nanostructure. In the reaction control, the effect of (4) the reaction circumstance control is very large.

The specific control methods described above are methods by selecting the certain kind of binding reaction state of a metal and hydrogen, and in particular, the control factors (2) and (3) are control methods in which the shape, composition, and crystal structure of a particle are selectively decided by selection of the bound state, and properties (physical properties) of a resulting product are decided according to which bound state is selected or exhibited, and thus stepwise change in the nature, which is observed in conventional reactions, may not be observed. The control factor for selecting or exhibiting the bound state is not also changed stepwise, and a specific state may be selected in a certain range or at a certain threshold value or more, and specific nanoparticles or nanostructure may be formed.

In this application, it makes apparent that when the bound state of the metal-based element and hydrogen is a compound or cluster having a mix proportion of $M_mH$ wherein m is an integer and $m \geq 3$ (referred to as a "hydrogen cluster" or "H cluster"), physical properties of the metal-based structure, nanoparticle, or cluster can be made particularly stable. In addition, the bound state can be selected by controlling the m number of the H cluster, and, for example, it makes clear that as the shape of nanoparticles, the shaped particle size, the formation of the formless phase, the composition of the metal-based element, and the crystal structure can be extremely precisely controlled.

(3-1) Step of Reducing Reducible Substance

The metal-based structure according to one embodiment of the present invention is a structure obtained by reducing a reducible substance; in other words, it is a structure obtained by reducing a reducible substance, which is a specific substance which can be reduced. The "structure obtained by reducing a reducible substance" has the same meaning of the "structure obtained by reducing a substance capable of being reduced." In the instant specification, the "reducible substance" refers to a substance which can be reduced and has reducibility. It can be expressed as a "substance capable of being reduced" and it includes a substance containing a metal-based reducible component, which contains at least one of a metal element and/or a semi-metal element. The "metal-based reducible component" can be expressed as a "metal-based component capable of being reduced" and it means a metal substance which contains a reducible component (component capable of being reduced), which is capable of forming a metal-based reduced substance (including a semi-metal) whose valence is 0 by receiving electrons, which is a substance relatively oxidized. Specifically, the metal-based reduced substance may include metals and/or semi-metals, and in this case, the metal-based reducible component may include positive ions of metals and/or semi-metals. If the explanation is made using the examples described above, the metal-based reducible component are exemplified by positive ions of metals and/or semi-metals, hydrated ions of the positive ions described above, substances containing an oxo acid ion (such as molybdate ion) containing the positive ion described above, and coordination compounds (such as ferrocene) containing the positive ion described above.

A substance providing the reducible substance may include metals salts such as metallic chlorides, metallic sulfates, metallic acetates, metallic nitrides, and metallic perchlorates. These salts may be a nonhydrate or a hydrate. The metal may be a ferromagnetism metal or a non-ferromagnetism metal. A metal ion contained in the metal salt may be a complex ion. Examples of the metal salt may include cobalt (II) acetate, cobalt (II) nitrate, cobalt (II) chloride, cobalt (II) sulfate, cobalt (II) perchlorate, nickel (II) acetate, nickel (II) nitrate, nickel (II) chloride, nickel (II) sulfate, nickel perchlorate, tetraamminenickel (II) chloride, iron (II) acetate, iron (II) nitrate, iron (II) sulfate, iron (II) chloride, iron (II) perchlorate, hexammineiron (II) chloride, copper (II) acetate, copper (II) nitrate, copper (II) sulfate, copper (II) chloride, copper (II) perchlorate, tetraamminecopper (II) chloride, silver (I) nitrate, bisamminesilver (I) chloride, lead (II) acetate, potassium tetrachloroplatinate (II), sodium tetrachloroplatinate (II), potassium tetrachloroaurate (III), sodium tetrachloroaurate (III), and the like.

One example of the methods for producing the metal-based structure containing hydrogen according to the present invention is characterized by containing a reduction step of reducing a reducible substance, which contains at least one of metal element and/or semi-metal element, in a liquid containing at least one of hydrogen or a hydrogen-containing substance. The hydrogen-containing substance, which forms the hydrogen-based substance according to one embodiment of the present invention, may include hydrogen radical, hydrogen anion or hydride, substances containing the same. As the liquid in which the hydrogen-based substance exists, it can be exemplified by a case in which radicals, anions or hydrides exists, resulting from an interaction such as hydrogen bonding reaction with the solvent as another substance, in a solution containing the hydrogen-containing substance. It is preferable that the hydrogen-based substance has a reducing property in order to stably reduce the reducible substance.

When the metal-based structure according to one embodiment of the present invention has the nanopart structure, the metal-based structure may be produced in a production method containing a step of reducing the reducible substance in liquid in which a hydrogen-based substance exists to form a nanopart structure, and a step of forming a metal-based structure containing multiple nanopart structures. In that case, the step of forming the nanopart structure and the step of forming the metal-based structure may be defined as completely separated steps, or may be continuous.

In the production method described above, the method for reducing the reducible substance is not specifically limited. The reduction may be performed using a reducing substance, or may be performed by electrolysis. The reduction by the electrolysis may specifically include electroplating and electrolysis of liquid. It may be performed by decomposition reduction with heating. Specifically, a metal salt (such as (potassium chloroplatinate (II)) is heat refluxed in an alcohol, whereby a colloidal metal can be formed. A photoreduction may be performed. It is specifically exemplified by photoreduction of water. The reduction may be performed by electron donation (hydrogen donation). Specific examples of the method may include gas dissolution, and more specifically bubbling of hydrogen gas in water, generation of hydrogen molecules ($H_2$) from a reducing agent such as $NaBH_4$ (which is graded as a concrete example of a reducing substance). An electron donor may be supplied in liquid. The substance may include metal such as Zn, as shown below, metal ions, and the like.

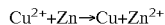

$$Cu^{2+} + Zn \rightarrow Cu + Zn^{2+}$$

The "reducing substance" is a substance which can reduce the reducible substance, and "to have a reducing property" means to have an action which reduces the reducible substance.

The hydrogen-containing reducing agent may include hydrogenated boron salts such as $NaBH_4$; hypophospites such as $NaH_2PO_2$ and $H_3PO_2$; hydrazine ($H_2NNH_2$); carboxylic acids such as oxalic acid ($C_2H_2O_4$) and formic acid (HCOOH); amines such as $NH_2OH$, $N(CH_3)_3$, and $N(C_2H_5)_3$; alcohols such as $CH_3OH$, $C_2H_5OH$, and $C_3H_7OH$, and the like. The reducing agent containing no hydrogen may include sulfites such as sodium sulfite ($Na_2SO_3$); hyposulfites such as sodium hyposulfite ($Na_2S_2O_4$), and the like. The substance generating hydrogen gas may include hydrogenated boron salt such as $NaBH_4$. In order to promote the reaction of the reducible substance with the hydrogen-based substance, the hydrogen-containing reducing agent is preferable. Further, a substance generating hydrogen gas is preferable. The method may be performed in combination with a method in which hydrogen gas is separately bubbled in liquid. When the reducible substance contains an element capable of forming a ferromagnetic substance, particularly an Fe element, it may sometimes be preferable to use a hydrogenated boron salt, particularly $NaBH_4$ as the hydrogen-containing reducing agent. In particular, there are cases in which the use thereof is preferable when the shape anisotropy or the shape of the metal-based structure is controlled.

When the metal-based structure is produced, it is considered that a reaction, specifically oxidation, of the metal-based reduced substance, which is produced by the reduction, with another element can be inhibited by performing a method in which the reducible substance is reduced in liquid containing the hydrogen-based substance. It is considered accordingly that the reaction of the metal-based reduced substance with the other element is inhibited by reacting the hydrogen-based substance in the liquid with the other element prior to the reaction of the metal-based reduced substance with the other element.

It is considered that the hydrogen in the metal-based structure, as described above, influences on the composition of the metal-based structure, the formation of the formless phase, the crystal structure, and the like by binding reaction with the metal-based reduced substance or formation of a solid solution.

From the above, the metal in the present invention is preferably a metal having an ionization tendency larger than that of hydrogen.

(3-2) Control of Composition of Metal-Based Structure, Hydrogen Content and Formless Phase In the production method above, the composition of the obtained metal-based structure containing hydrogen may be controlled by controlling one or more members selected from the group consisting of a solvent composition of liquid, an amount of the hydrogen-based substance in the liquid, a concentration of the hydrogen-based substance in the liquid, an amount of the reducible substance in the liquid, and a concentration of the reducible substance in the liquid, and a reduction time of the reducible substance in the liquid (in the instant specification, which may sometimes be referred to as a "first group").

In the production method above, the hydrogen content in the metal-based structure may be controlled by controlling one or more members selected from the first group. The measurement method of the hydrogen content in the metal-based structure is as described above.

In the production method above, the content of at least one of the metal element and/or the semi-metal element, and the content of element other than hydrogen (in the instant specification, which may sometimes be referred to as the "other element") in the metal-based structure may be decreased by controlling one or more members selected from the first group. The other element may specifically exemplified by oxygen.

In the production method above, the particle shape of the metal-based structure or the particle shape of the amorphous phase may be controlled by controlling one or more members selected from the first group.

In the production method above, whether or not the metal-based structure has the formless phase may be controlled by controlling one or more members selected from the first group.

As the liquid containing hydrogen-based substance, a reducing agent may be used. In that case, the amount and the concentration of the reducing agent in the liquid containing the hydrogen-based substance can be added to the first group. The reducing agent includes a hydrogen-containing reducing agent, and the hydrogen-based substance may be produced from the hydrogen-containing reducing agent. The hydrogen-containing reducing agent may specifically include $NaBH_4$, $LiAlH_4$, and the like, as described above. The reducing agent other than the hydrogen-containing reducing agent may specifically include a bivalent Fe ion, a bivalent Sn ion, and the like.

In the instant specification, the "solvent composition" means a composition of liquid in which the reduction of the reducible substance is performed. A degree of tendency of reduction of the reducible substance in the liquid is controlled by the solvent composition, whereby the composition of the metal-based structure, in particular, the hydrogen content in the metal-based structure and the content of the other element in the metal-based structure can be controlled by the solvent composition. The reason in which whether or not the metal-based structure has the formless phase can be controlled by the solvent composition is not clear, but it is considered that hydrogen in the metal-based structure may influence on the generation of the formless phase.

The particle shape of the amorphous phase can also be controlled by the solvent composition.

The solvent containing the hydrogen-based substance contains preferably at least one substance having hydrogen atoms capable of forming a hydrogen bind, in order to increase the controllability by the solvent composition. The substance having hydrogen atoms may include substances having at least one functional group selected from the group consisting of an O—H bond, an N—H bond, a P—H bond, and an S—H bond. More specifically, it is exemplified by water, alcohols, amines and thiols. There may be sometimes a tendency that when water is used as the solvent, the obtained metal-based structure has a low hydrogen content; whereas, when an alcohol is used as the solvent, the obtained metal-based structure has a high hydrogen content. The tendency in which the obtained metal-based structure has a high hydrogen content may be sometimes observed in a case in which water is used as a main solvent and an alcohol is added thereto. The substance containing the hydrogen atom may be contained in the liquid as a mode other than one kind of the solvent.

The amount of the hydrogen-based substance in the liquid and the concentration of the hydrogen-based substance in the liquid also influence the easiness of the reduction of the reducible substance. Consequently, it is possible to control the composition of the metal-based structure, in particular, the hydrogen content in the metal-based structure and the content of the other element in the metal-based structure. The reason in which whether or not the metal-based structure has the formless phase can be controlled by the amount of the hydrogen-based substance in the liquid and the concentration of the hydrogen-based substance in the liquid is not clear, but it is considered that the hydrogen in the metal-based structure influences the generation of the formless phase.

The amount of the reducible substance in the liquid and the concentration of the reducible substance in the liquid also influence the easiness of the reduction of the reducible substance. Consequently, it is possible to control the composition of the metal-based structure, in particular, the hydrogen content in the metal-based structure and the content of the other element in the metal-based structure. The reason in which whether or not the metal-based structure has the formless phase can be controlled by the amount of the reducible substance in the liquid and the concentration of the reducible substance in the liquid is not clear, but it is considered that the hydrogen in the metal-based structure influences the generation of the formless phase.

When the concentration (FS) (mmol/kg) of the reducible substance is controlled as described below, a different H %, m number, shaped particle, composition and crystal structure can be selectively formed (controlled).

When FS (Low range): $0.3 \leq FS < 15$, (preferably $0.3 \leq FS < 3$) mmol/kg is satisfied, an amorphous single phase having 0.4 at %$\leq$H %<2.0 at %, an m number $\geq$31, 300B, and $Fe_2B$ composition can be obtained.

When FS (High range): $3 \leq FS$ (preferably 150 or less), (preferably $15 \leq FS \leq 150$) mmol/kg is satisfied, a metal-based structure containing Fe amorphous phase, or an Fe amorphous single phase, having 2.0 at %$\leq$H %, an m number $\leq$30, and 100 F can be obtained.

Further, it is preferable to satisfy the following conditions.

The lower limit: hydrogen-containing substance concentration (H/+)>12 mmol/kg, FS>0.3 mmol/kg.

Further, in order to stably advance the self-granulating reaction, it is preferable that H/+ is less than 2000 mmol/kg and/or FS is less than 150 mmol/kg. Further, in the FS (Low range) above, it is preferable that FS: 0.3 mmol/kg or more and less than 14 mmol/kg, and H/+:6 (NB:3) mmol/kg or more and less than 120 (NB:60) mmol/kg; more preferably that FS: 1.0 mmol/kg or more and less than 3.0 mmol/kg, and H/+:20 (NB:10) mmol/kg or more and less than 120 (NB:60) mmol/kg, in terms of the stable operation.

Further, in the FS (High range) above, it is preferable that (S16) FS: 15 mmol/kg or more and less than 150 mmol/kg, H/+:30 (NB:15) mmol/kg or more and less than 2000 (NB:1000) mmol/kg, and H: 0.05% by mass (2.7% by atom) or more, more preferably that H: 0.1% by mass (5.3% by atom) or more, in terms of the stable operation.

The reduction time of the reducible substance in the liquid influences a production amount of the metal-based reduced substance, which is obtained by reduction of the reducible substance, and thus there are cases in which it is possible to control the composition of the metal-based structure, in particular, the hydrogen content in the metal-based structure and the content of the other element in the metal-based structure by the reduction time.

(3-3) Two-Liquid Mixing

The reduction of the reducible substance in the liquid may be performed by two-liquid mixing. The reduction of the reducible substance may be performed by mixing first liquid (solution A) containing the reducible substance with second liquid (solution B) containing at least one of the hydrogen-based substance and a substance capable of producing the hydrogen-based substance. In that case, it may be sometimes preferable to gradually mix the second liquid with the first liquid, whereby the concentration change of the reducible substance can be decreased as much as possible. The mixing speed of the second liquid to the volume of the first liquid is preferably adjusted to 50 volume %/second or less, more preferably 0.01 volume %/second or more and 10 volume %/second or less. In order to more stably perform the reaction, the speed may be preferably adjusted to 0.05 volume %/second or more and 1 volume %/second or less.

In that case, the composition of the metal-based structure can be controlled by controlling one or more members selected from the group consisting of an amount and a concentration of the reducible substance in the first liquid, an amount and a concentration of the hydrogen-based substance in the second liquid, an amount and a concentration of the substance capable of producing the hydrogen-based substance, and a volume ratio, which is a ratio of the volume of the second liquid to the volume of the first liquid (in the instant specification, which may sometimes be referred to as a "second group"). The hydrogen content and the content of the other element in the metal-based structure can be controlled by controlling one or more members selected from the second group. Whether or not the metal-based structure has the formless phase can be controlled by controlling one or more members selected from the second group.

The second liquid may contain the reducing agent. The reducing agent contains the hydrogen-containing reducing agent, and the hydrogen-based substance may be produced from the hydrogen-containing reducing agent. In that case, the reducing agent corresponds to one kind of the substances capable of producing the hydrogen-based substance. When the second liquid contains the reducing agent, the amount and the concentration of the reducing agent in the second liquid can be included in the second group.

With respect to the composition of the metal-based structure, hydrogen content in the metal-based structure, the content of the other element, and whether or not the metal-based structure has the formless phase, there is a tendency in which the content of the metal component in the metal-based structure and the hydrogen content are increased and the content of the other element such as oxygen is decreased with the increase of the volume ratio.

The hydrogen content, the particle shape of the amorphous phase, and the composition of the amorphous phase can be controlled by adjusting the kind and the concentration of the solvent in the solution A and/or the solution B.

Here, the concentration of the reducible substance in the A solution may be a value in the terms of the metal and/or the semi-metal element. Further, the concentration of the reducible substance is exemplified by a positive ion concentration of the metal and/or the semi-metal. In a case of the metal-based structure containing, as a main component, the metal element, the concentration is exemplified by a positive ion concentration of the metal.

(3-4) Addition Dropwise and Stirring (Reaction Circumstance Control)

The first liquid and the second liquid may be mixed by adding dropwise at least one of the first liquid and the second liquid to the other of the first liquid and the second liquid. In that case, there is an interrelationship between the volume ratio and the reduction time of the reducible substance. At that time, preferably, it may be possible to decrease the concentration change of the reducible substance as much as possible, by adding dropwise the second liquid to the first liquid. The dropwise addition speed of the second liquid in that case is preferably adjusted to 0.001 mL/second or more and 50 mL/second or less. In order to more stably perform the reaction, the speed may be preferably adjusted to 0.01 mL/second or more and 5 mL/second or less. With the dropwise addition speed, it may be sometimes preferable that a dropwise addition operation in which the liquid is added dropwise to other places by using multiple nozzles, whereby the dropwise addition operation time is substantially shortened.

The concentration fluctuation of the reducible substance at the dropwise addition can be decreased by adding the reducing component to the solution of the reducible substance, whereby the metal-based structure can be stably formed.

It is also preferable to suppress application of a mechanical external force to deposited particles as much as possible by advancing the reaction performing a stirring operation, or the like (performing the control without inhibition of the advance of the self-granulating reaction).

The formation of the amorphous phase can be promoted by the "quiet reaction" as described above; in other words, the H % content can be controlled and the formation of the amorphous phase can be controlled by the "reaction circumstance control." Further, the m number of the clusters can be controlled, whereby the metal-based structure and the physical properties of the nanoparticles can also be stably formed. The reaction circumstance control is also an important factor concerning the self-granulating reaction, and the physical properties of the shaped particle can be stably formed by "quiet reaction," as in the formation of the amorphous phase.

The reaction circumstance control is to control the change during the reaction in the comparison with a standing state before the reaction (difference from the standing state), and is a very important control factor for obtaining the predetermined effects of the present application. When the change of the pressure [Pa], temperature [K], and magnetic field effect [T] of the solution during the reaction are controlled to values sufficiently small (<1E (−4)), for example, when the temperature is a normal temperature, the pressure is a normal pressure, and there is no change in the magnetic field effect (a permanent magnet is fixed) as in Examples, the "reaction circumstance control" is performed by controlling amounts of change in the "volume factor" and the "stirring factor" to specific values or less. The "volume factor" refers to a rate of increase in the volume by mixing: V2/V1/time [1/second], or an amount of increase in the volume by mixing: V2/time [mL/second]. The "stirring factor" refers to a revolution speed of a rotor (S) [1/second], or the maximum speed of the rotor (Sv) [mm/second], wherein in a case of vibration of the solution, it is the vibration number [1/second], and in a case of movement of the solution, it is the maximum moving velocity [mm/second] (the moving velocity is a velocity to a container). When there is a steady flow, it is a relative velocity [mm/second] to the stead flow. S and Sv are appropriately converted to each other. Sv=2πrS (r: a radius of the rotor).

(3-5) Threshold Values T of Hydrogen Content and m Number

The binding reaction state of the metal element or semi-metal element and H, the metal element and H, or the Fe and H as shown in Examples, is selectively controlled by changing, in addition to the "reaction circumstance control," the "solution control," in particular, a concentration of the reducible substance (FS concentration); as a result, the hydrogen content in the metal-based structure, nanoparticle or cluster is controlled, and the specific mix proportion (the m number) is controlled. Further, the particle shape, i.e., the hydrogen content, composition and crystal structure, shape and size of the particle, can also be controlled.

In the present application, the existence of a "threshold value T of a concentration of the reducible substance" for controlling the hydrogen content, or controlling the m number has been found. (Example 1-11) At a threshold value T or more, the H % is controlled to 2.0 at % or more and m controlled to 30 or less, and a structure, nanoparticle, or cluster (metal H cluster), formed of the metal element or the metal single element (Fe) can be formed. (Example 1-12) At a less than threshold value T, the H % is controlled to less than 2.0 at % and m is controlled to m≥31, and a metal-based structure formed of an $Fe_2B$ composition can be formed. The "threshold value T can be controlled" by the solvent control. (Example 1-7) The threshold value is decreased by adding an alcohol (or ethanol) to a solvent, and at a threshold value T or more, the H % is controlled to 2.0 at % or more and m is controlled to m≤30, or the H % is controlled to 9.0 at % or more and m is controlled to m≤8, and a formless phase in which shaped particles 300B are mixed is formed, and a structure formed of the metal element, or the structure formed of the single element metal (Fe) are obtained. In Examples in the present application, when the solvent is water, the threshold value is 0.21% of the saturated concentration, or 3 mmol/kg, and when an alcohol is added, the threshold value is decreased to 1/10 and is 0.3 mmol/kg. The amount of the alcohol added of 1% by weight or more is effective. When the solvent is ethanol, the effect may sometimes be further increased.

When the concentration (metal ion concentration) of the reducible substance is adjusted to the threshold value or more, a structure, nanoparticle, or cluster ("metal H cluster") may sometimes be produced which consists of the metal element, or the single element metal (Fe), without the semi-metal. The threshold value relates to the cluster composition (metal element) and does not necessarily correspond to the particle shape.

There is a case in which the size of the shaped particle does not change depending on the kind of the solvent. In Examples in the present application, the addition of the alcohol to the solvent decreased the threshold values of the H % and the m number, but did not change the size of the shaped particle.

In the structure, nanoparticle or (metal) cluster formed of the metal element, or the single element metal (Fe), formed at the threshold value or more, a product having a lower the H % content and a larger the m number is formed with increase of the concentration of the reducible substance, and the H % content and them number, respectively, negatively and positively correlate to the concentration of the reducible substance; in other words, the tendency is observed in which the metal component is increased and the hydrogen content is decreased in the structure with increase of the concentration of the reducible substance.

(3-6) Control of Formation of Amorphous Phase, Particle Shape, Formation of Formless Phase, and Composition of Metal-Based Structure by Control of Hydrogen Content Seeing the above from the viewpoint of the control of the hydrogen content, it can be said that at least one of the following (i) to (iii) can be controlled by controlling the hydrogen content to the whole metal-based structure;

(i) To control the formation of the amorphous part;
(ii) To control the particle shape; and
(iii) To control the composition of the metal-based structure.

(3-6-1) Formation of Amorphous Phase by Control of Hydrogen Content

As described above, the present application provides the method for controlling the formation of the amorphous phase of the metal-based element, metal element, and single element metal, which is difficult to cause not only in a usual equilibrium reaction but also in non-equilibrium reaction such as a rapid solidification processing of melted metal. In particular, the formation of a compound of Fe with H has not been found, and the solid solution of H is known but it has hitherto been known that it is very difficult to form a combined state of Fe—H. In the present application, the formation of the Fe amorphous phase containing hydrogen is deduced that the crystallization of Fe is inhibited by exhibiting a specific bound reaction state of Fe and H, which has not hitherto been considered, as a result, whereby the Fe amorphous phase is formed by containing hydrogen. As the specific bound reaction state can be formed in Fe, which is the element having a very low binding reactivity with H, the method for controlling the hydrogen content and the method for controlling the formation of the amorphous phase of the present application are effective for other metal elements having a reactivity with H equal to or stronger than Fe.

(3-6-2) Control of Particle Shape by Control of Hydrogen Content

As described above, the particle shape can be controlled by controlling the hydrogen content. The particle shape includes the formless phase.

(3-6-2-1) Control of Particle Shape, Self-Granulating Reaction, and Magnetic Field Progression The shaped particle is formed by advance of the self-granulating reaction in a manner in which the H % is controlled by the "reaction circumstance control" in addition to the control of the concentration of, in particular, the reducible substance in the "solution control." The self-granulating reaction particles, accordingly, are formed by spontaneous growth of the aggregate until a specific character is formed by the self-granulating reaction. The formation of particles having uniform characters by the above mechanism is the mark. In particular, as in the present application, the formation of the shaped particle formed of the amorphous phases (self-granulating reaction particles) is a very specific phenomenon, and the present application is based on the finding of the phenomenon and consideration of the control method. The effects of the self-granulating reaction of the present invention are particularly very high when the substance is formed of the metal element, or the metal element single phase (Fe).

(3-6-2-2) Control of Particle Shape, Self-Granulating Reaction, Reaction Circumstance Control, and Cluster The detailed mechanism of the self-granulating reaction is unclear, but it is considered that an effect of a surface area, because of the specific uniform size, is one of the factors of self-control. Further, in a case of Examples in the present application, the particles have a specific magnetism, because they are aggregated and aligned in a magnetic field, and the magnetism is one of the factors of self-control; in other words, there is a possibility in which a magnetically stable shape is formed. It is not observed that the particle size is changed depending on the presence or absence of a magnetic action, and thus it is considered that the self-control by the magnetic property of the particle itself may act.

In order to form the shaped particle by itself, i.e., to stably advance the self-granulating reaction, the "reaction circumstance control" is important, and it is preferable that the control is performed so that "the reaction is quietly advanced," as in Examples in the present application.

Further, in order to stably form the shaped particles or to advance the self-granulating reaction, the formation of the structure, nanoparticle, or cluster having a specific mix proportion is very effective. When a compound or a cluster having a mix proportion of $M_mH$ wherein m is an integer and $m≥3$, or in addition to the above, a compound or a cluster having a specific m number wherein $m≤30$, which conforms to the regular polyhedron rule, an ordered structure with a short range or compound is formed by the clusters, the self-granulating reaction is stably advanced due to the specific crystal structure, composition, and magnetic characteristics of the clusters or aggregates thereof, and shaped particles having the uniform properties can be stably and effectively formed, as shown in Examples.

(3-6-3) Control of Composition by Controlling Hydrogen Content

When the H % of the metal-based structure is increased by "solute control," i.e., by changing the concentration of, mainly, the reducible substance, a metal-based structure formed of the metal element, or the single element metal (Fe), containing no semi-metal element is obtained. When the "solvent control" is performed, i.e., the H % of the metal-based structure is increased by adding ethanol to water of a solvent, the same metal-based structure formed of the metal element, or the single element metal (Fe), containing no semi-metal element is obtained.

The H % control and the composition control can be performed by a different operation, the "solute control" or the "solvent control"; in other word, it is possible "to control to the high purity metal composition formed of the metal element, containing no semi-metal element, or the metal single element composition (Fe) by increasing the H %." It is judged that "to control the composition by the H % control" and "to control to the high purity metal composition formed of the metal element, or the metal single element composition (Fe) by the increase of the H %" are universal results, because the same cause and effect relationship can be obtained by the different operation.

(3-7) Control of m Number

To control the m number is the control of the H %, and thus the m number cannot be directly controlled by the H concentration during the reaction, for example, the H content in the reaction liquid as in the case of the control of the H %. In the present application, in view of the circumstance, the same indirect control as in the H % control, is tried, and it has been found that the m number can be controlled by the "reaction circumstance control" and the "solution control."

The methods for controlling the m number (operation items and conditions) are as follows:

(1) "solution control"
a threshold value of concentration of reducible substance
$m≤30$ metal composition
(2) "reaction circumstance control"
dropwise addition/injection stirring
m 20/30 formation of amorphous phase
(3) "solution control"
Solvent containing alcohol
m 8 reduction of threshold value As described above, it is understood that the method which is considered to be the indirect control from the viewpoint of the control of the hydrogen content of the metal-based structure is the direct control from the viewpoint of the control of the m number. It is understood that the method is a very reasonable control method from the viewpoint of the control of the m number, and it can be said that it is a phenomenon in which the presence of the H clusters is demonstrated.

(3-7-1) Threshold Value of FS Concentration (Concentration of Reducible Substance)

It has been found that m≤30 or less can be obtained at a threshold value of the FS concentration or more, whereby the H % is controlled to 2.0 at % or more and the metal H clusters are formed. Considering the case of Fe ion in Examples, it is interpreted to be an indirect control that the H % is controlled by the Fe ion concentration, and the H % is increased by the increase of the Fe ion concentration from the viewpoint of the H %, but it is understood that Fe ion concentration is adjusted to the threshold value or more, i.e., the Fe ion concentration is adjusted to a specific value or more, to exclude elements other than Fe and H, whereby the Fe—H cluster is formed from the viewpoint of the Fe ion, which can be interpreted to be a direct control. When limiting to the a metal H cluster having m≤30 or less, there is a positive interrelationship between the FS concentration and the m number, that is, results of (Example 1-7) m=8 at FS_Low, and (Example 1-11) m=20 at FS_High are obtained.

From these results, according to the m number control by the reducible substance concentration, a metal H cluster having m≤30 or less is formed at the threshold value of the reducible substance concentration or more, and when the metal H cluster is formed, a metal H cluster having a large m number can be produced by increasing the concentration of the reducible substance. From the above, the m number control by the concentration of the reducible substance is interpreted to be the direct control. The method for controlling the m number by controlling the FS concentration, accordingly, has a large effect, in particular, when the reducible substance contains the metal, further when the metal H cluster is formed.

(3-7-2) "Reaction Circumstance Control"

As described below, by control of a reaction circumstance, i.e., by control of a mixing operation of (Example 1-11-2) a "dropwise addition" or (Example 1-14) an "injection mixing and stirring" when two liquids were mixed, the m numbers were respectively controlled to m=20 and m=30. The m number is also controlled by a heat-treatment different from the "reaction circumstance control"; that is, the m number was respectively controlled to m=20 and m=30 (Example 1-11-2) before the heat-treatment and (Example 1-11-3) after the heat-treatment at 450° C. From DSC analysis results of m=20 (Example 1-11, FIG. 56), two heat generation peaks are observed, and a heat generation peak at a low temperature side, about 320° C. is interpreted to be a measurement result demonstrating the structure change from an H cluster having an m number of 20 to an H cluster having an m number of 30. From the results, it is interpreted that the H cluster having an m number of 30 is energetically more stable than the H cluster having an m number of 20, the H cluster having an m number of 20, being at a higher energy level, is formed by "performing quietly" the deposition reaction, and the aggregates thereof form into the amorphous single phase.

On the other hand, it is interpreted that the H cluster having an m number of 30, which is at a lower energy level and is stable, is formed by performing the "injection mixing and stirring" or the heat-treatment at 450° C. A mechanism in which the H cluster having an m number of 30, or the metal-based structure, which is aggregates of the clusters, forms an amorphous phase partly containing crystal phases, is not clear, but it is considered that the mix proportion of the metal atom is increased by increasing the m number, and formation of crystal structure formed of the metal atom is appeared. Since the result of partly containing the crystal phases, it is also interpreted that the H cluster having an m of 30 is a more stable cluster at a lower energy level or forms a more stably assembled structure.

(3-7-3) Solvent

In Examples, it was found that the effect of decreasing the threshold value of the concentration of the reducible substance is expressed by containing ethanol in the solvent. The threshold value is a concentration value or more at which the metal H cluster can be formed, it is considered that in Examples, the presence of ethanol increases the binding reactivity of Fe—H, and the metal H cluster is easily formed prior to reactions with other elements, and as a result, the metal H cluster can be formed at a lower concentration of the reducible substance, i.e., the effect of decreasing the threshold value is appeared. It is understood that the metal H cluster can be formed at a low concentration of the reducible substance by the presence of ethanol, as a result, the metal H cluster having a low content ratio of the metal atoms (the m number is small), i.e., having a large H %, is formed.

(3-7-4) Phenomenon Controlled by m Number (Physical Property)

The following items are controlled by controlling the m number (physical property control by selection of cluster)

(i) H % control: m number
(ii) Composition control: metal H cluster (m≥30)
(iii) Amorphous phase control: amorphous single phase (m≥20) at metal H cluster
(iv) Particle shape control: particles by self-granulating reaction (m≥8), formless phase (m≤12)

(i) H % Control

The H % (at %) is decided by them number, i.e., the mix proportion.

(ii) Composition Control

An H cluster containing the metal-based element, or metal element is formed at an m number more than 3. A "metal H cluster" formed of metal element, or the metal single element is formed at m≤30; that is, the composition of the metal-based element is controlled. In Examples, structures, nanoparticles, or cluster, having an $Fe_2B$ composition, formed of the metal and the semi-metal, and containing the metal element, were formed at m≥31. Structures, nanoparticles, or cluster, formed of the metal element or the single element metal (Fe), were formed at m≤30.

(iii) Amorphous Phase Control

In the "metal H cluster" having m≤30, the crystal structure or the amorphous structure is controlled by the m number. In Examples, an amorphous phase is formed at m≤30. A partly crystallized amorphous phase-containing structure is obtained at m=30. An amorphous single phase is formed at m=20. There is a case in which the amorphous structure varies depending on the m number even if they have the same amorphous single phase structure. In Examples (comparison of Example 1-11-2 and 1-7), because there is a difference in DSC analysis results (FIG. 56/FIG. 54) between the case of m=20 and the case of m=8, although in both cases the amorphous single phase is formed, the difference in the amorphous structure is confirmed. It is considered that the difference in the amorphous structure is caused by the difference in the m number, i.e., the difference in the cluster structure.

(iv) Particle Shape Control (Shaped/Formless)

There is a case in which the shaped particle formation is controlled by the m number. It is particularly preferable that the shaped particles are formed by the self-granulating reaction. In Examples, shaped particles were formed by the self-granulating reaction at m≥8, and a formless phase formed of the amorphous phase was formed at m≤12 further at m≤8. A transitive state in which the shaped particles and the formless phases are mixed was obtained at m=8. Further, the shaped particles may sometimes be controlled by them number. In Examples (Example 1-7), self-granulating reaction particles having a particle size of 500 nm or less and formed of the amorphous single phase were obtained at m≥8. Further, (Example 1-11-2) self-granulating reaction particles having a particle length of less than 175 nm and formed of the amorphous single phase were obtained at m≥12, further at m≥20. Although these self-granulating reaction particles are both has the amorphous single phase structure, since there is a difference in DSC analysis results (FIG. 54/FIG. 56), the difference in the amorphous phase structure is confirmed. It is considered that the difference in the amorphous structure is caused by the m number, i.e., the difference in the cluster structure.

(3-8) Post-Step

Steps after the formation of the metal-based structure in liquid are not particularly limited. The deposited substance in the liquid may be subjected to an aggregation step, a washing step, and a drying step in this order, or may be subjected to a washing step, an aggregation step and a drying step in this order.

The aggregation step may include a method in which the deposited substance is aggregated by applying a magnetic field to the liquid, and aggregates are recovered. According to this method, it is effective that when targets having the nanostructure are aggregated, the aggregation work is performed by applying the magnetic field. In particular, the aggregation by the magnetic field action is very useful in order to maintain the fine structure of the metal-based structure. It is also effective to utilize the difference in a sensitivity to the magnetic field to perform selection and recovery. When the target is a ferromagnetic substance, this method is particularly effective because the selection and recovery of the ferromagnetic substance, and the removal of unnecessary oxide components can be easily performed. In addition, it is effective that after the aggregation of the magnetic field aggregation, the following washing is performed in terms of the maintenance of the nanostructure and removal of unnecessary components to obtain a high purity.

The washing work is a very important process on the removal of impurity components. It is preferable the washing is performed using a solvent capable of dissolving the unnecessary components. It is particularly preferable to use washing liquid containing the component contained in the solvent used in the reduction reaction. For example, in Examples described below, in order to remove ion components such as $SO_4^{2-}$ and oxides, washing step of washing with water three times and washing with ethanol three times was performed. In Examples, water and ethanol are used as the solvent used in the reduction reaction.

It may sometimes be good that the target, which is aggregated by the magnetic field action, is washed in the aggregated state, whereby the washing can be performed without destroying the fine structure of the metal-based structure having the wire shape. When the target is the ferromagnetic substance, this method is further effective, because the selection can be performed utilizing the difference in the sensitivity to the magnetic field. For example, it is possible that unnecessary oxide components having a weak sensitivity to the magnetic field (for example, iron oxides and boron oxides) are separated and they are removed with washing in a state in which the metal-based structures formed of Fe are aggregated, which is effective to obtain a high purity.

There are cases in which a more effective separation and removal washing can be performed by performing the washing after the aggregation step using the magnetic field. It may sometimes be effective that the washing step is divided to several times, and washing works are performed using difference solvents. A mixed solvent may be used. In the final washing step, it is advantageous to use a solvent having a lower vapor pressure, to increase the efficiency in a subsequent drying step. It is good to perform the drying step in a manner in which the target is washed with water, followed by alcohol, and then the drying step is performed, as in Examples described below. Ethanol is particularly effective.

4. Production Method of Metal-Based Structure Containing Magnetic Substance (4-1) Production Method Using No Nucleating Agent It is advantageous that the nanoparticles are formed using a liquid phase reduction method, because it is preferable to form the nanoparticle in the liquid and to form the metal-based structure in the liquid, in order to enhance the easiness of handling of the nanoparticles. At that time, according to a conventional technique, a manner in which a reducible substance is put in liquid, a nucleating agent, in addition to a reducing agent, is also put in the liquid, metal-based reduced substances are deposited from a reducible substance, using a component formed from the nucleating agent as a nucleus, and they are grown to form nanoparticles has been generally performed in order to stably advance the formation of the nanoparticles.

According to the method as above, however, components derived from the nucleating agent are essentially incorporated into the nanoparticles and thus it is essentially impossible to produce a material having excellent uniformity in terms of the composition and the crystallography, and the expression of original physical properties may sometimes be inhibited.

The present inventors have studied a method for producing nanoparticles and metal-based structures in liquid without using the nucleating agent, which is actually essential in the conventional technique, in the liquid phase reduction.

When the nucleating agent is not used, a process of growth of nanoparticles from metal-based reduced substances formed in the liquid phase reduction method is unstable, and it is very difficult to produce the metal-based structure having the pre-determined shape characteristic with a high repeatability. It is practically natural to use the nucleating agent in the conventional technique, because of the low controllability in the growth process of the nanoparticles.

As a result of the present inventors' painstaking studies, however, it has been clear that even if the nucleating agent is not used, when the reducible substance contains elements capable of forming a magnetic substance, preferably a ferromagnetic substance, a metal-based structure having a different shape characteristic can be produced with a good repeatability by controlling the following elements, upon the reduction of the reducible substance in the liquid.

(4-2) Element (4-2-1) (Element-1) Solvent Composition

As described above, in the instant specification, the "solvent composition" means the composition of the solvent in the liquid in the reduction step. The solvent may be a polar solvent or a non-polar solvent. When the reducible substance is a polar substance such as ions, it is preferable that at least apart of the reducible substance is dissolved in the liquid, and thus the solvent is preferably a polar solvent capable of dissolving the reducible substance. The polar solvent may be protonic or aprotonic. The protonic polar solvent may include water, alcohols, thiols, acids, and the like. The aprotonic polar solvent may include ketones, ethers, sulfoxides, and the like.

The shape of the produced metal-based structure may sometimes be changed by changing the composition of the solvent. For example, when a solvent formed of water is used and other conditions are set the same as each other, a metal-based structure having a nanopart structure with a relatively high aspect ratio may be easily obtained. On the other hand, the aspect ratio of the nanopart structure forming the metal-based structure may sometimes be decreased by increasing the alcohol content in the aqueous solvent.

It can be considered that behavior of the metal-based reduced substance in the liquid in a process in which the nanopart structure is produced from the metal-based reduced substance, obtained by the reducing the reducible substance, and behavior of the nanostructure in the liquid in a process in which multiple structures corresponding to the nanopart structure (in the instant specification, which may sometimes be referred to as a "nanostructure"), when a part of the metal-based structure is formed, are bounded to each other to form the metal-based structure varies by the change of the solvent composition. In particular, the solvent influences physically and chemically the movement of the reduced substance in the liquid so as to provide the shape anisotropy to the nanopart structure, the binding and aggregation of the reduced substance to each other, and the movement of the nanostructure in the liquid so as to provide the shape anisotropy to the metal-based structure; as a result, the solvent composition largely influences the shape characteristic of the metal-based structure.

(4-2-2) (Element-2) Starting Material Concentration

In the instant specification, the "starting material concentration" means a concentration of the reducible substance in liquid in the reduction step, which is a step in which the reducible substance in the liquid is reduced to produce a metal-based reduced substance containing a reduced substance formed by reducing a reducible component contained in the reducible substance in the liquid. The starting material concentration is one of the elements influencing the basic shape of the metal-based structure and the nanostructure forming the above. As shown in Examples, when the starting material concentration is adjusted to a threshold value or more, a fibrous nanostructure is easily obtained. On the contrary, when the starting material concentration is a threshold value or less, a bead-shaped nanostructure is easily obtained. The threshold value varies by a magnetic field strength for the solidification, explained next, and when the magnetic field strength for the solidification is high, the threshold value tends to be decreased.

It is considered that the control of the dispersion concentration of the metal-based reduced substance obtained by reducing the reducible substance (in the instant specification, which may sometimes be referred to as a "reduced substance dispersion concentration") in the liquid is realized by changing the starting material concentration. It is considered that the increase of the reduced substance dispersion concentration to a pre-determined threshold value or more is realized by adjusting the starting material concentration to a pre-determined threshold value or more, and in that case, a metal-based structure having an appearance similar to that of a yarn or web, which is an aggregate of fibers, is obtained, as shown in Examples. On the other hand, when the starting material concentration is less than a pre-determined threshold value, a metal-based structure having a shape obtained by connecting multiple bead-shaped nanostructures is obtained.

The threshold value of the starting material concentration varies depending on the magnetic field strength for the solidification, and when the magnetic field strength for the solidification is high, the threshold value of the starting material concentration tends to be decreased. From this, it is considered the magnetic property of the metal-based reduced substance influences whether the metal-based structure has a nanopart structure based on the nanostructure having a shape similar to a fiber or has a nanopart structure based on a bead-shaped nanostructure.

It can be considered that the nanostructure having a structure like the fiber has such a shape so that the metal-based reduced substance has growth anisotropy; that is, when the metal-based reduced substance particles collide to each other based on an isotropic motion such as Brown motion in a state in which the fine particles of the metal-based reduced substance are dispersed, a nanostructure, obtained by growing the metal-based reduced substance, can be expected to be an isotropic shape, but a bias is grown in a certain direction when the metal-based reduced substance is grown, thus resulting in the structure having the shape anisotropy, like a fiber.

(4-2-3) (Element-3) Magnetic Field Strength for the Solidification

In the instant specification, a "magnetic field strength for the solidification" means a strength of the magnetic field applied to a substance existing in liquid, in the reduction step and/or a solidification step in which the metal-based reduced substance, produced in the reduction step, is grown to obtain a metal-based structure. The magnetic field strength for the solidification may vary temporally, that is, it may be exemplified by a case in which the magnetic field strength for the solidification is low in the reduction step, and the magnetic field strength for the solidification is high in the solidification step, or a case in which the magnetic field strength for the solidification is low even in the solidification step, or some time elapses, and after that the strength is increased. The magnetic field strength for the solidification is one of the elements influencing the basic shape of the metal-based structure, and the nanopart structure or nanostructure forming the above, in addition to the starting material concentration described above. When the magnetic field strength for the solidification is high, a metal-based structure formed by binding the nanopart structures or nanostructures easily forms a shape which is observed as a shape having a part structure with a high aspect ratio in an observation visual field with a certain range (for example, 10 μm×10 μm).

The reason in which the anisotropy is caused in the growth of the metal-based reduced substance by increasing the starting material concentration is not clear, but it is considered that a magnetic property influences the metal-based reduced substance. It is considered, accordingly, that the metal-based reduced substance has paramagnetism or superparamagnetism, hardly causes a leakage field, and has a low sensitivity to an outer magnetic field at an initial stage of the generation; whereas, it turns to a nanostructure having a single magnetic domain structure capable of causing the leakage field by appropriate growth. Hereinafter, the nanostructure may sometimes be referred to as the "magnetized nanostructure." Once the nanoparticle has the magnetized nanostructure having the single magnetic domain structure, the sensitivity to the outer magnetic field is also increased, and thus a magnetic interrelation action is easily caused when the magnetized nanostructure approaches the magnetized nanostructure. In addition, the interrelation action with the metal-based reduced substance approaching the magnetized nanostructure is also influenced by the leakage field of the magnetized nanostructure to have the anisotropy. As a result, another magnetized nanostructure binds to the magnetized nanostructure in a direction along a single magnetic domain, or a ratio of the metal-based reduced substance bound along the direction of the single magnetic domain is increased, whereby a bias is caused in a growing direction of the nanostructure, and the nanostructure having the growth anisotropy is formed.

Considering as above, some explanation can be applied to the lowered threshold value of the starting material concentration, which decides the shape of the metal-based structure, by increasing the magnetic field strength for the solidification, thereby to obtain the filament shape even if the starting material concentration is relatively low. The nanostructure having a measurable magnetic anisotropy in the middle of the growth to the single magnetic domain is more easily aligned along the outer magnetic field with the increase of the magnetic field strength for the solidification. It is considered that when the magnetic field strength for the solidification is high, accordingly, the starting material concentration is low, and thus even a nanostructure having a relatively small diameter has the growth anisotropy, and is easily grown to a fibrous shape.

As fiber forming a web, which is an aggregate of fibers, is classified into a staple (short fiber) and a filament (long fiber) based on the difference in the length, the metal-based structure having the web shape can also be classified, as above, into a structure having a staple web shape based on the short fiber and a structure having a filament web shape based on the long fiber.

As one of the elements deciding that the metal-based structure having the web shape has either shape, the magnetic field strength for the solidification is recited. When the magnetic field strength for the solidification is less than a threshold value, the metal-based structure having the staple web shape is obtained, and when the magnetic field strength for the solidification is a threshold value or more, the metal-based structure having the filament web shape is obtained. The metal-based structure having the filament web shape is obtained by interlacing or binding multiple filament-shaped (long fiber) metal-based structures, floating in the liquid.

The presence of the threshold value of the magnetic field strength for the solidification, deciding the kind of the web shape (staple web-shape/filament web shape) may be easily understood, if supposing the nanostructure having the structure like the fiber. When the magnetic field strength for the solidification is strong, a percentage of the fibrous nanostructures existing in the liquid along the outer magnetic field is increased. Thus, the connection of the nanostructures to each other is easily caused in a direction along the outer magnetic field, and consequently, it is easy to obtain the filament metal-based structure having a long fiber length.

On the other hand, when the magnetic field strength for the solidification is weak, a percentage of the nanostructures existing in the liquid and existing along the outer magnetic field is smaller than that in the case in which the magnetic field strength for the solidification is strong. Thus, a possibility in which the long axis direction is oriented and the length in the long axis direction is prolonged is decreased when the nanostructures are connected to each other, and consequently the metal-based structure having the staple web shape obtained by interlacing the short fibers is easily obtained.

When the metal-based structure having the filament shape is used, linearity may sometimes be important. In such a case, as the element improving the linearity of the filament, the magnetic field strength for the solidification and the work time of the magnetic field are recited. With respect to these elements, the production conditions may be adjusted, observing the shape of the obtained metal-based structure. For example, as shown in Examples, when the reducible substance contains the ferromagnetic substance, or Fe, a magnetic field action caused by a ferrite magnet or a magnet field action more than that, preferably a magnetic field action caused by a neodymium magnet may be applied in 5 minutes after the finish of the dropwise addition of the reducing agent. When the time until the magnetic field action is applied is prolonged or the magnetic field strength is relatively decreased, a metal-based structure having a shape with a low linearity based on the staple can be easily obtained.

It is possible that the nanostructure or magnetized nanostructure and the nanopart structure or metal-based structure are grown so as to have at least one of the pre-determined particle size and the pre-determined magnetic characteristics, and then the magnetic field strength for the solidification is increased. Here, the pre-determined magnetic characteristic means a property providing the reactivity to the magnetic field and forming the structure by the movement and/or the alignment in the magnetic field. For example, it is exemplified by magnetic susceptibility, to have the single magnetic domain structure, to have the ferromagnetism, to have the paramagnetism, to have the superparamagnetism, and the like.

When the metal-based structure contains the ferromagnetic substance, particularly Fe, the particle size is preferably adjusted to from 50 nm to 500 nm, more preferably from 90 nm to 400 nm. Further, it is preferable that the particle size is adjusted to the following range.

When the metal-based structure has the shape based on the staple or filament shape, the particle size is preferably adjusted to from 50 to 250 nm, more preferably from 100 to less than 175 nm.

When the metal-based structure has the shape based on the bead shape, the particle size is preferably adjusted to from 150 to 500 nm, more preferably from 175 to 350 nm.

With respect to the magnetic field strength for the solidification, cases in which the magnetic field strength for the solidification is increased before the growth or before the deposition are included, even the metal-based structure is in the middle of the growth. Specifically, it is possible that the size or the magnetic characteristics are gradually changed in the growth process, and a desired substance responds to the magnetic field action to selectively form the metal-based structure.

The metal-based structure having either the staple web shape or the filament web shape can obtain a shape capable of functioning as a three-dimensional mesh, by appropriately setting a existence density of the interlaces or the bonds.

When the magnetic field strength for the solidification is a threshold value or more, the metal-based structure having the shape obtained by connecting multiple bead-shaped nanoparticles, obtained when the starting material concentration is low has a shape bead wire shape obtained by aligning and connecting multiple nanoparticles having bead shape. A metal-based structure having the web shape can be obtained by binding or interlacing multiple metal-based structures having the bead wire shape and floating in the liquid. The metal-based structure having the web shape can also have the shape capable of functioning as the three-dimensional mesh.

On the other hand, when the magnetic field strength for the solidification is less than a threshold value, a metal-based structure having a massive shape obtained by isotropically connecting multiple metal-based structures having the bead shape can be obtained. The threshold value of the magnetic field strength for the solidification shifts to a lower magnetic field side with increase of the starting material concentration; in other word, when the starting material concentration is high, the metal-based structure having the bead wire shape can be easily obtained even if the magnetic field strength for the solidification is low.

The magnetic field strength for the solidification may be controlled so that the strength temporally varies. For example, there are cases in which the shape of the obtained metal-based structure is different from each other between a case in which the magnetic field strength for the solidification is increased from the start of the reduction step and a case in which the magnetic field strength for the solidification is increased after the solidification step is advanced to some extent. Specifically, when the nanoparticle has the bead shape, the metal-based structure having the bead wire shape can be easily obtained by increasing the magnetic field strength for the solidification from the start of the reduction step, and it is difficult to the metal-based structure having the bead wire shape and the metal-based structure having the massive shape can be easily obtained by increasing the magnetic field strength for the solidification after some time elapses from the finish of the reduction step.

Specifically explaining, as shown in Examples, when the reducible substance contains Fe and forms the bead wire, it is preferable to apply a magnetic field action caused by a ferrite magnet or stronger action than that, preferably a magnetic field action caused by a neodymium magnet in 15 minutes after finish of the dropwise addition of the reducing agent. It is more preferable that the growth is performed while the movement is performed in a direction of a stronger magnetic field action after the dropwise addition. In cases other than Examples, the production conditions may be adjusted observing the obtained shape.

When the reduced substance obtained from the reducible substance is a magnetic substance, the threshold value may be changed in accordance with a degree of reaction with the magnetic field of the magnetic substance.

When the magnetic substance shows a weak magnetic field reaction, a desired structure can be easily obtained by using a higher magnetic field strength. In the contrary case, suitably, an electricity consumption and an apparatus strength can be inexpensively operated by using a relatively weak magnetic field strength.

When a structure containing the ferromagnetic substance, particularly in which the reducible substance contains Fe, is produced, it is preferable that the magnetic field strength is adjusted to 50 mT or more, more preferably 100 mT or more. When the magnetic field strength is less than 1000 mT, in a range of 300 to 1000 mT, from 300 to 800 mT, or from 300 to 600 mT (more inexpensive), a permanent magnet can be used, and an inexpensive and stable operation can be preferably performed. Regardless of the materials, the use of the permanent magnet is suitable for an inexpensive operation.

It may sometimes be preferable that there is a distribution in the magnetic field. Specifically, a case in which a magnet is set on a part of a bottom of a beaker, as performed in Examples, can be recited. According to the method in which the magnet is set on apart of the bottom of the beaker as above, the magnetic field strength is not uniform in the liquid, and has a dispersion in which the strength becomes weaker as it goes away from the magnet. This means that the particles after the dropwise addition are grown while they move toward a stronger magnetic field, and they are stuck to each other after the aggregation, which phenomenon is preferable. Before reaching the magnetic field strength necessary for sticking, preparatory steps of the necessary growth and aggregation can be previously advanced. In addition, a large-scaled electromagnet apparatus may sometimes be necessary for applying the uniform magnetic field, but the method can utilize an apparatus which is more inexpensive than that.

In Examples, the following three kinds of magnets were used.

(1) Neodymium magnet-1 (a diameter: 15 mm, a height: 6 mm, a surface inductive flux: 375 mT)
(2) Neodymium magnet-2 (a diameter: 30 mm, a height: 30 mm, a surface inductive flux: 550 mT)
(3) Ferrite magnet-1 (a diameter: 17 mm, a height: 5 mm, a surface inductive flux: 85 mT)

Differences in the experimental results are not observed depending on the two kinds of neodymium magnets described above.

For the movement and growth of the particles after the dropwise addition, a relative flow in the solution and the magnetic field may be controlled. In that case, it is preferable to control a quiet flow without stirring or vibration at a flow rate of 100 mm/second or higher, or 500 mm/second or higher. The utilization of free convection or spontaneous sedimentation may sometimes be preferable.

(4-2-4) (Other Element)

In addition to the 3 elements described above, there are elements influencing the shape of the metal-based structure. As the other element, an amount of the reducing agent, used for reducing the reducible substance is recited. Due to adding the reducing agent to the liquid containing the reducible substance, which is the liquid to be contained when the reduction of the reducible substance is advanced, the concentration of the reducing agent in the liquid containing the reducing agent is apt to influence the shape of the metal-based structure. The concentration of the reducing agent may sometimes influence not only the shape of the metal-based structure but also the composition thereof (for example, the hydrogen content) and the crystallographic characteristics (for example, when the reduced substance is Fe and the heat-treatment is performed for crystallization, the content ratio of αFe in the obtained metal-based structure). A degree of the influence is related to the 3 elements described above, and is particularly highly related to the starting material concentration, and thus characteristics of a metal-based structure produced may sometimes be effectively controlled by combination of the concentration of the reducing agent and the starting material concentration.

(4-3) Shape of Metal-Based Structure

FIG. 1 is a view showing conceptually the classification of the shape of the metal-based structure in relation to the starting material concentration and the magnetic field strength for the solidification.

In a case shown in Example 1, two modes of the wire shape based on the filaments and the bead wire shape based on the beads are generated, when the metal-based structure has a wire shape. The grown particle having the metal-based structure has at least two kinds of grown particles corresponding to the two wire shapes. When a magnetic field is applied to the specific grown particles, two kinds of modes of the wire shape and bead wire shape are obtained by the influences of the magnetic characteristics, the size (the whole size) of the grown particles. The reducible ion concentration is dominant in the factor in which the nature of the grown particles is divided into two. However, the nature of the grown particles is divided into the two kind, although there is a transitive concentration region separating into two, and the same concentration is shown in the region by the magnetic field strength at the deposition time or the growth time. From this, when the content of the reducible substance is 10 or more and less than 20 mmol/kg, the difference in the mode described above easily appears due to the magnetic field strength; that is, the filament shape tends to be formed when the magnetic field strength is stronger. When the threshold value of the mode change, in the terms of a content of the reducible substance wherein the reducible substance is the ferromagnetic substance, or Fe, is 3 mmol/kg or more, the filament shape is easily obtained, and from this viewpoint it is more preferably 20 mmol/kg or more, particularly preferably 60 mmol/kg or more. When the reducible substance is the ferromagnetic substance, or Fe, the bead wire shape is easily obtained at less than 60 mmol/kg, and from this viewpoint it is more preferably 10 mmol/kg or less, particularly preferably 3 mmol/kg or less. The threshold value for forming the filament shape tends to be decreased when a magnet having a strong the magnetic field strength, i.e., the neodymium magnet, is used.

The metal-based structure obtained in the method described above contained the amorphous part in all of the 4 shapes shown in FIG. 1. It is considered that the growth to the metal-based structure by binding the nanostructures to each other even applying a comparatively low outer force such as the magnetic field or heat-vibration is related to the existence of the amorphous parts in the metal-based structure; and further the effects thereof are enhanced by providing the bond of the metal-based structures through hydrogen and the inhibition of the formation of the oxidized layer due to the hydrogen-containing amorphous. It is considered accordingly that the nanostructures also have the amorphous parts, the amorphous parts can be easily bound to each other by a weaker outer force, compared to a crystalline substance, and the amorphous parts of the nanoparticles or nanostructure forming them remain in the metal-based structure in which they are bounded to each other, thereby providing the amorphous parts in the metal-based structure.

5. Production Method of Metal-Based Structure with Formless Phase

The metal-based structure according to one embodiment of the present invention has the formless phase described above. The metal-based structure having the formless phase may sometimes be obtained when the metal-based structure, formed in a step which contains the reduction of the reducible substance in liquid, is taken out from the liquid. It can be considered accordingly that the formless phase has already existed as another structure in a state in which the metal-based structure is in the liquid. There also is a possibility in which they have existed as the grown particles having or capable of forming the formless phase, and the formless phase is formed by taking them out from the liquid, or a part or all of the metal-based structures are melted by taking the metal-based structure out from the liquid, or by influences caused by the drying or the heat-treatment step to change the structures thereof, thereby forming the formless phase. In that case, there is a possibility in which the formless phases are generated so that they surround or take in the nanopart structure by disappearance of the liquid brought to into contact with the nanopart structures or, particularly, the solvent.

As described above, the amount of the formless phase may sometimes be changed by heating the metal-based structure taken out from the liquid (FIGS. 20, 22 and 23). Specifically, there is a case in which even if the formless phase is hardly observed when the metal-based structure is taken out from the liquid, the formless phase can be observed by heating the metal-based structure at about 50° C. When the heating temperature is increased to about 200° C., the amount of the formless phase observed becomes maximum. When the heating temperature is further elevated, the formless phase amount is rather decreased, and for example there is a case in which the amount formless phase observed at about 300° C. is apparently smaller compared to a case of about 200° C.

6. Production Method of Crystallized Metal-Based Structure

A metal-based structure which is crystallized, i.e., a crystallized metal-based structure, can be obtained by heating the metal-based structure according to one embodiment of the present invention to a crystallization temperature or higher. The temperature depends on the kind and the composition of the reduced substance.

The crystallization temperature can be confirmed by a DSC profile. In the metal-based structure in which the metal-based reduced substance is Fe, a heat generation peak, which can be considered that it is caused by the crystallization, is confirmed at about 460° C.

In the DSC profile, a heat generation peak may sometimes appear at a temperature lower than that of the peak which considered that it is caused by the crystallization at about 460° C., specifically at about 300° C. In a different case, an endothermic peak may appear at about 380° C. What phenomenon causes this peak is unclear. When the endothermic peak on the lower temperature side is observed, there is a case in which the metal-based structure has the formless phase, and thus it is considered that there is some relationship between them. It is considered that, in the crystallization process of the metal-based structure having both the amorphous part and the hydrogen, crystallization is advanced by removal of hydrogen from the metal-based structure. It is considered that the endothermic change at about 380° C. is caused by the phenomenon accompanied with the removal of the hydrogen. The heat generation at about 300° C. may sometimes be observed in the metal-based structure having the filament shape, and it is considered that when the αFe single phase is obtained after the crystallization, the heat generation at about 300° C. is caused by the formation of a metastable phase or quasicrystal phase formed of Fe or the combination of Fe and hydrogen.

The metal-based structure has the nanopart structure, and when a cavity is defined by the nanopart structures, as described above, the volume of the cavity can be decreased or substantially lost by heating the metal-based structure at a temperature higher than the crystallization temperature (FIG. 27 to FIG. 29). When the cavity may adversely influence macro physical properties of the crystallized metal-based structure, particularly the mechanical properties, the influences can be decreased by appropriately adjusting the heating temperature.

The heating method in this case is not particularly limited. Pressurization may be performed instead of or in addition to the heating. At that time, the specific method of applying the pressure is not limited. The atmosphere when the heating and/or the pressurization is performed is not particularly limited, and it may sometimes be preferable that the treatments are performed in vacuo or inert gas in order to decrease effects of oxidation or the like. Alternatively, it may sometimes be preferable to perform it in a reactive gas such as hydrogen, nitrogen or oxygen.

7. Production Method of Composite Structure

The metal-based structure according to one embodiment of the present invention has the nanopart structure, and there is a case in which a cavity is defined by the nanopart structures. A composite structure can be produced from the metal-based structure having such a cavity and using other materials (additional substances) in a method described below.

One of the production methods of the composite structure according to one embodiment of the present invention is a method in which an additional substance is put in a cavity defined by the nanopart structures of the metal-based structure having the nanopart structure to form a metal-based structure-additional substance mixture. The method of putting the additional substance is not particularly limited. The additional substance is a powder and the metal-based structure-additional substance mixture may be formed by mixing the powder with the metal-based structure. The metal-based structure-additional substance mixture may also be formed by performing an electroplating treatment to the metal-based structure in liquid to deposit the additional substance on the surface of the metal-based structure. Alternatively, the metal-based structure-additional substance mixture may be formed by putting the metal-based structure in liquid together with the reducible substance and a substance having a function to reduce it, and depositing a substance obtained by reduction of the reducible substance or a substance based on the reduced substance (oxides, and the like) on the surface of the metal-based structure. The metal-based structure-additional substance mixture may be formed by putting the additional substance on the surface of the metal-based structure in a dry process such as evaporation or spattering. When the additional substance has a low melting point, the metal-based structure-additional substance mixture may be formed by immersing the metal-based structure in liquid formed of the additional substance (for example, melted tin).

The thus obtained metal-based structure-additional substance mixture is heated as necessary, whereby the additional substance is stuck to the metal-based structure. The heating temperature depends on the composition and the shape of the metal-based structure and the composition and the shape of the additional substance. When an alloy is formed from the metal-based structure and the additional substance, they may be stuck to each other even at a relatively low heating temperature. The substance may also be stuck to the structure even at a relatively low heating temperature in a case in which the nanopart structure of the metal-based structure is sufficiently small and the additional substance is also small.

If necessary, the volume of the cavity in the metal-based structure may be decreased or substantially lost by adjusting the heating condition, specifically elevating the heating temperature. The heating temperature basically depends on the metal-based structure, but the additional substance is melted at that temperature thus resulting in an interaction (alloying) with the material forming the metal-based structure, and consequently the temperature at which the cavity substantially disappears may sometimes be different from a temperature at which the cavity substantially disappears in the metal-based structure alone.

For obtaining the composite structure from the metal-based structure-additional substance mixture, pressurization may be performed instead of or in addition to the heating. At that time, the specific method of applying the pressure is not limited. The atmosphere when the heating and/or the pressurization is performed is not particularly limited, and it may sometimes be preferable that the treatments are performed in vacuo or inert gas in order to decrease effects of oxidation or the like. Alternatively, it may sometimes be preferable to perform it in a reactive gas such as hydrogen, nitrogen or oxygen.

When the method described above is used, even a material which is electrochemically base compared to the material forming the metal-based structure can be easily conjugated. When the metal-based structure-additional substance mixture or composite structure is obtained by reduction of the reducible substance in a state in which the additional substance is dispersed in liquid, there is a risk that the metal-based structure is not formed, or it is difficult to stick the additional substance to the metal-based structure, depending on the material or shape of the additional substance. On the other hand, according to the method described above, the metal-based structure is first formed, and then the composite structure is obtained by putting the additional substance in the cavity in the metal-based structure. Consequently, the chemical elements (elements concerning the reduction reaction) can be removed when the metal-based structure-additional substance mixture is obtained. In addition, as described above, in the metal-based structure according to one embodiment of the present invention, the shape characteristic can be controlled with a good repeatability, and thus it is expected that the repeatability is excellent in a stage in which the metal-based structure-additional substance mixture is obtained by mixing the metal-based structure with the additional substance.

In the composite structure produced in the method described above, a ratio of a volume of the parts derived from the metal-based structure to the whole volume of the composite structure is not particularly limited. The part derived from the metal-based structure may be main, or the part derived from the additional substance may be main. Specific examples of the case in which the component derived from the additional substance is main may include the use of the metal-based structure as a sintering aid on the production of sintered parts such as a gear. As the metal-based structure according to one embodiment of the present invention contains hydrogen, it is considered that the hydrogen has functions to remove an oxidized layer on the sintered material and to aid the diffusion of the sintered materials.

Another method for obtaining the composite structure may include a method in which an additional substance is put in a cavity in the crystallized metal-based structure. Specifically, a crystallized metal-based structure in a state in which cavities remain is immersed in liquid of a metal having a low melting point (for example, tin) to put the metal in the cavity, and after that the crystallized metal-based structure is pulled up and cooled to room temperature, whereby a composite structure formed of a crystallized metal-based structure having a cavities in which the metal having a low melting point is put can be obtained.

8. Other Production Method

When the metal-based structure, the crystallized metal-based structure, or the composite structure, explained above, is subjected to at least one treatment of the pressurization and the heating, the part structures forming the structure, and the structure can be stuck to each other. The structure having excellent mechanical properties, which is obtained by decreasing or substantially losing the volume of the cavities in the structure, can be obtained by the sticking.

The specific method of the pressurization or the strength is not particularly limited. There are cases in which a pressure is applied mechanically, or a pressure is applied by increasing a magnetic field strength to be applied. The heating temperature is not also limited. In the case of the metal-based structure, it may sometimes be preferable to adjust it to a crystallization temperature or higher. In the case of the crystallized metal-based structure, it may sometimes be preferable to heat it until the cavities substantially disappear. In the case of the composite structure, it may sometimes preferable to heat it until the additional substance is melted to fill the cavities with it.

In the specific one example of the metal-based structure as explained above, the structure containing Fe, as a main component, and inevitable impurities is recited, as the component other than hydrogen. When the metal-based structure is produced by reduction of Fe ions in the liquid, as one example, there is a possibility of including the inevitable impurity components contained in the reducing agent. The content of the inevitable impurity depends on parameter concerning the reduction reaction (an Fe ion concentration, a reducing agent concentration, a temperature, and the like). When the Fe ion concentration, the reducing agent concentration, and the solvent composition are adjusted to appropriate ranges, the content of the impurities is decreased, and a high purity metal-based structure formed of the single phase ($\alpha$Fe single phase) of the main component can be produced. When the metal-based structure contains hydrogen, and has the amorphous part or is formed of the amorphous single phase, a high purity metal-based structure formed of the single phase of the main component ($\alpha$Fe single phase) may sometimes be obtained after the crystallization. In that case, it is considered that the metal-based structure containing the hydrogen, and having the amorphous part or being the amorphous single phase has the composition formed of Fe, which is the main component, and hydrogen. When the metal-based structure containing Fe as the main component is produced in the method described above, if the concentration of the reducing agent is extremely small, the Fe element may exist in the oxide state in the metal-based structure, because the reduction of Fe ion is insufficient.

It is possible to produce the metal-based structure or the metal-based structure with a high purity whose composition is adjusted to a pre-determined value by the production method described above. It is further possible to produce the metal material or composite metal material formed of the desired alloy component by adding the additional substance, or the like. The method is particularly preferable when the material formed of the nanosize particles or having the nanopart structure is produced.

9. Application (Industrial Applicability)

The metal-based structure, crystallized metal-based structure, and composite structure according to the present invention are applicable to magnetism materials, electrode materials, catalyst materials or structure material utilizing a nanostructure; metal materials, structure materials, and strength members utilizing the solidified substance formed of nanostructure; a filter, holders for catalyst, and electrode members utilizing the nanosize mesh structure; and alloy and composite materials utilizing the above. In addition, they are preferably utilized as a shaped sintered body such as a screw or gear, or a material thereof. They are also utilizable for a hydrogen occlusion body.

In the metal-based structure of the present invention, the formation of the oxide layer is suppressed, and thus the sticking formability is high, and it is very useful as a metal particle material for forming, coating materials, material for a 3D printer.

EXAMPLES

The present invention is explained in more detailed by means of Examples, but the scope of the present invention is not limited to Examples.

The following findings about the present invention are obtained.

(A) The hydrogen-containing amorphous metal-based structure is preferable for the formation of the nanostructure (the alignment property of magnetic field, the adherence, and the formation of the formless phase).

(B) The hydrogen content can be controlled by the combination of the solutions and the solvent composition.

(C) When the hydrogen content is high, the high purity metal-based structure can be obtained.

(D) When the hydrogen content is high, the formless phase is formed.

(E) The morphology can be selectively formed by applying the magnetic field to (A).

(A) to (E) are explained based on experimental results in Examples below.

1. Example 1

1-1. Each Example

Example 1-1

(1) Preparation of Iron Sulfate Solution

Aqueous iron sulfate solutions having a composition shown in Table 1 were prepared as a part of liquid containing a reducible substance. The solution concentration (an iron sulfate content) was expressed as a mol number of a solute per kg of a solvent (hereinafter the same, with respect to the solution concentration). The bound water corresponding to 7 hydrate, hydrate in iron (II) sulfate 7 hydrate, was added to the solvent and concentrations were calculated.

TABLE 1

| Kind of aqueous iron sulfate solution | Iron(II)sulfate 7 hydrate [g] | Water [g] | Ethanol [g] | Iron sulfate content [mmol/kg] | Ethanol in solvent Percentage [% by mass] |
|---|---|---|---|---|---|
| FS1 | 0.30 | 13 | 3 | 67 | 19 |
| FS2 | 0.30 | 13 | 3 | 67 | 19 |
| FS3 | 0.06 | 13 | 3 | 13 | 19 |
| FS4 | 0.09 | 90 | 30 | 2.7 | 25 |
| FS5 | 0.30 | 16 | 0 | 67 | 0 |
| FS6 | 0.09 | 120 | 0 | 2.7 | 0 |

(2) Preparation of Aqueous Reducing Agent Solution

As a reducing agent used for reducing an Fe ion ($Fe^{2+}$) which was a reducible component, aqueous reducing agent solutions containing $NaBH_4$ and having a composition shown in Table 2 were prepared.

TABLE 2

| Kind of aqueous NaBH4 solution | NaBH4 [g] | Water [g] | Ethanol [g] | NaBH4 content [mmol/kg] | Ethanol in solvent Percentage [% by mass] |
|---|---|---|---|---|---|
| NB1 | 0.20 | 15 | 0 | 350 | 0 |
| NB2 | 0.06 | 25 | 0 | 63 | 0 |
| NB3 | 0.04 | 15 | 0 | 70 | 0 |
| NB4 | 0.06 | 45 | 15 | 26 | 25 |
| NB5 | 0.06 | 25 | 0 | 63 | 0 |
| NB6 | 0.06 | 60 | 0 | 26 | 0 |

(3) Production of Metal-Based Structure

In a Schale (an outer diameter: 71 mm×a height: 16 mm, wall thickness: 2 mm, made of glass, the Schale having the same shape was used in the following Examples) was put 16 mL of an aqueous iron sulfate solution, prepared using iron (II) sulfate 7 hydrate ($FeSO_4 \cdot 7H_2O$), manufactured by Wako Pure Chemical Industries, Ltd. and indicated as FS1 in Table 1. To the liquid in the Schale was added dropwise, at 3 mL/minute, 15 mL of an aqueous reducing agent solution, prepared using sodium tetrahydroborate ($NaBH_4$) manufactured by Wako Pure Chemical Industries, Ltd. and indicated as NB1 in Table 2. The dropwise addition operation was performed from one nozzle while the addition position to the liquid surface of the solution in the vessel (the Schale) was moved (hereinafter the same). The dropwise addition operation was performed at room temperature (23° C.) (hereinafter the same). Other operations were performed at room temperature unless otherwise noted (hereinafter the same). It was observed that bubbles and black murky deposit were generated around parts at which the aqueous reducing agent solution was added dropwise.

The water used in the aqueous iron sulfate solution and the aqueous reducing agent solution was distilled water, obtained using "GS-200 DIW" manufactured by ADVANTEC Co., Ltd. and classified into JIS Classification A3 (JIS K 0577: 1998). Ethanol manufactured by Kanto Chemical Co., Inc. and having a GC purity of 99.5% or more was used. The water and ethanol were used in washing works described below.

After the dropwise addition of the aqueous reducing agent solution was finished, the liquid was allowed to stand for 15 minutes. After that, the liquid was filtered, and the filtered deposit was washed according to the following conditions:
i) A work in which 50 mL of distilled water was poured and casted was performed 3 times, and subsequently
ii) A work in which 50 mL of ethanol was poured and casted was performed 3 times.

Hereinafter the washing condition above is referred to as "washing condition 1."

After the washing, the deposit was put in a beaker, which was dried in a desiccator to obtain a metal-based structure.

Example 1-2

In a Schale was put 16 mL of an aqueous iron sulfate solution indicated as FS2 in Table 1. To the liquid in the Schale was added dropwise 25 mL of an aqueous reducing agent solution indicated as NB2 in Table 2 at 5 mL/minute. It was observed that bubbles and black murky deposit were generated around parts in the liquid at which the aqueous reducing agent solution was added dropwise.

After the dropwise addition of the aqueous reducing agent solution was finished, the liquid was allowed to stand for 5 minutes. Subsequently, a neodymium magnet-1 (an outer diameter: 15 mm×a thickness 6 mm, a surface inductive flux: 375 mT) was brought into contact with an outer bottom face of the Schale. It was observed that the deposit in the liquid moved toward the magnet so as to approach the magnet. The liquid in the Schale was allowed to stand for 5 minutes in the state in which the magnet was brought into contact with the bottom face of the Schale. The Schale was slanted in the state in which the magnet was brought into contact with the bottom face of the Schale to cast the liquid, whereby the deposit remained inside the bottom face of the Schale.

The deposit was washed in the washing condition 1 in the state in which the magnet was brought into contact with the bottom face of the Schale.

After the washing, the magnet was separated from the bottom face of the Schale, and, while that state was maintained, the deposit remaining on the bottom face of the Schale was recovered using a scoopula.

The recovered deposit was put in a glass tube (an outer diameter: 12 mm, an inner diameter: 10 mm, a length: 120 mm, made of Pyrex (registered trademark), hereinafter the same) whose one end was sealed, the inside of the glass tube was vacuum-dried at room temperature for 15 minutes using a rotary pump without heating. An ultimate vacuum was 1.5 Pa. Hereinafter the vacuum-drying condition is referred to as "drying condition 1."

While the exhaust ventilation in the glass tube was continued, the glass tube was heated from the outside with a heater to elevate the temperature from room temperature (23° C.) to 400° C. (hereinafter, the highest temperature reached by this heating may sometimes be referred to as the "heat temperature"). Specifically, the temperature was elevated at 5° C./minute up to 100° C., and at 15° C./minute in a range of 100° C. or higher. The deposit was maintained at the heat temperature for 2 minutes. The temperature was measured with a thermocouple, which was in contact with a tip of the glass tube. After that, while the exhaust ventilation in the glass tube by the rotary pump was continued, the deposit was allowed to cool until the measurement temperature reached room temperature. Hereinafter the heat-treatment condition is referred to as the "heat-treatment condition 1." The exhaust ventilation in the glass tube by the rotary pump was finished to obtain a substance in the glass tube as a metal-based structure.

Example 1-3

In a Schale was put 16 mL of an aqueous iron sulfate solution indicated as FS2 in Table 1. Subsequently, a ferrite magnet-1 (an outer diameter: 17 mm×a thickness: 5 mm, a surface inductive flux: 85 mT) was brought into contact with an outer bottom face of the Schale. To the liquid in the Schale was added dropwise 25 mL of an aqueous reducing agent solution indicated as NB2 in Table 2 at 5 mL/minute. It was observed that bubbles and black murky deposit were generated around parts in the liquid at which the aqueous reducing agent solution was added dropwise. It was also observed that the produced deposit moved toward the magnet in the liquid so as to approach the magnet.

After the dropwise addition of the aqueous reducing agent solution was finished, the liquid was allowed to stand for 5 minutes in the state in which the magnet was brought into contact with the bottom face of the Schale, and the Schale was slanted while the state was maintained to cast the liquid. As a result, the deposit remained inside the bottom face of the Schale.

The deposit was washed in the washing condition 1 in the state in which the magnet was brought into contact with the bottom face of the Schale.

After the washing, the magnet was separated from the bottom face of the Schale, and, while the state was maintained, the deposit remaining on the bottom face of the Schale was recovered using a scoopula.

The recovered deposit was put in a glass tube whose one end was sealed, which was dried in the drying condition 1. While the exhaust ventilation in the glass tube by using the rotary pump was continued, a heat-treatment was performed in the heat-treatment condition 1 in which the deposit was maintained at 400° C. for 2 minutes. The exhaust ventilation in the glass tube by the rotary pump was finished to obtain a substance in the glass tube as a metal-based structure.

Example 1-4

In a Schale was put 16 mL of an aqueous iron sulfate solution indicated as FS1 in Table 1. Subsequently, the ferrite magnet-1 (an outer diameter: 15 mm) was brought into contact with an outer bottom face of the Schale. To the liquid in the Schale was added dropwise 15 mL of an aqueous reducing agent solution indicated as NB1 in Table 2 at 3 mL/minute. It was observed that bubbles and black murky deposit were generated around parts in the liquid at which the aqueous reducing agent solution was added dropwise. It was also observed that the produced deposit moved toward the magnet in the liquid so as to approach the magnet.

After the dropwise addition of the aqueous reducing agent solution was finished, the liquid was allowed to stand for 5 minutes in the state in which the magnet was brought into contact with the bottom face of the Schale, and the Schale was slanted while the state was maintained to cast the liquid. As a result, the deposit remained inside the bottom face of the Schale.

The deposit was washed in the washing condition 1 in the state in which the magnet was brought into contact with the bottom face of the Schale.

After the washing, the magnet was separated from the bottom face of the Schale, and, while the state was maintained, the deposit remaining on the bottom face of the Schale was transferred to a beaker, which was dried in a desiccator to obtain a metal-based structure.

Example 1-4-1

In a 200 mL beaker (made of Pyrex (registered trademark), an inner diameter of the bottom: 63 mm, a thickness of the bottom: 1 to 2 mm, hereinafter the same) was put 48 mL of an aqueous iron sulfate solution indicated as FS2 in Table 1. Subsequently, a neodymium magnet-2 (an outer diameter: 30 mm×a thickness: 30 mm, a surface inductive flux: 550 mT) was brought into contact with an outer bottom face of the beaker. To the liquid in the beaker was added dropwise 75 mL of an aqueous reducing agent solution indicated as NB2 in Table 2 at 10 mL/minute. It was observed that bubbles and black murky deposit were generated around parts in the liquid at which the aqueous reducing agent solution was added dropwise. It was also observed that the deposit moved toward the magnet in the liquid so as to approach the magnet. After that, the deposit was washed in the washing condition 1 in the same manner as in Example 1-4. After the washing, the magnet was separated from the bottom face of the beaker, and, while that state was maintained, the deposit remaining on the bottom face of the beaker was recovered using a scoopula. The recovered deposit was put in a glass tube whose one end was sealed, which was dried in the drying condition 1. While the exhaust ventilation in the glass tube by using the rotary pump was continued, a heat-treatment was performed according to the heat-treatment condition 1 in which the deposit was maintained at 150° C. for 2 minutes. The exhaust ventilation in the glass tube by the rotary pump was finished to obtain a substance in the glass tube as a metal-based structure.

Example 1-4-2

In a 100 mL beaker (made of Pyrex (registered trademark), an inner diameter of the bottom: 51 mm, a thickness of the bottom: 1 to 2 mm, hereinafter the same) was put 16 mL of an aqueous iron sulfate solution indicated as FS2 in Table 1. Subsequently, a neodymium magnet-1 (an outer diameter: 15 mm) was set on an inside bottom face of the beaker. To the liquid in the beaker was added dropwise 25 mL of an aqueous reducing agent solution indicated as NB2 in Table 2 at 5 mL/minute. It was observed that bubbles and black murky deposit were generated around parts in the liquid at which the aqueous reducing agent solution was added dropwise. It was also observed that the deposit moved toward the magnet in the liquid so as to approach the magnet. After that, the deposit was washed in the washing condition 1, was dried in the drying condition 1, and consequently was subjected to a heat-treatment in the heat-treatment condition 1 in which the deposit was maintained at 150° C. for 2 minutes, in the same manner as in Example 1-4-1, whereby a metal-based structure was obtained.

Example 1-4-3

The same procedures as in Example 1-4 were performed up to the washing condition 1. After that, the recovered deposit was put in a glass tube whose one end was sealed, was dried in the drying condition 1, and, continuously, was subjected to a heat-treatment in the heat-treatment condition 1 in which the deposit was maintained at 400° C. for 2 minutes, whereby a metal-based structure was obtained.

Example 1-4-4

A metal-based structure, obtained in the same procedures as in Example 1-4-1, was subjected to a heat-treatment in the heat-treatment condition land, subsequently, while the exhaust ventilation in the glass tube by the rotary pump was continued, a glass tube is vacuum-sealed in the state in which the substance was put in the glass tube. The vacuum-sealing operation was an operation in which, while the exhaust ventilation in the glass tube was continued, the glass tube was heated from the outside with a gas burner at a position sufficiently distant so that the substance in the glass tube was not affected by the heat to reduce the diameter of the glass tube, whereby the substance was vacuum-sealed, and the glass tube was cut. After the vacuum-sealing, the glass tube had a length of about 70 mm. Hereinafter, the vacuum-sealing was performed in the same manner as above. The resulting glass tube was maintained at 500° C. for 60 minutes using an air atmosphere furnace with a temperature elevation rate of 20° C./minute, and was cooled to room temperature in the furnace. After the heat-treatment, the substance in the glass tube was obtained as a metal-based structure.

Example 1-5

In a Schale was put 16 mL of an aqueous iron sulfate solution indicated as FS3 in Table 1. Subsequently, a ferrite magnet-1 (an outer diameter: 17 mm) was brought into contact with an outer bottom face of the Schale. To the liquid in the Schale was added dropwise 15 mL of an aqueous reducing agent solution indicated as NB3 in Table 2 at 3 mL/minute. It was observed that bubbles and black murky deposit were generated around parts in the liquid at which the aqueous reducing agent solution was added dropwise. It was also observed that the produced deposit moved toward the magnet in the liquid so as to approach the magnet.

After the dropwise addition of the aqueous reducing agent solution was finished, the liquid was allowed to stand for 5 minutes in the state in which the magnet was brought into contact with the bottom face of the Schale, and the Schale was slanted while the state was maintained to cast the liquid. As a result, the deposit remained inside the bottom face of the Schale.

The deposit was washed in the washing condition 1 in the state in which the magnet was brought into contact with the bottom face of the Schale.

After the washing, the magnet was separated from the bottom face of the Schale, and, while the state was maintained, the deposit remaining on the bottom face of the Schale was recovered using a scoopula.

The recovered deposit was put in a glass tube whose one end was sealed, and was dried in the drying condition 1. While the exhaust ventilation in the glass tube by the rotary pump was continued, the heat-treatment was performed in the heat-treatment condition 1 in which the deposit was maintained at 200° C. for 2 minutes. The exhaust ventilation in the glass tube by the rotary pump was finished, and the substance in the glass tube was obtained as a metal-based structure.

Example 1-6

In a Schale was put 16 mL of an aqueous iron sulfate solution indicated as FS3 in Table 1. Subsequently, a neodymium magnet-1 (an outer diameter: 15 mm) was brought into contact with an outer bottom face of the Schale. To the liquid in the Schale was added dropwise 15 mL of an aqueous reducing agent solution indicated as NB3 in Table 2 at 3 mL/minute. It was observed that bubbles and black murky deposit were generated around parts in the liquid at which the aqueous reducing agent solution was added dropwise. It was also observed that the produced deposit moved toward the magnet in the liquid so as to approach the magnet.

After the dropwise addition of the aqueous reducing agent solution was finished, the liquid was allowed to stand for 5 minutes in the state in which the magnet was brought into contact with the bottom face of the Schale, and the Schale was slanted while the state was maintained to cast the liquid. As a result, the deposit remained inside the bottom face of the Schale.

The deposit was washed in the washing condition 1 in the state in which the magnet was brought into contact with the bottom face of the Schale.

After the washing, the magnet was separated from the bottom face of the Schale, and, while the state was maintained, the deposit remaining on the bottom face of the Schale was recovered using a scoopula.

The recovered deposit was put in a glass tube whose one end was sealed, and was dried in the drying condition 1. While the exhaust ventilation in the glass tube by the rotary pump was continued, the heat-treatment was performed in the heat-treatment condition 1 in which the deposit was maintained at 400° C. for 15 minutes. The exhaust ventilation in the glass tube by the rotary pump was finished, and the substance in the glass tube was obtained as a metal-based structure.

Example 1-7

In a 200 mL beaker was put 120 mL of an aqueous iron sulfate solution indicated as FS4 in Table 1. To the liquid in the beaker was added dropwise 60 mL of an aqueous reducing agent solution indicated as NB4 in Table 2 at 10 mL/minute. It was observed that bubbles and black murky deposit were generated around parts in the liquid at which the aqueous reducing agent solution was added dropwise.

After the dropwise addition of the aqueous reducing agent solution was finished, the liquid was allowed to stand for 15 minutes. Subsequently, a neodymium magnet-1 (an outer diameter: 15 mm) was brought into contact with an outer bottom face of the beaker. It was observed that the deposit moved toward the magnet in the liquid so as to approach the magnet. The liquid in the schale was allowed to stand for 5 minutes in the state in which the magnet was brought into contact with the bottom face of the beaker. The beaker was slanted in the state in which the magnet was brought into contact with the bottom face of the beaker to cast the liquid, whereby the deposit remained inside the bottom face of the beaker.

The deposit was washed in the washing condition 1 in the state in which the magnet was brought into contact with the bottom face of the beaker.

After the washing, the magnet was separated from the bottom of the beaker, and, while the state was maintained, the deposit remaining on the bottom face of the beaker was recovered using a scoopula.

The work described above was performed twice in total, the recovered deposit was put in a glass tube whose one end was sealed, and was dried in the drying condition 1. While the exhaust ventilation in the glass tube by the rotary pump was continued, the heat-treatment was performed in the heat-treatment condition 1 in which the deposit was maintained at 200° C. for 2 minutes. The exhaust ventilation in the glass tube by the rotary pump was finished, and the substance in the glass tube was obtained as a metal-based structure.

Example 1-7-1

The same procedures as in Example 1-7 were performed up to the drying in the drying condition 1. While the exhaust ventilation in the glass tube by the rotary pump was continued, the heat-treatment was performed in the heat-treatment condition 1 in which the deposit was maintained at 50° C. for 2 minutes. The exhaust ventilation in the glass tube by the rotary pump was finished, and the substance in the glass tube was obtained as a metal-based structure.

Example 1-7-2

In a 1 L beaker was put 480 mL of an aqueous iron sulfate solution indicated as FS4 in Table 1. To the liquid in the beaker was added dropwise 240 mL of an aqueous reducing agent solution indicated as NB4 in Table 2 at 25 mL/minute. It was observed that bubbles and black murky deposit were generated around parts in the liquid at which the aqueous reducing agent solution was added dropwise.

After the dropwise addition of the aqueous reducing agent solution was finished, the liquid was allowed to stand for 15 minutes. Subsequently, a part of the liquid in the 1 L beaker was transferred to a 200 mL beaker with which a neodymium magnet-2 (an outer diameter: 30 mm) was brought into contact on the outer bottom face thereof. It was observed that the deposit moved toward the magnet in the liquid so as to approach the magnet. The liquid in the beaker was allowed to stand for 5 minutes in the state in which the magnet was brought into contact with the bottom face of the beaker. The beaker was slanted in the state in which the magnet was brought into contact with the bottom face of the beaker to cast the liquid, whereby the deposit remained inside the bottom face of the beaker. While the magnet was brought into contact with the beaker, the work was performed 5 times in total. After the washing was performed in the washing condition 1, the magnet was separated from the bottom face of the beaker, and the deposit in the 1 L beaker was recovered.

The work described above was performed twice in total, and the obtained deposit was put in a glass tube whose one end was sealed and dried in the drying condition 1. While the exhaust ventilation in the glass tube by the rotary pump was continued, the heat-treatment was performed in the heat-treatment condition 1 in which the deposit was maintained at 200° C. for 2 minutes. The exhaust ventilation in the glass tube by the rotary pump was finished, and the substance in the glass tube was obtained as a metal-based structure.

Example 1-7-3

The same procedure as in Example 1-7 were performed up to the drying in the drying condition 1. While the exhaust ventilation in the glass tube by the rotary pump was continued, the heat-treatment was performed in the heat-treatment condition 1 in which the deposit was maintained at 300° C. for 2 minutes. The exhaust ventilation in the glass tube by the rotary pump was finished, and the substance in the glass tube was obtained as a metal-based structure.

Example 1-7-4

The same procedures as in Example 1-7 was performed up to the drying in the drying condition 1. While the exhaust ventilation in the glass tube by the rotary pump was continued, the heat-treatment was performed in the heat-treatment condition 1 in which the deposit was maintained at 400° C. for 30 minutes. After the heat-treatment, the substance in the glass tube was obtained as a metal-based structure.

Example 1-7-5

The same procedures as in Example 1-7-2 were performed up to the operation in the washing condition 1 except that the amount of the aqueous iron sulfate solution used was 240 mL, the amount of the aqueous reducing agent solution used was 120 mL, and the dropwise addition rate was 20 mL/minute. The obtained deposit was put in a glass tube whose one end was sealed, and was dried in the drying condition 1. While the exhaust ventilation in the glass tube by the rotary pump was continued, the heat-treatment was performed in the heat-treatment condition 1 in which the deposit was maintained at 150° C. for 2 minutes. After that, while the exhaust ventilation was continued, the glass tube was vacuum-sealed in a state in which the substance was put in the glass tube. The glass tube was maintained at 600° C. for 60 minutes using an air atmosphere furnace with a temperature elevation rate of 20° C./minute, and was cooled to room temperature in the furnace, whereby the substance in the glass tube after the heat-treatment was obtained as a metal-based structure.

Example 1-8

A ferrite magnet-1 (an outer diameter: 17 mm) was brought into contact with an outer bottom face of a 100 mL beaker. In the beaker was put 20 mL of an aqueous iron sulfate solution indicated as FS4 in Table 1. Subsequently, to the liquid in the beaker was added dropwise 10 mL of an aqueous reducing agent solution indicated as NB4 in Table 2 at 3 mL/minute. It was observed that bubbles and black murky deposit were generated around parts in the liquid at which the aqueous reducing agent solution was added dropwise. It was also observed that the produced deposit moved toward the magnet in the liquid so as to approach the magnet.

After the dropwise addition of the aqueous reducing agent solution was finished, the liquid was allowed to stand for 5 minutes in the state in which the magnet was brought into contact with the bottom face of the beaker, and the beaker was slanted while the state was maintained to cast the liquid. As a result, the deposit remained inside the bottom face of the beaker. In the beaker was put 20 mL of an aqueous iron sulfate solution in the state in which the magnet was brought into contact with the bottom face of the beaker, the dropwise addition operation described above was repeated again, and the deposit was washed in the washing condition 1.

After the washing, the magnet was separated from the bottom of the beaker, and, while the state was maintained, the deposit remaining on the bottom face of the beaker was recovered using a scoopula.

The work above was repeated twice, and the work was performed 4 times in total. The obtained deposit was put in a glass tube whose one end was sealed, and was dried in the drying condition 1. While exhaust ventilation in the glass tube by the rotary pump was continued, the heat-treatment was performed in the heat-treatment condition 1 in which the deposit was maintained at 150° C. for 2 minutes. The exhaust ventilation in the glass tube by the rotary pump was finished, and the substance in the glass tube was obtained as a metal-based structure.

Example 1-9

The same dropwise addition operation as in Example 1-8 was performed except that the magnet, which was brought into contact with the beaker, was a neodymium magnet-1 (an outer diameter: 15 mm). After the dropwise addition of the aqueous reducing agent solution was finished, the liquid was allowed to stand for 5 minutes in the state in which the magnet was brought into contact with the bottom face of the beaker, and the beaker was slanted while the state was maintained to cast the liquid. As a result, the deposit remained inside the bottom face of the beaker.

The dropwise addition operation was repeated 5 times in the state in which the magnet was brought into contact with the bottom face of the beaker, and the deposit was washed in the washing condition 1.

After the washing, the magnet was separated from the bottom of the beaker, and, while the state was maintained, the deposit remaining on the bottom face of the beaker was recovered using a scoopula.

The deposit, obtained in the above work, was put in a glass tube whose one end was sealed, and was dried in the drying condition 1. While the exhaust ventilation in the glass tube by the rotary pump was continued, the heat-treatment was performed in the heat-treatment condition 1 in which the deposit was maintained at 250° C. for 2 minutes. The exhaust ventilation in the glass tube by the rotary pump was finished, and the substance in the glass tube was obtained as a metal-based structure.

Example 1-9-1

A part of the metal-based structure obtained in Example 1-9 was put in a glass tube whose one side was sealed, and was dried in the drying condition 1. While the exhaust ventilation in the glass tube by the rotary pump was continued, the glass tube was vacuum-sealed in a state in which the substance was put in the glass tube. The glass tube was maintained at 600° C. for 60 minutes using an air atmosphere furnace with a temperature elevation rate of 20° C./minute, and was cooled to room temperature in the furnace. After the heat-treatment, the substance in the glass tube was obtained as a metal-based structure.

Example 1-9-2

A part of the metal-based structure obtained in Example 1-9 was put in a glass tube whose one side was sealed, and was dried in the drying condition 1. While the exhaust ventilation in the glass tube by the rotary pump was continued, glass tube was vacuum-sealed in a state in which the substance was put in the glass tube. The glass tube was maintained at 800° C. for 60 minutes using an air atmosphere furnace with a temperature elevation rate of 20° C./minute, and was cooled to room temperature in the furnace. After the heat-treatment, the substance in the glass tube was obtained as a metal-based structure.

(Example 1-9-3) XRD Measurement

A neodymium magnet-2 (an outer diameter: 30 mm) was brought into contact with an outer bottom face of a 500 mL beaker. In the beaker was put 240 mL of an aqueous iron sulfate solution indicated as FS4 in Table 1. Subsequently, to the liquid in the beaker was added dropwise 120 mL of an aqueous reducing agent solution indicated as NB4 in Table 2 at 20 mL/minute. It was observed that bubbles and black murky deposit were generated around parts in the liquid at which the aqueous reducing agent solution was added dropwise. It was also observed that the produced deposit moved toward the magnet in the liquid so as to approach the magnet.

After the dropwise addition of the aqueous reducing agent solution was finished, the liquid was allowed to stand for 5 minutes in the state in which the magnet was brought into contact with the bottom face of the beaker, the beaker was slanted while the state was maintained to cast the liquid. As a result, the deposit remained inside the bottom face of the beaker. The deposit was washed in the washing condition 1 in the state in which the magnet was brought into contact with the bottom face of the beaker.

After the washing, the magnet was separated from the bottom of the beaker, and, while the state was maintained, the deposit remaining on the bottom face of the beaker was recovered using a scoopula.

The deposit, obtained in the work as above, was put in a glass tube whose one end was sealed, and was dried in the drying condition 1. While the exhaust ventilation in the glass tube by the rotary pump was continued, the heat-treatment was performed in the heat-treatment condition 1 in which the deposit was maintained at 150° C. for 2 minutes. After that, while the exhaust ventilation in the glass tube was continued, the glass tube was vacuum-sealed in a state in which the substance was put in the glass tube. After the glass tube was maintained at 600° C. for 60 minutes using an air atmosphere furnace with a temperature elevation rate of 20° C./minute, the heating was stopped, and the glass tube was cooled to room temperature in the furnace. After the heat-treatment, the substance in the glass tube was obtained as a metal-based structure, which was subjected to an XRD measurement (FIG. 63).

Example 1-10

In a 200 mL beaker was put 48 mL of an aqueous iron sulfate solution indicated as FS5 in Table 1. To the liquid in the beaker was added dropwise 75 Lm of an aqueous reducing agent solution indicated as NB5 in Table 2 at 10 mL/minute. It was observed that bubbles and black murky deposit were generated around parts in the liquid at which the aqueous reducing agent solution was added dropwise.

After the dropwise addition of the aqueous reducing agent solution was finished, the liquid was allowed to stand for 15 minutes. After it was allowed to stand, the liquid was filtered, the filtered deposit was washed in the washing condition 1.

After the washing, the deposit remaining on the bottom face of the beaker was recovered using a scoopula.

The washed deposit was put in a glass tube whose one side was sealed, and was dried in the drying condition 1. While the exhaust ventilation in the glass tube by the rotary pump was continued, the heat-treatment was performed in the heat-treatment condition 1 in which the deposit was maintained at 150° C. for 2 minutes. The exhaust ventilation in the glass tube by the rotary pump was finished, and the substance in the glass tube was obtained as a metal-based structure.

Example 1-10-1

A part of the metal-based structure obtained in Example 1-10 was put in a glass tube whose one side was sealed, and was dried in the drying condition 1. While the exhaust ventilation in the glass tube by the rotary pump was continued, the glass tube was vacuum-sealed in a state in which the substance was put in the glass tube. The glass tube was maintained at 600° C. for 60 minutes using an air atmosphere furnace with a temperature elevation rate of 20° C./minute, and was cooled to room temperature in the furnace. After the heat-treatment, the substance in the glass tube was obtained as a metal-based structure.

(Example 1-11) XRD Measurement (the Phase is Called "X1 Phase.")

In a 100 mL beaker was put 16 mL of an aqueous iron sulfate solution indicated as FS5 in Table 1. Subsequently, a neodymium magnet-2 (an outer diameter: 30 mm) was brought into contact with an outer bottom face of the beaker. To the liquid in the beaker was added dropwise 25 mL of an aqueous reducing agent solution indicated as NB5 in Table 2 at 5 mL/minute. It was observed that bubbles and black murky deposit were generated around parts in the liquid at which the aqueous reducing agent solution was added dropwise. It was also observed that the produced deposit moved toward the magnet in the liquid so as to approach the magnet.

After the dropwise addition of the aqueous reducing agent solution was finished, the liquid was allowed to stand for 5 minutes in the state in which the magnet was brought into contact with the bottom face of the beaker, and the beaker was slanted while the state was maintained to cast the liquid. As a result, the deposit remained inside the bottom face of the beaker.

The deposit was washed in the washing condition 1 in the state in which the magnet was brought into contact with the bottom face of the beaker.

The washed deposit was put in a glass tube whose one side was sealed, and was dried in the drying condition 1. While the exhaust ventilation in the glass tube by the rotary pump was continued, the heat-treatment was performed in the heat-treatment condition 1 in which the deposit was maintained at 150° C. for 2 minutes. The exhaust ventilation in the glass tube by the rotary pump was finished, and the substance in the glass tube was obtained as a metal-based structure. The resulting metal-based structure was subjected to an XRD measurement (FIG. 47).

Example 1-11-1

The same procedures as in Example 1-11 was performed up to the drying in the drying condition 1. While the exhaust ventilation in the glass tube by the rotary pump was continued, the heat-treatment was performed in the heat-treatment condition 1 in which the deposit was maintained at 150° C. for 2 minutes. After that, the glass tube was vacuum-sealed in a state in which the substance was put in the glass tube. The glass tube was maintained at 400° C. for 60 minutes using an air atmosphere furnace with a temperature elevation rate of 20° C./minute, and was cooled to room temperature in the furnace. After the heat-treatment, the substance in the glass tube was obtained as a metal-based structure.

Example 1-11-2

The same procedures as in Example 1-11 were performed up to the drying in the drying condition 1 except that the amount of the aqueous iron sulfate solution used was 48 mL, the amount of the aqueous reducing agent solution used was 75 mL, the dropwise addition rate was 10 mL/minute, and a 200 mL beaker was used. While the exhaust ventilation in the glass tube by the rotary pump was continued, the heat-treatment was performed in the heat-treatment condition 1 in which the deposit was maintained at 200° C. for 2 minutes. The exhaust ventilation in the glass tube by the rotary pump was finished, and the substance in the glass tube was obtained as a metal-based structure.

(Example 1-11-3) Measurement of Hydrogen Content and SEM Measurement

The same procedures as in Example 1-11 were performed up to the drying in the drying condition 1 except that the amount of the aqueous iron sulfate solution used was 48 mL, the amount of the aqueous reducing agent solution used was 75 mL, the dropwise addition rate was 10 mL/minute, and a 200 mL beaker was used. While the exhaust ventilation in the glass tube by the rotary pump was continued, the heat-treatment was performed in the heat-treatment condition 1 in which the deposit was maintained at 450° C. for 2 minutes. The exhaust ventilation in the glass tube by the rotary pump was finished, and the substance in the glass tube was obtained as a metal-based structure.

(Example 1-11-4) XRD Measurement (the Phase is Called X2 Phase.)

A part, 30 mg, of the metal-based structure in Example 1-11-3 was subjected to an XRD measurement (FIG. 64).

(Example 1-11-5) XRD Measurement (the Phase is Called X3 Phase.)

After the XRD measurement of the metal-based structure was performed in Example 1-11-4, nearly the entire amount thereof was put in a glass tube whose one side was sealed, and was dried in the drying condition 1. While the exhaust ventilation in the glass tube by the rotary pump was continued, the heat-treatment was performed in the heat-treatment condition 1 in which the deposit was maintained at 150° C. for 2 minutes. While the exhaust ventilation was further continued, the glass tube was vacuum-sealed in a state in which the substance was put in the glass tube. The glass tube was maintained at 600° C. for 60 minutes using an air atmosphere furnace with a temperature elevation rate of 20° C./minute, and was cooled to room temperature in the furnace. After the heat-treatment, the substance in the glass tube was obtained as a metal-based structure, and nearly the entire amount thereof was subjected to an XRD measurement (FIG. 65).

Example 1-12

In a 200 mL beaker was put 120 mL of an aqueous iron sulfate solution indicated as FS6 in Table 1. To the liquid in the beaker was added dropwise 60 mL of an aqueous reducing agent solution indicated as NB6 in Table 2 at 10 mL/minute. It was observed that bubbles and black murky deposit were generated around parts in the liquid at which the aqueous reducing agent solution was added dropwise.

After the dropwise addition of the aqueous reducing agent solution was finished, the liquid was allowed to stand for 15 minutes. Subsequently, a neodymium magnet-2 (an outer diameter: 30 mm) was brought into contact with an outer bottom face of the beaker. It was observed that the deposit moved toward the magnet in the liquid so as to approach the magnet. The liquid in the beaker was allowed to stand for 5 minutes in the state in which the magnet was brought into contact with the bottom face of the beaker. The beaker was slanted in the state in which the magnet was brought into contact with the bottom face of the beaker to cast the liquid, whereby the deposit remained inside the bottom face of the beaker.

After the deposit was washed in the washing condition 1 in the state in which the magnet was brought into contact with the bottom face of the beaker, the deposit was recovered.

The work described above was performed twice in total, the obtained deposit was put in a glass tube whose one end was sealed, and was dried in the drying condition 1. While the exhaust ventilation in the glass tube by the rotary pump was continued, the heat-treatment was performed in the heat-treatment condition 1 in which the deposit was maintained at 150° C. for 2 minutes. The exhaust ventilation in the glass tube by the rotary pump was finished, and the substance in the glass tube was obtained as a metal-based structure.

Example 1-12-1

In a 1 L beaker was put 480 mL of an aqueous iron sulfate solution indicated as FS6 in Table 1. To the liquid in the beaker was added dropwise 240 mL of an aqueous reducing agent solution indicated as NB6 in Table 2 at 25 mL/minute. It was observed that bubbles and black murky deposit were generated around parts in the liquid at which the aqueous reducing agent solution was added dropwise.

After the dropwise addition of the aqueous reducing agent solution was finished, the liquid was allowed to stand for 15 minutes. Subsequently, a part of the liquid in the 1 L beaker was transferred to a 200 mL beaker with which a neodymium magnet-2 (an outer diameter: 30 mm) was brought into contact on the outer bottom face thereof. It was observed that the deposit moved toward the magnet in the liquid so as to approach the magnet. The liquid in the beaker was allowed to stand for 5 minutes in the state in which the magnet was brought into contact with the bottom face of the beaker. The beaker was slanted in the state in which the magnet was brought into contact with the bottom face of the beaker to cast the liquid, whereby the deposit remained inside the bottom face of the beaker. While the magnet was brought into contact with the beaker, the work was performed 5 times in total, and the washing was performed in the washing condition 1. After that, the magnet was separated from the bottom face of the beaker, and the deposit in the 1 L beaker was recovered.

The work described above was performed twice in total, the deposit obtained in the work above was put in a glass tube whose one side was sealed, and was dried in the drying condition 1. While the exhaust ventilation in the glass tube by the rotary pump was continued, the heat-treatment was performed in the heat-treatment condition 1 in which the deposit was maintained at 200° C. for 2 minutes. The exhaust ventilation in the glass tube by the rotary pump was finished, and the substance in the glass tube was obtained as a metal-based structure.

Example 1-12-2

A part of the metal-based structure obtained in Example 1-12 was put in a glass tube whose one side was sealed, and was dried in the drying condition 1. While the exhaust ventilation in the glass tube by the rotary pump was continued, glass tube was vacuum-sealed in a state in which the substance was put in the glass tube. The glass tube was maintained at 600° C. for 60 minutes using an air atmosphere furnace with a temperature elevation rate of 20° C./minute, and was cooled to room temperature in the furnace. After the heat-treatment, the substance in the glass tube was obtained as a metal-based structure.

Example 1-13

In a 200 mL beaker with which a neodymium magnet-2 (an outer diameter: 30 mm) was brought into contact on an outer bottom face of the beaker was put 60 mL of an aqueous iron sulfate solution indicated as FS6 in Table 1. To the liquid in the beaker was added dropwise 30 mL of an aqueous reducing agent solution indicated as NB6 in Table 2 at 10 mL/minute. It was observed that bubbles and black murky deposit were generated around parts in the liquid at which the aqueous reducing agent solution was added dropwise. It was also observed that the produced deposit moved toward the magnet in the liquid so as to approach the magnet.

After the dropwise addition of the aqueous reducing agent solution was finished, the liquid was allowed to stand for 5 minutes in the state in which the magnet was brought into contact with the bottom face of the beaker, and the beaker was slanted while the state was maintained to cast the liquid. As a result, the deposit remained inside the bottom face of the beaker.

After the dropwise addition work described above was performed 4 times in total in the state in which the magnet was brought into contact with the bottom face of the beaker, the deposit was washed in the washing condition 1.

The obtained deposit was put in a glass tube whose one end was sealed, and was dried in the drying condition 1. While the exhaust ventilation in the glass tube by the rotary pump was continued, the heat-treatment was performed in the heat-treatment condition 1 in which the deposit was maintained at 150° C. for 2 minutes. The exhaust ventilation in the glass tube by the rotary pump was finished, and the substance in the glass tube was obtained as a metal-based structure.

Example 1-13-1

The metal-based structure, obtained in the same manner as in Example 1-13, was put in a glass tube whose one side was sealed, and was dried in the drying condition 1. While the exhaust ventilation in the glass tube by the rotary pump was continued, the glass tube was vacuum-sealed in a state in which the substance was put in the glass tube. The vacuum-sealed glass tube was maintained at 600° C. for 60 minutes using an air atmosphere furnace with a temperature elevation rate of 20° C./minute, and was cooled to room temperature in the furnace. After the heat-treatment, the substance in the glass tube was obtained as a metal-based structure.

(Example 1-14) XRD Measurement (the Phase is Called Y1 Phase.)

In a 200 mL beaker was put 48 mL of an aqueous iron sulfate solution indicated as FS5 in Table 1. Subsequently, 75 mL of an aqueous reducing agent solution indicated as NB5 in Table 2 was poured into the liquid in the beaker in 20 seconds (about 4 mL/second). It was confirmed to produce black murky deposit in the liquid in which bubbles were rather violently generated, and it was observed that the stirring was sufficiently performed by the generation of the bubbles during the pouring of the aqueous reducing agent solution. After the pouring was finished, subsequently the stirring was performed for 10 minutes with a glass rod. The obtained deposit was extracted through a filter paper, and washed in the washing condition 1. After that, a half amount thereof was dried in a desiccator having a temperature of room temperature to obtain a metal-based structure, which was subjected to an XRD measurement (FIG. 66).

(Example 1-14-1) Measurement of Hydrogen Content

After the same procedures as in Example 1-14 was performed up to the washing of the deposit in washing condition 1, it was put in a glass tube whose one side was sealed, and was dried in the drying condition 1. While the exhaust ventilation in the glass tube by the rotary pump was continued, the heat-treatment was performed in the heat-treatment condition 1 in which the deposit was maintained at 200° C. for 2 minutes. The exhaust ventilation in the glass tube by the rotary pump was finished, and the substance in the glass tube was obtained as a metal-based structure.

(Example 1-14-2) XRD Measurement (the Phase is Called Y3 Phase.)

After the washing was performed in the washing condition 1 in Example 1-14, the half of the remaining was put in a glass tube whose one side was sealed, and was dried in the drying condition 1. While the exhaust ventilation in the glass tube by the rotary pump was continued, the heat-treatment was performed in the heat-treatment condition 1 in which the deposit was maintained at 150° C. for 2 minutes. While the exhaust ventilation was further continued, the glass tube was vacuum-sealed in a state in which the substance was put in the glass tube. The glass tube was maintained at 600° C. for 60 minutes using an air atmosphere furnace with a temperature elevation rate of 20° C./minute, and was cooled to room temperature in the furnace. After the heat-treatment, the substance in the glass tube was obtained as a metal-based structure, which was subjected to an XRD measurement (FIG. 67).

1-2. Measurement
(Measurement 1) X-Ray Diffraction

Using an X-ray diffraction apparatus ("NEW D8 ADVANCE" manufactured by BRUKER AXS Corporation), diffraction spectrum measurements of the metal-based structures obtained in Examples according to X-ray (Cu-Kα ray) were performed.

Measurement results are shown in FIG. 39 to FIG. 52.

The relationships in each Example, Fig. and measurement results are as follows:

| Example | Figure | Phase |
|---|---|---|
| Example 1-1 | FIG. 39 | amorphous single phase |
| Example 1-4 | FIG. 40 | amorphous single phase |
| Example 1-4-4 | FIG. 41 | αFe single phase |
| Example 1-7 | FIG. 42 | amorphous single phase |
| Example 1-7-5 | FIG. 43 | αFe single phase |
| Example 1-9 | FIG. 44 | amorphous single phase |
| Example 1-9-3 | FIG. 63 | αFe single phase |
| Example 1-10 | FIG. 45 | a phase containing mainly amorphous substance |
| Example 1-10-1 | FIG. 46 | αFe single phase |
| Example 1-11 | FIG. 47 | amorphous single phase |
| Example 1-11-1 | FIG. 48 | αFe phase |
| Example 1-11-4 | FIG. 64 | αFe phase |
| Example 1-11-5 | FIG. 65 | αFe single phase |
| Example 1-12 | FIG. 49 | amorphous single phase |
| Example 1-12-2 | FIG. 50 | $Fe_2B$ single phase |
| Example 1-13 | FIG. 51 | amorphous single phase |
| Example 1-13-1 | FIG. 52 | $Fe_2B$ and αFe are mixed |
| Example 1-14 | FIG. 66 | αFe phase |
| Example 1-14-2 | FIG. 67 | αFe single phase |

In the obtained diffraction spectrum, when only a peak substantially based on the αFe was observed, it was judged that the metal-based structure imparting the diffraction spectrum was an αFe single phase.

From the result, the following items can be understood.
(A) It was confirmed to obtain, in the production method according to the present invention, the metal-based structure mainly containing the amorphous single phase or the amorphous.
(B) It was confirmed to obtain the crystallized metal-based structure of the metal single phase, which was formed of the metal αFe single phase, the intermetallic compound $Fe_2B$ single phase, or a mixed phase thereof, by subjecting the metal-based structure mainly containing the amorphous single phase or the amorphous part to the heating operation.

A judgment about whether or not the crystal phase can be formed is shown in X1 phase/X2 phase/X3 phase in Examples, and is judged as follows:
(a) In the XRD measurement results (FIG. 47_X1), when an amorphous substance which is judged to be an amorphous single phase containing no crystal phase (which is called X1 phase) was subjected to, for example, a heat-treatment at 450° C., a peak considered to be a crystal phase (which is called X2 phase) appears in the XRD measurement results (FIG. 64_X2).
(b) In the XRD measurement results (FIG. 65_X3), when the metal-based structure containing the crystal phase shown in FIG. 64_X2 (X2 phase) is subjected to, for example, a heat-treatment at 600° C., a crystal phase having higher crystallinity as shown in FIG. 65_X3 (which is called X3 phase) can be obtained.

In the case (a) in which there is a phase change of X1 phase to X2 phase or the case (b) in which there is a phase change of X2 phase to X3 phase, when it is judged that the crystallinity is relatively increased in each of (a) and (b), i.e., regions of the ordered structure are increased, in the XRD measurement results, it is assessed that the crystal phase is formed from the amorphous phase in the amorphous part. It is preferable to perform measurements in the same conditions as above, and to relatively assess them.

The judgements are made as described below based on the judgement method above from experimental results.

X1 phase has an amorphous part capable of forming a crystal phase (the number of XRD peaks is increased), from the results of X2 phase.

X2 phase has an amorphous part capable of forming a crystal phase (the XRD peak is changed from broad to sharp peak, and a ratio of a peak intensity is increased) from the results of X3 phase. It is desirable that the assessment in which the crystallinity is increased or the ordered structure range is increased is performed by an intercomparison. For example, the judgement is made by increase of a regularity of an atomic arrangement relatively comparing the XRD measurement results obtained in the same conditions. In addition, the judgement may sometimes be made by existence of at least one of characteristics described below.

(α) The number of peaks is increased.
(β) A half-value width (HW [°]), which is an angle width at a half value of the peak intensity, is narrowed. The peak is changed from broad to sharp peak.
(γ) A ratio of an intensity of a peak intensity to a noise intensity width of a base having no peak is increased.
* Intensity of peak is referred to as an intensity difference between the maximum value of a peak intensity and an extrapolation value of a base containing no peak (an average value, considering noises).

From the XRD measurement results in Example 1-11-4 (FIG. 64), Example 1-11-5 (FIG. 65), Example 1-14 (FIG. 66), and Example 1-14-2 (FIG. 67), the half-value widths (HW [°]), obtained based on the maximum peak, were respectively 0.78, 0.18, 0.85, and 0.19, and the intensity ratios of the peak (Ip/N) were respectively 20, 102, 23, and 153. When there were differences in the half-value width and the intensity ratio being twice or more, the half-value width was decreased and/or the intensity ratio was increased. From the results, it is assessed that the regularity of the amorphous part is relatively increased and the crystallization is advanced.

(Measurement 2) Measurement of Hydrogen Content

The content of hydrogen contained in the metal-based structure was measured. The hydrogen content was calculated by dividing a mass of hydrogen, obtained by a measurement described below, by an amount of a sample weighed, and multiplying the obtained value by 100, and expressed as a hydrogen content in the sample [% (mass percentage)], which is hereinafter referred to as % by mass.

The measurement method was in accordance with JIS Z 2614 "General Rules for Determination of Hydrogen in Metallic Materials." The measurement was performed using an apparatus described in JIS H 1619 "Titanium and Titanium Alloys-Determination of Hydrogen Content." Specifically, measurement was performed with hydrogen as it is, JIS H 1619 Titanium and Titanium Alloys-Determination of Hydrogen Content 5 Inert Gas Melted-Thermal Conductivity Method.

A sample was heat-melted together with tin using a graphite crucible in an inert gas stream in an impulse furnace, and hydrogen was extracted with other gases. The extracted gases were passed through a separation column as they were to separate hydrogen from them, and the hydrogen was introduced into a thermal conductivity detector, thereby measuring a change of a thermal conductivity caused by hydrogen.

Other conditions were as follows:
Sample state: Powder
Preparation method of sample: After heat-drying at 105° C. in a 2 Hr atmosphere, cooling to room temperature was performed in a desiccator, and mixing was performed to uniformize.
Collection method of sample: A powdery sample was weighed at a g (gram) unit up to the fourth decimal place, Quantitative Method
(Gas extraction method): Inert gas fusion method
(Gas analysis method): Thermal conductivity method Gas extraction temperature (a temperature at which an analysis sample is fused and gas is released): 2000° C.
Gas collection time: 75 seconds
Blank test value: 0.000003% (0.03 ppm)
Measurement apparatus: EMGA 621A-type manufactured by HORIBA Ltd. Amount of sample weighed and control method thereof About 100 mg of a powdery sample was subjected to an analysis in each condition.
Degassing temperature (=a blank baking temperature of a crucible): A, B, and C were performed in this order.
A: 3200° C.-30 seconds
B: 2100° C.-15 seconds
C: 2000° C.-5 seconds
Kind and purity of inert gas used in extraction: Ar, 99.999%
Denitrogenation and deoxygenation agent of inert gas, and dehydrating agent:
No denitrogenation and deoxygenation agent Magnesium perchlorate was used as the dehydrating agent.

As a result of the measurements above, the hydrogen contents were 0.22% by mass for the metal-based structure obtained in Example 1-7-2; 0.10% by mass for the metal-based structure obtained in Example 1-11-2; and 0.02% by mass for the metal-based structure obtained in Example 1-12-1. From the results of Examples 1-7-5 and 1-11-5, it can be considered that a parent phase is Fe. At that time, hydrogen contents as an atomic fraction (a hydrogen content [% (atomic fraction)] in the sample, hereinafter expressed as % by atom) of the metal-based structure obtained in Example 1-7-2 and the metal-based structure obtained in Example 1-11-2 are respectively converted as 11.0% by atom and 5.3% by atom. With respect to Example 1-12-1, it can be considered that a parent phase may be a phase formed of $Fe_2B$ or a phase having the same composition ratio of $Fe_2B$, from the results in Example 1-12-2, and the hydrogen content was converted as 0.81% by atom.

As a result of the measurement, a hydrogen content of the metal-based structure obtained in Example 1-11-3 was 0.06% by mass. From the results in Example 1-11-5, it can be considered that a parent phase is Fe, and the hydrogen content as an atomic fraction of the metal-based structure was converted as 3.2% by atom.

Further as a result of the measurement, a hydrogen content of the metal-based structure obtained in Example 1-14-1 was 0.06% by mass. From the results in Example 1-14-2, it can be considered that a parent phase is Fe, and the hydrogen content as an atomic fraction of the metal-based structure was converted as 3.2% by atom. Table in which the results are summarized is shown below.

TABLE 3

| Example | Hydrogen content (% by mass) | Hydrogen content (% by atom) | Parent Phase |
|---|---|---|---|
| 1-7-2 | 0.22 | 11.0 | Fe amorphous single phase |
| 1-11-2 | 0.10 | 5.3 | Fe amorphous single phase |
| 1-11-3 | 0.06 | 3.2 | Fe amorphous substance + αFe crystal phase |
| 1-12-1 | 0.02 | 0.81 | $Fe_2B$ amorphous single phase |
| 1-14-1 | 0.06 | 3.2 | Fe amorphous substance + αFe crystal phase |

From the results, it was confirmed that the metal-based structure according to the present invention was the hydrogen-containing metal-based structure, and further was the hydrogen-containing amorphous structure.

As described above, the hydrogen, which does not go out from the metal-based structure when the metal-based structure of the present invention is heated at 200° C. for 2 minutes, is the non-diffusible hydrogen. It can be said accordingly that the hydrogen content described above is the content of the non-diffusible hydrogen, because it is the hydrogen content after the structure is heated at 200° C. for 2 minutes.

As described above, when hydrogen is contained in the metal-based structure, the crystallization of the metal-based reduced substance is inhibited when it is grown, as a result, it can be said that the amorphous state or a state close thereto is generated in the metal-based structure. It is accordingly assumed that when hydrogen was contained, the amorphous phase was formed.

When this is seen from the aspect of the hydrogen content, it can be said that the formation of the amorphous phase could be controlled by controlling the hydrogen content of the metal-based structure.

(Mixing Step by Dropwise Addition and Mixing Step by Stirring)

There are differences described below between the mixing step by the dropwise addition and the mixing step by stirring. When the mixing by the dropwise addition was performed, the metal-based structure after the deposition was the amorphous single phase (Example 1-11, FIG. 47, X1 phase) and the hydrogen content was 0.1% by weight (Example 1-11-2). After the heat-treatment at 600° C., the structure was the αFe single phase, and only the existence of the Fe element was observed (Example 1-11-5, X3 phase). On the other hand, when the mixing by stirring was performed, the metal-based structure after the deposition was the αFe phase (Example 1-14, FIG. 66, Y1 phase) and the hydrogen content was 0.06% by weight (Example 1-14-1). After the heat-treatment at 600° C., the structure was αFe single phase, and only the existence of the Fe element was observed (Example 1-14-2, FIG. 67, Y3 phase). Y1 phase has the amorphous part capable of forming the crystal phase from the result of Y3 phase.

From the measurement results, the following assessment is made. When the stirring condition upon the deposition reaction was changed, different phases (X1 phase and Y1 phase) were formed starting from the same starting material, and the same phase (X3 phase and Y3 phase) was formed after the heat-treatment at 600° C. The first starting material and the final αFe phase are the same, and the difference occurred only in the phase (X1 phase and Y1 phase) after the deposition and the drying, and thus the hydrogen content of the metal-based structure and the formation of the amorphous phase could be controlled by controlling the liquid state upon the deposition reaction. This is assumed to be the influence caused by inhibition of application of the mechanical outer force to the deposited particles as much as possible, as described above.

(Consideration about Formation of Amorphous Phase by Control of Hydrogen Content)

Although the detailed explanation is described below, when the mixing method upon the deposition reaction was changed, the structure had a high hydrogen content and the amorphous single phase was formed when the dropwise addition was performed; whereas, the structure had a low hydrogen content, and the crystallized parts were partly formed when the stirring was performed. It is considered that when the stirring was performed upon the deposition reaction, the binding reaction state between Fe and hydrogen was changed to decrease the hydrogen content, whereby a part of the structure was crystallized.

On the other hand, when the amorphous single phase was heated, the hydrogen content was decreased, whereby a part of the structure was crystallized. It is considered that the crystal phase was formed by decreasing the hydrogen content. In that case, the structure having a high hydrogen content formed the amorphous single phase, and a structure having a low hydrogen content was crystallized in part, similarly to the above.

When the hydrogen content was changed by the two different operations, i.e., the mixing operation upon the deposition reaction, and the heat-treatment, the structure having a high hydrogen content formed the amorphous single phase, and the structure having a low hydrogen content was crystallized in part, in both cases. That is, the same results were obtained by the different operation methods.

Collectively, it is a universal conclusion that the formation of the amorphous phase can be controlled by controlling the hydrogen content, because the formation of the Fe amorphous phase, which has not hitherto been obtained, was realized by containing hydrogen, and the same cause and effect relationships were obtained in the hydrogen content and the formation of the amorphous phase by the two different operations.

(Measurement 3) SEM Observation

Using a scanning electron microscope ("VE-9800" manufactured by Keyence Corporation), the metal-based structure obtained in each Example was observed (secondary electron beam images). A sample to be measured was not subjected to a pre-treatment such as evaporation, and the sample put on a conductive pressure-sensitive adhesive tape pasted on a sample stand was observed as it was. A pressure of a measurement chamber in which the material was put was maintained at $10^{-3}$ Pa or less. An acceleration voltage and a working distance at the measurement are shown in a view showing the measurement results. A magnification at the measurement and a scale bar are also shown in the view.

A short axis length d of the metal-based structure was measured as follows:

In an SEM image measured, 10 measurement points were selected at random, a short axis length was measured at each measurement point without any treatment such as binarization, and an average value was obtained. When the metal-based structure was filament-shaped or had an element of filament shape, a width perpendicular to a long axis of the metal-based structure was measured as the short axis length d. When the metal-based structure was formed of the staple-shaped element or the bead-shaped element, a short axis length in apart in which the short axis length located nearest the measurement point is maximum was measured as the short axis length d at the measurement point.

With respect to the long axis length L of the metal-based structure, a length between both terminals of the metal-based structure was measured in an SEM image measured, and the obtained length was defined as the minimum value of the long axis length. The measured long axis length L of the metal-based structure was defined as the length measured or longer.

The aspect ratio L/d was defined as a value obtained by dividing the long axis length L by the short axis length d, the short axis length being obtained at any point at which the long axis length L was measured in the metal-based structure.

SEM observation results are shown in FIG. 2 to FIG. 38.

The relationships in each Example and view, and the shape classification of the obtained metal-based structure are as follows:

| | | |
|---|---|---|
| Example 1-1 | FIG. 2 to 5 | staple web |
| FIG. 4 is the enlarged view of the middle part of FIG. 2. | | |
| Example 1-2 | FIG. 6 | filament web |
| Example 1-3 | FIG. 7 | filament web |
| Example 1-4 | FIGS. 8 and 9 | filament web |
| Example 1-4-2 | FIGS. 10 and 11 | filament web |
| FIG. 10 is the enlarged view of the middle part of FIG. 11. | | |
| Example 1-4-3 | FIGS. 12 to 15 | filament web |
| FIG. 14 is the enlarged view of the middle part of FIG. 13. | | |
| Example 1-5 | FIG. 16 | bead web |
| Example 1-6 | FIG. 17 | filament web |
| Example 1-7 | FIGS. 18 to 21 | bead bulk |
| FIG. 19 is the enlarged view of the middle part of FIG. 18 | | |
| FIG. 20 is the enlarged view of the middle part of FIG. 19. | | |
| FIG. 21 is the enlarged view of the upper middle part of FIG. 19. | | |
| Example 1-7-1 | FIG. 22 | bead bulk |
| Example 1-7-3 | FIG. 23 | bead bulk |
| Example 1-7-4 | FIGS. 24 and 25 | sinter solidified substance of bead bulk |
| FIG. 25 is the enlarged view of the middle part of FIG. 24. | | |
| Example 1-8 | FIG. 26 | bead bulk |
| Example 1-9 | FIG. 27 | bead web |
| Example 1-9-1 | FIG. 28 | sintered body of bead web |
| Example 1-9-2 | FIG. 29 | sintered body of bead web |
| Example 1-10 | FIG. 30 | staple web |
| Example 1-11 | FIGS. 31 and 32 | filament web |
| FIG. 31 is the enlarged view of the middle part of FIG. 32. | | |
| Example 1-12 | FIG. 33 | bead bulk |
| Example 1-12-1 | FIG. 34 | bead bulk |
| Example 1-12-2 | FIG. 35 | sintered body of bead bulk |
| Example 1-13 | FIGS. 36 to 38 | bead web |

-continued

| FIG. 36 is the enlarged view of the middle part of FIG. 38. | | |
| FIG. 37 is the enlarged view of the middle part of FIG. 36. | | |
| Example 1-11-3 | FIG. 68 | filament web |
| Example 1-11-5 | FIG. 69 | sintered body of filament web |

The short axis length d (average value), the long axis length L and the aspect ratio L/d, obtained from the SEM observation results, are shown as follows:

Example 1-1 FIG. 3 short axis length d: 130 nm
long axis length L: 3.9 µm
aspect ratio L/d: 27

Example 1-2 FIG. 6 short axis length d: 140 nm
long axis length L: 4.0 µm
aspect ratio L/d: 24

Example 1-3 FIG. 7 short axis length d: 150 nm
long axis length L: 3.8 µm
aspect ratio L/d: 21

Example 1-4 FIG. 8 short axis length d: 110 nm
long axis length L: 2.7 µm
aspect ratio L/d: 17

Example 1-4-2 FIG. 10 short axis length d: 130 nm
long axis length L: 2.1 µm
aspect ratio L/d: 17

Example 1-4-3 FIG. 15 short axis length d: 130 nm
long axis length L: 6.9 µm
aspect ratio L/d: 40

Example 1-7 FIG. 20 short axis length d: 250 nm

Example 1-9 FIG. 27 short axis length d: 200 nm
long axis length L: 2.8 µm
aspect ratio L/d: 10

Example 1-10 FIG. 30 short axis length d: 120 nm
long axis length L: 3.8 µm
aspect ratio L/d: 21

Example 1-11 FIG. 31 short axis length d: 110 nm
long axis length L: 5.6 µm
aspect ratio L/d: 52

Example 1-12 FIG. 33 short axis length d: 300 nm

Example 1-13 FIG. 37 short axis length d: 330 nm
long axis length L: 3.7 µm
aspect ratio L/d: 8.1

From the results above, the following can be understood. In the wire shape of the amorphous phase according to the present invention, two modes of the wire shape, the wire shape based on the filament and the bead wire shape based on the bead are produced, i.e., there are at least two kinds of grown particles corresponding to the two modes of the wire shape and the bead wire shape in the grown particles developing into the metal-based structure. When the magnetic field is applied to the specific grown particles, the two kinds of shapes, i.e., the wire shape and the bead wire shape, are obtained depending on the influences of the magnetic property, the shape, the size (the whole size), and the like. The content of the reducible substance dominantly influences the factor to divide the nature of the grown particle into two. Provided that, there is the transitive content regions, and whether it is formed into the wire shape based on the filament or it is formed into the bead wire shape based on the bead is decided depending on the magnetic field strength there.

In both cases in which the solvent is water and the solvent contains the alcohol, when the content of the reducible substance is 3 mmol/kg or more, it is easy to obtain the metal-based structure having the filament-shaped wire shape, and when the content of the reducible substance is less than 60 mmol/kg, it is easy to obtain the metal-based structure having the bead wire shape. The threshold values thereof tend to be decreased when the magnetic field strength is strong, i.e., when the neodymium magnet is used.

The shapes are further changed by changing the timing at which the magnetic field is applied to the grown particles and the magnetic field strength. The following theoretical formula is obtained.

grown particles 2kinds×magnetic field action(the presence or absence of the magnet)2kinds=4 modes(filament/staple,bead wire/bead bulk)

Further, variations of middle modes are produced by applying the middle magnetic field strength or changing the timing of the magnetic field action.

Further, the bead bulk in which the formless phase is produced is formed by increasing the hydrogen content of the metal-based structure or adding the alcohol to the solvent. The formless phase can be formed within the range of the content of reducible substance shown in Example 1. In particular, when the content of the reducible substance is 0.3 mmol/kg or more and less than 60 mmol/kg, it is easy to form the formless phase. When the solvent contains the alcohol, it is easy to form the formless phase.

The existence of the formless phase is effective for obtaining the minute metal-based structure or the crystallized metal-based structure.

The short axis length of the filament or staple was from about 100 to 150 nm, and the remarkable increase thereof by the heat-treatment was not observed (Example 1-4-3). The short axis length of the mode in which the bead is the basic shape (the bead wire, bead bulk, and bead powder) was from about 200 nm to 300 nm.

With respect to the long axis length, the filament of 10 μm or more, 30 μm or more, or 40 μm or more was obtained. In the filament, an aspect ratio of 10 or more, 20 or more, 50 or more, or 150 or more was observed. In the bead wire, a long axis length of 10 μm or more and an aspect ratio of 8 or more, or 25 or more were obtained.

The metal-based structures having 4 kinds of linear shapes of filament/staple measured had almost the same short axis length d of 110 to 130 nm. The tendency in which the filament to which the magnetic field action is applied has a prolonged short axis length, compared to the staple to which the magnetic field action is not applied is not particularly observed. From this, it can be considered that the magnetic field action had no influence on prompting the growth in a direction of the short axis (Example 1-1, Example 1-4, Example 1-10 and Example 1-11).

From the results above, it is considered that after the formed particles were grown to a certain pre-determined size, they are bound to each other to form the shape having the long axis direction. In particular, the bead wire has the shape in which the spheres form an almost line in the long axis direction, and the state in which they are stuck to each other in the short axis direction is hardly observed, and thus the formation process above can be demonstrated. It is considered that when the magnetic field is applied during the binding, the linearity in the long axis direction was increased, as a result, the wire shape having a long length in the long axis direction, and having a high aspect ratio, expressed by long axis length/short axis length was obtained. It is considered that the length in the short axis direction was not prolonged in the case in which the magnetic field action was applied, and thus the formed particles were preferentially bound to each other in the long axis direction, and the binding of the particles in the short axis direction was not advanced or the advance was extremely decreased.

It can be further considered that the wire having a large curve (winding) like the staple was formed by the influence in which the substantial magnetic field effect was decreased by the long elapsed time from the deposition (Example 1-2) or the insufficient magnetic field strength (Example 1-3) when the magnetic field was applied, even if having the wire shape.

There were no differences in the shape of the obtained filament in the comparison of the case in which the magnetic field action was applied through glass with the case in which it was directly applied (Examples 1-4 and 1-4-2).

From the results above, the following is understood. When the hydrogen content was measured as described above for the shape having the component of the wire shape based on the filament, the shape having the component of the bead wire shape, and the shape having a large amount of the formless phase, they were confirmed to be the hydrogen-containing metal-based structure, or the hydrogen-containing amorphous structure.

It became possible to obtain the metal-based structure formed of the metal single phase, or the metal element single phase (for example, the αFe single phase). In particular, it was found that the amorphous-containing substance and/or the hydrogen-containing substance were effective for obtaining the high purity metal-based structure formed of the metal single phase, or the metal element single phase.
(Relationship Between Concentration (Content of Reducible Substance) and Hydrogen Content)

(S1) Without restrictions on the solvent, when the content of the reducible substance (unit: mmol/kg, hereinafter which is abbreviated to "FS") was adjusted to 0.3 mmol/kg or more, the metal-based structure having a hydrogen content (unit: % by mass, hereinafter which is abbreviated to "H") of 0.01% by mass (0.4% by atom) or more could be obtained (Example 1-12). The upper limit of the "FS" is the saturated concentration, unless otherwise noted.

(S2) Without restrictions on the solvent, when FS is 3 mmol/kg or more, H of 0.05% by mass (2.7% by atom) or more is obtained (Example 1-11).

(S3) In particular, when the solvent containing water+alcohol was used, FS of 0.3 mmol/kg or more and H of 0.05% by mass (2.7% by atom) or more, 0.1% by mass (5.3% by atom) or more, or H of 0.2% by mass (10.1% by atom) or more can be obtained. The hydrogen content, accordingly, is increased by adding the alcohol to the solvent.

(S4) It is a value obtained by diving a molar concentration of hydrogen contained in the hydrogen-containing reducing agent by a valence of the metal-based ion according to the reducible substance, which means a hydrogen concentration per monovalent metal-based ion according to the reducible substance, unit: mmol/kg, which is referred to as "H/+." The content of the reducing agent (the content of $NaBH_4$ in Examples), unit: mmol/kg, hereinafter which is abbreviated to "NB." Without restrictions on the solvent, when H/+ of 6 (NB:3) mmol/kg or more, or H/+ of 20 (NB:10) mmol/kg or more, the tendency (S1, S2, or S3) is remarkably expressed (Example 2-21, Example 2-14). In both cases of "H/+" and "NB," the upper limit is the saturated concentration, unless otherwise noted.

From the above, it can be said that the hydrogen content of the metal-based structure according to the present invention can be controlled by controlling the concentration of the reducible substance. It can be said that the hydrogen content can also be controlled by adjusting the kind and the concentration of the solvent.
(Relationship of Concentration (Content of Reducible Substance), Hydrogen Content and Metal Phase)

(S5) Without restrictions on the solvent, when H is adjusted to 0.01% by mass (0.4% by atom) or more in a case in which FS is 0.3 mmol/kg or more and H/+ is 20 (NB:10) mmol/kg or more, the formation of oxide is suppressed, thereby to obtain the metal-based structure formed of the metal single phase or the metal element single phase (Example 1-12, Example 2-14, and Example 2-21).

(S6) Without restrictions on the solvent, when H is adjusted to 0.05% by mass (2.7% by atom) or more in a case in which FS is 3 mmol/kg or more and H/+ is 20 (NB:10) mmol/kg or more, the metal-based structure formed of the metal element single phase is obtained (Example 1-11).

(S7) In particular, when the solvent containing water+alcohol is used, FS is adjusted to 0.3 mmol/kg or more, H/+ is adjusted to 20 (NB:10) mmol/kg or more, and H is adjusted to 0.05% by mass (2.7% by atom) or more, 0.1% by mass (5.3% by atom) or more, or 0.2% by mass (10.1% by atom) or more, then the metal-based structure formed of the metal element single phase is obtained. The solvent containing water+alcohol has a big effect of increasing the hydrogen content (Example 1-7).

(S8) When water is used as the solvent, and FS is adjusted to 0.3 mmol/kg or more and less than 14 mmol/kg and H/+ is adjusted to 6 (NB:3) mmol/kg or more and less than 120 (NB:60) mmol/kg, or FS is adjusted to 1.0 mmol/kg or more and less than 3.0 mmol/kg and H/+ is adjusted to 20 (NB:10) mmol/kg or more and less than 120 (NB:60) mmol/kg, then the metal-based structure containing the intermetallic compound ($Fe_2B$) formed of the metal and the semi-metal, or the metal-based structure formed of the intermetallic compound (Fe$_2$B) single phase is obtained (Example 1-12 and Example 2-20).

From the above, it can be said that the composition of the amorphous phase of the metal-based structure according to the present invention can be controlled by adjusting the concentration of the reducible substance.

(Relationship Between Hydrogen Content and Metal Phase)
<Hydrogen Content from S1 to S8>

(S9) When H is adjusted to 0.01% by mass (0.4% by atom) or more, the metal-based structure formed of the metal single phase or the metal element single phase is obtained.

(S10) When H is adjusted to 0.05% by mass (2.7% by atom) or more, H is adjusted to 0.1% by mass (5.3% by atom) or more, or H is adjusted to 0.2% by mass (10.1% by atom) or more, the high purity metal-based structure formed of the metal element single phase is obtained.

From the results above, when the hydrogen content of the metal-based structure is changed, the purity of the metal component (the metal element and/or the semi-metal element) of the crystal phase or in the crystal phase, included in the metal-based structure or the crystallized metal-based structure, is changed. For example, in the comparison of the metal-based structure in which the oxide phase and the metal phase are mixed and the metal-based structure formed of the metal single phase, the purity of the metal component in the latter is higher. Here, the metal phase is a phase formed of the metal element and/or the semi-metal element, and examples thereof may include a metal element single phase, alloy, a semi-metal, an intermetallic compound, solid solution thereof, a mixture thereof, and a composite thereof. The metal single phase is, as described above, the phase formed of the metal alone, and is exemplified by a phase containing no phase other than the metal phase, such as an oxide. The metal element single phase is a phase formed of the metal element alone, including no semi-metal element, and includes a phase formed of a single metal element alone (single metal element single phase) and a phase formed of multiple metal elements. In the latter, the phase in which multiple phases of the single metal element single phase, alloy phases formed of the metal element, and intermetallic compound phases (in this case, formed of the metal element alone) are mixed may sometimes be obtained.

For example, in the comparison of the Fe$_2$B single phase, which is the intermetallic compound single phase, and the αFe single phase, which is the metal element single phase, the latter contains no semi-metal element, and thus the latter has a higher purity of the metal element than that of the former, and is the metal-based structure with a higher purity. Similarly, when, in the metal-based structure having the amorphous part, or having the amorphous part and containing hydrogen, the crystal phase after the crystallization is formed of the metal single phase or the metal element single phase, it is understood that the former has a higher purity of the metal component, and the latter has a higher purity of the metal element, excluding the hydrogen element. From this, the metal-based structure formed of the metal element single phase, and the metal-based structure, which has the amorphous part, has the amorphous part and contains hydrogen, or is formed of the amorphous single phase wherein it is formed of the metal element single phase by crystallization, are referred to as a "high purity metal-based structure." In addition, the metal-based structure formed of the metal single phase, and the metal-based structure, which has the amorphous part, has the amorphous part and contains hydrogen, or is formed of the amorphous single phase wherein it is formed of the metal single phase by crystallization, are referred to as a "metal-based structure formed of the high purity metal component."

These phases are assessed by the measurement results in the X-ray diffraction described above. For example, in the X-ray diffraction spectra obtained from the metal-based structures, when only the peak based on the metal element single phase, for example, αFe single phase, was substantially observed, it was assessed that it was a metal-based structure formed of the metal element single phase (αFe single phase).

The purity of the metal component in the metal-based structure, particularly the metal-based structure containing the amorphous part, or the purity of the metal element is defined by the hydrogen content of the metal-based structure or the metal-based structure containing the amorphous part, i.e., the metal-based structure formed of the high purity metal component can be obtained by adjusting H to 0.01% by mass (0.4% by atom) or more. Further, the high purity metal-based structure can be obtained by adjusting H to 0.05% by mass (2.7% by atom) or more, to 0.10% by mass (5.3% by atom) or more, or to 0.20% by mass (10.1% by atom) or more. From this, the high purity metal-based structure in which the metal element has a high purity can be obtained by increasing the hydrogen content of the metal-based structure. When the metal-based structure contains the amorphous part, or is the amorphous single phase, the effect of forming the high purity metal-based structure is greater. The hydrogen content can be controlled by, for example, the control of the concentration of the reducible substance, the concentration of the reducing agent or H/+, and further the control of the solvent composition (Example 1-7, Example 1-11, and Example 1-12).

As shown in Examples, in particular, when Fe is used among the ferromagnetic substances, the metal-based structure in which the crystallization phase is formed of the metal element single phase (αFe) or the intermetallic compound phase (Fe$_2$B) is obtained at H of 0.01% by mass (0.4% by atom) or more (Example 1-12). Further, the high purity metal-based structure in which the crystallization phase contains, as a main component, the metal phase (αFe) or is formed of the single phase of the metal phase (αFe) is obtained at H of 0.05% by mass (2.7% by atom) or more, H of 0.10% by mass or more (5.3% by atom), or H of 0.20% by mass (10.1% by atom) or more (Example 1-11, Example 1-7). The formation of the formless phase is promoted at H of 0.05% by mass (2.7% by atom) or more, H of 0.10% by mass (5.3% by atom) or more, or H of 0.20% by mass (10.1% by atom) or more (Example 1-7). The high purity metal-based structure in which the crystallization phase is formed of the single phase of the metal phase (αFe) is also obtained in that case. The effect above is more remarkably exerted when the solvent containing water+alcohol is used (Example 1-7).

With respect to the hydrogen content, H of 0.01% by mass (0.4% by atom) or more is obtained at FS of 0.3 mmol/kg or more (Example 1-12). H of 0.05% by mass (2.7% by atom) or more is obtained at FS of 3 mmol/kg or more (Example 1-11). The hydrogen content, accordingly, is increased by increasing the concentration of the reducible substance (FS). When the solvent containing water+alcohol is used, H of 0.05% by mass (2.7% by atom) or more, 0.10% by mass (5.3% by atom) or more, or 0.20% by mass (10.1% by atom) or more is obtained at FS of 0.3 mmol/kg or more (Example 1-7). The hydrogen content is increased by adding the alcohol to the solvent as above. The tendency described above remarkably exerts at H/+ of 6(NB:3) mmol/kg or more, and further, the metal-based structure formed of the metal phase (αFe) or the intermetallic compound phase (Fe$_2$B) is obtained avoiding the formation of the oxide at H/+ of 20 (NB:10) mmol/kg or more (Example 2-21 and Example 2-14).

From the results above, the purity of the desired crystal phase or metal element in the metal-based structure can be defined by the hydrogen content. It is possible to control the hydrogen content by the concentration of the reducible substance, the concentration of the reducing agent or H/+, and the solvent composition.

When operations other than Examples are performed, a relationship between the hydrogen content and the control element thereof, and a hydrogen content specified value for obtaining a desired crystallization phase may be experimentally obtained according to the methods shown in Examples, and the like. Provided that when the metal-based structure contains hydrogen, the structure contains H in a content of 0.01% by mass (0.4% by atom) or more, H in a content of 0.05% by mass (2.7% by atom) or more, H in a content of 0.10% by mass (5.3% by atom) or more, or H in a content of 0.20% by mass (10.1% by atom) or more, the structure contains hydrogen in a specified value or more and/or the structure contains the amorphous part, there is the effect of increasing the purity of the metal element in the metal-based structure and, at the same time, there is the effect of controlling the shape of the metal-based structure.

In addition, there is the effect on the formation of the formless phase, when the metal-based structure contains hydrogen, the structure contains H in a content of 0.01% by mass (0.4% by atom) or more, H in a content of 0.05% by mass (2.7% by atom) or more, H in a content of 0.10% by mass (5.3% by atom) or more, or H in a content of 0.20% by mass (10.1% by atom), the structure contains hydrogen in a specified value or more and/or the structure contains the amorphous part.

When the composition of the solvent is adjusted, in particular, the alcohol is used as the solvent or the solvent containing the alcohol is used, or water is used as the solvent in which the alcohol is contained, the hydrogen content of the metal-based structure is increased compared to a case in which water is used as the solvent in Example 1; as a result, the high purity metal-based structure can be easily produced. Further, the effect of decreasing the cavity ratio of the solidified substance after the sintering or the crystallization can be promoted by promoting the formation of the formless phase. The effect above is particularly effective on the production of the metal-based structure formed of the ferromagnetic substance, and on Fe.

The alcohol is a substance in which a hydrogen atom on the hydrocarbon is substituted by a hydroxyl group (—OH), and examples thereof may include methanol, ethanol, propanol, and the like. The alcohols may be used alone or as a mixture. It is effective that the content of the alcohol is adjusted to less than 90% by mass, relative to the mass of the solvent, preferably less than 60% by mass, more preferably less than 50% by mass. When the reducible substance is water-soluble, it is effective to contain the alcohol in water, and usefully, the saturated concentration of the reducible substance to the solvent may sometimes be controlled by adjusting the alcohol content to less than 90% by mass, preferably less than 60% by mass, more preferably less than 50% by mass. In that case, it may be preferable to adjust the alcohol content to a range from 1% by mass or more and less than 50% by mass, it may be more preferable to adjust the content to a range of 5% by mass or more and less than 50% by mass, and it may be particularly preferable to adjust the content to a range of 10% by mass or more and less than 40% by mass. In the production of the metal-based structure formed of, particularly, the ferromagnetic substance, or Fe, it is effective to use ethanol as the alcohol, and in the production of the hydrogen-containing metal-based structure, the use of ethanol is particularly effective. It may sometimes be good to use ethanol as a main component in combined with another alcohol such as propanol.

(Measurement 4) DSC

The heat characteristics of the metal-based structures obtained in Examples were measured using a differential scanning calorimetry apparatus ("DSC-60" a pan made of Al, manufactured by Shimadzu Corporation, elevating the temperature at 3° C./minute to 500° C.

The measurement results are shown in FIG. 53 to FIG. 58.

The relationships between each Example and Fig. are as follows:

Example 1-4-1 FIG. 53
Example 1-7 FIG. 54
Example 1-10 FIG. 55
Example 1-11 FIG. 56
Example 1-12-1 FIG. 57
Example 1-13 FIG. 58

As described above, the crystallization temperature can be confirmed by the DSC profile.

(Significance of Heat-Treatment Step)

The metal-based structure formed of the amorphous single phase (X1 phase) in Example 1-11 (FIGS. 31 and 47) formed the crystal phase (X2 phase) in Example 1-11-3 or 1-11-4 by heat-treatment at 450° C. At the same time, the hydrogen content was decreased by 40% to X1 phase. When it was further subjected to the heat-treatment at 600° C. in additional Example 1-11-5, the crystal phase became more dominant. It was considered to be the αFe single phase having a high crystallinity, and there were no elements other than Fe (X3 phase).

From the experimental results above, the following can be understood. The metal-based structure, which was just deposited and dried, was the amorphous substance of Fe containing hydrogen (X1 phase), and when it was subjected to the heat-treatment, the hydrogen content was decreased and the αFe crystal phase was formed (X2 phase). When it was further subjected to the heat-treatment at a higher temperature, the metal-based structure of the αFe single phase having a higher crystallinity (X3 phase) was obtained. The hydrogen content of the metal-based structure can be controlled by the heat-treatment (the decrease of the hydrogen content). When it is seen from the aspect of the hydrogen content, it can be said that it was possible to control the amorphous phase (the formation of the crystal phase) by the control (decrease) of the hydrogen content.

From the results of the SEM observation, in the nanowire structure, the hydrogen content was decreased and the large shape change was not observed after the heat-treatment at 450° C. (FIG. 68) at which the crystal phase was formed, compared to the structure which was just deposited and dried (FIG. 31). Further it was observed that the wires were stuck to each other after the heat-treatment at 600° C. (FIG. 69), and at the same time the decrease of the cavity was observed.

It is effective to perform the heat-treatment so that the temperature is maintained at a temperature at which the heat generation is observed in the DSC analysis on the formation of the crystal phase. At that time, it may sometimes be more effective to perform the treatment in a reduced pressure or in a vacuum atmosphere on the decrease of the hydrogen content and/or the promotion of the crystallization. It is also possible to control the hydrogen content and/or the crystallization of the metal-based structure by controlling the heat-treatment temperature and atmosphere.

2. Example 2

As shown in Table 4, as in Example 1, the aqueous iron sulfate solutions having a different concentration and the aqueous solution containing the reducing agent (NaBH$_4$), having a different concentration were prepared, and the aqueous reducing agent solution was added dropwise to the aqueous iron sulfate solution at room temperature to obtain the deposit. As described above, the concentration fluctuation of the reducible substance at the dropwise addition can be decreased by adding the reducing component to the solution of the reducible substance, whereby the metal-based structure can be stably formed.

As the solvent of the aqueous solution, water was used.

After the dropwise addition of the aqueous reducing agent solution was finished, the liquid was allowed to stand for 15 minutes, and a neodymium magnet-2 was brought into contact with an outer bottom face of the beaker to obtain deposit. The washing was performed in the washing condition 1 once or more while the state in which the magnet was brought into contact with the beaker was maintained. After the washing, the magnet was separated, the deposit remaining on the bottom face of the beaker was put in a glass tube whose one side was sealed, and was dried in the drying condition 1. While the exhaust ventilation in the glass tube by the rotary pump was continued, the heat-treatment was performed in the heat-treatment condition 1 in which the heat temperature was changed to 150° C. and the retention time was changed to 2 minutes.

After that, while the exhaust ventilation was continued, the glass tube was vacuum-sealed in a state in which the substance was put in the glass tube. The glass tube was maintained at 600° C. for 60 minutes using an air atmosphere furnace with a temperature elevation rate of 20° C./minute, and was cooled to room temperature in the furnace. After the heat-treatment, the substance in the glass tube was obtained as a crystallized metal-based structure (Example 2-1 to Example 2-20). In Example 2-21, after the dropwise addition of the aqueous reducing agent solution was finished, the liquid was allowed to stand for 15 minutes, and the resulting liquid was filtered. The filtered deposit was washed in the washing condition 1. After the washing, the deposit was put in a beaker, which was dried in a desiccator to obtain a metal-based structure.

An X-ray diffraction spectrum of the metal-based structure obtained as above was measured in the same manner as in Example 1, whereby the crystal phase was examined. The results are shown in Table 4.

Example 2-12 and Example 2-19 were respectively quoted from Example 1-11-1 and Example 1-12-2, wherein the operation conditions are as described above.

In Table 4, a volume ratio was calculated based on a volume of the iron sulfate solution in which 1 kg of the solution containing the iron sulfate was assumed to be 1 L and 1 kg of the solution containing NaBH$_4$ was assumed to be 1 L.

Symbols showing the crystal phase in Table 4 have the following meanings.

F: αFe single phase
F/(B): mainly formed of αFe and a slight amount of Fe$_2$B was mixed
F—O: mixture of αFe and Fe oxide
F/B: mixture of αFe and Fe$_2$B
FB: Fe$_2$B single phase
FO: Fe oxide

[Table 4]

TABLE 4

| | Aqueous iron sulfate solution | | Aqueous Reducing agent (NaBH$_4$) solution | | Solution concentration conversion | | Volume ratio Based on | |
|---|---|---|---|---|---|---|---|---|
| Example | Solvent Water [g] | Solution concentration Based on solvent [mol/kg] | Solvent Water [g] | Solution concentration Based on solvent [mol/kg] | H concentration [mol/kg] | H/+ [mol/kg] | iron sulfate [L/L] | Crystal phase |
| 2-1 | 13 | 1.4E+00 | 15 | 3.5E+00 | 1.4E+01 | 7.0E+00 | 1.1E+00 | F |
| 2-2 | 13 | 1.4E+00 | 12 | 1.0E+00 | 4.1E+00 | 2.0E+00 | 9.0E−01 | F |
| 2-3 | 13 | 1.4E+00 | 25 | 6.3E−01 | 2.5E+00 | 1.3E+00 | 1.9E+00 | F |
| 2-4 | 13 | 1.4E+00 | 25 | 6.3E−02 | 2.5E−01 | 1.3E−01 | 1.9E+00 | F |
| 2-5 | 16 | 1.0E−01 | 12 | 1.0E+00 | 4.1E+00 | 2.0E+00 | 7.4E−01 | F/(B) |
| 2-6 | 16 | 6.7E−02 | 20 | 3.6E+00 | 1.4E+01 | 7.1E+00 | 1.2E+00 | F |
| 2-7 | 16 | 6.7E−02 | 12 | 1.0E+00 | 4.1E+00 | 2.0E+00 | 7.4E−01 | F/(B) |
| 2-8 | 16 | 6.7E−02 | 6 | 1.0E+00 | 4.1E+00 | 2.0E+00 | 3.7E−01 | F |
| 2-9 | 16 | 6.7E−02 | 24 | 1.0E+00 | 4.1E+00 | 2.0E+00 | 1.5E+00 | F |
| 2-10 | 16 | 6.7E−02 | 25 | 6.3E−01 | 2.5E+00 | 1.3E+00 | 1.5E+00 | F |
| 2-11 | 16 | 6.7E−02 | 15 | 3.5E−01 | 1.4E+00 | 7.0E−01 | 9.3E−01 | F |
| 2-12 | 16 | 6.7E−02 | 25 | 6.3E−02 | 2.5E−01 | 1.3E−01 | 1.5E+00 | F |
| 2-13 | 16 | 6.7E−02 | 110 | 1.4E−02 | 5.8E−02 | 2.9E−02 | 6.8E+00 | F/B |
| 2-14 | 16 | 6.7E−02 | 125 | 6.3E−03 | 2.5E−02 | 1.3E−02 | 7.7E+00 | F—O |
| 2-15 | 16 | 1.3E−02 | 15 | 3.5E+00 | 1.4E+01 | 7.0E+00 | 9.4E−01 | F |
| 2-16 | 48 | 1.3E−02 | 45 | 7.0E−02 | 2.8E−01 | 1.4E−01 | 9.4E−01 | F/(B) |
| 2-17 | 480 | 2.7E−03 | 15 | 3.5E+00 | 1.4E+01 | 7.0E+00 | 3.1E−02 | F/B |
| 2-18 | 480 | 2.7E−03 | 75 | 6.3E−01 | 2.5E+00 | 1.3E+00 | 1.6E−01 | F/B |
| 2-19 | 120 | 2.7E−03 | 60 | 2.6E−02 | 1.1E−01 | 5.3E−02 | 5.0E−01 | FB |
| 2-20 | 480 | 2.7E−03 | 440 | 1.4E−02 | 5.8E−02 | 2.9E−02 | 9.2E−01 | FB |
| 2-21 | 360 | 2.7E−03 | 930 | 2.6E−03 | 1.0E−02 | 5.1E−03 | 2.6E+00 | FO |

As shown in Table 4, when the concentration of an aqueous reducing agent solution was excessively low, the reduction of Fe ions in the aqueous iron sulfate solution did not appropriately occur, and the peak belonging to the Fe oxide appeared in the X-ray diffraction spectrum of the metal-based structure. When the concentration of an aqueous iron sulfate solution was not excessively low, αFe was confirmed by increasing the concentration of an aqueous reducing agent solution, and when the concentration of an aqueous iron sulfate solution is 15 mmol/kg or more, only the peak belonging αFe appeared in the X-ray diffraction spectrum of the metal-based structure (FIG. 65 (Example 2-12), FIG. 59 (Example 2-3)). When the concentration of an aqueous reducing agent solution is excessively high, not only the peak of αFe but also the peak belonging to $Fe_2B$ appeared in the X-ray diffraction spectrum of the metal-based structure (FIG. 60 (Example 2-7)). When the concentration of an aqueous iron sulfate solution is excessively low, only the peak belonging to $Fe_2B$ appeared in the X-ray diffraction spectrum of the metal-based structure (FIG. 50 (Example 2-19)).

Summarizing the results above, the effects caused by the concentration of an aqueous iron sulfate solution and the concentration of an aqueous reducing agent solution on the crystal phase or the composition of the metal-based structure can be shown as in FIG. 61. It is considered that, in a part near to a border in each region, the composition is changed due to the influence of adjacent regions. Specifically, at a part near to a border between a region of αFe and a region of Fe oxide, there is a mixed part in which both αFe and Fe oxide exist, as shown in Example 2-14.

Example 2-12 is quoted from Example 1-11-1.
Example 2-19 is quoted from Example 1-12-2.

In the results described below, the upper limits of "FS" and "NB" (the concentration of an aqueous reducing agent solution) are both the saturated concentration, unless otherwise noted. The upper limit is a saturated concentration, unless otherwise noted. The saturated concentration at room temperature in FS and NB were respectively 1.4 mol/kg and 14 mol/kg (H/+:28 mol/kg).

(S11) When FS is 3 mmol/kg or more, and H/+ is 20 (NB:10) mmol/kg or more, then the metal phase containing mainly αFe is obtained.

(S12) When FS is adjusted to 3 mmol/kg or more, H/+ is adjusted to 20 (NB:10) mmol/kg or more, and H is adjusted to 0.05% by mass (2.7% by atom) or more, then the metal phase containing mainly αFe is obtained (Example 2-12, and Example 1-11-2).

(S13) When FS is 15 mmol/kg or more, and H/+ is 30 (NB:15) mmol/kg or more and less than 2000 (1000) mmol/kg, then the αFe single phase of high purity metal phase is obtained as the crystallization phase.

(S14) When FS is adjusted to 15 mmol/kg or more, H/+ is adjusted to 30 (NB:15) mmol/kg or more and less than 2000 (1000) mmol/kg, and H:0.05% by mass (2.7% by atom) or more, then the αFe single phase of high purity metal phase is obtained as the crystallization phase (Example 2-12 and Example 1-11-2).

(S15) When FS is 15 mmol/kg or more and less than 150 mmol/kg, and H/+ is 30 (NB:15) mmol/kg or more and less than 2000 (NB:1000) mmol/kg, then the αFe single phase of high purity metal phase is obtained as the more stable crystallization phase.

(S16) When FS is adjusted to 15 mmol/kg or more and less than 150 mmol/kg, H/+ is adjusted to 30 (NB:15) mmol/kg or more and less than 2000 (NB:1000) mmol/kg, and H is adjusted to 0.05% by mass (2.7% by atom) more, or H is adjusted to 0.1% by mass (5.3% by atom) more, then the αFe single phase of high purity metal phase is obtained as the more stable crystallization phase (Example 2-12 and Example 1-11-2).

The deposition performed in a state in which FS is a value near to the saturated concentration or FS is in an oversaturation state is preferable in terms of the operation, because it is easy to adjust FS to a certain range. It is possible to adjust the saturated concentration by adjusting the composition of the solvent.

As shown in Table 4, a basic tendency is that when the concentration of the aqueous reducing agent solution is a certain value or more and the volume ratio is large, the crystallized metal-based structure having αFe single phase is obtained. Although the upper limit of the volume ratio is not particularly limited, it is preferably 5.0 or less, more preferably 2.0 or less.

Specifically, as shown in FIG. 62, the following two threshold values, N-1 and N-2 could be set for the concentration of an aqueous reducing agent solution.

N-1 is H/+:14 (NB:7) mmol/kg.
N-2 is H/+:60 (NB:30) mmol/kg.

The following 5 threshold values, L-1 to L-5 could be set for the volume ratio.
L-1: 0.02
L-2: 0.2
L-3: 0.6
L-4: 0.8
L-5: 1.0

When the threshold values were N-1 or more and L-1 or more, the metal single phase having no oxide was obtained.

When the threshold values were N-2 or more and L-2 or more, the metal phase (αFe) was obtained.

When the threshold values were N-2 or more and L-3 or more, it was easy to obtain the metal phase (αFe).

When the threshold values were N-2 or more and L-4 or more, it was easier to obtain the metal phase (αFe).

When the threshold values were N-2 or more and L-5 or more, it was particularly easy to obtain the metal phase (αFe).

3. Consideration 3-1. Control of (i)-(iii) by H % Control
(i) Formation of Amorphous Phase (Dropwise Addition/Stirring and Heat-Treatment) <Consideration 1> <Consideration 4>

The mixing method during the deposition reaction was changed (Example 1-11). In the case of the dropwise addition, the hydrogen content was high, i.e., 0.1% by weight (5.3 at %), and the Fe amorphous single phase was formed (Example 1-14), and in the case of the injection mixing and the stirring, the H content was low, i.e., 0.06% by weight (3.2 at %) and a part of the Fe amorphous substance was crystallized. It is considered that the binding reaction state between Fe and H was changed by stirring the system during the deposition reaction to decrease the H content, whereby a part of the amorphous substance was crystallized <Consideration 1>.

On the other hand, (Example 1-11-3), the amorphous single phase was heated to decrease the H content, and a part of the Fe amorphous substance was crystallized at 0.06% by weight (3.2 at %). It is considered that the H content was decreased by the heating to change the binding reaction state between Fe and H, whereby the crystal phase was formed. In that case, similarly to the above, the amorphous single phase was formed in the case of the high H content; whereas, a part of the amorphous substance was crystallized in the case of the low H content <Consideration 4>.

When the H content was changed by the two different operations, i.e., the mixing operation during the deposition reaction, and the heating treatment, the amorphous single phase was formed in the case of the high H content; whereas, a part of the amorphous substance was crystallized in the case of the low H content in both operations. That is, the same results were obtained by the different operation methods.

Summarizing the above, the formation of the Fe amorphous phase could be realized by containing H, wherein it had hitherto been difficult to form the Fe amorphous phase. Further, the amorphous phase containing the crystal phase in part was formed by decreasing the hydrogen content in the two different operations. As the same cause and effect relationships could be obtained in the different operations, it was concluded as the universal conclusion that the formation of the amorphous phase could be controlled by controlling the hydrogen content.

The effects above are large when the metal-based structure has an H % of 2.0 at % or more (m≤30, for reference), and further the effects are larger when the structure is, in addition to the H % above, formed of the metal element, or the single element metal (Fe). When the H content is 0.061% by weight (3.3 at %) or more, 0.075% by weight (4.0 at %) or more, or 0.095% by weight (5.04 at %) or more, the amorphous single phase containing hydrogen, formed of the metal element or formed of the single element metal (Fe), are obtained.

The present application provides the method for controlling the formation of the amorphous phase of the metal-based element, metal element, and single element metal, which is difficult to cause not only in a usual equilibrium reaction but also in non-equilibrium reaction such as a rapid solidification processing of melted metal. In particular, the formation of a compound of Fe with H has not been found, and the solid solution of H is known but it has hitherto been known that it is very difficult to form a combined state of Fe—H. In the present application, the formation of the Fe amorphous phase containing hydrogen is deduced that the crystallization of Fe is inhibited by exhibiting a specific bound reaction state of Fe and H, which has not hitherto been considered, as a result, whereby the Fe amorphous phase is formed (amorphized) by containing hydrogen. As the specific bound reaction state can be formed in Fe, which is the element having a very low binding reactivity with H, the method for controlling the hydrogen content and the method for controlling the formation of the amorphous phase of the present application are effective for other metal elements having a reactivity with H equal to or stronger than Fe.

(ii) Particle Shape Control (Control of Shaped/Formless Shape)
<Consideration 3>

In the comparison of Examples 1-12, 1-11 and 1-7, the H contents were respectively 0.02% by weight (0.81 at %), 0.10% by weight (5.3 at %) and 0.22% by weight (11.0 at %), and the particle shape was shaped (300B), shaped (100F), or has 300B+formless phase. From the above, it was understood that the formless phase could be formed by increasing the H content. Specifically, when the H content is more than 0.10% by weight (5.5 at %), 0.12% by weight (6.5 at %) or more, or 0.19% by weight (9.4 at %) or more, the formless phase-forming efficiency is increased. Conversely, when the H content is 0.27% by weight (13 at %) or less, 0.19% by weight (9.4 at %) or less, or 0.10% by weight (5.5 at %) or less, the shaped phase (shaped particle)-forming efficiency is increased. The H content is controlled by the solvent control, whereby the particle shape (shaped/formless) can be controlled. In particular, when the alcohol or ethanol is contained in the solvent, the control efficiency may sometimes be increased. Combining it with the results in Consideration 5 described below, when the H content is 0.037% by weight (2.0 at %) or more and 0.27% by weight (13 at %) or less, the self-granulating reaction particles having a particle size of 500 nm or less, and containing mainly the metal element or formed of the single element metal (Fe) are formed. When the H content is 0.037% by weight (2.0 at %) or more and 0.19% by weight (9.4 at %) or less, or 0.10% by weight (5.5 at %) or less, the self-granulating reaction particles having a particle size of less than 175 nm, and containing mainly the metal element or formed of the single element metal (Fe) are formed.

(iii) Composition Control <Consideration 5>

(Example 1-12) When the concentration of the reducible substance (FS), FS_Low was 2.7 mmol/kg and H % was 0.02% by weight (0.81 at %), the metal-based ($Fe_2B$ composition) amorphous single phase was obtained. (Example 1-11) When FS_High was 67 mmol/kg and H % was 0.10% by weight (5.3 at %), the metal (Fe) amorphous single phase was obtained. (Example 1-7) In the condition in which ethanol was added to the solvent, when FS_Low was 2.7 mmol/kg and H % was 0.22% by weight (11.0 at %), the metal (Fe) amorphous single phase was obtained.

When the H % of the metal-based structure is increased by "solute control," i.e., by changing the concentration of, mainly, the reducible substance, a metal-based structure formed of the metal element, or the single element metal (Fe), containing no semi-metal element is obtained. When the "solvent control" is performed, i.e., the H % of the metal-based structure is increased by adding ethanol to water of a solvent, the same metal-based structure formed of the metal element, or the single element metal (Fe), containing no semi-metal element is obtained.

The H % control and the composition control can be performed by a different operation, the "solute control" or the "solvent control"; in other word, it is possible "to control to the high purity metal composition formed of the metal element, containing no semi-metal element, or the metal single element composition (Fe) by increasing the H %." It is judged that "to control the composition by the H % control" and "to control to the high purity metal composition formed of the metal element, or the metal single element composition (Fe) by the increase of the H %" are universal results, because the same cause and effect relationship can be obtained by the different operation.

Considering Consideration 1 and Consideration 4 together, in Example 1-14 and Example 1-11-3, when the H % was 0.06% by weight (3.2 at %), the Fe metal-based structure containing the amorphous phase was obtained, and thus when H % is 0.018% by weight (1.0 at %) or more, 0.037% by weight (2.0 at %) or more, or 0.056% by weight (3.03 at %) or more, the metal-based structure formed of the metal element or the metal single element composition (Fe), or the metal-based structure having the amorphous phase at least in part, which is formed of the metal element or the metal single element composition (Fe) is obtained.

3-2. H Cluster

Example 1-11 (FS_High, Solvent Water) is considered as described below. <Consideration 2>

(a) It is difficult to form the stable amorphous phase for Fe atoms, but the stable amorphous phase containing H was formed in the present application.

(b) In the Fe amorphous phase, a lot of (5.29 at %) H atoms are stably contained in a non-diffusion state.

(c) The formation of the hydrogen compound is not confirmed from Fe.

(d) In the amorphous phase (Example 1-11) of the present application, the crystallization is performed by the heat-treatment, whereby the αFe single phase is formed.

(1) From (c), the strong binding reaction state is not formed between Fe and H in the state of equilibrium which has conventionally been known. From (a), (b) and (c), the specific reaction bound state between Fe and H, which cannot be explained by the usual state of equilibrium, is formed, in view of the high hydrogen content and the stable amorphous phase.

(2) From the result (d), the impurity components such as B in the solution are excluded, and the specific atomic structure (composition) containing Fe and H is obtained.

(3) In Example 1-11-2, the hydrogen content in the amorphous single phase was 5.29 at %, and the ratio of Fe:H was 20:1.12.

As a result of the study of the H mix proportion in Examples, the atomic mix proportion of M (metal-based atom) to H (hydrogen atom) was expressed as M:H=m:1 wherein m is an integer and m≥3. The mix proportion is a mix proportion of the aggregate or cluster, or nanoparticle or metal-based structure of the reduction deposited substance, and all of the 6 metal-based structures, whose H contents were measured in Examples, conform to the condition in which "m:1, m is an integer, and m≥3." In Examples other than Example 1-12, as the αFe single phase was formed, from the XRD results after the heat-treatment, % by weight was converted to at %, defining the metal-based atom as the Fe atom and the parent phase as Fe, and the m number (mix proportion) was obtained from the at % of Fe and the at % of H. In Example 1-12, as the Fe$_2$B single phase was formed, the m number was obtained defining the parent phase as Fe$_2$B. The measurement results are that M:H were, from top to bottom of Examples in Table 5 below, 8:0.98, 20:1.12, 30:1.01, 30:1.01, and 120:0.98. From the results above, the m number of M:H=m:1 were obtained as, from the top, 8, 20, 30, 30, and 120. In Example 1-12-1 (the bottom column in Table 5), as the parent phase is Fe$_2$B, m was, respectively, 40, 80 and 120 relative to the intermetallic compound (Fe$_2$B), the metal atom (Fe), and the metal-based atom (Fe+B).

TABLE 5

| | Parent phase | Hwt % | Hat % | Feat % | Bat % | m | m:X |
|---|---|---|---|---|---|---|---|
| 1-7-2 | Fe | 0.22 | 10.96 | 89.04 | — | 8 | 0.98 |
| 1-11-2 | Fe | 0.10 | 5.29 | 94.71 | — | 20 | 1.12 |
| 1-14-1 | Fe | 0.06 | 3.24 | 96.76 | — | 30 | 1.01 |
| 1-11-3 | Fe | 0.06 | 3.24 | 96.76 | — | 30 | 1.01 |
| 1-12-1 | Fe$_2$B | 0.02 | 0.81 | 66.13 | 33.06 | 120 | 0.98 |

From the results above, all the cases conform to the "integer rule"; that is, the planar or three-dimensional structure in which one H (hydrogen) atom exists at the center and the metal atoms are disposed outside is suggested. When the structure is formed of the metal element or the metal single element (Fe), they conform to a "regular polyhedron rule (described below)." (Regular polyhedron rule: m=4, 6, 8, 12, 20, 30.) From the conclusion, the existence of the compound or cluster, having the regular polyhedron structure or the structure having the same short distance regularity, was concluded.

Definition of Cluster: "A substance in which several to several tens or more atoms or molecules are bounded to each other by an interaction."

"H cluster" means a cluster formed of the metal-based atom and hydrogen, of the present application, including the metal-based structure, nanoparticle, or cluster having a mix proportion of M$_m$H wherein M is a metal-based atom, and m is an integer, m≥3. The shaped nanoparticle has the specific mix proportion and is the aggregate, and thus it can be said to be the H cluster.

"Metal H cluster" means the structure, nanoparticle, or cluster formed of the metal element, or the metal single element (Fe).

3-3. "Reaction Circumstance Control"

With respect to the same Examples (Comparison of Examples 1-11 and 1-14) stated in (i) amorphous phase formation by the H % control <Consideration 1>, production conditions to form the amorphous phase by the H % control is described. This is the detailed explanation about "Drop-wise Addition/Stirring."

The formation of the amorphous phase can be promoted by the "quiet reaction"; in other words, the H % content can be controlled and the formation of the amorphous phase can be controlled by the "reaction circumstance control." Further, the m number of the clusters can be controlled, whereby the metal-based structure and the physical properties of the nanoparticles can also be stably formed. The reaction circumstance control is also an important factor concerning the self-granulating reaction, and the physical properties of the shaped particle can be stably formed by "quiet reaction," as in the formation of the amorphous phase.

The same "solution" was used, and the rate of change C in the reaction circumstance (described below) was changed. There was a difference in the amorphous phase after the drying. After the heat-treatment at 600° C., αFe was formed in both cases. Only the formation of the amorphous phase could be controlled (amorphous single phase or partly crystallized) by changing the rate of change C in the reaction circumstance. (1) When C was adjusted to 0.4252, the amorphous single phase of the single element metal (Fe) having a hydrogen content, H % of 0.10 and m of 20 was obtained. (2) When C is adjusted to 2.5781, the amorphous phase-containing single element metal structure was obtained which had an H % of 0.06, and an m of 30, was the single element metal (Fe) amorphous phase+αFe, and had a crystallized part in part.

The reaction circumstance control is to control the change during the reaction in the comparison with a standing state before the reaction (difference from the standing state), and is a very important control factor for obtaining the predetermined effects of the present application. When the change of the pressure [Pa], temperature [K], and magnetic field effect [T] of the solution during the reaction are controlled to values sufficiently small (<1E(−4)), for example, when the temperature is a normal temperature, the pressure is a normal pressure, and there is no change in the magnetic field effect (a permanent magnet is fixed) as in Examples, the "reaction circumstance control" is performed by controlling amounts of change in the "volume factor" and the "stirring factor" to specific values or less.

"Volume Factor"

Volume Element V [1/second]:

A rate of increase in the volume by mixing: V=V2/V1/time

A rate of increase in the volume by mixing: V2/V1/time [1/second]

Amount of increase in the volume by mixing: V2/time [mL/second]

"Stirring Factor"

It is defined by a stirring element S [1/second]: a stirring speed, a revolution speed (the number of revolutions) of a rotor, the number of vibrations of the solution, a moving velocity of the solution, and the like. S [1/second]: the number of revolutions of a rotor [1/second], the number of vibrations [1/second] in the case of the solution vibration. Sv [mm/second]: the maximum speed of a rotor [mm/second], the maximum moving velocity [mm/second] (the moving velocity is a speed to a vessel) in the case of the moving of the solution. When there is a steady flow, a relative velocity to the steady flow [mm/second], Sv, is appropriately converted to S. S=Sv/(2πr), Sv=2πrS wherein r is a radius of a rotor.

TABLE 6

| Example No. | | Volume factor | | | | Stirring factor | |
|---|---|---|---|---|---|---|---|
| | | V1 mL | V2 mL | times | V 1/s | V2/time mL/s | S 1/s | Sv mm/s |
| 1-11 | Dropwise addition | 16 | 25 | 300 | 0.0052 | 0.0833 | 0.42 | 40 |
| | | Dropwise addition | | | | | Generation of bubbles | |
| 1-14 | Stirring | 48 | 75 | 20 | 0.0781 | 3.7500 | 2.5 | 236 |
| | | Injection | | | | | Stirring with glass rod | |

V: Volume Element, evaluates the mixed state of the solution.

$V = V2/V1/\text{time}$,

V1: a volume of a reducible solution, V2/time: a dropwise addition rate of a reducing agent
S: Stirring Element, evaluates the stirring state of the solution.
S: a stirring speed, the number of revolutions [1/second], Sv: the maximum speed of a rotor [mm/second]
Sv=2πrS (r: a radius of a rotor)

In Example of stirring (Example 1-14), the middle part of the beaker having an inner diameter of about 60 mm was stirred at a rotation of φ30 mm using a glass rod. In Example wherein r=15 mm, the dropwise addition was S=2.5 [1/second] (2.5 revolutions per second) (Example 1-11), as a result of the observation, the moving velocity of the bubbles introduced by the dropwise addition of the reducing agent immediately after the dropwise addition was 40 [mm/second]. The slight stirring occurred by the movement of the bubbles. The stirring element was obtained from the moving velocity of the bubbles. The results were obtained from Sv=40 [mm/second] (measurement), the stirring element: S=Sv/(2πr)=0.42 [1/second], and r=15. The results are shown in Table 6.
C: Rate of change in the reaction circumstance (the total of the rates of change influencing the change of the deposition reaction) [1/second]

$C = \Sigma(V+S+P+T+m+ \ldots)$

When the mixing method was changed during the deposition reaction, in the case of the dropwise addition (Example 1-11), the hydrogen content was high and the amorphous single phase was formed, and in the case of the injection mixing and the stirring (Example 1-14), the H content was low and the crystallization occurred in part. When the rate of change C in the reaction circumstance was 3.1 [/second] or less, i.e., the total of the change elements in the reaction circumstance, C=V+S, was 3.1 or less, the amorphous phase-containing substance was obtained which had an H % of 2.0 at % or more or 2.7 at % or more, having an m number of 41 or less or 30 or less, and was formed of the metal element or the metal single element.

When C was adjusted to 2.47 or less, or V was controlled to 0.07 or less and S was controlled to 2.4 or less, or V was controlled to 0.07 or less and Sv was controlled to 200 or less, the amorphous single phase was obtained which had an H % of 3.3 at % or more or 4.1 at % or more, and an m number of 29 or less or 20 or less, and was formed of the metal element or the metal single element.

When C was controlled to 2.47 or less, or V was controlled to 0.07 or less and S was controlled to 2.4 or less, or V was controlled to 0.07 or less and Sv was controlled to 200 or less, the shaped particles were stably formed by the self-granulating reaction {e.g., refer to Example 1-11 (the shaped particle 100F) and Example 1-12 (the shaped particle 300B)}. In order to stably advance the self-granulating reaction, the same conditions as the formation condition of the amorphous single phase are preferable.

3-4. "Threshold Values" and H %, m Number (Selectively Formed m Number of 30 or More/or Less)

The binding reaction state of the metal element or semimetal element and H, the metal element and H, or the Fe and H as shown in Examples, is selectively controlled by changing, in addition to the "reaction circumstance control," the "solution control," in particular, a concentration of the reducible substance (FS concentration); as a result, the hydrogen content in the metal-based structure, nanoparticle or cluster is controlled, and the specific mix proportion (the m number) is controlled. Further, the particle shape, i.e., the hydrogen content, composition and crystal structure, shape and size of the particle, can also be controlled.

In the present application, the existence of a "threshold value T of a concentration of the reducible substance" for controlling the hydrogen content, or controlling the m number has been found. (Example 1-11) At a threshold value T or more, the H % is controlled to 2.0 at % or more and m controlled to 30 or less, and a structure, nanoparticle, or cluster (metal H cluster), formed of the metal element or the metal single element (Fe) can be formed. (Example 1-12) At a less than threshold value T, the H % is controlled to less than 2.0 at % and m is controlled to m≥31, and a metal-based structure formed of an Fe$_2$B composition can be formed. The "threshold value T can be controlled" by the solvent control. (Example 1-7) The threshold value is decreased by adding an alcohol (or ethanol) to a solvent, and at a threshold value T or more, the H % is controlled to 2.0 at % or more and m is controlled to m≤30, or the H % is controlled to 9.0 at % or more and m is controlled to m≤8, and a formless phase in which shaped particles 300B are mixed is formed, and a structure formed of the metal element, or the structure formed of the single element metal (Fe) are obtained. In Examples in the present application, when the solvent is water, the threshold value is 0.21% of the saturated concentration, or 3 mmol/kg, and when an alcohol is added, the threshold value is decreased to 1/10 and is 0.3 mmol/kg. The amount of the alcohol added of 1% by weight or more is effective. When the solvent is ethanol, the effect may sometimes be further increased.

When the concentration (metal ion concentration) of the reducible substance is adjusted to the threshold value or more, a structure, nanoparticle, or cluster ("metal H cluster") may sometimes be produced which consists of the metal element, or the single element metal (Fe), without the semi-metal. The threshold value relates to the cluster composition (metal element) and does not necessarily correspond to the particle shape.

There is a strong interrelationship between the FS concentration and the particle shape. There is a case in which the size of the shaped particle does not change depending on the kind of the solvent. In Examples in the present application, the addition of the alcohol to the solvent decreased the threshold values of the H % and them number, but did not change the size of the shaped particle. (Example 1-12) before the addition (the solvent was water), the shaped particle was 300B at a concentration of the reducible substance of 2.7 mmol/kg, and (Example 1-7) in the case of addition of the alcohol to the solvent, the shaped particle was 300B at a concentration of the reducible substance of 2.7 mmol/kg. The size of the shaped particle was not changed by the change of the solvent.

There is a strong interrelationship between the FS concentration and the m number at a threshold value or more. In the structure, nanoparticle or (metal) cluster formed of the metal element, or the single element metal (Fe), formed at the threshold value or more, a product having a lower the H % content and a larger the m number is formed with increase of the concentration of the reducible substance, and the H % content and the m number, respectively, negatively and positively correlate to the concentration of the reducible substance; in other words, the tendency is observed in which the metal component is increased and the hydrogen content is decreased in the structure with increase of the concentration of the reducible substance.

5. Control of Shaped Particle Shape, Self-Granulating Reaction, and Magnetic Field Alignment <Consideration 2>

In Examples of the present application, it was found that there was an interrelationship between the concentration of the reducible substance (FS) and the particle shape. As shown in Examples below, the "shaped particles" having uniform characters, such as the shape and the size, of each of 100F and 300B in FS_High and FS_Low are formed. The features of the characters are that (1) they have the uniform shape and size; (2) they have the specific composition; (3) they are the amorphous phase; and (4) they have the specific amorphous phase structure (the DSC results are different).

The results are compared below.

(Example 1-11) In the condition in which a concentration of the reducible substance (FS) was FS_High: 67 mmol/kg and the solvent was water, the amorphous single phase having a hydrogen content, H %, of 0.10% by weight and a mix proportion, m, of 20, formed of 100F shaped particles, and having the single element metal (Fe) composition, from XRD results, was obtained. DSC results: two peaks of heat generation.

(Example 1-12) In the condition in which a concentration of the reducible substance (FS) was FS_Low: 2.7 mmol/kg and the solvent was water, the amorphous single phase having an H % of 0.02% by weight and an m of 40, 80, 120, formed of 300B shaped particles, and having the $Fe_2B$ composition, from XRD results, was obtained. DSC results: one of endothermic change and one peak of heat generation.

(Example 1-7) In the condition in which a concentration of the reducible substance (FS) was FS_Low: 2.7 mmol/kg and the solvent was water+ethanol, the amorphous single phase having an H % of 0.22% by weight and an m of 8, formed of 300B+formless phase, and having the single element metal (Fe) composition, from XRD results was obtained. DSC results: one endothermic change and one peak of heat generation.

(1) The Shape and the Size are Uniform.

When the metal-based structure is based on the shape of staples or filaments, particles having uniform sizes between 110 and 150 nm (referred to as "100 F") are observed. When the metal-based structure is based on the bead shape, particles having uniform size from 200 to 330 nm (referred to as "300B") are observed.

(2) To have a Specific Composition. <Consideration 2>

(Example 1-11) 100F shaped particles, and the single element metal (Fe) composition from XRD results after the heat-treatment. (Example 1-12) 300B shaped particles, and the intermetallic compound $Fe_2B$ composition from XRD results after the heat-treatment. (Example 1-7) 300B (+formless phase), and the single element metal (Fe) composition from XRD results after the heat-treatment.

From the XRD measurement results after the heat-treatment, when the composition of the metal-based element other than H is observed, it is controlled to the specific composition of the metal element single element (Fe) or the intermetallic compound ($Fe_2B$); that is, it is controlled to either the single element metal or the intermetallic compound composition, and there is no mixture. In Example 1-7, the formless phase is contained, but the $\alpha Fe$ single phase is formed as a whole, and thus 300B in Example 1-7 is also the single element metal (Fe) composition, concerning the metal-based element.

(3) It is the amorphous phase. (4) The specific amorphous phase structure exists (DSC results are different). (Example 1-11) 100F shaped particles and the amorphous single phase, DSC results: two peaks of heat generation, (Example 1-12) 300B shaped particles and the amorphous single phase, DSC results: one endothermic change and one peak of heat generation. It is understood that the two kinds of the shaped particles are both the amorphous single phase, but are different in the amorphous phase structure from the DSC results.

These shaped particles are formed by advance of the self-granulating reaction in a manner in which the H % is controlled by the "reaction circumstance control" in addition to the control of the concentration of, in particular, the reducible substance in the "solution control." The self-granulating reaction particles, accordingly, are formed by spontaneous growth of the aggregate until a specific character is formed by the self-granulating reaction. The formation of particles having uniform characters by the above mechanism is the mark. In particular, (1) and (2) are important characters to control the self-granulating reaction. In addition, as Examples in the present application, the formation of the shaped particle formed of the amorphous phases (self-granulating reaction particles) is a very specific phenomenon, a part in the present application is based on the finding of the phenomenon and consideration of the control method. In particular, the effects of the self-granulating reaction of the present invention are particularly very high when the metal-based structure is the ferromagnetic substance containing the metal, or the metal element, as a main component, or is formed of the metal element single phase (Fe).

In addition, from the results of each DSC analysis of the two kinds of the self-granulating reaction particles, 100F and 300B, it is understood that they are both the amorphous single phase structures, but there is a difference in the amorphous phase structure. It is suggested that the results above arise from a cause in which a smaller aggregate forming each particle have a structure different from the other. In particular, it is considered that, in Example 1-11, the peak of heat generation at a lower temperature side among the two peaks of heat generation demonstrates the structure change from the structure formed of the compound or cluster having an m number of 20 (Example 1-11-2) to the structure formed of that having an m number of 30 (Example 1-11-3).

The detailed mechanism of the self-granulating reaction is unclear, but it is considered that an effect of a surface area, resulting from the specific uniform size, is one of the factors of self-control. Further, in a case of Examples in the present application, the particles have a specific magnetism, because they are aggregated and aligned in a magnetic field, and the magnetism is one of the factors of self-control; in other words, there is a possibility in which a magnetically stable shape is formed. It is not observed that the particle size is changed depending on the presence or absence of a magnetic action, and thus it is considered that the self-control by the magnetic property of the particle itself may act.

In order to form the shaped particle by itself, i.e., to stably advance the self-granulating reaction, the "reaction circumstance control" is important, and it is preferable that the control is performed so that "the reaction is quietly advanced," as in Examples in the present application. Further, in order to stably form the shaped particles, or to advance the self-granulating reaction, the formation of the structure, nanoparticle, or cluster having a specific mix proportion is very effective. When a compound or a cluster having a mix proportion of $M_mH$ wherein m is an integer and m≥3, or a compound or a cluster having a specific m number wherein m≤30, which conforms to the regular polyhedron rule, in addition to the above, an ordered structure or compound with a short range is formed by the clusters, the self-granulating reaction is stably advanced due to the specific crystal structure, composition, and magnetic characteristics of the clusters or aggregates thereof, and shaped particles having the uniform properties can be stably and effectively formed, as shown in Examples.

Production (Control) Method

When the concentration (FS) of the reducible substance is controlled as described below, a different H %, m number, shaped particle, composition and crystal structure can be selectively formed (controlled). When FS (Low range): 0.3≤FS<15, (0.3≤FS<3) mmol/kg is satisfied, an amorphous single phase having 0.4 at %≤H %<2.0 at %, an m number ≥31, 300B, and $Fe_2B$ composition can be obtained. When FS (High range): 3≤FS (preferably 150 or less), (preferably 15≤FS≤150) mmol/kg is satisfied, a metal-based structure containing Fe amorphous phase, or an Fe amorphous single phase, having 2.0 at %≤H %, an m number ≤30, and 100 F can be obtained.

Further, it is preferable to satisfy the following conditions.

The lower limit: hydrogen-containing substance concentration: H/+>12 mmol/kg, FS>0.3 mmol/kg. Further, in order to stably advance the self-granulating reaction, it is preferable that H/+ is less than 2000 mmol/kg, FS is less than 150 mmol/kg. Further, in the FS (Low range) above, it is preferable that FS: 0.3 mmol/kg or more and less than 14 mmol/kg, and H/+:6 (NB:3) mmol/kg or more and less than 120 (NB:60) mmol/kg; more preferably that FS: 1.0 mmol/kg or more and less than 3.0 mmol/kg, and H/+:20 (NB:10) mmol/kg or more and less than 120 (NB:60) mmol/kg, in terms of the stable operation.

Further, in the FS (High range) above, it is preferable that (S16) FS: 15 mmol/kg or more and less than 150 mmol/kg, H/+:30 (NB:15) mmol/kg or more and less than 2000 (NB:1000) mmol/kg, and H: 0.05% by mass (2.7% by atom) or more, more preferably that H: 0.1% by mass (5.3% by atom) or more, in terms of the stable operation.

Magnetic Field Alignment

When the shaped particles formed by the self-granulating reaction are aggregated and aligned in a magnetic field, a secondary structure can be very effectively formed because of the uniform property. At that time, the secondary structure can be very effectively formed by the effect of improving the adherence, when the H % is the specified value or more, and the amorphous phase is contained.

3-6. Summary of m Number Control

A. Method for Controlling m Number

To control the m number is the control of the H %, and thus the m number cannot be directly controlled by the H concentration during the reaction, for example, the H content in the reaction liquid as in the case of the control of the H %. In the present application, in view of the circumstance, the same indirect control as in the H % control, is tried, and it has been found that the m number can be controlled by the "reaction circumstance control" and the "solution control."

The methods for controlling the m number (operation items and conditions) are as follows:

(1) "solution control"

a threshold value of concentration of reducible substance

<Considerations 2 and 5>

(2) "reaction circumstance control"

dropwise addition/injection stirring m 20/30 formation of amorphous phase

<Consideration 1>

(3) "solution control"

Solvent containing alcohol m 8 reduction of threshold value

<Considerations 3 and 5>

The descriptions of the operation methods and the results have already been individually made about the H % control, and thus only the description about the m number control is made here. As described above, it is understood that the method which is considered to be the indirect control from the viewpoint of the control of the hydrogen content of the metal-based structure is the direct control form the viewpoint of the control of the m number. It is understood that the method is a very reasonable control method from the viewpoint of the control of the m number, and it can be said that it is a phenomenon in which the presence of the H clusters is demonstrated.

(1)_Threshold Value of FS Concentration (Concentration of Reducible Substance)

It has been found that 30 or less can be obtained at a threshold value of the FS concentration or more, whereby the H % is controlled to 2.0 at % or more and the metal H clusters are formed. Considering the case of Fe ion in Examples, it is interpreted to be an indirect control that the H % is controlled by the Fe ion concentration, and the H % is increased by the increase of the Fe ion concentration from the viewpoint of the H %, but it is understood that Fe ion concentration is adjusted to the threshold value or more, i.e., the Fe ion concentration is adjusted to a specific value or more, to exclude elements other than Fe and H, whereby the Fe—H cluster is formed from the viewpoint of the Fe ion, which can be interpreted to be a direct control. When limiting to the a metal H cluster having m≤30 or less, there is a positive interrelationship between the FS concentration and the m number, that is, results of (Example 1-7) m=8 at FS_Low, and (Example 1-11) m=20 at FS_High are obtained.

From these results, according to the m number control by the reducible substance concentration, a metal H cluster having m≤30 or less is formed at the threshold value of the reducible substance concentration or more, and when the metal H cluster is formed, a metal H cluster having a large m number can be produced by increasing the concentration of the reducible substance. From the above, the m number control by the concentration of the reducible substance is interpreted to be the direct control. The method for controlling the m number by controlling the FS concentration, accordingly, has a large effect, in particular, when the reducible substance contains the metal, further when the metal H cluster is formed.

(2) "Reaction Circumstance Control"

By control of a reaction circumstance, i.e., by control of a mixing operation of (Example 1-11-2) a "dropwise addition" or (Example 1-14) an "injection mixing and stirring" when two liquids were mixed, the m numbers were respectively controlled to m=20 and m=30. The m number is also controlled by a heat-treatment different from the "reaction circumstance control"; that is, the m number was respectively controlled to m=20 and m=30 (Example 1-11-2) before the heat-treatment and (Example 1-11-3) after the heat-treatment at 450° C. From DSC analysis results of m=20 (Example 1-11, FIG. 56), two heat generation peaks are observed, and a heat generation peak at a low temperature side, about 320° C. is interpreted to be a measurement result demonstrating the structure change from an H cluster having an m number of 20 to an H cluster having an m number of 30. From the results, it is interpreted that the H cluster having an m number of 30 is energetically more stable than the H cluster having an m number of 20, the H cluster having an m number of 20, being at a higher energy level, is formed by "performing quietly" the deposition reaction, and the aggregates thereof form into the amorphous single phase. On the other hand, it is interpreted that the H cluster having an m number of 30, which is at a lower energy level and is stable, is formed by performing the "injection mixing and stirring" or the heat-treatment at 450° C. A mechanism in which the H cluster having an m number of 30, or the metal-based structure, which is aggregates of the clusters, forms an amorphous phase partly containing crystal phases, is not clear, but it is considered that the mix proportion of the metal atom is increased by increasing the m number, and formation of crystal structure formed of the metal atom is appeared. Since the result of partly containing the crystal phases, it is also interpreted that the H cluster having an m of 30 is a more stable cluster at a lower energy level or forms a more stably assembled structure.

(3) Solvent

In Examples, it was found that the effect of decreasing the threshold value of the concentration of the reducible substance is expressed by containing ethanol in the solvent. The threshold value is a concentration value or more at which the metal H cluster can be formed, it is considered that in Examples, the presence of ethanol increases the binding reactivity of Fe—H, and the metal H cluster is easily formed prior to reactions with other elements, and as a result, the metal H cluster can be formed at a lower concentration of the reducible substance, i.e., the effect of decreasing the threshold value is appeared. It is understood that the metal H cluster can be formed at a low concentration of the reducible substance by the presence of ethanol, as a result, the metal H cluster having a low content ratio of the metal atoms (the m number is small), i.e., having a large H %, is formed.

B. Phenomenon (Physical Property) Controlled by m Number

The following items are controlled by controlling the m number (physical property control by selection of cluster)
(i) H % control: m number <all Examples, measured H %>
(ii) Composition control: metal H cluster (m≥30) <Consideration 5>
(iii) Amorphous phase control: amorphous single phase (m≥20) at metal H cluster <Consideration 1>
(iv) Particle shape control: particles by self-granulating reaction (m≥8), formless phase (m≤12) <Considerations 2 and 3>

(i) H % Control

The H % (at %) is decided by the m number, i.e., the mix proportion.

(ii) Composition Control

An H cluster containing the metal-based element, or metal element is formed at an m number more than 3. A "metal H cluster" formed of metal element, or the metal single element is formed at m≤30; that is, the composition of the metal-based element is controlled. In Examples, structures, nanoparticles, or cluster, having an Fe$_2$B composition, formed of the metal and the semi-metal, and containing the metal element, were formed at m≥31. Structures, nanoparticles, or cluster, formed of the metal element or the single element metal (Fe), were formed at m≤30.

(iii) Amorphous Phase Control

In the "metal H cluster" having m≤30, the crystal structure or the amorphous structure is controlled by the m number. In Examples, an amorphous phase is formed at m≤30. A partly crystallized amorphous phase-containing structure is obtained at m=30. An amorphous single phase is formed at m≤20. There is a case in which the amorphous structure varies depending on the m number even if they have the same amorphous single phase structure. In Examples (comparison of Example 1-11-2 and 1-7), because there is a difference in DSC analysis results (FIG. 56/FIG. 54) between the case of m=20 and the case of m=8, although in both cases the amorphous single phase is formed, the difference in the amorphous structure is confirmed. It is considered that the difference in the amorphous structure is caused by the difference in the m number, i.e., the difference in the cluster structure.

(iv) Particle Shape Control (Shaped/Formless)

There is a case in which the shaped particle formation is controlled by the m number. It is particularly preferable that the shaped particles are formed by the self-granulating reaction. In Examples, shaped particles were formed by the self-granulating reaction at m≥8, and a formless phase formed of the amorphous phase was formed at m≤12 further at m≤8. A transitive state in which the shaped particles and the formless phases are mixed was obtained at m=8. Further, the shaped particles may sometimes be controlled by the m number. In Examples (Example 1-7), self-granulating reaction particles having a particle size of 500 nm or less and formed of the amorphous single phase were obtained at m≥8. Further, (Example 1-11-2) self-granulating reaction particles having a particle length of less than 175 nm and formed of the amorphous single phase were obtained at m≥12, further at m≥20. Although these self-granulating reaction particles are both has the amorphous single phase structure, since there is a difference in DSC analysis results (FIG. 54/FIG. 56), the difference in the amorphous phase structure is confirmed. It is considered that the difference in the amorphous structure is caused by the m number, i.e., the difference in the cluster structure.

What is claimed is:

1. A metal-based structure comprising a hydrogen compound, a cluster, or an aggregate thereof, represented by the general formula: $M_mH$
   wherein M represents one or more metals or a mixture of one or more metals and one or more semi-metals;
   H is a hydrogen atom; and
   i) m is an integer of 6 or more and 300 or less, or
   ii) m is an integer of 3 or more and 300 or less and the metal-based structure further comprises an amorphous phase at least in part.

2. The metal-based structure according to claim 1, wherein m is any of 4, 6, 8, 12, 20, or 30.

3. The metal-based structure according to claim 1, further comprising a metal-based amorphous phase which is amorphized by containing hydrogen.

4. The metal-based structure according to claim 1, wherein at least a part of the hydrogen, which is contained in the metal-based structure after the metal-based structure is heated at 200° C. for 2 minutes, is non-diffusible hydrogen.

5. The metal-based structure according to claim 1, wherein m is an integer of 6 or more and 300 or less and the metal-based structure further comprises an amorphous phase at least in part.

6. The metal-based structure according to claim 5, wherein the amorphous phase contains hydrogen.

7. The metal-based structure according to claim 1, further comprising a ferromagnetic substance as a main component.

8. The metal-based structure according to claim 1, wherein M comprises a metal element as a main component.

9. The metal-based structure according to claim 8, wherein the metal element comprises a single element.

10. The metal-based structure according to claim 1, wherein the metal-based structure contains iron.

11. The metal-based structure according to claim 1,
   wherein the hydrogen compound, the cluster, or the aggregate thereof has a regular polyhedron structure,
   wherein in the regular polyhedron structure, a metal atom is disposed on each vertex of the regular polyhedron structure, or on the middle of each surface or each side, centered on a hydrogen atom.

12. The metal-based structure according to claim 1, wherein m is an integer of 8 or more and 300 or less.

13. A method for producing the metal-based structure according to claim 1, which is a method for producing a metal-based structure obtained by reducing, in liquid, a reducible substance which is a substance containing a metal-based reducible component containing at least one metal element and/or semi-metal element, comprising a step of controlling at least one of the following (i) to (iii) by controlling a hydrogen content based on the whole amount of the metal-based structure, the hydrogen being contained in the metal-based structure:
   (i) controlling formation of an amorphous phase which the metal-based structure comprises;
   (ii) controlling a particle shape of the metal-based structure; and
   (iii) controlling a composition of the metal-based structure.

14. A method for producing the metal-based structure according to claim 1, the method comprising a step of:
   controlling m to be 30 or less, wherein the metal-based structure comprises a metal element as a main component, or
   controlling m to be 31 or more, wherein the metal-based structure comprises a metal as a main component.

15. A method for producing the metal-based structure according to claim 1, the method comprising a step of:
   controlling m to be 31 or more, and forming the metal-based structure comprising a metal-based amorphous phase or,
   controlling m to be 30 or less, and forming the metal-based structure comprising a metal-based amorphous phase wherein the metal-based amorphous phase comprises a metal element as a main component and/or,
   controlling m to be 20 or less, and forming the metal-based structure substantially comprising a metal-based amorphous phase alone wherein the metal-based amorphous phase comprises a metal element as a main component and/or,
   controlling m to be 12 or less, and forming the metal-based structure substantially comprising a metal-based amorphous phase alone wherein the metal-based amorphous phase comprises a metal element as a main component and at least a part of the metal-based amorphous phase is formless.

16. A method for producing the metal-based structure according to claim 1, the method comprising controlling m to be 8 or more, and controlling an average length of a particle structure of the metal-based structure or an average short axis length of a wire-shaped structure of the metal-based structure to be 500 nm or less.

17. The method according to claim 13, wherein at least a part of hydrogen contained in the metal-based structure is non-diffusible hydrogen contained in the metal-based structure after the metal-based structure is heated at 200° C. for 2 minutes.

18. A method for producing the metal-based structure according to claim 1, comprising a reduction step which comprises reducing a reducible substance containing at least one metal element and/or semi-metal element in liquid containing at least one of hydrogen and a hydrogen-containing substance, wherein at least a part of the hydrogen, which is contained in the metal-based structure after the metal-based structure is heated at 200° C. for 2 minutes, is non-diffusible hydrogen.

19. A method for producing a metal-based structure, comprising a step of applying a magnetic field to the metal-based structure according to claim 1, thereby to control a shape anisotropy of the metal-based structure.

20. A method for producing a metal-based structure comprising a step of imparting an additional substance to a cavity in the metal-based structure according to claim 1.

21. A method for producing a metal-based structure comprising a step of heating and/or pressurizing the metal-based structure according to claim 1, thereby to decrease a volume of a cavity in the metal-based structure, to stick the metal-based structures to each other, to stick the part structures in the metal-based structure to each other, and/or to stick an additional substance to the metal-based structure.

22. A method for producing a metal-based structure, comprising a step of heating the metal-based structure according to claim 1 and/or decreasing a hydrogen content of the metal-based structure according to claim 1, thereby to form a crystal phase at least in part.

23. A composite structure comprising the metal-based structure according to claim 1.

24. A metal-based structure, wherein at least a part of the metal-based structure according to claim 1 is crystalized.

25. A metal-based structure, wherein at least a part of the composite structure according to claim 23 is crystalized.

26. A method for producing a composite structure according to claim 23, the method comprising (a) a step of controlling at least one of the following (i) to (iii) by controlling a hydrogen content based on the whole amount of the metal-based structure, the hydrogen being contained in the metal-based structure:
   (i) controlling formation of an amorphous phase which the metal-based structure comprises;
   (ii) controlling a particle shape of the metal-based structure;
   (iii) controlling a composition of the metal-based structure; and
(b) adding at least one additional substance.

* * * * *